(12) United States Patent
Sakai et al.

(10) Patent No.: US 7,548,736 B2
(45) Date of Patent: Jun. 16, 2009

(54) TRANSMITTER, RECEIVER, DATA TRANSFER SYSTEM, TRANSMISSION METHOD, RECEPTION METHOD, COMPUTER PROGRAM FOR TRANSMISSION, COMPUTER PROGRAM FOR RECEPTION, AND RECORDING MEDIUM

(75) Inventors: Koji Sakai, Osaka (JP); Hitoshi Naoe, Nara (JP); Fumihiro Fukae, Sakurai (JP); Shohei Osawa, Tenri (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 634 days.

(21) Appl. No.: 11/127,264

(22) Filed: May 12, 2005

(65) Prior Publication Data

US 2005/0254456 A1 Nov. 17, 2005

(30) Foreign Application Priority Data

May 14, 2004 (JP) .............................. 2004-145114
Aug. 6, 2004 (JP) .............................. 2004-231635

(51) Int. Cl.
*H04B 1/18* (2006.01)
(52) U.S. Cl. .................. 455/151.2; 398/130; 398/140
(58) Field of Classification Search ............... 455/11.1, 455/41.1–41.3, 92, 95, 151.1, 151.2, 414.1, 455/418–420, 509, 510, 516, 517, 550.1, 455/552.1, 556.1, 556.2, 557, 566; 379/74, 379/102.01, 102.02, 102.03; 340/815.57, 340/815.6; 714/701; 398/118, 130, 140, 398/182, 202
See application file for complete search history.

(56) References Cited

U.S. PATENT DOCUMENTS

| | | | |
|---|---|---|---|
| 5,585,952 A * | 12/1996 | Imai et al. ................... 398/103 |
| 6,154,298 A | 11/2000 | Tamagawa | |
| 6,297,802 B1 | 10/2001 | Fujioka et al. | |
| 6,735,245 B1 * | 5/2004 | Palm ........................... 375/222 |
| 6,842,433 B2 * | 1/2005 | West et al. ................... 370/312 |
| 7,069,059 B2 * | 6/2006 | Osawa ......................... 455/572 |

(Continued)

FOREIGN PATENT DOCUMENTS

CN 1167380 12/1997

(Continued)

OTHER PUBLICATIONS

Infrared Data Association Serial Infrared Link Access Protocol, Version1.1, Jun. 16, 1996, pp. 1-116.

(Continued)

*Primary Examiner*—Alexander Eisen
*Assistant Examiner*—Anthony S Addy
(74) *Attorney, Agent, or Firm*—Birch, Stewart, Kolasch & Birch, LLP

(57) ABSTRACT

A transmitter apparatus transmits transfer data having a predetermined amount to a receiver apparatus. The apparatus includes a data packet generating section dividing the transfer data into multiple divisional data sets; an error detection/correction code adding section adding an error detection code (error detection information) by which an error in the divisional data sets is detected to each of the divisional data sets; and a transmitter section transmitting the multiple divisional data sets to which the error detection code is added all together. Thus, data transfer is very reliable. It takes less time to transfer data.

3 Claims, 60 Drawing Sheets

U.S. PATENT DOCUMENTS

| | | | |
|---|---|---|---|
| 7,366,532 B2 * | 4/2008 | Khawand et al. | 455/502 |
| 7,411,974 B2 * | 8/2008 | Attar et al. | 370/465 |
| 2002/0065065 A1 | 5/2002 | Lunsford et al. | |
| 2002/0196812 A1 | 12/2002 | Yamaguchi et al. | |
| 2003/0114107 A1 | 6/2003 | Aoyagi | |
| 2004/0054796 A1 | 3/2004 | Kikuchi et al. | |
| 2005/0071733 A1 * | 3/2005 | Fukae et al. | 714/776 |
| 2006/0250973 A1 * | 11/2006 | Trott | 370/252 |
| 2007/0064733 A1 * | 3/2007 | Osawa et al. | 370/468 |

FOREIGN PATENT DOCUMENTS

| | | |
|---|---|---|
| CN | 1394029 A | 1/2003 |
| EP | 0 584 464 A1 | 3/1994 |
| JP | 4-839 A | 1/1992 |
| JP | 6-70383 A | 3/1994 |
| JP | 10-98435 A | 4/1998 |
| JP | 2000-32000 A | 1/2000 |
| JP | 2002-223466 A | 8/2002 |
| JP | 2003-258880 A | 9/2003 |
| JP | 2004-94555 A | 3/2004 |
| JP | 2004-343246 A | 12/2004 |

OTHER PUBLICATIONS

Infrared Data Association Serial Infrared Physical Layer Specification, Version1.4, May 30, 2001, pp. i-viii and pp. 1-60.

* cited by examiner

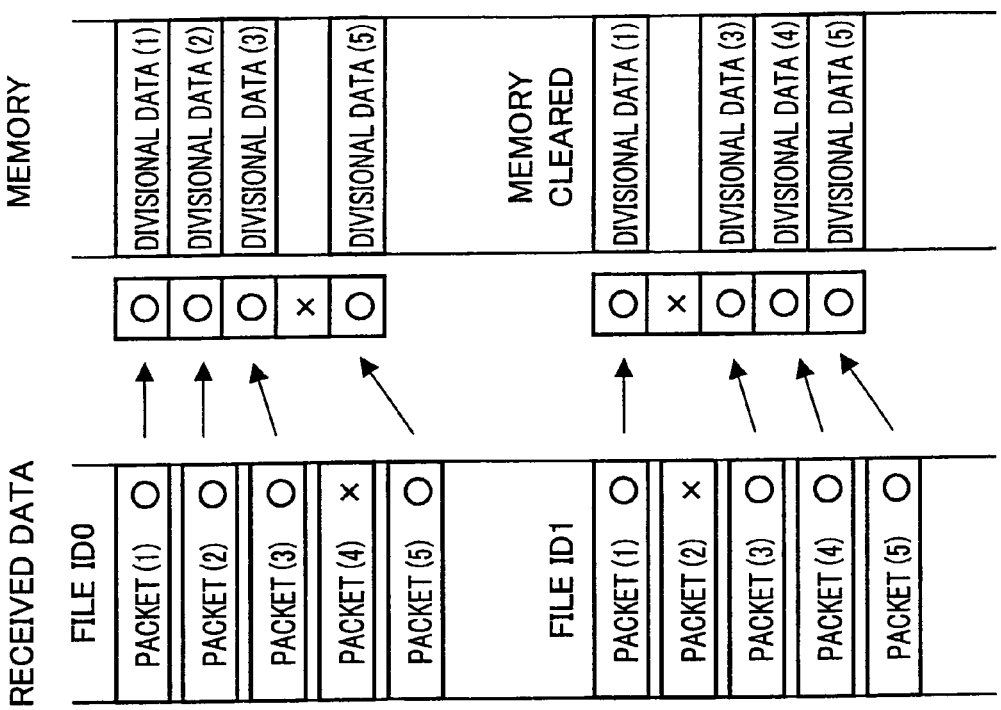
FIG. 25(b) DIFFERENT FILE IDs
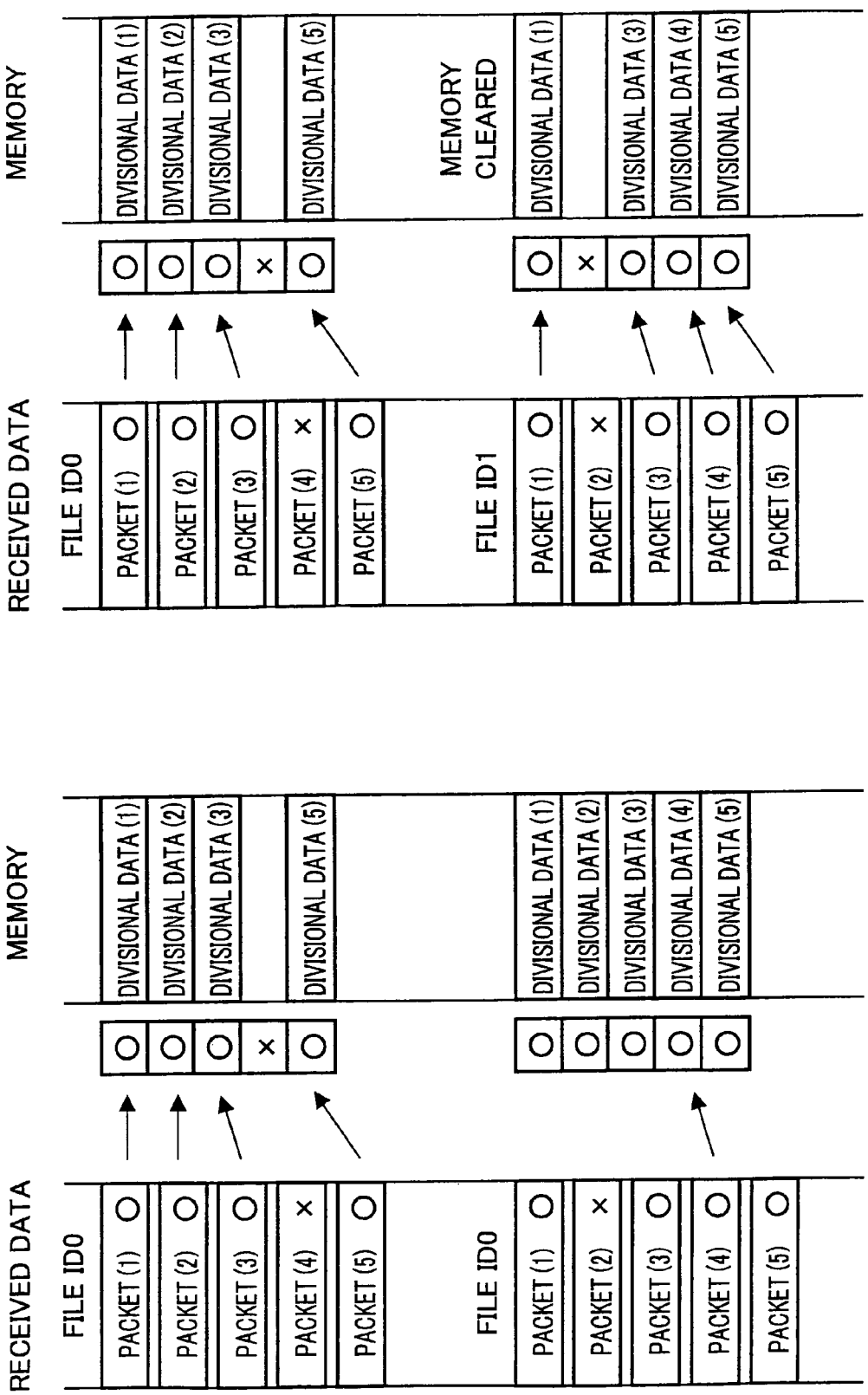
FIG. 25(a) SAME FILE IDs

| PREAMBLE FIELD | START FLAG | ADDRESS FIELD | CONTROL FIELD | DATA FIELD | FCS | STOP FLAG |

EXISTING IrDA METHOD

NEW METHOD

Twait:
CHECK THAT THERE IS
NO INCOMING SIGNAL
FOR PREDETERMINED PERIOD

Twait:
CHECK THAT THERE IS
NO INCOMING SIGNAL
FOR PREDETERMINED PERIOD

TRANSMITTER, RECEIVER, DATA TRANSFER SYSTEM, TRANSMISSION METHOD, RECEPTION METHOD, COMPUTER PROGRAM FOR TRANSMISSION, COMPUTER PROGRAM FOR RECEPTION, AND RECORDING MEDIUM

This Nonprovisional application claims priority under 35 U.S.C. § 119(a) on Patent Applications Nos. 2004-145114 filed in Japan on May 14, 2004 and 2004-231635 filed in Japan on Aug. 6, 2004, the entire tents of which are hereby incorporated by reference.

FIELD OF THE INVENTION

The present invention relates to, among others, data transmitters, data receivers, data transfer systems, data transmission methods, data reception methods, computer programs for data transmission, computer programs for data reception, and storage media.

BACKGROUND OF THE INVENTION

We have recently seen increasingly popular use of mobile phones which come with imaging functions. They are used to take pictures and send the image data to televisions, printers, or like devices where the data is processed for display or in other predetermined manners.

The mobile phone interfaces to the television, printer, or personal computer (PC) through such an infrared link as IrDA (Infrared Data Association). See Infrared Data Association Serial Infrared Link Access Protocol (IrLAP) Version 1.1 (Jun. 16, 1996) and Infrared Data Association Serial Infrared Physical Layer Specification Version 1.4 (May 30, 2001).

Infrared transmission including IrDA is directional. If the direct path between the transmitter and receiver is obstructed, no data can be transmitted. On the other hand, if the transmitter and receiver can establish a line-of-sight link, high speed data transfer is possible. IrDA standards include Very Fast InfraRed (VFIR) at a maximum transfer rate of 16 Mbps, Fast InfraRed (FIR) at 4 Mbps, and Serial InfraRed (SIR) at 115.2 kbps. Devices capable of a maximum transfer rate of up to 4 Mbps are currently available on the market.

FIG. 44 gives a rough sketch of procedures establishing a data transfer connection according to the IrDA standards for infrared links. Throughout the instant specification and claims, the "establishment of data transfer connection" refers to having the system ready for a transfer of desired data (images, documents, etc.).

A primary station is the first station to seek another party to be involved in the communications. In other words, the term refers to the station which requests the establishment of a data transfer connection or which transmits a station discovery command (XID command). A secondary station is a station which accepts the request. In other words, the term refers to the station which transmits a station discovery response (XID response) to the station discovery command. A request (instruction) from the primary station to the secondary station is called a command. The secondary station then replies to that command by sending a "response" to the primary station.

The XID command is a command to search for a station which can be a secondary station within a communicable distance of the primary station. The SlotNumber indicates the sequential number of the command being sent as counted from the first one.

The secondary station, upon receipt of an XID command, sends back an XID response (station discovery response) to notify the primary station of the presence of the secondary station. The primary station sends a specified number of XID commands and sets the SlotNumber of the last XID command to 256. The SlotNumber 256 indicates that this is the last command.

Subsequently, using a SNRM command, the primary station notifies the secondary station of a transfer rate, data size, and other settings needed for communications. Upon receipt of the command, the secondary station compares those settings to the settings on the secondary station and notifies the primary station of acceptable settings in a UA response.

Details will be given below.

According to the IrDA standards, the number of XID command packets transmitted from the primary station can be selected from 1, 6, 8, and 15. Assume, for example, that 8 XID command packets are transmitted at a time as in FIG. 44. The primary station assigns SlotNumbers 1 to 7 to the first to seventh packets respectively. The primary station further assigns a SlotNumber 256 to the last, or eighth, packet to notify the secondary station, another party involved in the transmission, that this is the last packet. About 500 ms after the transmission of the last packet, the first packet is transmitted again so as to repeat the transmission of the first to eighth packets. Consecutive packets are transmitted every 70 ms.

The secondary station is not specified to send back an XID response immediately after receiving an XID command. The secondary station sends back an XID response after receiving a packet with a predetermined SlotNumber. For example, still assuming that 8 packets are transmitted at a time, the secondary station can freely determine whether it sends back an XID response after receiving the first packet or the eighth packet. FIG. 44 shows, as an example, the secondary station sending back an XID response after receiving the third packet.

The IrDA standards stipulate that the XID command and the XID response are sent at 9600 bps transfer rate in compliance with SIR. This transfer rate is very slow compared to 4 Mbps which is the transfer rate for a data frame (will be detailed later). This will add to the time it takes for the primary and secondary stations to exchange the XID command and response.

These procedures establish a data transfer connection between the primary station and the secondary station.

Conventional IrDA high speed communications modes can deliver a transfer rate of 4 Mbps. The standards stipulate that transmit/receive waveform complies with quaternary PPM. FIG. 45 is a drawing showing a correlation between data pulses and data in quaternary PPM. 500 ns is divided into four periods, each 125 ns long. The data pulses represent 2-bit information by their temporal positions. In the figure, (1), (2), (3) and (4) represent 00, 01, 10, and 11 respectively.

The IrDA standards specify that data is transmitted frame by frame. FIG. 46 is a drawing showing a frame according to the IrDA standards. The IrDA-compliant frame includes a preamble field, a start flag, an address field, a control field, a data field, a FCS, and a stop flag. Among these fields, the preamble field is used to generate a reception clock used by the receiving end in the receiver circuit. The FCS contains an error detection code for error detection, an error correction code, etc.

Some frames are termed I (information) frames and used for information transfer. There are also S (supervisory) frames for monitoring and control of communications and U (unnumbered) frames for connection and disconnection. The I, S, and U frames are identifiable by information contained in the control field.

In most cases, data cannot be transmitted in one frame and are divided into a set of I frames for a transmission. The I frame contains transmitted data in the data field and has a serial number for use in checking missing data to achieve high reliability communications. The S frame has no data field to hold data and is used to transmit a reception preparation completion, busy, retransmit request, etc. The U frame is called the non-number frame because it is not numbered like the I frame. The U frame is used to make communications mode settings, send a response and an alert to an abnormality, and establish and cut off a data link.

FIG. 47 is a sequence diagram illustrating typical procedures in the foregoing communications method. Station A requests establishment of a data transfer connection to station B by transmitting a SNRM frame. Upon receipt, station B sends back a DM frame if communications are impossible and a UA frame indicating an acceptance if communications are possible. The SNRM frame, the DM frame, and the UA frame are all U frames. As station B sends back the UA frame, a data transfer connection is established between the two stations; the stations are ready for a data transfer.

Here, the description concerns station A transmitting to station B data divided into multiple I frames. Station A first transmits an I frame assigned a number "0" as the first data frame. Upon receipt, station B sends back a response frame (data transfer request frame) assigned a next number "1" in order to convey the intention that it needs station A to transmit a first piece of data. The response frame is an S frame termed an RR frame. Station A checks the response frame from station B and transmits an I frame containing the first divisional data set. By repeating this set of procedures as many times as necessary, accuracy in communications based on multiple I frames improves.

In an alternative transfer method, station A may transmit multiple I frames successively. When this is the case, after completing the transmission of all the I frames, station A attempts to disconnect by transmitting a DISC frame to station B. The DISC frame is a U frame indicating a disconnect request. As station B sends back a UA frame which is a U frame indicating an acceptance, station A disconnects. When either one of the stations develops a communications abnormality or other malfunction, it also sends a disconnect request to cut off the connection.

The remote controller is a communications device using infrared frequencies as the communications medium. A conventional remote controller, as shown in FIG. 48, transmits a leader code 101, custom codes 102, and control data 103 in this order. The code 101 indicates a start of a transmission. The codes 102 are assigned by each manufacturer on its own to prevent crosstalk. The data 103 forms a block containing a 2 byte pair. As can be seen here, the conventional infrared transmission format for the remote controller allows a transfer of no more than 2 bytes of data in a single transfer cycle; transfer efficiency is low.

To increase the amount of data transferred in one transfer cycle, the length of data in the data array area may be freely assigned. This method is disclosed, for example, by Japanese published patent application 6-70383/1994 (Tokukaihei 6-70383; published on Mar. 11, 1994, corresponding to EP0584464A1). Note that data and a reverse of the data are paired up for data error detection in this method too.

However, the IrDA schemes show poor transfer efficiency, because as mentioned above, the transmitter device and the receiver device frequently check that data transmission/reception is being performed between the devices during a data transfer. This adds to the transfer time, which presents problems in achieving efficient infrared data transfer. On top of it, the time it takes to establish a data transfer connection reduces overall transfer efficiency.

In contrast, according to the remote controller scheme, the entire data needs be transmitted in one transfer cycle. Therefore, the transfer cycle needs be extended in order to transmit a large amount of data, such as image data. If the data transfer is interrupted in the middle even for an instant, the receiver cannot receive the data, resulting in a low transfer reliability. The remote controller scheme is not suitable for the transfer of images and other large amount data. In addition, as mentioned above, the scheme involves reverse data, which leads to low data transfer efficiency and extended transfer time.

SUMMARY OF THE INVENTION

The present invention, conceived to address these problems, has an objective to provide a transmitter, a receiver, a data transfer system, a transmission method, a reception method, a computer program for data transmission, a computer program for data reception, a recording medium, etc., which deliver reliable and quick data transfer.

A transmitter in accordance with the present invention, to solve the problems, is a transmitter transmitting transfer data having a predetermined amount to a receiver. The transmitter includes: a dividing section dividing the transfer data into multiple divisional data sets; an error detection information adding section adding error detection information to each of the divisional data sets produced by the dividing by the dividing section, the error detection information being information to be used to detect an error in the divisional data sets; and a first transmitter section transmitting the multiple divisional data sets all together to which the error detection information is added by the error detection information adding section.

A transmission method in accordance with the present invention, to solve the problems, is a transmission method of transmitting transfer data having a predetermined amount to a transmitter. The method involves: dividing the transfer data into multiple divisional data sets; adding error detection information to each of the divisional data sets, the error detection information being information to be used to detect an error in the divisional data sets; and transmitting the multiple divisional data sets all together to which the error detection information is added.

According to the configuration and method, each divisional data set has error detection information added thereto. The receiver can determine whether any of the divisional data sets contains an error, and perform a predetermined process according to the divisional data sets.

In addition, the transfer data is divided into multiple divisional data sets, and the multiple divisional data sets are transmitted. Therefore, even if the size of the transfer data is large, the transfer data can be transmitted by dividing the transfer data into an increased number of divisional data sets. The configuration and method hence improves reliability over the aforementioned remote controller in the transfer of large amounts of data.

In addition, the multiple divisional data sets are transmitted all together. Therefore, there is no need to perform a check with the receiver on a receipt of each divisional data set (or each predetermined divisional data set). Transfer efficiency is improved.

A receiver in accordance with the present invention, to solve the problems, is a receiver receiving transfer data having a predetermined amount from a transmitter. The receiver includes: a second receiver section receiving multiple divisional data sets and error detection information together from the transmitter, the transfer data being divided into the multiple divisional data sets, an error in each of the divisional data sets being detected based on the error detection information; and an error detection section detecting whether any of the divisional data sets contains an error according to the error detection information received by the second receiver section. When the error detection section has detected no error in the multiple divisional data sets, the receiver performs a predetermined process according to the divisional data set.

A reception method in accordance with the present invention, to solve the problems, is a method of receiving transfer data having a predetermined amount from a transmitter. The method involves: receiving multiple divisional data sets and error detection information together from the transmitter, the transfer data being divided into the multiple divisional data sets, an error in each of the divisional data sets being detected based on the error detection information; and detecting whether any of the divisional data sets contains an error according to the received error detection information. When no error has been detected in any of the multiple divisional data sets, a process according to the multiple divisional data sets is performed.

According to the configuration and method, the multiple divisional data sets and the error detection information are received all together. When the error detection section has detected no error in any of the divisional data sets, the section performs a predetermined process according to the divisional data sets. In other words, there is no need to transmit a notification to verify reception for each or two or more of the divisional data sets. It takes less time to receive all the divisional data sets.

In addition, the divisional data sets into which the transfer data is divided are received. Therefore, a large size of transfer data can be handled by increasing the number of divisional data sets. The configuration and method hence improves reliability over the aforementioned remote controller in the transfer of large amounts of data.

A data transfer system in accordance with the present invention includes: the transmitter and the receiver. The transfer data is transferred from the transmitter to the receiver.

According to the configuration, the data transfer has high reliability, It takes less time to transfer the data.

A transmission program in accordance with the present invention is a computer program causing a computer to function as components of the transmitter.

According to the configuration, the transmitter can be realized by a computer realizing the components of the transmitter.

A reception program in accordance with the present invention is a computer program causing a computer to function as components of the receiver.

According to the configuration, the receiver can be realized by a computer realizing the components of the receiver.

A recording medium in accordance with the present invention is a computer-readable recording medium containing either the transmission program realizing the aforementioned sections on a computer and manipulating the transmitter or the reception program realizing the aforementioned sections on a computer and manipulating the receiver.

According to the configuration, the transmitter or receiver can be realized on the computer by either the transmission or reception program retrieved from the recording medium. Also, an electronic device in accordance with the present invention includes the transmitter or the receiver.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIGS. 25(a), 25(b) are diagrams illustrating the relationship between data packets received by a receiver apparatus and divisional data sets stored in a memory. FIG. 25(a) shows when an identical file identifier is received. FIG. 25(b) shows when a different file identifier is received.

FIG. 50(*b*) is a timing chart illustrating transmission procedures implemented the transmitter apparatus.

FIG. 60(*b*) is a timing chart illustrating IrDA 9600 bps.

FIG. 62(*b*) is a timing chart for SIL modulation with SIL 115 kbps signals.

DESCRIPTION OF THE EMBODIMENTS

The present invention is applicable to transmitter/receiver apparatus which transmits/receives a predetermined amount of desired transfer data in a single piece representing information, such as image data and document data. Here, the predetermined amount of data may vary depending on transfer data. The transmission of transfer data may be either wired or wireless. Examples of wired transmission include IEEE 1394, USB (universal serial bus), and Ethernet®. Examples of wireless transmission include IEEE 802.11, Bluetooth®, wireless 1394, UWB, and infrared.

Subsequent embodiments take infrared data transfer (transmission) methods to illustrate the present invention. Nevertheless, this is by no means intended to limit the invention. Data may be transmitted optically in another spectrum. The invention is applicable also to the above listed wired and wireless transmission.

Embodiment 1

Figure 1:
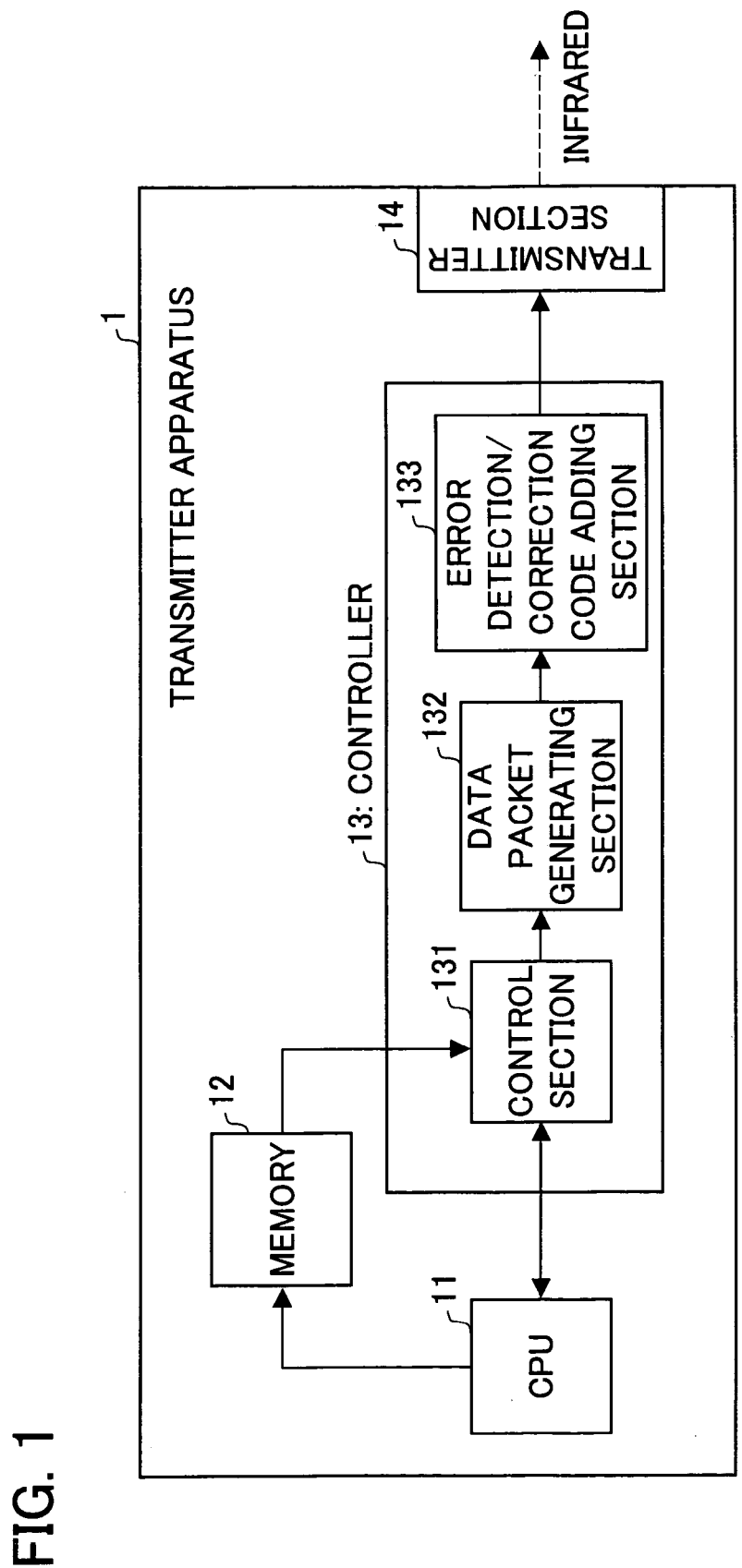
FIG. 1 is a block diagram illustrating a configuration of a transmitter apparatus of embodiment 1.
Figure 2:
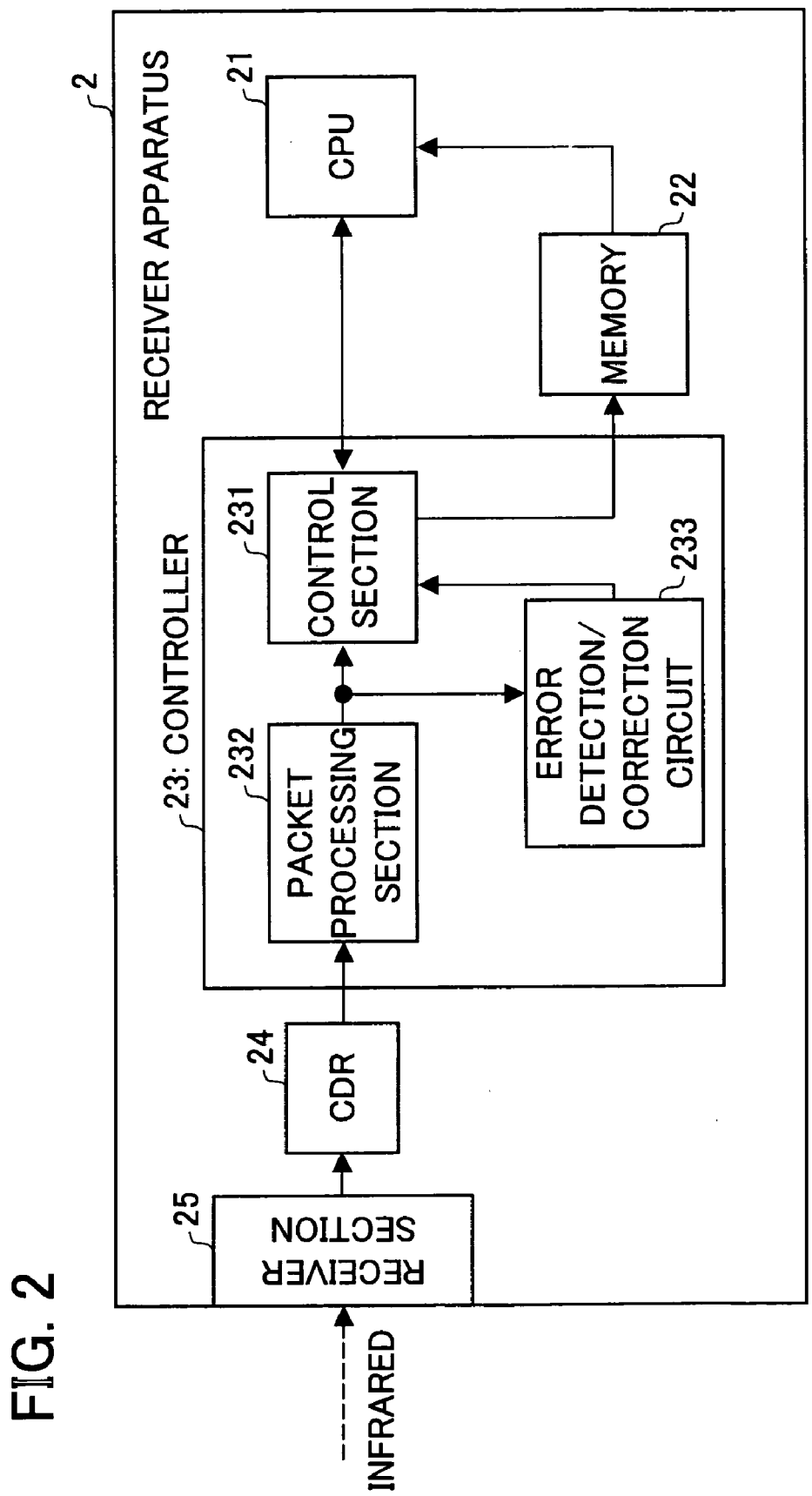
FIG. 2 is a block diagram illustrating a configuration of a receiver apparatus of embodiment 1.
Figure 3:
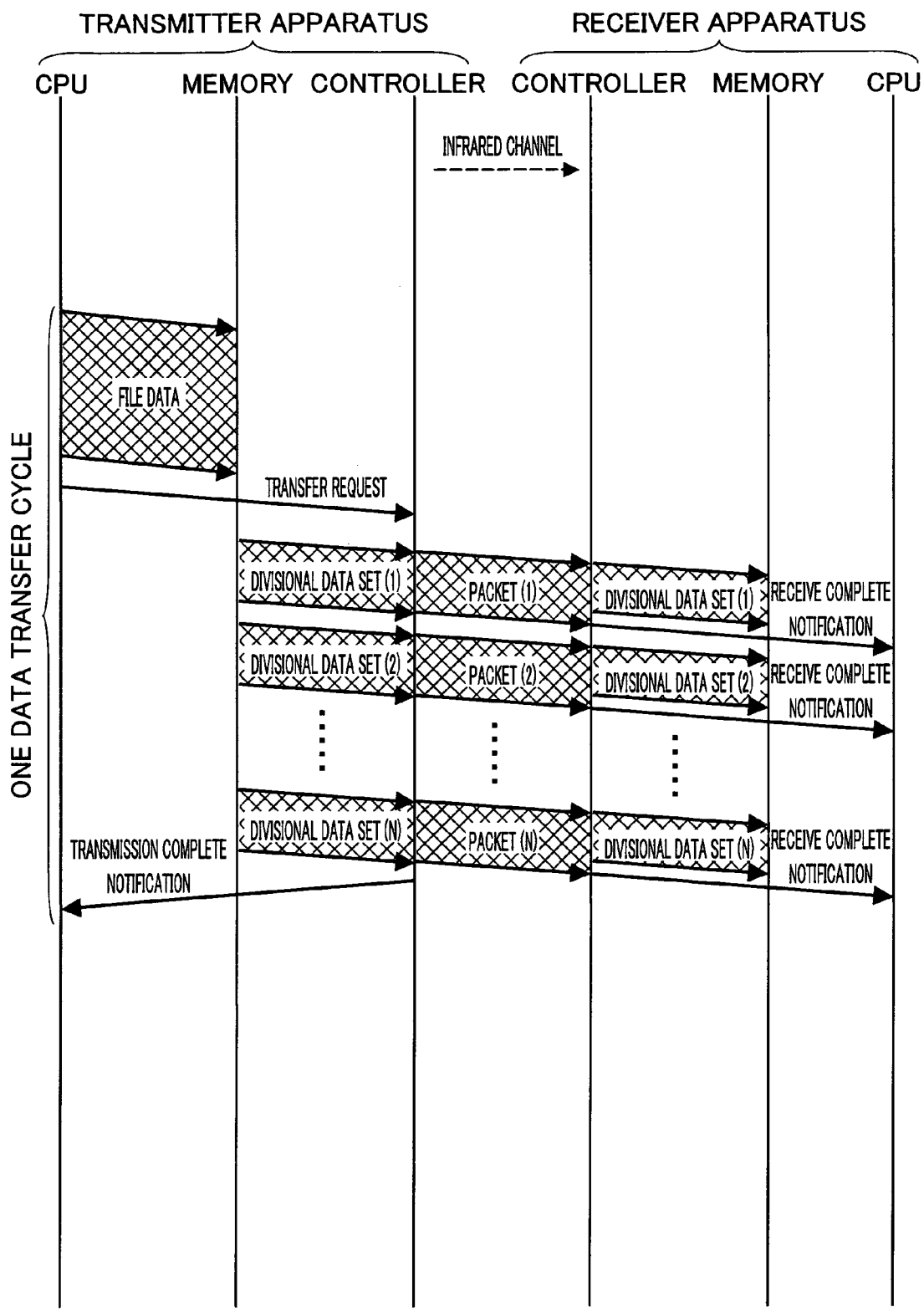
FIG. 3 is a drawing illustrating procedures in a data transfer process of embodiment 1.

The following will describe a data transfer system in accordance with an embodiment of the present invention in reference to FIG. 1 to FIG. 3. FIG. 1 is a block diagram illustrating a configuration of a transmitter apparatus (transmitter) 1 of the present embodiment. As shown in FIG. 1, the transmitter apparatus 1 contains a CPU 11, a memory 12, a controller 13, and a transmitter section (first transmitter section) 14.

The CPU 11 performs predetermined computing in accordance with user instructions entered through an manipulation section (not shown). The predetermined computing includes a data transfer process. In response to a data transfer instruction from the manipulation section, the CPU 11 loads desired transfer data into the memory 12. Also the CPU 11 sends a transfer request to the controller 13. The CPU 11 completes a transfer process when it receives from the controller 13 a transmission complete notification indicating the end of a data transmission.

The memory 12 temporarily holds the desired data under the control of the CPU 11.

The controller 13 controls a transfer of the data in accordance with the transfer request from the CPU 11. The controller 13 contains a control section 131, a data packet generating section (dividing section) 132 and an error detection/correction code adding section (error detection information adding section) 133.

Upon receipt of the transfer request from the CPU 11, the control section 131 retrieves the transfer data from the memory 12 and sends the retrieved transfer data to the data packet generating section 132. The section 131 also instructs the data packet generating section 132 to generate data packets. In so doing, the control section 131 controls the length and interval of the packets generated by the data packet generating section 132. The control section 131 controls the packet length so that it does not exceed a maximum packet length calculated from the amount of data detectable by the error detection/correction code adding section 133 (detailed later).

As the control section 131 detects that the transmitter section 14 has transmitted all the data packets corresponding to the transfer data retrieved from the memory 12, the section 131 sends the CPU 11 a transmission complete notification which indicates an end of the transmission of the transfer data.

The data packet generating section 132 divides the transfer data received from the control section 131 generates multiple data packets. In doing so, the data packet generating section 132 generates divisional data sets (1) to (N) by dividing the transfer data so that each divisional data set has a length given by the control section 131. The data packet generating section 132 then generates data packets containing the respective divisional data sets as information. In other words, the data packet generating section 132 generates from a data packet (1) containing a divisional data set (1) to a data packet (N) containing a divisional data set (N). The transfer rate for the data packet generated by the data packet generating section 132 is controlled by the control section 131.

The data packet generating section 132 sends the generated multiple packets to the error detection/correction code adding section 133 at an interval given by the control section 131.

Figures 45, 46:
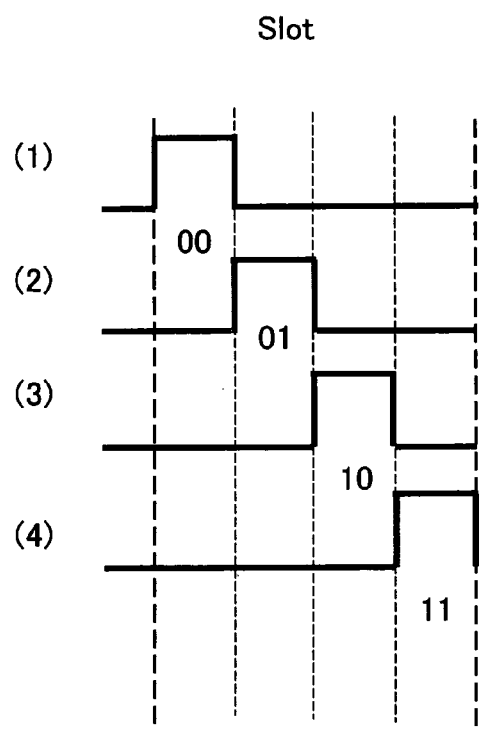
FIG. 45 is a drawing illustrating a correlation between data pulse and data in quaternary PPM.
FIG. 46 is a drawing illustrating a frame according to the IrDA standards.
Figure 47:
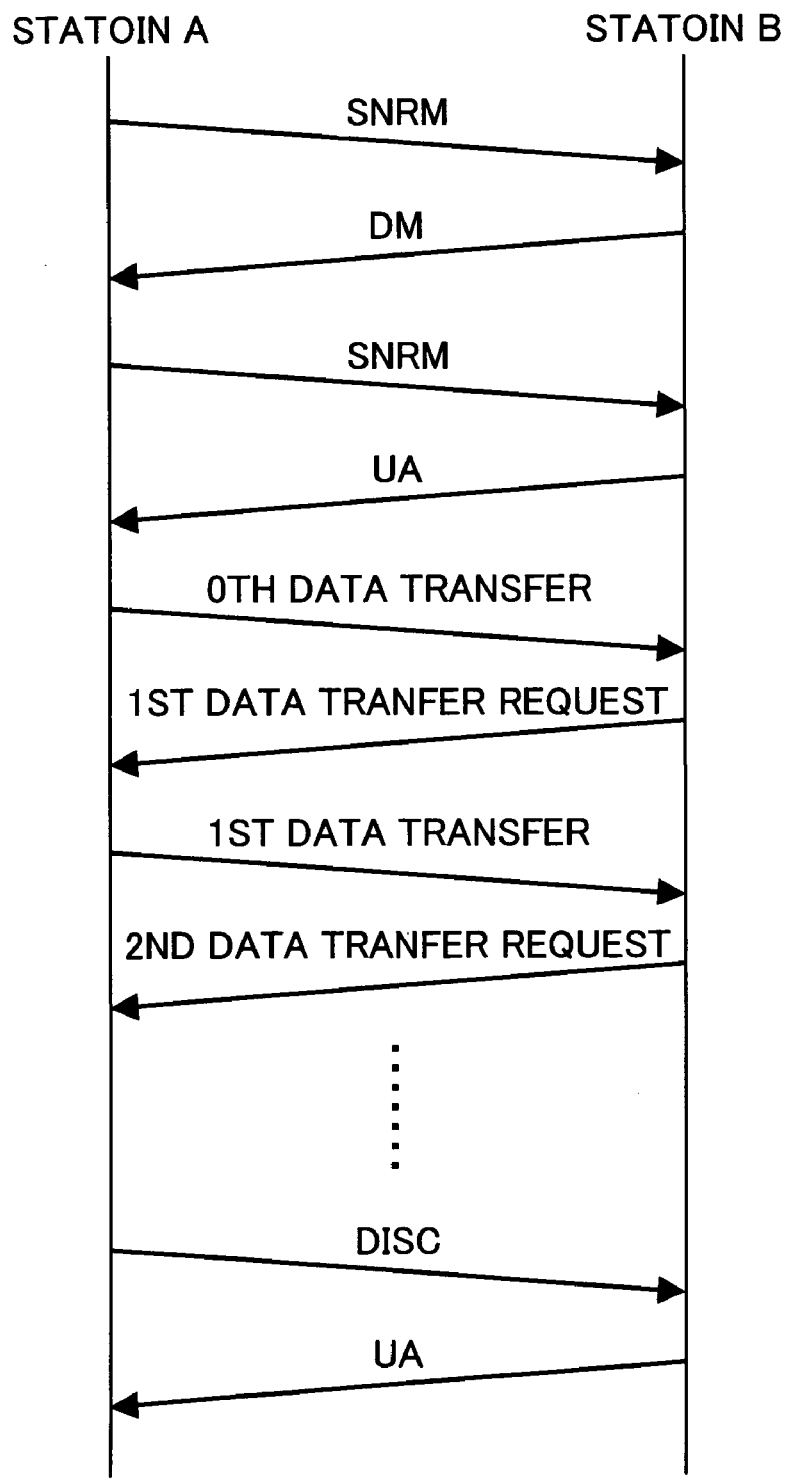
FIG. 47 is a drawing illustrating general data transfer procedures according to the IrDA standards.
Figure 48:
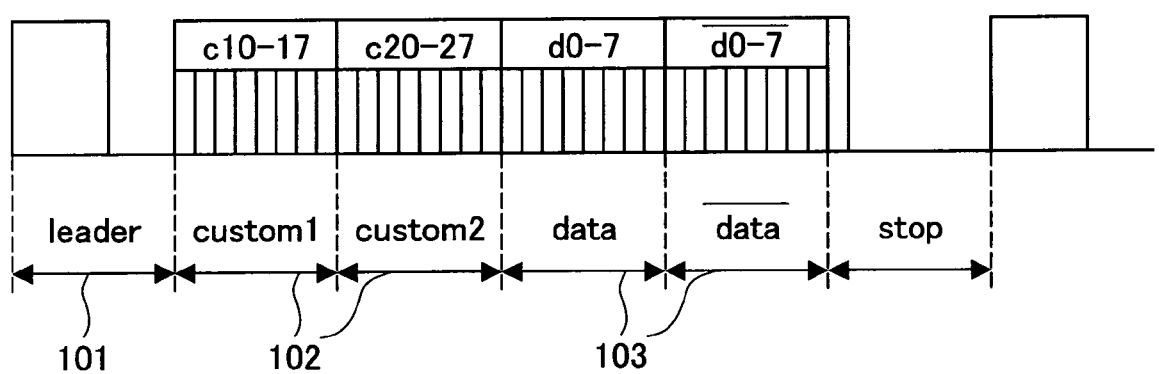
FIG. 48 is a drawing illustrating a signal format for an infrared remote controller.

As shown in FIG. 46, each data packet contains a preamble field, a start flag, an address field, a control field, a data field, a FCS, and a stop flag. The divisional data set is contained in the data field.

The error detection/correction code adding section 133 adds an error detection code or a correction code to each data packet generated by the data packet generating section 132 before sending to the next stage, i.e. the transmitter section 14. The error detection/correction code adding section 133 includes the error detection code (or correction code) in the FCS in the data packet.

The error detection code (see Infrared Data Association Serial Infrared Physical Layer Specification Version 1.4) is, for example, a CRC (Cyclic Redundancy Check) code or other cyclic code. The correction code is, for example, a parity check code, a Hamming code, a Reed-Solomon code, or other BCH code. The CRC code is 4 byte long. The amount of data is limited by the 4-byte detection capacity.

The transmitter section 14 receives the packets from the controller 13 and sends them out over an infrared channel at a predetermined interval.

Next, a receiver apparatus 2 of the present embodiment will be described in reference to FIG. 2 which is a block diagram illustrating the configuration of the receiver apparatus 2. As shown in FIG. 2, the receiver apparatus (receiver) 2 contains a CPU 21, a memory 22, a controller 23, a CDR (clock data recovery) 24, and a receiver section (second receiver section) 25.

The receiver section 25 receives the packets transmitted from the transmitter apparatus 1 over an infrared channel and sends the received packets to the CDR 24.

The CDR 24 extracts (recovers) a clock signal and a data signal from the received signal reproduced from the received packet. The CDR 24 sends the recovered clock and data signals to the controller 23.

The controller 23 receives the packets from the CDR 24 and implements a predetermined control according to the packets. The controller 23 contains a control section 231, a packet processing section 232 and an error detection/correction circuit (error detection section) 233.

The packet processing section 232 receives the packets recovered by the CDR 24 and detects the start flag and the stop flag from each received packet. The packet processing section 232 extracts the data field and the FCS. In other words, the packet processing section 232 extracts information from the data field of each packet from the receiver section 25 and an error detection code (or correction code) for that information. The packet processing section 232 sends the extracted information and error detection code (or correction code) to the control section 231 and the error detection/correction circuit 233.

For example, the packet processing section 232, upon receipt of each data packet, extracts the divisional data set and the error detection code (or correction code) from the data packet. The section 232 then sends the extracted divisional data set and the error detection code (or correction code) to the control section 231 and the error detection/correction circuit 233.

The error detection/correction circuit 233 detects (or corrects) errors in the received information and sends a result to the control section 231.

The control section 231 implements a predetermined process in accordance with the result fed from the error detection/correction circuit 233. If the result from the error detection/correction circuit 233 indicates that the divisional data set has no error, the control section 231 writes the divisional data set into the memory 22 and sends a receive complete notification to the CPU 21. On the other hand, if the result from the error detection/correction circuit 233 indicates that the divisional data set has an error, the control section 231 discards the divisional data set and sends the CPU 21 a notification that the data set has a reception error.

The memory 22 holds the divisional data sets received by the receiver section 25. The divisional data sets are written to the memory 22 by the control section 231.

The CPU 21 implement a process in accordance with the notification from the control section 231. In other words, as the CPU 21 receives receive complete notifications for all the divisional data sets from the control section 231, the CPU 21 implements a predetermined received data post-process according to all the divisional data sets held in the memory 22.

The predetermined received data post-process is a process implemented by the CPU 21 according to the received divisional data sets. Given that the receiver apparatus 2 is a television and the transfer data is image data, the CPU 21 generates image data by combining the divisional data sets written in the memory 22. A display section (not shown) then displays an image reproduced from the resultant image data. As another example, when the receiver apparatus 2 is a printer and the transfer data is document data, the CPU 21 generates document data by combining the divisional data sets written in the memory 22. A print section (not shown) then prints the document reproduced from the resultant document data on a medium.

Next, procedures in a data transfer process by the transmitter apparatus 1 and the receiver apparatus 2 will be described in reference to the sequence shown in FIG. 3. The sequence assumes that none of the divisional data sets contains an error.

First, in the transmitter apparatus 1, the CPU 11 receives a transfer instruction through the manipulation section and loads desired transfer data into memory 12. The CPU 11 then sends a transfer request to the controller 13.

In the controller 13, upon receipt of the transfer request, the control section 131 retrieves the transfer data from the memory 12 and feeds it to the data packet generating section 132. In so doing, the control section 131 specifies a predetermined packet length and interval and sends them to the data packet generating section 132.

The data packet generating section 132 divides the received transfer data into multiple divisional data sets (1) to (N) to generate data packets (1) to (N) containing the respective divisional data sets as information: The data packet (1) contains the divisional data set (1). The data packet (2) contains the divisional data set (2). The data packet (N) contains the divisional data set (N). The data packet generating section 132 determines the size of each divisional data set so that the data packets (1) to (N) have a packet length specified by the control section 131.

The error detection/correction code adding section 133 then adds an error detection code (or correction code) to each data packets (1) to (N) generated by the data packet generating section 132. The section 133 outputs the code-added data packets to the next stage, i.e. the transmitter section 14, at the packet interval specified by the control section 131.

Thereafter, the transmitter section 14 transmits the data packets (1) to (N), supplied from the error detection/correction code adding section 133, to the receiver apparatus 2 over an infrared channel. When the transmitter section 14 has transmitted all the data packets, the control section 131 sends a transmission complete notification to the CPU 11.

The receiver apparatus 2 receives the data packets (1) to (N) sequentially from the transmitter apparatus 1. First, upon receipt of the data packet (1), the packet processing section 232 extracts the divisional data set (1) and the error detection code (or correction code) from the data packet (1). The extracted divisional data set (1) and the error detection code are fed to the control section 231 and the error detection/correction circuit 233.

According to the received error detection code (or correction code), the error detection/correction circuit 233 determines whether the received divisional data set (1) has an error. A result is sent to the control section 231. The control section 231, upon receipt of the result indicating no errors, records the divisional data set (1) in the memory 22 and sends the CPU 21 a receive complete notification for the divisional data set (1).

The controller 23 successively processes the received packets (2) to (N) similarly to the packet (1). The memory 22 in the receiver apparatus 2 holds all the divisional data sets. Thereafter, when none of the divisional data sets contains an error, and the CPU 21 has received receive complete notifications, the CPU 21 implements a predetermined received data post-process according to the divisional data sets.

As described in the foregoing, the transmitter apparatus 1 of the present embodiment transmits transfer data of a predetermined amount to the receiver apparatus 2. The apparatus 1 contains the data packet generating section 132, the error detection/correction code adding section 133, and the transmitter section 14. The data packet generating section 132 divides transfer data into multiple divisional data sets. The error detection/correction code adding section 133 adds an error detection code (error detection information) to each divisional data set. The detection code is used to detect an error in the divisional data set. The transmitter section 14 transmits each multiple divisional data set together with its added error detection code in a single transmission.

The receiver apparatus 2 of the present embodiment receives transfer data of a predetermined amount from the transmitter apparatus 1. The apparatus 2 contains the receiver section 25 and the error detection/correction circuit (error detection section) 233. The receiver section 25 receives each divisional data set and its error detection information from the transmitter apparatus 1 in a single transmission. The multiple divisional data set is produced by dividing the transfer data. The error detection information is used to detect an error in the divisional data set. The error detection/correction circuit (error detection section) 233 detects an error, if any, in each divisional data set according to the received error detection information. If the apparatus 2 detects no errors in all the multiple divisional data sets, the apparatus 2 implements the predetermined received data post-process according to the divisional data set.

Each divisional data set has an added error detection code. The receiver apparatus 2 can thus determine whether any of the divisional data sets have an error and implement the predetermined received data post-process according to the divisional data sets.

The transmitter apparatus 1 divides the transfer data into multiple divisional data sets and transmits the multiple divisional data sets. Therefore, the apparatus 1 is capable of transmission of large amounts of transfer data by dividing it into an increased number of divisional data sets. The invention hence offers improved reliability over the aforementioned remote controller in the transfer of large amounts of data.

Embodiment 2

In embodiment 1, the data packets are transmitted without the transmitter apparatus 1 determining the presence/absence of the receiver apparatus 2. This allows significant reductions in time it takes to transfer data. However, if no receiver apparatus 2 is present, a data packet transmission adds to the power consumption in the transmitter apparatus 1. In contrast, communicating the XID and SNRM commands and their response adds to the time it takes to transfer data as is the case with the aforementioned IrDA. The present embodiment solves these problems. Power consumption is lowered. Also, data is transferred in less time than the aforementioned IrDA.

Referring to FIG. 4 to 7, a data transfer system of the present embodiment will be described. For convenience, members of the present embodiment that have the same function as members of the above embodiment, and that are mentioned in that embodiment are indicated by the same reference numerals and description thereof is omitted.

Figure 4:
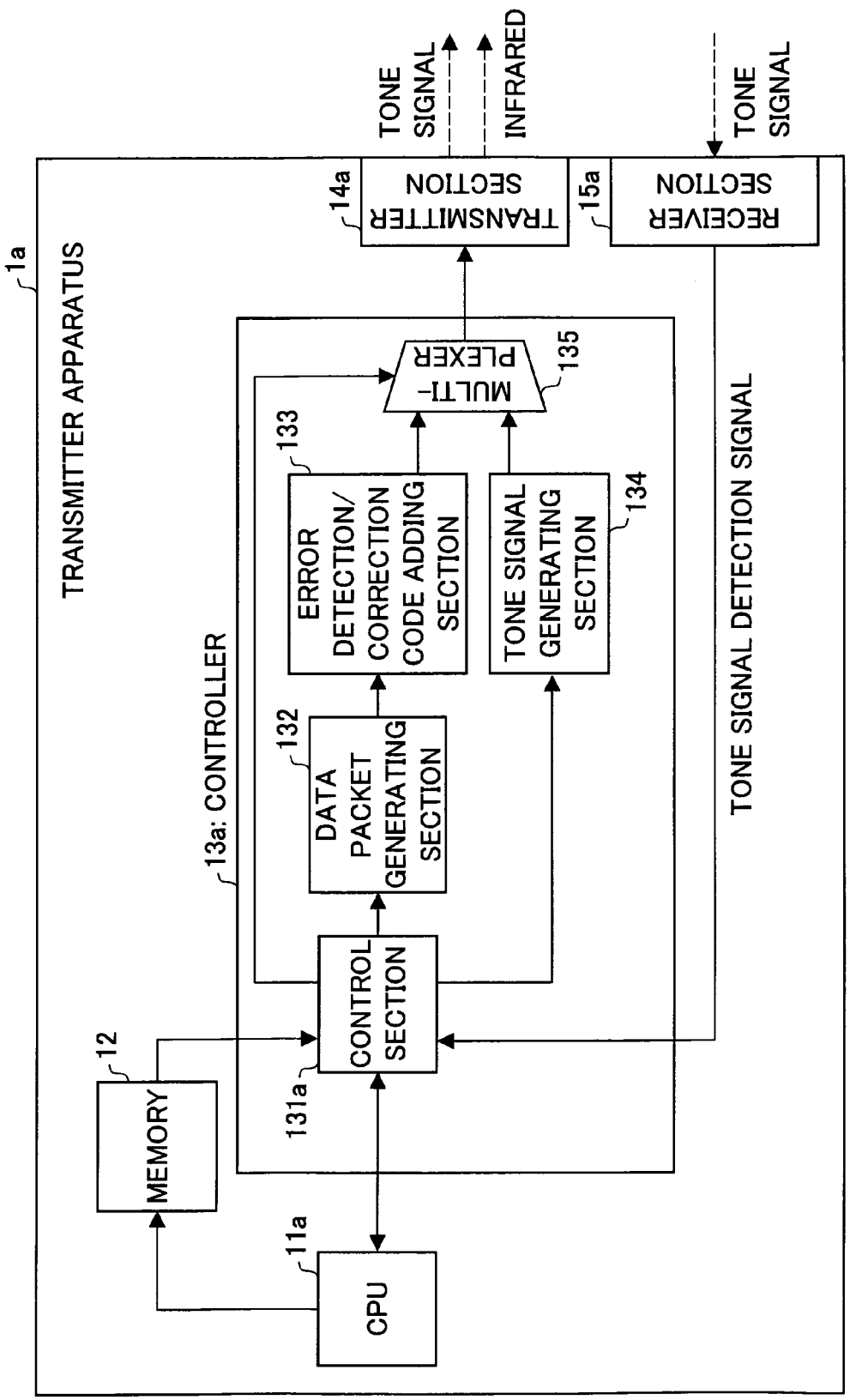
FIG. 4 is a block diagram illustrating a configuration of a transmitter apparatus of embodiment 2.

FIG. 4 is a block diagram illustrating a configuration of a transmitter apparatus (transmitter) 1a of the present embodiment. As shown in FIG. 4, the transmitter apparatus 1a differs from the transmitter apparatus 1 where the CPU 11 is replaced by a CPU 11a, the controller 13 by a controller 13a, and the transmitter section 14 by a transmitter section (first transmitter section) 14a. Another difference is that the apparatus 1a contains a receiver section (first receiver section) 15a.

The CPU 11a implements a process to transfer image data, document data, etc. (hereinafter, "simply data") in accordance with user instructions entered through a manipulation section (not shown). The CPU 11a, upon receipt of a transfer instruction from the manipulation section, sends the controller 13a a receiver apparatus detection tone transmit request causing the controller 13a to transmit a tone signal to sense whether or not there is a receiver apparatus in a data transferable range.

When the CPU 11a receives from the controller 13a a receiver apparatus detection response tone receive complete notification which indicates a response tone signal to the receiver apparatus detection tone transmit request has been received, the CPU 11a processes similarly to the CPU 11. Specifically, the CPU 11a loads desired transfer data into the memory 12 and sends a transfer request to the controller 13a.

The receiver section 15a detects a tone signal received externally over an infrared channel and sends a tone signal detection signal to the controller 13a.

The controller 13a contains a control section 131a, a data packet generating section 132, an error detection/correction code adding section 133, a tone signal generating section (tone signal generating section) 134, and a multiplexer 135.

The multiplexer 135 selects one of input terminals in accordance with a switch signal from the control section 131a and outputs a signal received at the selected input terminal. The input terminal of the multiplexer 135 of the present embodiment are connected to the error detection/correction code adding section 133 and the tone signal generating section 134.

The control section 131a controls the controller 13a in accordance with requests from the CPU 11a. As mentioned earlier, the requests from the CPU 11a include a receiver apparatus detection tone transmit request and a transfer request.

Upon receipt of the receiver apparatus detection tone transmit request, the control section 131a sends the tone signal generating section 134 a tone signal generate request causing the section 134 to generate a tone signal. The section 131a also sends the multiplexer 135 a switch signal causing the multiplexer 135 to output the tone signal generated by the tone signal generating section 134. Upon receiving the tone signal detection signal from the receiver section 15a, the control section 131a sends the CPU 11a the receiver apparatus detection response tone receive complete notification.

Upon receiving the transfer request, the control section 131a retrieves transfer data from the memory 12 similarly to the control section 131 and sends the retrieved transfer data to the data packet generating section 132. In so doing, the control section 131a sends the multiplexer 135 a switch signal causing the multiplexer 135 to output data packets generated by the data packet generating section 132. The control section 131a senses that the transmitter section 14 has transmitted all the data packets corresponding to the transfer data retrieved from the memory 12 and sends the CPU 11a a transmission complete notification indicating an end of a data transmission.

The tone signal generating section 134 receives the tone signal generate request from the control section 131a, generates the tone signal, and sends the generated tone signal to the transmitter section 14a via the multiplexer 135. Here, the term "tone signal" refers to a digital signal represented by a meaningless pattern of "1s" and "0s."

When compared to the functions of the transmitter section 14, the transmitter section 14a has an additional function to transmit the tone signal.

Figure 5:
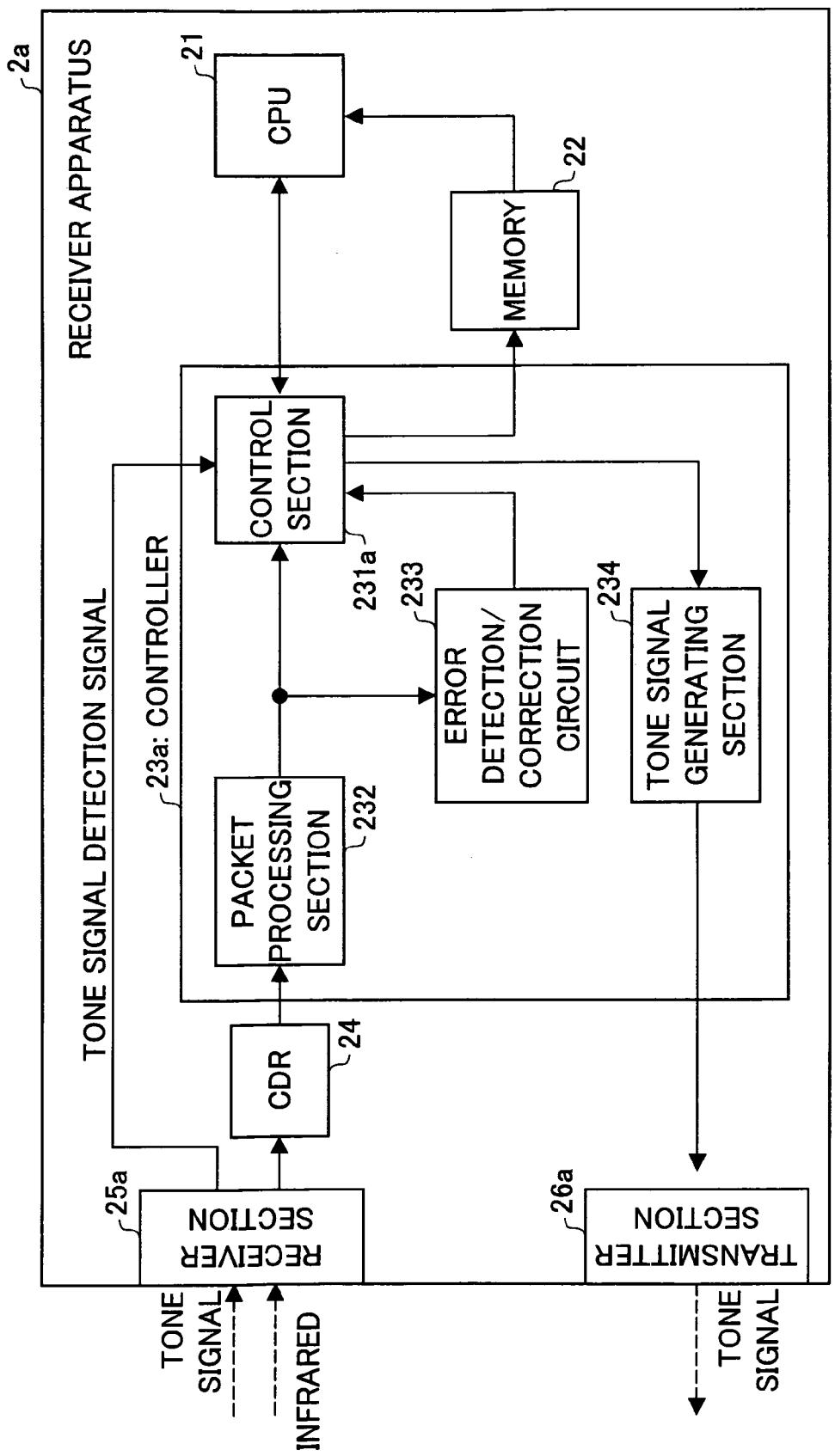
FIG. 5 is a block diagram illustrating a configuration of a receiver apparatus of embodiment 2.

Next, the receiver apparatus (receiver) 2a of the present embodiment will be described in reference to the a block diagram in FIG. 5. As shown in FIG. 5, the receiver apparatus 2a differs from the receiver apparatus 1 where the controller 23 is replaced by a controller 23a, and the receiver section 25 by a receiver section (second receiver section) 25a. Another difference is that the apparatus 2a contains a transmitter section (second transmitter section) 26a.

The receiver section 25a externally receives a packet or tone signal. When receiving a packet, the receiver section 25a sends the received packet to the CDR 24. In contrast, when receiving a tone signal, the receiver section 25a outputs to the controller 23a a tone signal detection signal indicating a receipt of the tone signal.

The controller 23a includes a control section 231a, a packet processing section 232, an error detection/correction circuit 233, and a tone signal generating section (tone signal generating section) 234.

The control section 231a performs a predetermined process in accordance with the result from the error detection/correction circuit 233 or the tone signal detection signal from the receiver section 25a. Similarly to the control section 231, if the result from the error detection/correction circuit 233 indicates that the divisional data set has no errors, the control section 231a writes the divisional data set to the memory 22 and sends a receive complete notification to the CPU 21. On the other hand, if the result from the error detection/correction circuit 233 indicates that the divisional data set has an error, the control section 231a discards the divisional data set and sends the CPU 21 a notification that the data set has a reception error.

In addition, when the control section 231a receives the tone signal detection signal from the receiver section 25a, the section 231a sends a tone signal generate request requesting the tone signal generating section 234 to generate a tone signal. When receiving the tone signal detection signal, the control section 231a sends the CPU 21 a receiver apparatus detection tone receipt notification indicating that the section 231a has received a tone signal for a receiver apparatus detection from the transmitter apparatus 1a. Further, the section 231a senses that the transmitter section 26a has transmitted the tone signal generated by the tone signal generating section 234, the section 231a sends the CPU 21 a receiver apparatus detection response tone transmission complete notification indicating that a response tone signal has been transmitted in response to the tone signal for a receiver apparatus detection. Thus, the CPU 21 can know that data will be transmitted from the transmitter apparatus 1a.

The tone signal generating section 234 receives the tone signal generate request from the control section 231a, generates the tone signal, and sends the generated tone signal to the transmitter section 26a.

The transmitter section 26a externally transmits the tone signal generated by the tone signal generating section 234.

Figure 7:
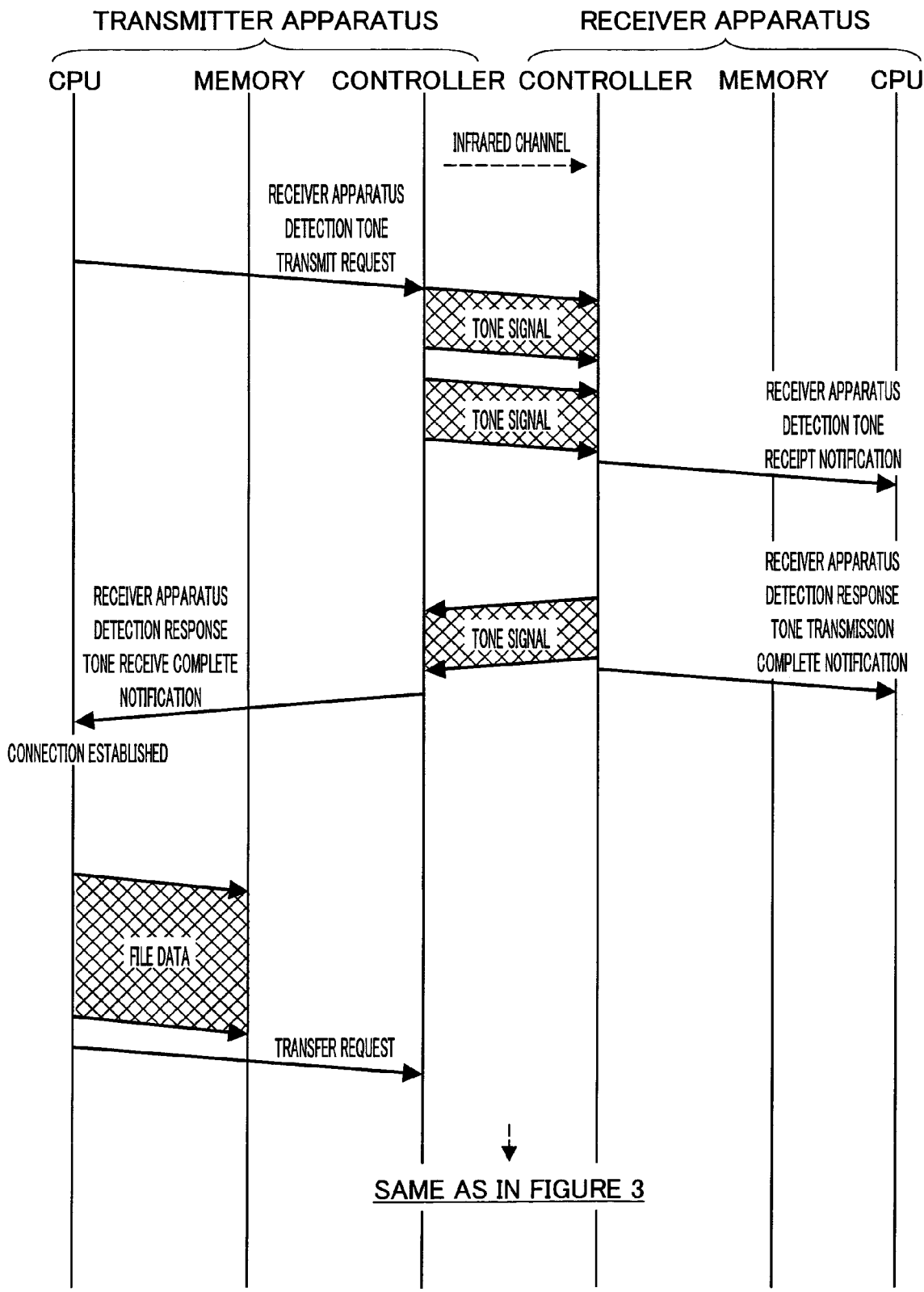
FIG. 7 is a drawing illustrating procedures in a data transfer process of embodiment 2.

Next, in reference to FIG. 7, data transmission/reception procedures between the transmitter apparatus 1a and the receiver apparatus 2a of the present embodiment will be described.

First, in the transmitter apparatus 1a, upon receipt of a transfer instruction from the manipulation section, the CPU 11a sends the control section 131a a receiver apparatus detection tone transmit request. The control section 131a sends a tone signal generate request to the tone signal generating section 134 in accordance with the request and outputs a switch signal to the multiplexer 135 causing the multiplexer 135 to output the tone signal generated by the tone signal generating section 134. The transmitter section 14 externally transmits the tone signal generated by the tone signal generating section 134. The frequency and cycle of the tone signal generated by the tone signal generating section 134 are specified in advance, but are by no means limited in any manner. That is, the pattern and transmission counts of the tone signal are not limited. FIG. 7 shows the tone signal being transmitted twice as an example.

Upon receipt of the tone signal transmitted from the transmitter apparatus 1a, the receiver apparatus 2a sends the control section 231a a tone signal detection signal indicating that the receiver section 25a has detected the tone signal. Upon reception of the tone signal detection signal, the control section 231a sends a tone signal generate request to the tone signal generating section 234 and sends a receiver apparatus detection tone receipt notification to the CPU 21.

Upon receipt of the tone signal generate request, the tone signal generating section 234 generates the tone signal and transmits the generated tone signal via the transmitter section 26. Upon detection of the transmission of the tone signal generated by the tone signal generating section 234, the control section 231a sends a receiver apparatus detection response tone transmission complete notification indicating the detection to the CPU 21.

Upon receipt of the tone signal transmitted from the receiver apparatus 2a, in the transmitter apparatus 1a, a tone signal detection signal indicating a detection of the tone signal by the receiver section 15a is sent to the control section 131a. Upon reception of the tone signal detection signal, the control section 131a determines that a response to the receiver apparatus detection tone signal has been received and sends a receiver apparatus detection response tone receive complete notification indicating the determination to the CPU 11a.

Upon receipt of the receiver apparatus detection response tone receive complete notification, the CPU 11a loads the desired transfer data in the memory 12 and sends a transfer request to the controller 13a. Subsequent procedures are the same as those in the embodiment shown in FIG. 3.

Figure 6:
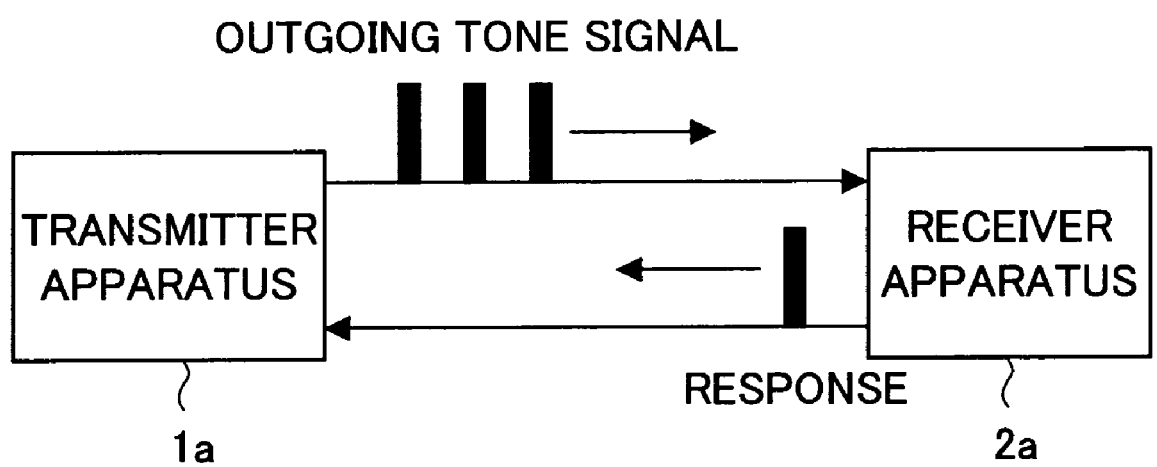
FIG. 6 is a drawing illustrating a tone signal pattern exchanged between the transmitter apparatus and the receiver apparatus.

In this manner, the transmitter apparatus 1a communicates tone signals with the receiver apparatus 2a. After detecting the presence of the receiver apparatus 2a within its communicable range, the apparatus 1a transmits the transfer data. In other words, as shown in FIG. 6, the transmitter apparatus 1a transmits the tone signal to the receiver apparatus 2a. Upon receipt of the tone signal from the transmitter apparatus 1a, the receiver apparatus 2a transmits a tone signal as a response to the receipt. Here, the frequencies and cycles of the tone signals generated by the tone signal generating section 134 in the transmitter apparatus 1a and the tone signal generating section 234 in the receiver apparatus 2a may be either equal or different, and are not limited to any particular values. In addition, the tone signal may be transmitted once or more. If the tone signal is transmitted once, it takes less time and operation power to detect the receiver apparatus. If the signal is detected twice or more, the receiver apparatus is detected with improved accuracy.

As described in the foregoing, the transmitter 1a of the present embodiment includes the tone signal generating section 134 generating a tone signal. The transmitter section 14a transmits the tone signal. Thereafter, after receiving the tone signal from the receiver apparatus 2a, the section 14a transmits multiple divisional data sets. In addition, the receiver apparatus 2a includes the tone signal generating section 234 generating a tone signal and the transmitter section 26a. When the receiver section 25a has received the tone signal, the transmitter section 26a transmits the tone signal generated by the tone signal generating section 234 to the transmitter apparatus 1a.

Therefore, the transmitter apparatus 1a can determine the presence/absence of the receiver apparatus 2a simply by communicating tone signals with the receiver apparatus 2a. In addition, since the divisional data set is transmitted after receiving a tone signal from the receiver apparatus 2a, the transmitter apparatus 1a can prepare a transmission of a divisional data set or perform other processes while waiting for a tone signal to come in from the receiver apparatus 2a. As a result, the divisional data set can be transmitted as soon as a tone signal is received from the receiver apparatus 2a.

Incidentally, in the present embodiment, the control section 231a may have a function to control a turn on/off of the power supply to the CDR 24 which is a receipt clock generating section or a receipt clock generating circuit (for example, PLL [phase locked loop] circuit) in the CDR 24. When this is the case, the control section 231a turns on the CDR 24 or the PLL circuit in the CDR 24 upon receipt of a tone signal detection signal from the receiver section 25a. The control section 231a sends a tone signal generate request to the tone signal generating section 234 when the PLL circuit outputs a lock signal (that is, while the PLL circuit is in a stable operation). Further, after the control section 231a sends receive complete notifications for all data packets to the PU 21, the section 231a preferably turns off the PLL circuit. This keeps the PLL circuit turned off when no data packet is received, resulting in reduced power consumption.

Embodiment 3

Similarly to embodiment 2, the present embodiment lowers power consumption and requires less time to transfer data than the aforementioned IrDA.

Figure 8:
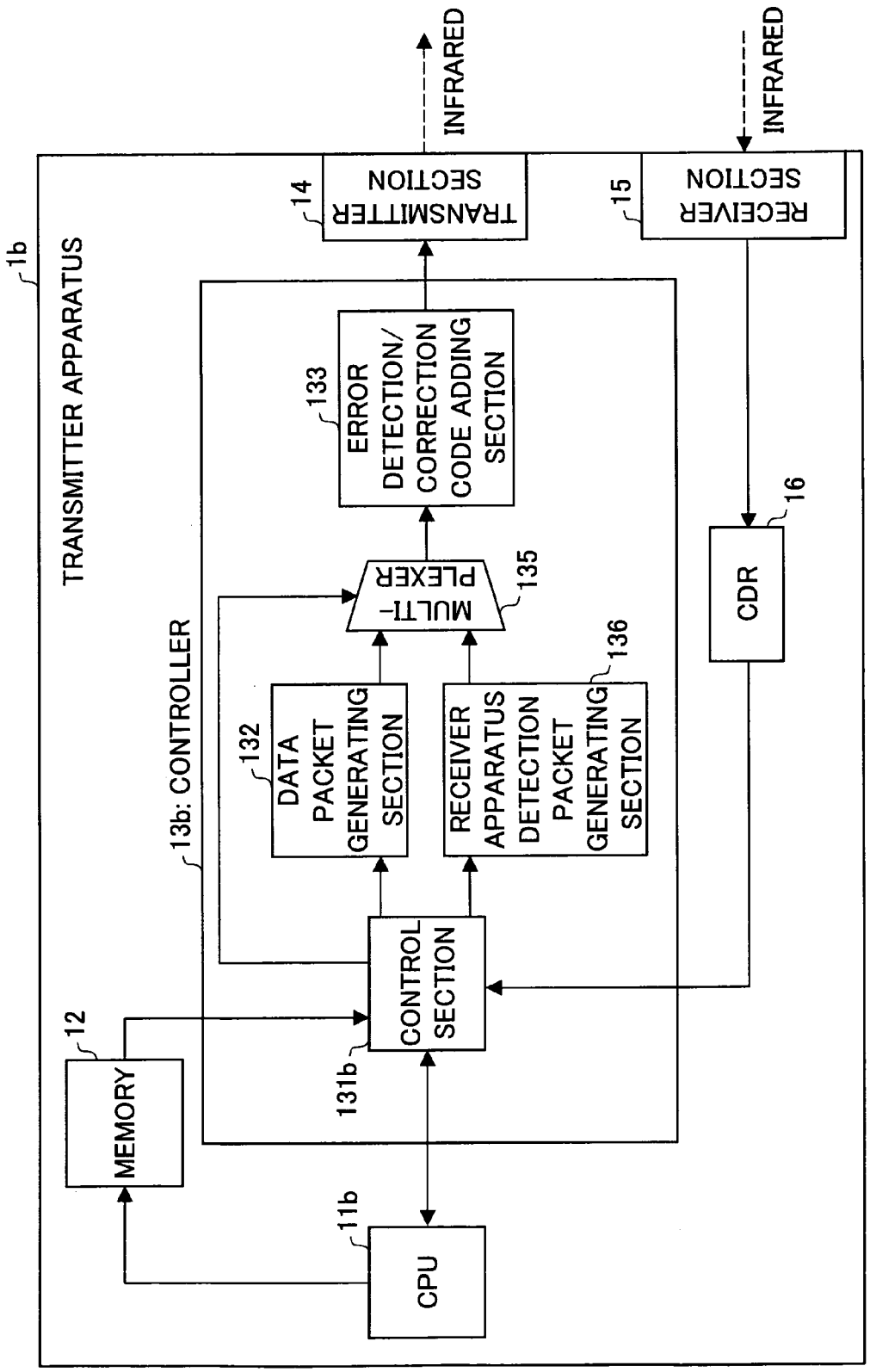
FIG. 8 is a block diagram illustrating a configuration of a transmitter apparatus of embodiment 3.
Figure 9:
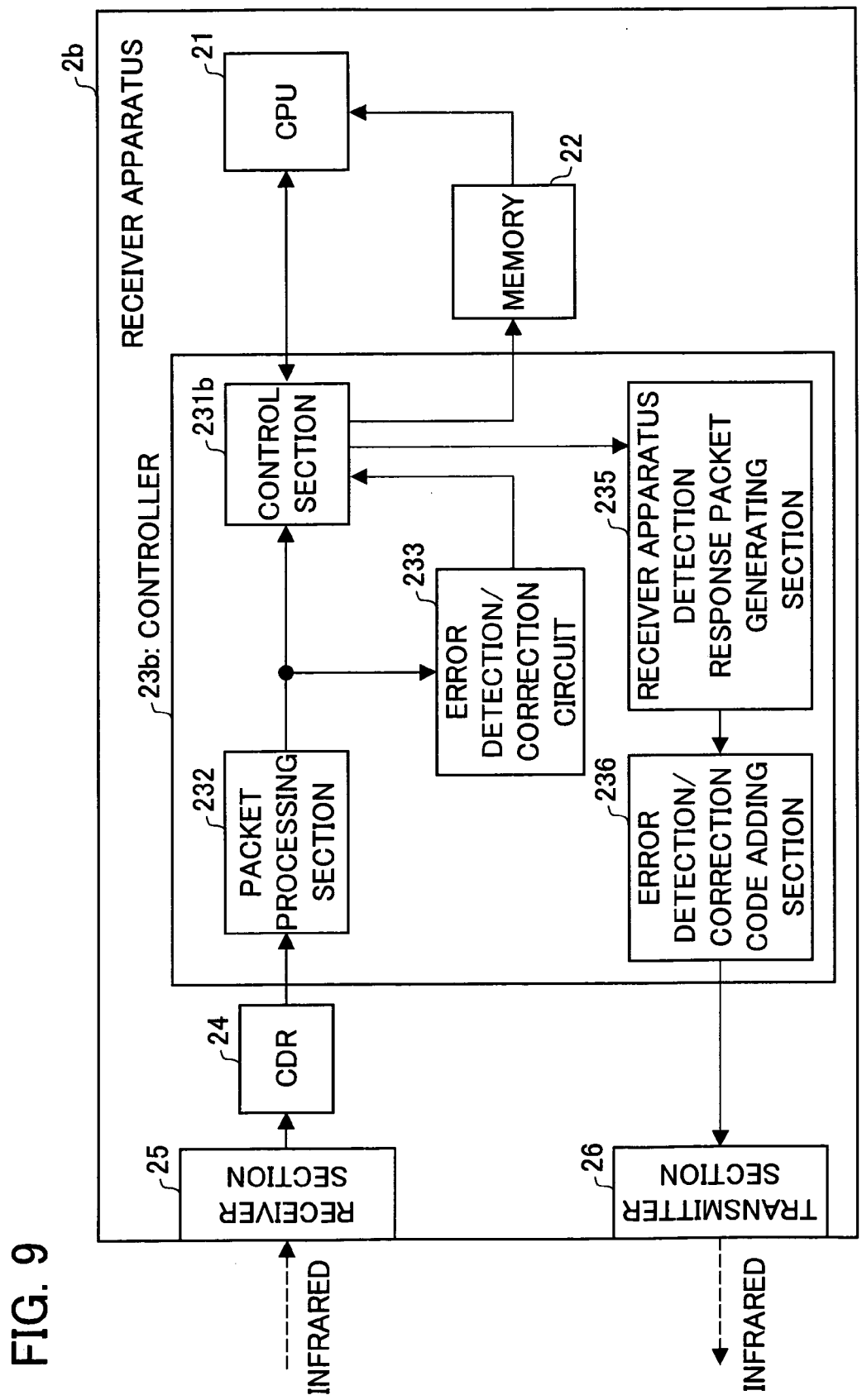
FIG. 9 is a block diagram illustrating a configuration of a receiver apparatus of embodiment 3.
Figure 10:
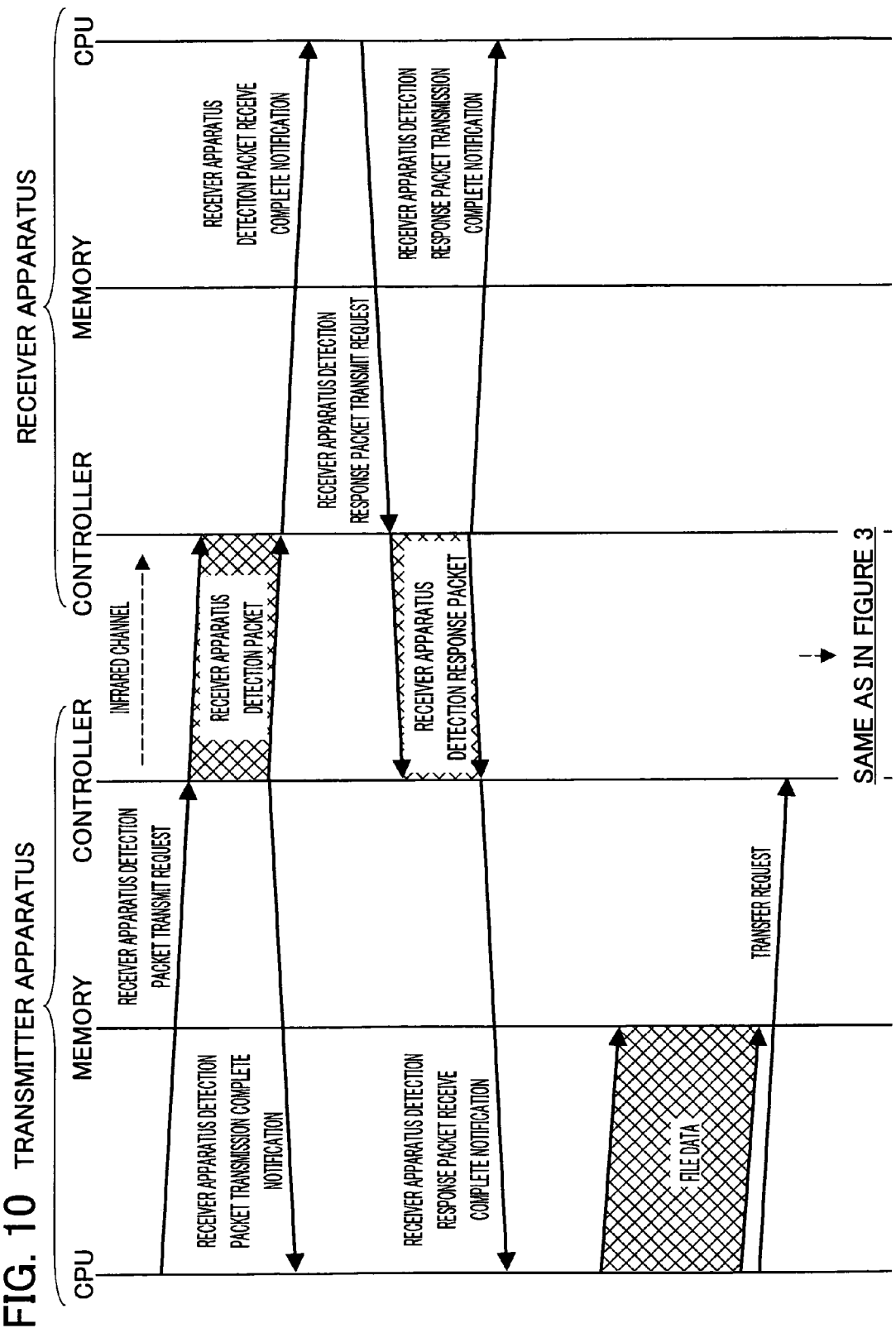
FIG. 10 is a drawing illustrating procedures in a data transfer process of embodiment 3.

Referring to FIGS. 8 to 10, a transmission system of the present embodiment will be described. For convenience, members of the present embodiment that have the same function as members of the above embodiments, and that are mentioned in those embodiments are indicated by the same reference numerals and description thereof is omitted.

FIG. 8 is a block diagram illustrating the configuration of a transmitter apparatus (transmitter) 1b of the present embodiment. As shown in FIG. 8, the transmitter apparatus 1b differs from the transmitter apparatus 1 where the CPU 11 is replaced by a CPU 11b, and the controller 13 by a controller 13b. Another difference is that the apparatus 1b contains a receiver section (first receiver section) 15 and a CDR 16.

When receiving a transfer instruction from the manipulation section, the CPU 11b sends the controller 13b a receiver apparatus detection packet transmit request to request a transmission of a receiver apparatus detection packet to sense whether there is a receiver apparatus.

In addition, upon receiving from the controller 13b a receive complete notification of a receiver apparatus detection response packet indicating a receipt of a response packet with respect to the receiver apparatus detection packet, the CPU 11b performs a similar process to the CPU 11. In other words, the CPU 11b upon reception of the receive complete notification loads desired transfer data into the memory 12 and sends a transfer request to the controller 13b.

Further, upon receiving a transmission complete notification indicating the completion of a data transmission from the controller 13b, the CPU 11b ends the transfer process.

The receiver section 15 externally receives a packet over an infrared channel and sends the received packet to the CDR 16.

The CDR 16 extracts (recovers) a clock signal and a data signal from the received signal according to the packet received by the receiver section 15. The CDR 16 sends the recovered clock and data signals to the controller 13b.

The controller 13b includes a control section 131b, a data packet generating section 132, an error detection/correction code adding section 133, a multiplexer 135, and a receiver apparatus detection packet generating section (information generating section) 136. To the input terminal of the multiplexer 135 of the present embodiment are coupled the data packet generating section 132 and the receiver apparatus detection packet generating section 136. To the output terminal is coupled the error detection/correction code adding section 133.

The control section 131b controls the controller 13b in accordance with requests from CPU 11b. As mentioned earlier, the requests from the CPU 11b include a receiver apparatus detection packet transmit request and a transfer request.

Upon receiving the receiver apparatus detection packet transmit request, the control section 131b sends the receiver apparatus detection packet generating section 136 a receiver apparatus detection packet generate request requesting generation of a receiver apparatus detection packet. In so doing, the control section 131b sends the multiplexer 135 a switch signal causing the multiplexer 135 to output the receiver apparatus detection packet generated by the receiver apparatus detection packet generating section 136. Upon receiving a response packet (receiver apparatus detection response packet) to the receiver apparatus detection packet from the CDR 16, the control section 131b sends the CPU 11b a receiver apparatus detection response packet receive complete notification.

Upon receiving the transfer request, the control section 131b retrieves the transfer data from the memory 12 and sends the retrieved transfer data to the data packet generating section 132. In so doing, the control section 131b sends the multiplexer 135 a switch signal causing the multiplexer 135 to output the packet generated by the data packet generating section 132. In addition, the control section 131b detects the transmitter section 14 having transmitted all data packets corresponding to the transfer data retrieved from the memory 12 and sends the CPU 11b a transmission complete notification indicating a completion of the data transmission.

The receiver apparatus detection packet generating section 136 receives the receiver apparatus detection packet generate request from the control section 131b and generates a packet (receiver apparatus detection packet) containing receiver apparatus detection information to detect the presence of the receiver apparatus as information.

In so doing, the receiver apparatus detection packet generating section 136 generates the receiver apparatus detection packet by modulation (quaternary PPM) in compliance with the IrDA Fast InfraRed (FIR). In addition, the receiver apparatus detection packet generating section 136 renders the transfer rate for the generated receiver apparatus detection packet equal to the transfer rate (4 Mbps) stipulated in the IrDA Fast InfraRed (FIR).

In addition, the receiver apparatus detection packet generating section 136 sends the generated receiver apparatus detection packet to the error detection/correction code adding section 133 via the multiplexer 135. The error detection/correction code adding section 133 adds an error detection code (or correction code) to the receiver apparatus detection packet. The resultant receiver apparatus detection packet with the added code is transmitted from the transmitter section 14.

Next, the receiver apparatus (receiver) 2b of the present embodiment will be described in reference to the block diagram in FIG. 9. As shown in FIG. 9, the receiver apparatus 2b differs from the receiver apparatus 2 where the controller 23 is replaced by a controller 23b. Another difference is that the apparatus 2b includes a transmitter section (second transmitter section) 26.

The controller 23b contains a control section 231b, a packet processing section 232, an error detection/correction circuit 233, a receiver apparatus detection response packet generating section (response information generating section) 235, and an error detection/correction code adding section 236.

The control section 231b performs a predetermined process in accordance with the content of the packet from the packet processing section 233. In other words, if the packet from the packet processing section 233 is a data packet containing a divisional data set, the control section 231b, similarly to the control section 231, discards the divisional data set or writes the divisional data set to the memory 22 in accordance with the result from the error detection/correction circuit 233.

In contrast, if the information sent from the packet processing section 233 is receiver apparatus detection information, the control section 231b sends the receiver apparatus detection response packet generating section 235 a response packet generate request requesting generation of a response packet to received receiver apparatus detection information. The control section 231b, if receiving receiver apparatus detection information, sends the CPU 21 a receiver apparatus detection packet receive complete notification indicating the reception. Further, upon detecting a transmission from the transmitter section 26 of the receiver apparatus detection response packet generated by the receiver apparatus detection response packet generating section 235, a receiver apparatus detection response packet transmission complete notification indicating the detection is sent to the CPU 21. Thus, the CPU 21 can know that data will be transmitted from the transmitter apparatus 1b.

The receiver apparatus detection response packet generating section 235 receives a response packet generate request from the control section 231b, generates a receiver apparatus detection response packet which is a response packet to the receiver apparatus detection packet, and sends a generated receiver apparatus detection response packet to the error detection/correction code adding section 236.

In so doing, the receiver apparatus detection response packet generating section 235 generates the receiver apparatus detection response packet by modulation (quaternary PPM) in compliance with the IrDA Fast InfraRed (FIR). In addition, the receiver apparatus detection response packet generating section 235 renders the transfer rate for the generated receiver apparatus detection response packet equal to the transfer rate (4 Mbps) of the IrDA Fast InfraRed (FIR).

The error detection/correction code adding section 236 adds an error detection code (or correction code) to incoming packets for a transmission to the transmitter section 26.

The transmitter section 26 externally transmits the packet output from the error detection/correction code adding section 236.

Next, in reference to FIG. 10, data transmission/reception procedures between the transmitter apparatus 1b and the receiver apparatus 2b of the present embodiment will be described.

First, in the transmitter apparatus 1b, upon receiving a transfer instruction from the user, the CPU 11b sends a receiver apparatus detection packet transmit request to the control section 131b. The control section 131b sends the packet generate request to the receiver apparatus detection packet generating section 136 in accordance with the request and sends the multiplexer 135 a switch signal causing the multiplexer 135 to output the packet generated by the receiver apparatus detection packet generating section 136.

The receiver apparatus detection packet generating section 136 generates a receiver apparatus detection packet to detect the presence of the receiver apparatus in accordance with modulation (quaternary PPM) in compliance with the IrDA Fast InfraRed (FIR), and sends the generated receiver apparatus detection packet via the multiplexer 135 to the error detection/correction code adding section 133. The error detection/correction code adding section 133 adds an error detection code (or correction code) to the receiver apparatus detection packet and sends the packet with the added code to the transmitter section 14. The transmitter section 14 externally transmits the receiver apparatus detection packet over an infrared channel. The transfer rate is in accordance with the transfer rate in compliance with the IrDA Fast InfraRed (FIR) (4 Mbps).

Thus, the transmitter apparatus 1b is capable of transmitting the receiver apparatus detection packet at a higher rate than the conventional XID command.

In addition, the receiver apparatus detection packet is transmitted at the transfer rate (4 Mbps) and by modulation (quaternary PPM) in compliance with the FIR. The controller 13b can therefore be readily manufactured from a controller circuit in accordance with the conventional FIR.

The control section 131b detects a transmission of the receiver apparatus detection packet from the transmitter section 14 and sends the CPU 11b a receiver apparatus detection packet transmission complete notification.

In the receiver apparatus 2b having received the receiver apparatus detection packet transmitted from the transmitter apparatus 1b, the receiver apparatus detection packet is sent via the receiver section 25 and the CDR 24 to the packet processing section 232. The packet processing section 232 extracts the receiver apparatus detection information and the error detection code (or correction code) from the data field of the receiver apparatus detection packet and sends the extracted receiver apparatus detection information and the error detection code to the control section 231b and the error detection/correction circuit 233.

Upon receiving a notification indicating no errors from the error detection/correction circuit 233, the control section 231b sends the receiver apparatus detection response packet generating section 235 a response packet generate request requesting generation of a response packet to the received receiver apparatus detection information and sends the CPU 21 a receiver apparatus detection packet receive complete notification.

Upon receiving the response packet generate request, the receiver apparatus detection response packet generating section 235 generates a receiver apparatus detection response packet and transmits the generated receiver apparatus detection response packet via the transmitter section 26.

The receiver apparatus detection response packet generating section 235 generates the receiver apparatus detection response packet in accordance with modulation (quaternary PPM) in compliance with the IrDA Fast InfraRed (FIR). The transmitter section 26 then externally transmits the receiver apparatus detection response packet in accordance with the transfer rate in compliance with the IrDA Fast InfraRed (FIR) (4 Mbps).

The receiver apparatus 2b is thus capable of transmitting the receiver apparatus detection response packet at a higher rate than the conventional XID response.

In addition, the receiver apparatus detection response packet is transmitted at the transfer rate (4 Mbps) and by modulation (quaternary PPM) in compliance with the FIR. The controller 23b can therefore be readily manufactured from a controller circuit in accordance with the conventional FIR.

Upon detecting a transmission of the receiver apparatus detection response packet, the control section 231b sends the CPU 21 a receiver apparatus detection response packet transmission complete notification indicating the detection.

In the transmitter apparatus 1b having received the receiver apparatus detection response packet from the receiver apparatus 2b, the receiver apparatus detection response packet is sent to the control section 131b via the receiver section 15 and the CDR 16. Upon receiving the receiver apparatus detection response packet, the control section 131b sends the CPU 11b a receive complete notification of the receiver apparatus detection response packet.

Upon receiving the receive complete notification, the CPU 11b loads desired transfer data into the memory 12 and sends a transfer request to the controller 13b. Subsequent procedures are the same as those in the embodiment shown in FIG. 3.

As described in the foregoing, the transmitter apparatus 1b of the present embodiment contains the receiver apparatus detection packet generating section 136 and the receiver section 15. The section 15 receives the receiver apparatus detection response packet which is response information to the receiver apparatus detection packet from the receiver apparatus 2b. The transmitter section 14 transmits the receiver apparatus detection packet. Thereafter, after the receiver section 15 has received the receiver apparatus detection response packet, multiple divisional data sets are transmitted. The receiver section 25 in the receiver apparatus 2b receives the divisional data sets and the receiver apparatus detection packets. The receiver apparatus 2b includes the receiver apparatus detection response packet generating section 235 and the transmitter section 26. The section 235 generates the receiver apparatus detection response packet. The section 26 transmits the receiver apparatus detection response packet when the receiver section 25 have normally received the receiver apparatus detection packet.

Therefore, the transmitter apparatus 1b can determine the presence of the receiver apparatus 2b simply by communicating the receiver apparatus detection packet and the receiver apparatus detection response packet with the receiver apparatus 2b. According to conventional IrDA, at least four packets needed to be exchanged before a data transfer: a XID command, a XID response, a SNRM command, and a UA response. In comparison, the present embodiment involves the exchanges of at least two packets and therefore takes less time to transfer data than conventionally.

In addition, since the divisional data set is transmitted after the receiver apparatus detection response packet is received the apparatus 1b can prepare a transmission of a divisional data set or perform other processes while waiting for an incoming receiver apparatus detection response packet. As a result, the divisional data set can be transmitted as soon as a receiver apparatus detection response packet is received.

Further, the transmitter section 14 and the transmitter section 26 transmit the receiver apparatus detection packet and the receiver apparatus detection response packet at a maximum transfer rate of 4 Mbps. As mentioned earlier, the IrDA FIR standard specifies a maximum transfer rate of 4 Mbps. Therefore, when the transmitter apparatus 1b or the receiver apparatus 2b is already equipped with an FIR controller, the FIR controller can be used.

In conventional IrDA, as mentioned earlier, the XID packet and the SNRM packet are transmitted at 9600 bps which is slower than the data transfer rate. It therefore takes a long time before data is transmitted. However, in the present embodiment, a data transfer process can be started more quickly than conventional techniques because the receiver apparatus detection packet and the receiver apparatus detection response packet are transmitted at a maximum transfer rate of 4 Mbps.

In the present embodiment, the transmitter section 14 and the transmitter section 26 transmit the receiver apparatus detection packet and the receiver apparatus detection response packet at a maximum transfer rate of 4 Mbps. Alternatively, the maximum transfer rate can be 115.2 bps.

Therefore, an existing built-in SIR controller in mobile phones, etc. can be used for this purpose. Changing the protocol also reduces a time before an establishment of a connection when compared with the establishment of a connection by existing IrDA at 9600 bps, which leads to an improved effective transfer rate.

The transmitter section 14 preferably transmits the receiver apparatus detection packet only once. This reduces the transmit time of the receiver apparatus detection packet and lowers power consumption for the transmission. The circuit size of the receiver apparatus detection packet generating section 136 and the transmitter section 14 can be reduced.

The foregoing description dose not mention the modulation and transfer rate of the data packet generated by the data packet generating section 132. The data packet is preferably modulated (quaternary PPM) for a transfer at 4 Mbps which is a transfer rate in compliance with the IrDA FIR. When this is the case, the packets generated by the data packet generating section 132 and the packets generated by the receiver apparatus detection packet generating section 136 are transferred at substantially the same transfer rate in compliance with the IrDA FIR. Thus, the data packet generating section 132 and the receiver apparatus detection packet generating section 136 can have substantially the same circuit structure. The transmitter section 14 does not need to change transfer rates between the data packets and the receiver apparatus detection packets. The circuit size can be relatively reduced.

Embodiment 4

Similarly to embodiment 3, the present embodiment lowers power consumption and requires less time to transfer data than the aforementioned IrDA.

Figure 11:
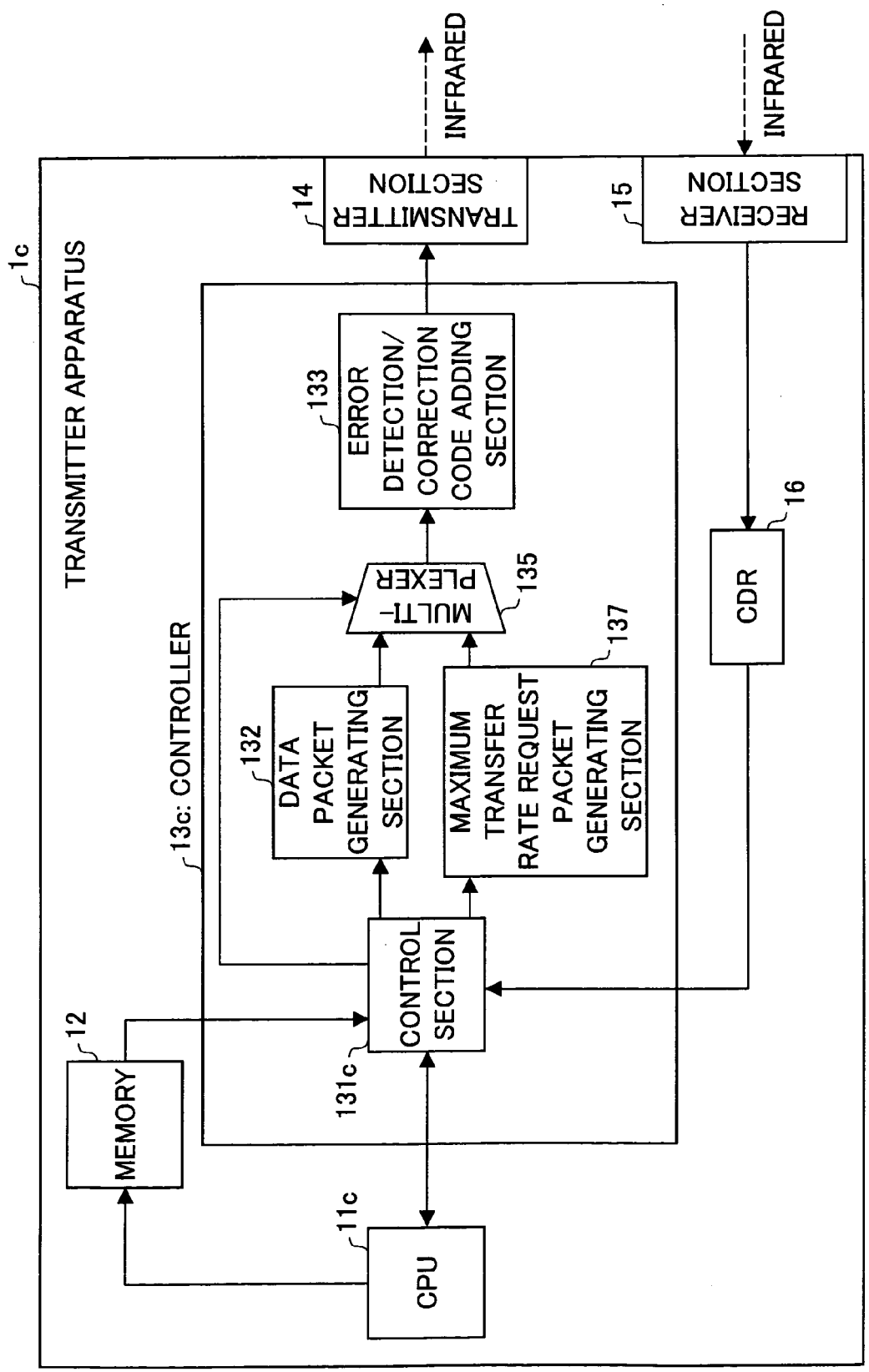
FIG. 11 is a block diagram illustrating a configuration of a transmitter apparatus of embodiment 4.
Figure 12:
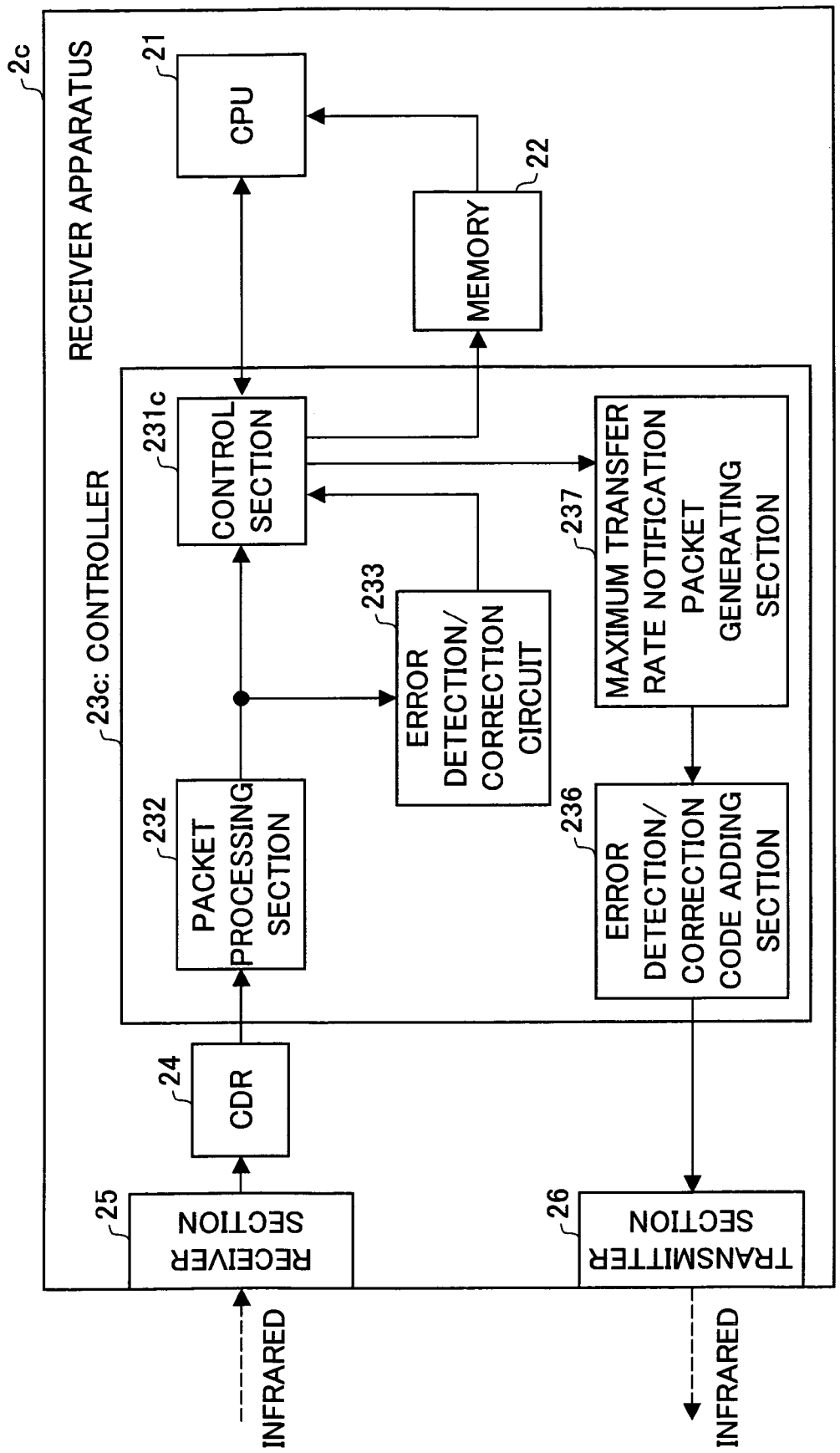
FIG. 12 is a block diagram illustrating a configuration of a receiver apparatus of embodiment 4.
Figure 13:
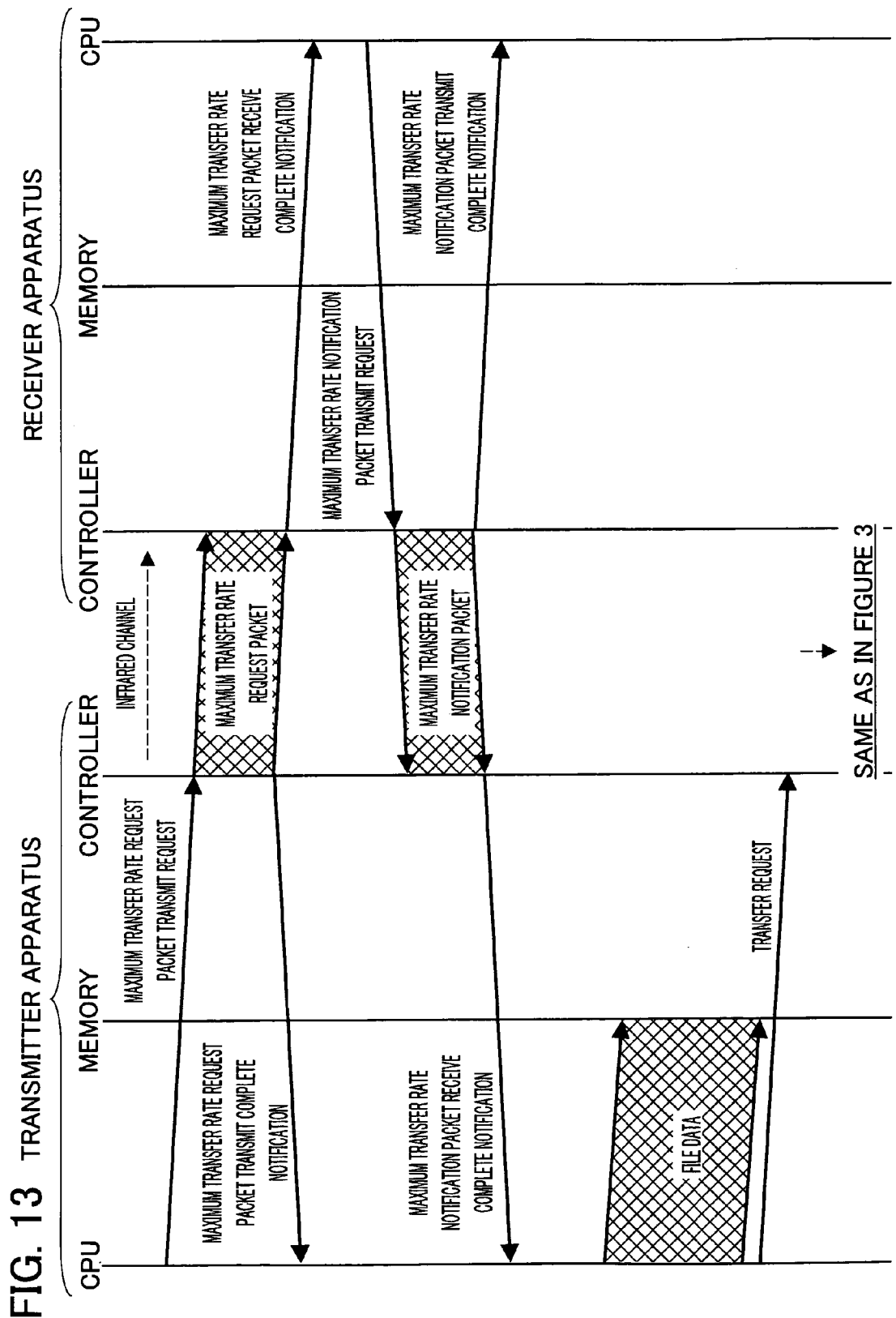
FIG. 13 is a drawing illustrating procedures in a data transfer process of embodiment 4.

Referring to FIGS. 11 to 13, a transmission system of the present embodiment will be described. For convenience, members of the present embodiment that have the same function as members of the above embodiments, and that are mentioned in those embodiments are indicated by the same reference numerals and description thereof is omitted.

FIG. 11 is a block diagram illustrating the configuration of a transmitter apparatus (transmitter) 1c of the present embodiment. As shown in FIG. 11, the transmitter apparatus 1c differs from the transmitter apparatus 1b where the CPU 11b is replaced by a CPU 11c, and the controller 13b by a controller 13c.

The CPU 11c differs from the CPU 11b as follows: The CPU 11c sends the controller 13c not a receiver apparatus detection packet transmit request, but a maximum transfer rate request packet transmit request which is a request for a transmission of a packet requesting a notification of a maximum transfer rate. The CPU 11c receives not a receiver apparatus detection response packet, but a receive complete notification of a maximum transfer rate notification packet, loads desired transfer data into the memory 12, and sends a transfer request to the controller 13c. Otherwise, the CPU 11c is the same as the CPU 11b.

The controller 13c differs from the controller 13b where the control section 131b is replaced by a control section 131c, and the receiver apparatus detection packet generating section 136 by a maximum transfer rate request packet generating section (information generating section) 137.

The control section 131c receives a maximum transfer rate request packet transmit request and a transfer request from the CPU 11c. The control by the control section 131c following the reception of the transfer request is similar to the control by the control section 131b following the reception of the transfer request.

Upon reception of the maximum transfer rate request packet transmit request, the control section 131c sends the maximum transfer rate request packet generating section 137 a packet generate request requesting generation of a maximum transfer rate request packet. In so doing, the control section 131c sends the multiplexer 135 an output switch signal causing the multiplexer 135 to output a maximum transfer rate request packet generated by the maximum transfer rate request packet generating section 137.

The control section 131c receives a response packet (maximum transfer rate notification packet) to the maximum transfer rate request packet from the CDR 16. The control section 131c then determines a transfer rate for a next data packet to be transmitted according to the maximum transfer rate contained in the received maximum transfer rate notification packet. In other words, the control section 131c compares the maximum transfer rate of the received receiver apparatus 2c and the maximum transfer rate of the transmitter apparatus 1c. If the maximum transfer rate of the receiver apparatus 2c is either equal to the maximum transfer rate of the transmitter apparatus 1c or lower than the maximum transfer rate of the transmitter apparatus 1c, the control section 131c sets the transfer rate for the next data packet to be transmitted to the maximum transfer rate of the receiver apparatus 2c. On the other hand, if the maximum transfer rate of the receiver apparatus 2c is higher than the maximum transfer rate of the transmitter apparatus 1c, the control section 131c sets the transfer rate for the next data packet to be transmitted to the maximum transfer rate of the transmitter apparatus 1c.

Further, the control section 131c sends the CPU 11c a receive complete notification of a maximum transfer rate notification packet.

The maximum transfer rate request packet generating section 137 receives a packet generate request from the control section 131c and generates a maximum transfer rate request packet containing as information a maximum transfer rate request for a notification of the maximum transfer rate of the receiver apparatus. The maximum transfer rate request packet generating section 137 sends the generated maximum transfer rate request packet to the error detection/correction code adding section 133 via the multiplexer 135. The error detection/correction code adding section 133 adds an error detection code (or correction code) to the maximum transfer rate request packet for a transmission from the transmitter section 14.

The maximum transfer rate request packet generating section 137 generates the maximum transfer rate request packet by modulation (quaternary PPM) in compliance with the IrDA Fast InfraRed (FIR). The maximum transfer rate request packet generating section 137 sets a transfer rate for the generated maximum transfer rate request packet to 4 Mbps which is the transfer rate of the IrDA Fast InfraRed (FIR).

Next, the receiver apparatus (receiver) 2c of the present embodiment will be described in reference to the a block diagram in FIG. 12. As shown in FIG. 12, the receiver apparatus 2c differs from the receiver apparatus 2b where the controller 23b is replaced by a controller 23c. Further, the controller 23c differs from the controller 23b where the control section 231b is replaced by a control section 231c, and the receiver apparatus detection response packet generating section 235 by a maximum transfer rate notification packet generating section (response information generating section) 237.

The control section 231c performs a predetermined process in accordance with information in a packet from the packet processing section 233. If the information from the packet processing section 233 is a divisional data set, the control section 231c performs a similar process to the control section 231b.

In contrast, if the information from the packet processing section 233 is a maximum transfer rate request, the control section 231c sends the maximum transfer rate notification packet generating section 237 a response packet generate request for generation of a maximum transfer rate notification packet containing as information a maximum reception rate of the receiver apparatus 2c. Upon a receipt of the maximum transfer rate request, the control section 231c sends the CPU 21 a maximum transfer rate request packet receive complete notification indicating the receipt. Further, the control section 231c detects a transmission by the transmitter section 26 of the maximum transfer rate notification packet generated by the maximum transfer rate notification packet generating section 237 and sends the CPU 21 a maximum transfer rate notification packet transmission complete notification indicating the detection. Thus, the CPU 21 can know that data will be transmitted from the transmitter apparatus 1c.

The maximum transfer rate notification packet generating section 237 receives the response packet generate request from the control section 231c, generates the maximum transfer rate notification packet containing the maximum transfer rate (here, reception rate) of the receiver apparatus 2c, and sends the generated maximum transfer rate notification packet to the error detection/correction code adding section 236. Thus, the maximum transfer rate notification packet is transmitted to the transmitter apparatus 1c via the error detection/correction code adding section 236 and the transmitter section 26.

The maximum transfer rate notification packet generating section 237 generates the maximum transfer rate notification packet by modulation (quaternary PPM) in compliance with the IrDA Fast InfraRed (FIR). The maximum transfer rate notification packet generating section 237 sets a transfer rate for the generated maximum transfer rate notification packet to 4 Mbps which is the transfer rate of the IrDA Fast InfraRed (FIR).

Next, in reference to FIG. 13, data transmission/reception procedures between the transmitter apparatus 1c and the receiver apparatus 2c of the present embodiment will be described.

First, in the transmitter apparatus 1c, upon receiving a transfer instruction from the user, the CPU 11c sends a maximum transfer rate request packet transmit request to the control section 131c. The control section 131c sends the packet generate request to the maximum transfer rate request packet generating section 137 in accordance with the request and sends the multiplexer 135 a switch signal causing the multiplexer 135 to output the packet generated by the maximum transfer rate request packet generating section 137.

In so doing, similarly to the receiver apparatus detection packet of embodiment 3, the maximum transfer rate request packet generating section 137 generates the maximum transfer rate request packet in accordance with modulation (quaternary PPM) in compliance with the IrDA Fast InfraRed (FIR) and sends the generated maximum transfer rate request packet to the error detection/correction code adding section 133 via the multiplexer 135. The error detection/correction code adding section 133 adds an error detection code (or correction code) to the maximum transfer rate request packet and sends the packet and code to the transmitter section 14. The transmitter section 14 externally transmits the maximum transfer rate request packet over an infrared channel only once. The transmitter section 14 does so in accordance with the transfer rate in compliance with the IrDA Fast InfraRed (FIR) (4 Mbps).

Thus, the transmitter apparatus 1c is capable of transmitting the maximum transfer rate request packet at a higher rate than the conventional XID command.

In addition, the maximum transfer rate request packet is transmitted at the transfer rate (4 Mbps) and by modulation (quaternary PPM) in compliance with the FIR. The controller 13c can therefore be readily manufactured from a controller circuit in accordance with the conventional FIR.

The control section 131c detects a transmission of the maximum transfer rate request packet from the transmitter section 14 and sends the CPU 11c a transmission complete notification for a maximum transfer rate request packet.

In the receiver apparatus 2c, the maximum transfer rate request packet is sent to the packet processing section 232 via the receiver section 25 and the CDR 24. The packet processing section 232 extracts the maximum transfer rate request and the error detection code (or correction code) from the received maximum transfer rate request packet and sends the extracted maximum transfer rate request and the error detection code to the control section 231c and the error detection/correction circuit 233.

Upon receiving the maximum transfer rate request, the control section 231c sends the maximum transfer rate notification packet generating section 237 a packet generate request for generation of a maximum transfer rate notification packet and sends the CPU 21 a maximum transfer rate request packet receive complete notification.

Upon receiving the packet generate request, the maximum transfer rate notification packet generating section 237 generates a maximum transfer rate notification packet indicating a maximum transfer rate indicating a maximum reception rate of the receiver apparatus 2c and transmits the generated maximum transfer rate notification packet via the transmitter section 26.

The maximum transfer rate notification packet generating section 237 generates the maximum transfer rate notification packet in accordance with modulation (quaternary PPM) in compliance with the IrDA Fast InfraRed (FIR). The transmitter section 26 externally transmits the maximum transfer rate notification packet in accordance with the transfer rate in compliance with the IrDA Fast InfraRed (FIR) (4 Mbps).

Thus, the receiver apparatus 2c is capable of transmitting the maximum transfer rate notification packet at a higher rate than the conventional XID response.

In addition, the maximum transfer rate notification packet is transmitted at the transfer rate (4 Mbps) and by modulation (quaternary PPM) in compliance with the FIR. The controller 23c can therefore be readily manufactured from a controller circuit in accordance with the conventional FIR.

Upon detecting a transmission of the maximum transfer rate notification packet, the control section 231c sends the CPU 21 a maximum transfer rate notification packet transmission complete notification indicating the detection.

In the transmitter apparatus 1c having received the maximum transfer rate notification packet from the receiver apparatus 2c, the maximum transfer rate notification packet is sent to the control section 131c via the receiver section 15 and the CDR 16. Upon receiving the maximum transfer rate notification packet, the control section 131c sends the CPU 11c a receive complete notification of the maximum transfer rate notification packet.

Upon receiving the receive complete notification, the CPU 11c loads desired transfer data into the memory 12 and sends a transfer request to the controller 13c. Subsequent procedures are the same as those in the embodiment shown in FIG. 3. The control section 131c however determines a transfer rate for a next data packet to be transmitted according to the maximum transfer rate contained in the received maximum transfer rate notification packet, that is, the maximum transfer rate of the receiver apparatus 2c. In other words, if the maximum transfer rate of the receiver apparatus 2c is either equal to the maximum transfer rate of the transmitter apparatus 1c or lower than the maximum transfer rate of the transmitter apparatus 1c, the control section 131c sets the transfer rate for the next data packet to be transmitted to the maximum transfer rate of the receiver apparatus 2c. On the other hand, if the maximum transfer rate of the receiver apparatus 2c is higher than the maximum transfer rate of the transmitter apparatus 1c, the control section 131c sets the transfer rate for the next data packet to be transmitted to the maximum transfer rate of the transmitter apparatus 1c.

The present embodiment produces similar effects to embodiment 3 and also the following effects. The transmitter apparatus 1c can know the maximum transfer rate at which the receiver apparatus 2c can receive. The transmitter apparatus 1c transmits the divisional data sets in a receivable range for the receiver apparatus 2c. Therefore, the receiver apparatus 2c can more certainly receive the divisional data sets.

Embodiment 5

The receiver apparatus can in some cases execute multiple application programs: for example, when the receiver apparatus is a printer and executes a black and white print program on document data and a color print program on image data. However, in embodiment 1, it is impossible to determine which program to execute unless all the divisional data sets are received from the transmitter apparatus 1, and the types of transfer data composed of the divisional data sets are analyzed. These receipt and analysis delays the start of a data post-process on the received data.

The present embodiment is adapted to solve these problems. Further, similarly to embodiment 3, the present embodiment lowers power consumption and requires less time to transfer data than the aforementioned IrDA.

Figure 15:
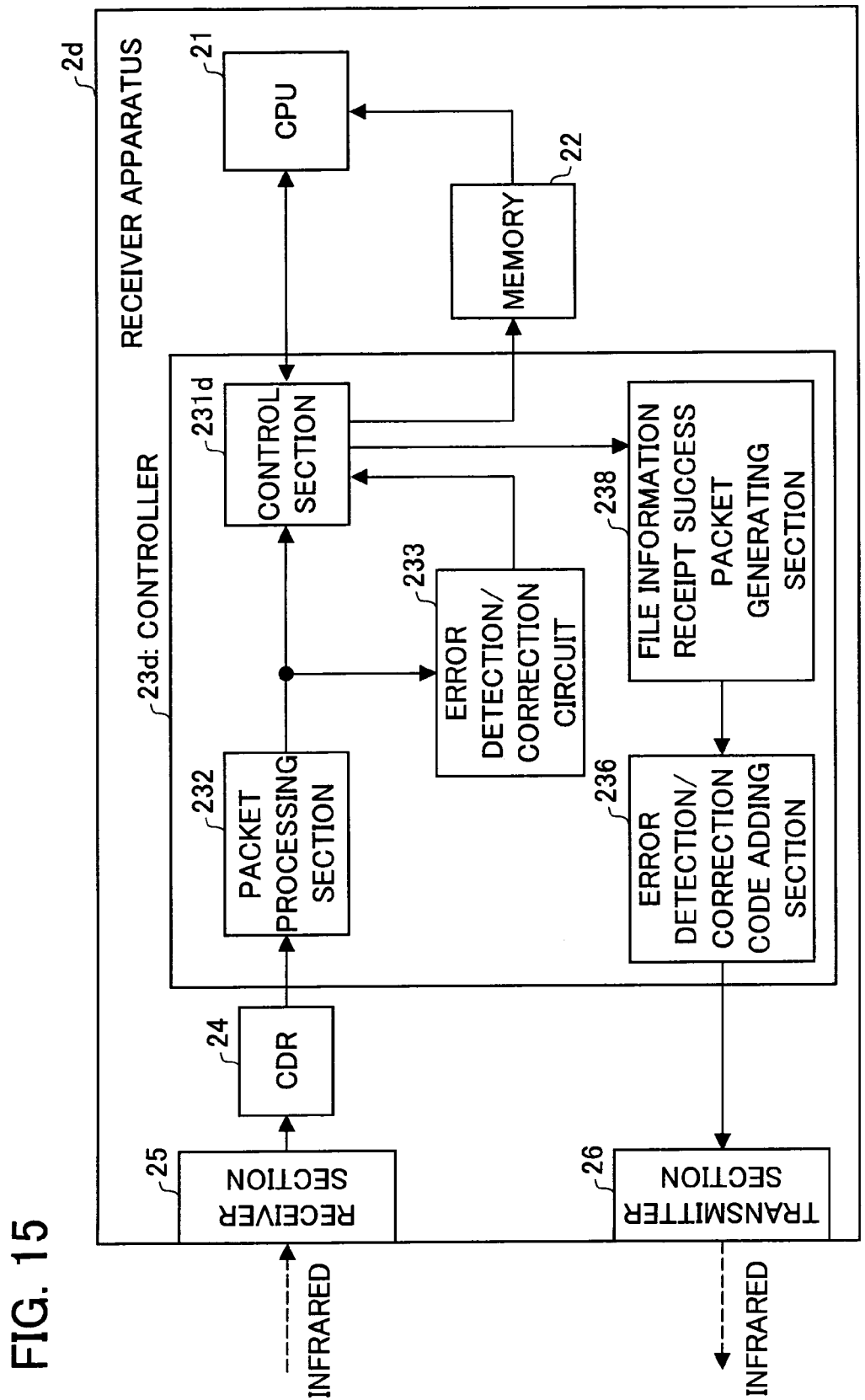
FIG. 15 is a block diagram illustrating a configuration of a receiver apparatus of embodiment 5.
Figure 16:
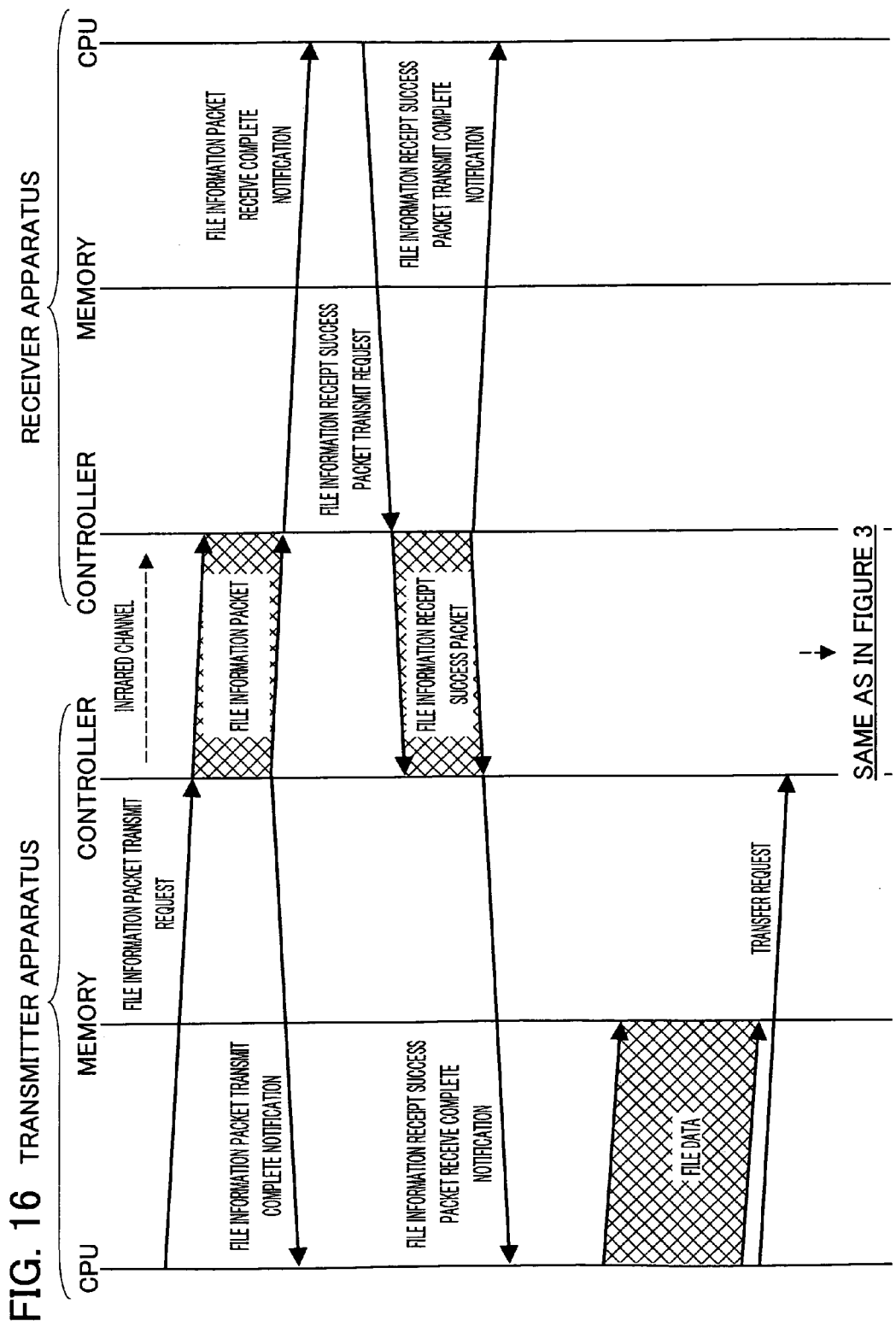
FIG. 16 is a drawing illustrating procedures in a data transfer process of embodiment 5.

In reference to FIGS. 14 to 16, a transfer system of the present embodiment will be described. For convenience, members of the present embodiment that have the same function as members of the above embodiments, and that are mentioned in those embodiments are indicated by the same reference numerals and description thereof is omitted.

Figure 14:
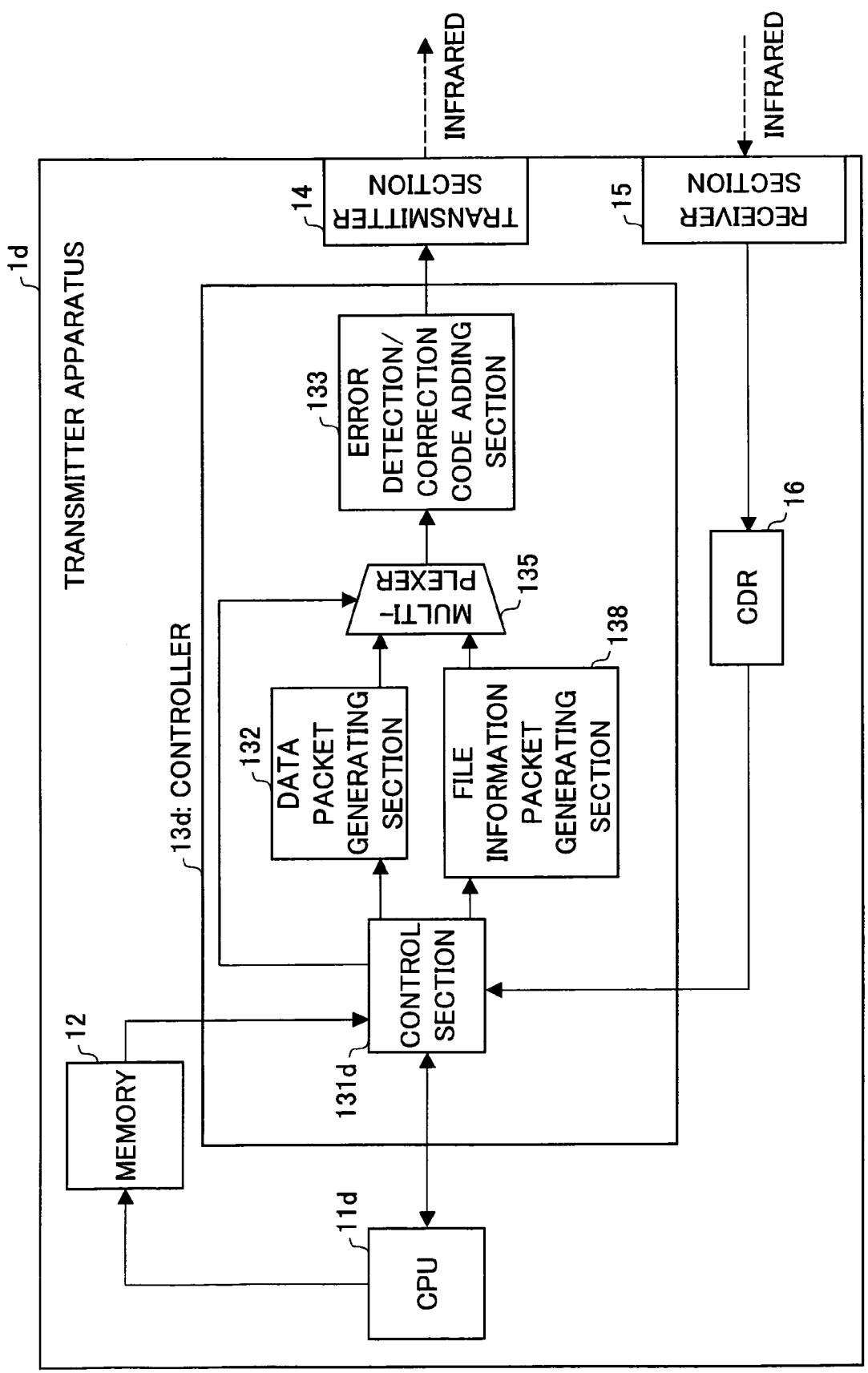
FIG. 14 is a block diagram illustrating a configuration of a transmitter apparatus of embodiment 5.

FIG. 14 is a block diagram illustrating the configuration of a transmitter apparatus (transmitter) 1d of the present embodiment. As shown in FIG. 14, the transmitter apparatus 1d differs from the transmitter apparatus 1b where the CPU 11b is replaced by a CPU 11d, and the controller 13b by a controller 13d.

The CPU 11d differs from the CPU 11b as follows: The CPU 11d sends the controller 13d not a receiver apparatus detection packet transmit request, but a file information packet transmit request with added file information (data identity information, for example, the type, name, date of creation, author, etc. of data) identifying transfer data to be transferred. The CPU 11d receives not a receiver apparatus detection response packet, but a receive complete notification of a file information receipt success packet, loads desired transfer data into the memory 12, and sends a transfer request to the controller 13d. Otherwise, the CPU 11d is the same as the CPU 11b.

The controller 13d differs from the controller 13b where the control section 131b is replaced by a control section 131d, and the receiver apparatus detection packet generating section 136 by a file information packet generating section (data identity information generating section) 138.

The control section 131d receives from the CPU 11d a transfer request and the file information packet transmit request with the added file information. The control by the control section 131d following the reception of the transfer request is similar to the control by the control section 131b following the reception of the transfer request.

Upon reception of the file information packet transmit request, the control section 131d sends the file information added to the transmit request to the file information packet generating section 138. The control section 131d also sends the file information packet generating section 138 a packet generate request for generation of a file information packet. In so doing, the control section 131d sends the multiplexer 135 a switch signal causing the multiplexer 135 to output the file information packet generated by the file information packet generating section 138.

The control section 131d receives a response packet (file information receipt success packet) to the file information packet from the CDR 16. In so doing, the control section 131d sends the CPU 11d the receive complete notification of the file information receipt success packet.

The file information packet generating section 138 receives the packet generate request and the file information from the control section 131d and generates a file information packet containing the file information. The file information packet generating section 138 sends the generated file information packet to the error detection/correction code adding section 133 via the multiplexer 135. The error detection/correction code adding section 133 adds an error detection code (or correction code) to the file information packet for transmission from the transmitter section 14.

The file information packet generating section 138 generates the file information packet by modulation (quaternary PPM) in compliance with the IrDA Fast InfraRed (FIR). In addition, the file information packet generating section 138 sets a transfer rate for the generated file information packet to 4 Mbps which is the transfer rate of the IrDA Fast InfraRed (FIR).

Next, in reference to the block diagram in FIG. 15, a receiver apparatus (receiver) 2d of the present embodiment will be described. As shown in FIG. 15, the receiver apparatus 2d differs from the receiver apparatus 2b where the controller 23b is replaced by a controller 23d. Further, the controller 23d differs from the controller 23b where the control section 231b is replaced by a control section 231d, and the receiver apparatus detection response packet generating section 235 by a file information receipt success packet generating section (response information generating section) 238.

The control section 231d performs a predetermined process in accordance with information in a packet from the packet processing section 233. If the information from the packet processing section 233 is a divisional data set, the control section 231d performs a similar process to the control section 231.

In contrast, if the information from the packet processing section 233 is file information, the control section 231d processes the file information in accordance with an error status from the error detection/correction circuit 233.

If having been notified of the inclusion of an error in the file information by the error detection/correction circuit 233, the control section 231d notifies the CPU 21 of it and performs no further processing.

In contrast, if having been notified of the inclusion of no error in the file information by the error detection/correction circuit 233, the control section 231d sends the file information receipt success packet generating section 238 a packet generate request for generation of a file information receipt success packet indicating that the file information packet has been successfully received. The section 231d records the received file information in the memory 22. Further, The control section 231d performs a similar process to the control section 231 on a next divisional data set to be received.

If the file information includes no error, the control section 231d sends the CPU 21 a file information packet receive complete notification indicating that the file information packet has been received. Further, the section 231d detects a transmission by the transmitter section 26 of the file information receipt success packet generated by the file information receipt success packet generating section 238 and sends the CPU 21 a file information receipt success packet transmission complete notification indicating the detection.

Thus, the CPU 21 can know that data will be transmitted from the transmitter apparatus 1d and retrieve file information on transfer data from the memory 22. The CPU 21 can therefore determine an application program for the next post-process of received data in advance according to the file information. The post-process on the received data can be instantly executed.

The file information receipt success packet generating section 238 receives a packet generate request from the control section 231d, generates the file information receipt success packet indicating a successful receipt of the file information packet, and sends the generated file information receipt success packet to the error detection/correction code adding section 236. Thus, the file information receipt success packet is transmitted to the transmitter apparatus 1d via the error detection/correction code adding section 236 and the transmitter section 26.

The file information receipt success packet generating section 238 generates the file information receipt success packet by modulation (quaternary PPM) in compliance with the IrDA Fast InfraRed (FIR). In addition, the file information receipt success packet generating section 238 sets a transfer rate for the generated file information receipt success packet to 4 Mbps which is the transfer rate of the IrDA Fast InfraRed (FIR).

Next, in reference to FIG. 16, data transmission/reception procedures between the transmitter apparatus 1d and the receiver apparatus 2d of the present embodiment will be described.

First, in the transmitter apparatus 1d, upon receiving a transfer instruction from the user, the CPU 11d sends the control section 131d a file information packet transmit request with added file information on transfer data to be transferred. The control section 131d sends the packet generate request and the file information to the file information packet generating section 138 in accordance with the request. The section 131d also sends the multiplexer 135 a switch signal causing the multiplexer 135 to output the packet generated by the file information packet generating section 138.

The file information packet generating section 138 generates the file information packet according to the received file information and sends the generated file information packet to the error detection/correction code adding section 133 via the multiplexer 135. The error detection/correction code adding section 133 adds an error detection code (or correction code) to the file information packet and sends them to the transmitter section 14. The transmitter section 14 externally transmits the file information packet over an infrared channel only once.

In so doing, similarly to the receiver apparatus detection packet of embodiment 3, the file information packet generating section 138 generates the file information packet in accordance with modulation (quaternary PPM) in compliance with the IrDA Fast InfraRed (FIR), and sends the generated file information packet to the error detection/correction code adding section 133 via the multiplexer 135. The error detection/correction code adding section 133 adds the error detection code (or correction code) to the file information packet and sends them to the transmitter section 14. The transmitter section 14 externally transmits the file information packet over an infrared channel. The transfer rate here is in accordance with the transfer rate in compliance with the IrDA Fast InfraRed (FIR) (4 Mbps).

Thus, the transmitter apparatus 1d is capable of transmitting the file information packet at a higher rate than the conventional XID command.

In addition, the file information packet is transmitted at the transfer rate (4 Mbps) and by modulation (quaternary PPM) in compliance with the FIR. The controller 13d can therefore be readily manufactured from a controller circuit in accordance with the conventional FIR.

Upon detecting a transmission of the file information packet from transmitter section 14, the control section 131d sends the CPU 11d a transmission complete notification for a file information packet.

On the other hand, in the receiver apparatus 2d, the file information packet is sent to the control section 231d via the receiver section 25, the CDR 24, and the packet processing section 232. Upon receiving the file information packet, the control section 231d sends the file information receipt success packet generating section 238 a packet generate request for generation of a file information receipt success packet and sends the CPU 21 a file information packet receive complete notification.

Upon receiving the packet generate request, the file information receipt success packet generating section 238 generates the file information receipt success packet indicating a successful receipt of the file information packet, and transmits the generated file information receipt success packet via the transmitter section 26. In so doing, the control section 231d sends the file information receipt success packet transmission complete notification to the CPU 21 and records the received file information into the memory 22.

Upon receiving the file information receipt success packet from the receiver apparatus 2d, in the transmitter apparatus 1d, the file information receipt success packet is sent to the control section 131d via the receiver section 15 and the CDR 16.

The file information receipt success packet generating section 238 generates the file information receipt success packet in accordance with modulation (quaternary PPM) in compliance with the IrDA Fast InfraRed (FIR). The transmitter section 26 externally transmits the file information receipt success packet in accordance with the transfer rate in compliance with the IrDA Fast InfraRed (FIR) (4 Mbps).

Thus, the receiver apparatus 2d is capable of transmitting the file information receipt success packet at a higher rate than the conventional XID response.

In addition, the file information receipt success packet is transmitted at the transfer rate (4 Mbps) and by modulation (quaternary PPM) in compliance with the FIR. The controller 23d can therefore be readily manufactured from a controller circuit in accordance with the conventional FIR.

Upon receiving the file information receipt success packet, the control section 131d sends the CPU 11d a file information receipt success packet receive complete notification.

Upon receiving a receiver apparatus detection response packet receive complete notification, the CPU 11d loads desired transfer data into the memory 12 and sends a transfer request to the controller 13d. Subsequent procedures are the same as those in the embodiment in FIG. 3.

As described in the foregoing, the transmitter apparatus 1d of the present embodiment contains the file information packet generating section 138 generating the file information packet (data identity information) containing the file information to identify the transfer data. The transmitter section 14 transmits the file information packet.

Here, the data identity information refers to, for example, such data format, date of creation, author, and other information on the transfer data. Thus, the receiver apparatus 2d can identify the transfer data composed of the received divisional data sets.

For example, if the data identity information is a data format, the receiver apparatus 2d can readily select an execution program for the received divisional data sets according to the received data format. In addition, if the data identity information is the data author, the receiver apparatus 2d can classify the transfer data composed of the received divisional data set by the author according to the received data author.

In addition, the receiver section 15 in the transmitter apparatus 1d receives the file information receipt success packet indicating that the file information packet has been normally received from the receiver apparatus 2d. After the receiver section 15 receives the file information receipt success packet, the transmitter section 14 transmits the multiple divisional data sets.

Therefore, the transmitter apparatus 1d can determine the presence/absence of the receiver apparatus 2d by communicating the file information packet and the file information receipt success packet. In addition, the transmitter apparatus 1d can prepare a transmission of a divisional data set or perform other processes while waiting for a file information receipt success packet to come in. As a result, the divisional data set can be transmitted as soon as the file information receipt success packet is received.

Embodiment 6

In embodiment 1, the receiver apparatus 1 extracts divisional data sets from multiple data packets generated from a single piece of transfer data and records only error-free divisional data sets into the memory 22. However, combining these multiple divisional data sets produces a single piece of transfer data. Therefore, if any of the divisional data sets has an error, the transfer data as a whole has a defect. When this is the case, the user usually performs the data transfer again.

Therefore, if an error is detected in any of the divisional data sets, the power to receive the other divisional data sets is wasted.

The present embodiment is adapted to solve these problems.

A receiver apparatus of the present embodiment will be described in reference to FIGS. 17 and 18. For convenience, members of the present embodiment that have the same function as members of the above embodiments, and that are mentioned in those embodiments are indicated by the same reference numerals and description thereof is omitted.

Figure 17:
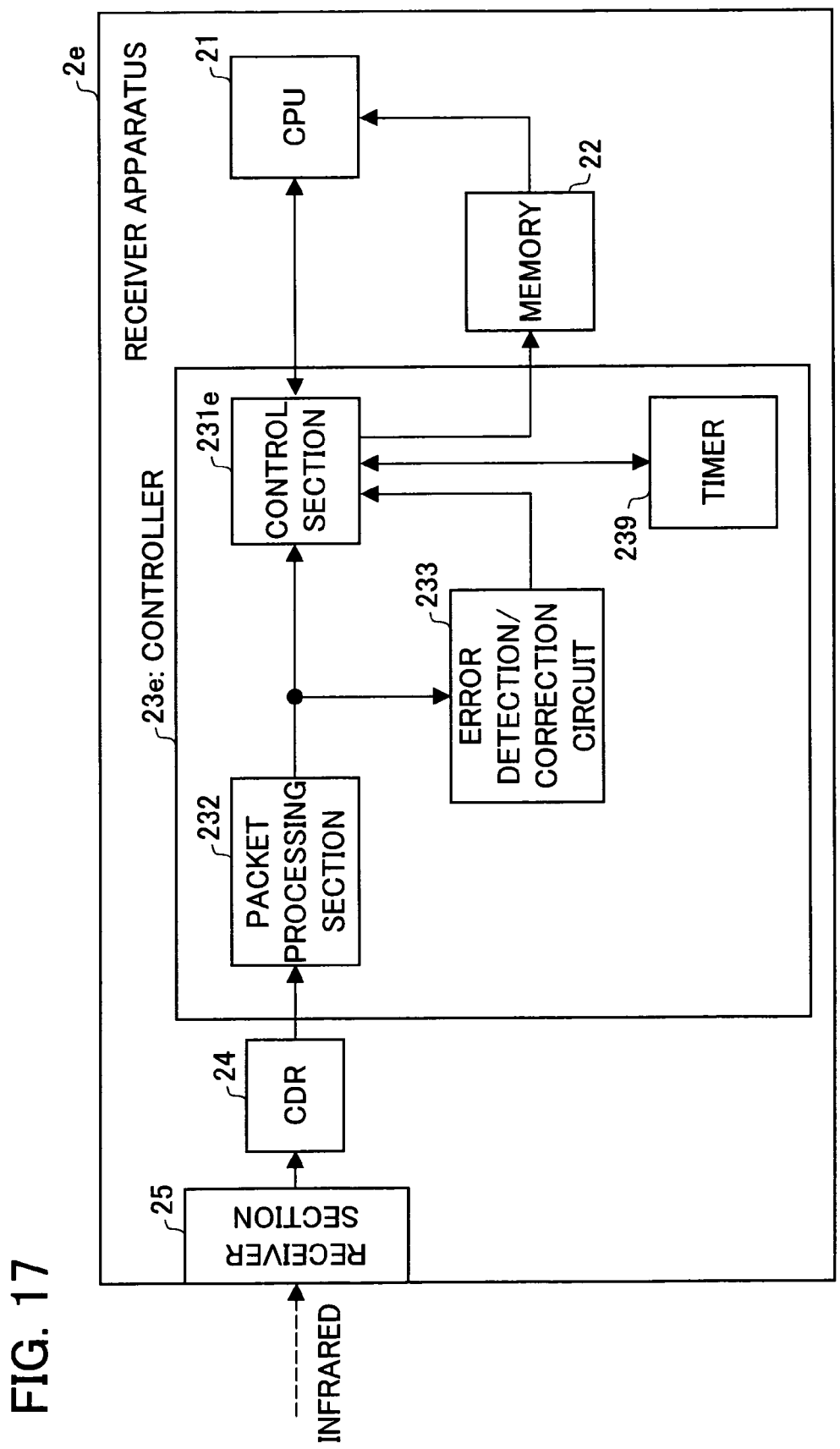
FIG. 17 is a block diagram illustrating a configuration of a receiver apparatus of embodiment 6.

FIG. 17 is a block diagram illustrating the configuration of a receiver apparatus (receiver) 2e of the present embodiment. As shown in FIG. 17, the receiver apparatus 2e differs from the receiver apparatus 2 where the controller 23 is replaced by a controller 23e. In addition, the controller 23e differs from the controller 23 where the control section 231 is replaced by a control section 231e. Another difference is that the controller 23e contains a timer 239.

The control section 231e has the following functions as well as those of the control section 231: When the control section 231e receives from the error detection/correction circuit 233 a notification that an error is contained, the section 231e discards the divisional data set and measures, using the timer 239, a no-signal period during which no divisional data set from the packet processing section 232 will be accepted. The control section 231e discards all the following divisional data sets received from the packet processing section 232 until the time measured on the timer 239 reaches a predetermined time. The "predetermined time" is set to be longer than the time usually required for the transmission of all the divisional data sets generated from one set of transfer data (time A) and shorter than the sum of time A and the usual time interval between two sets of transfer data.

Thus, the control section 231e discards those divisional data sets which are sent from the packet processing section 232 after an error is received from the error detection/correction circuit 233 and which are part of the same transfer data as is the error-containing divisional data set. Thereafter, when other transfer data is transmitted, since the timer measurement has reached the predetermined time, the control section 231e can record into the memory 22 divisional data sets which are part of transfer data newly transmitted from the transmitter apparatus.

Next, divisional data set transmission/reception procedures in the present embodiment will be described in reference to FIG. 18.

The transmitter apparatus 1 sequentially transmits the data packets (1) to (N) containing the divisional data sets (1) to (N) formed by dividing transfer data. In the receiver apparatus 2e, the data packets (1) to (N) are sent in this order to the packet processing section 232 via the receiver section 25 and the CDR 24.

The packet processing section 232 extracts the divisional data set and the error detection code (correction code) from each data packet and sends the extracted divisional data set and the error detection code to the control section 231 and the error detection/correction circuit 233.

Assume now that the error detection/correction circuit 233 has detected the divisional data set (1) is error free and the divisional data set (2) has an error.

Figure 18:
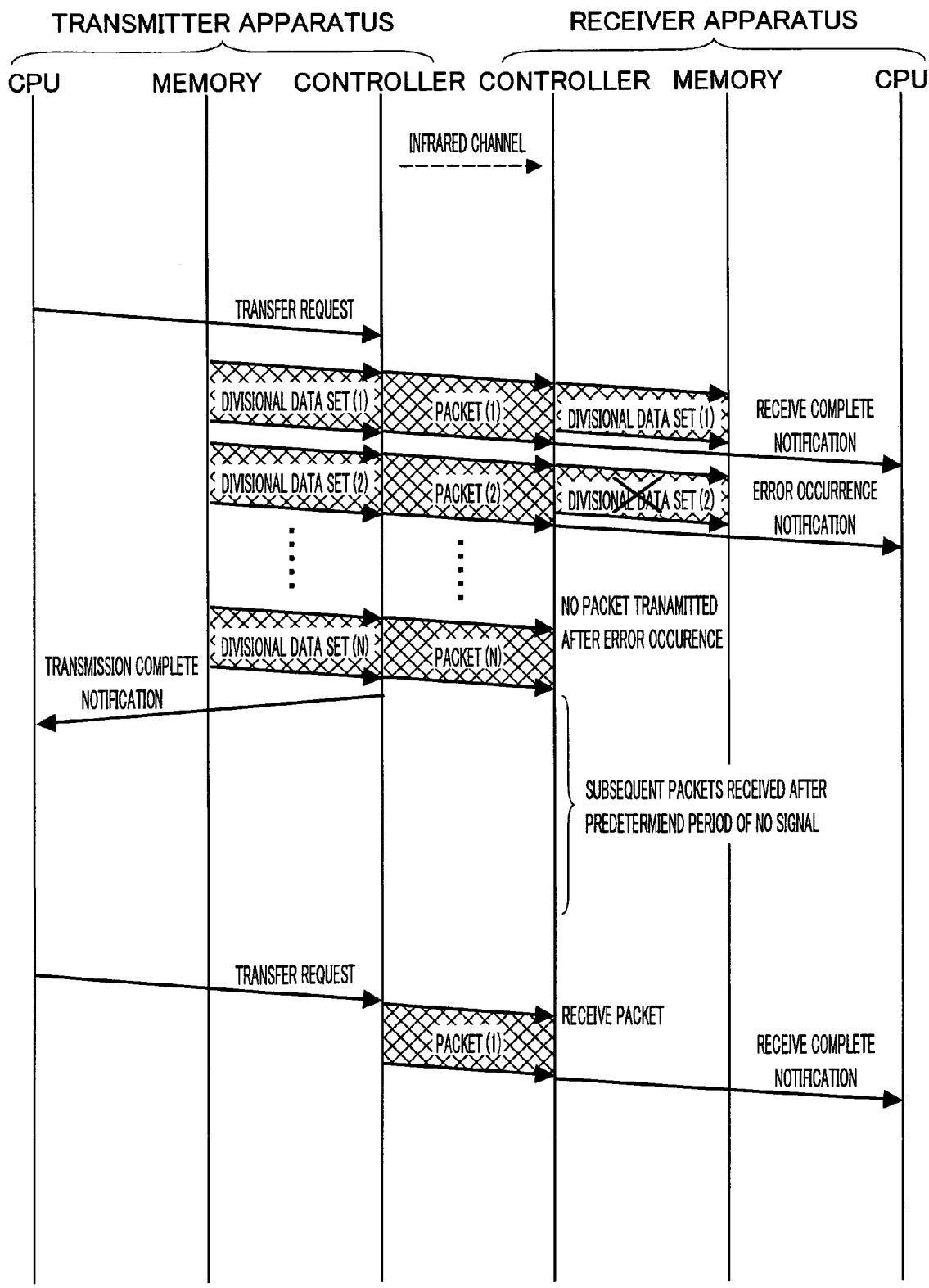
FIG. 18 is a drawing illustrating procedures in a data transfer process of embodiment 6.

When this is the case, in the receiver apparatus 2e, as shown in FIG. 18, the control section 231e records the divisional data set (1) into the memory 22 and sends the CPU 21 a receive complete notification indicating the completion of a receipt of the divisional data set (1).

Next, the control section 231e receives, from the error detection/correction circuit 233, a notification indicating that the divisional data set (2) has an error. The section 231e discards the divisional data set (2) and sends the CPU 21 an error occurrence notification indicating an occurrence of an error in the divisional data set (2).

Thereafter, using the timer 239, the control section 231e starts measuring the non-signal time during which no divisional data set from the packet processing section 232 will be accepted. The section 231e does not receive divisional data sets from the packet processing section 232 until a predetermined time elapses.

Thereafter, when the time measurement on the timer 239 reaches the predetermined time, the control section 231e resets the timer 239 and receives packets from the packet processing section 232. In other words, the section 231e receives data packets which are part of the transfer data newly transmitted from the transmitter apparatus 1 (the same or different transfer data as the previous time).

As described in the foregoing, in the receiver apparatus 2e of the present embodiment, if the error detection/correction circuit 233 detects an error in a divisional data set received by the receiver section 25, the control section 231e does not perform a receipt process on divisional data sets after the divisional data set in which an error has been detected, regarding the transfer data containing the divisional data set in which an error has been detected. If the error detection/correction circuit 233 detects an error in a divisional data set received by the receiver section 25, the control section 231e may control the receiver section 25 so that it receives no divisional data sets after the divisional data set in which an error has been detected regarding the transfer data containing the divisional data set in which an error has been detected.

This inhibits reception of divisional data sets after the divisional data set in which an error has been detected regarding the transfer data containing the divisional data set in which an error has been detected. If one of the divisional data sets contains an error, the transfer data of which the divisional data set is a part loses its original meaning. Therefore, by not performing the wasteful receipt process on, or not receiving, the divisional data sets after the divisional data set in which an error has been detected, the power consumption can be lowered.

Embodiment 7

In the foregoing embodiments, the CPU 21 may in some cases perform another computing process (interrupt process) while the controller 23 is recording the received divisional data set into the memory 22. When this is the case, the controller 23 cannot finish the write process for the divisional data set in time. In an extreme case, the control section 231 could, before finishing writing the divisional data set (n) into the memory 22, receive a next divisional data set (n+1) and save the divisional data set (n+1) replacing the divisional data set (n).

The present embodiment is adapted to solve these problems. A transmission system of the present embodiment will be described in reference to FIGS. 19 to 22. For convenience, members of the present embodiment that have the same function as members of the above embodiments, and that are mentioned in those embodiments are indicated by the same reference numerals and description thereof is omitted.

Figure 20:
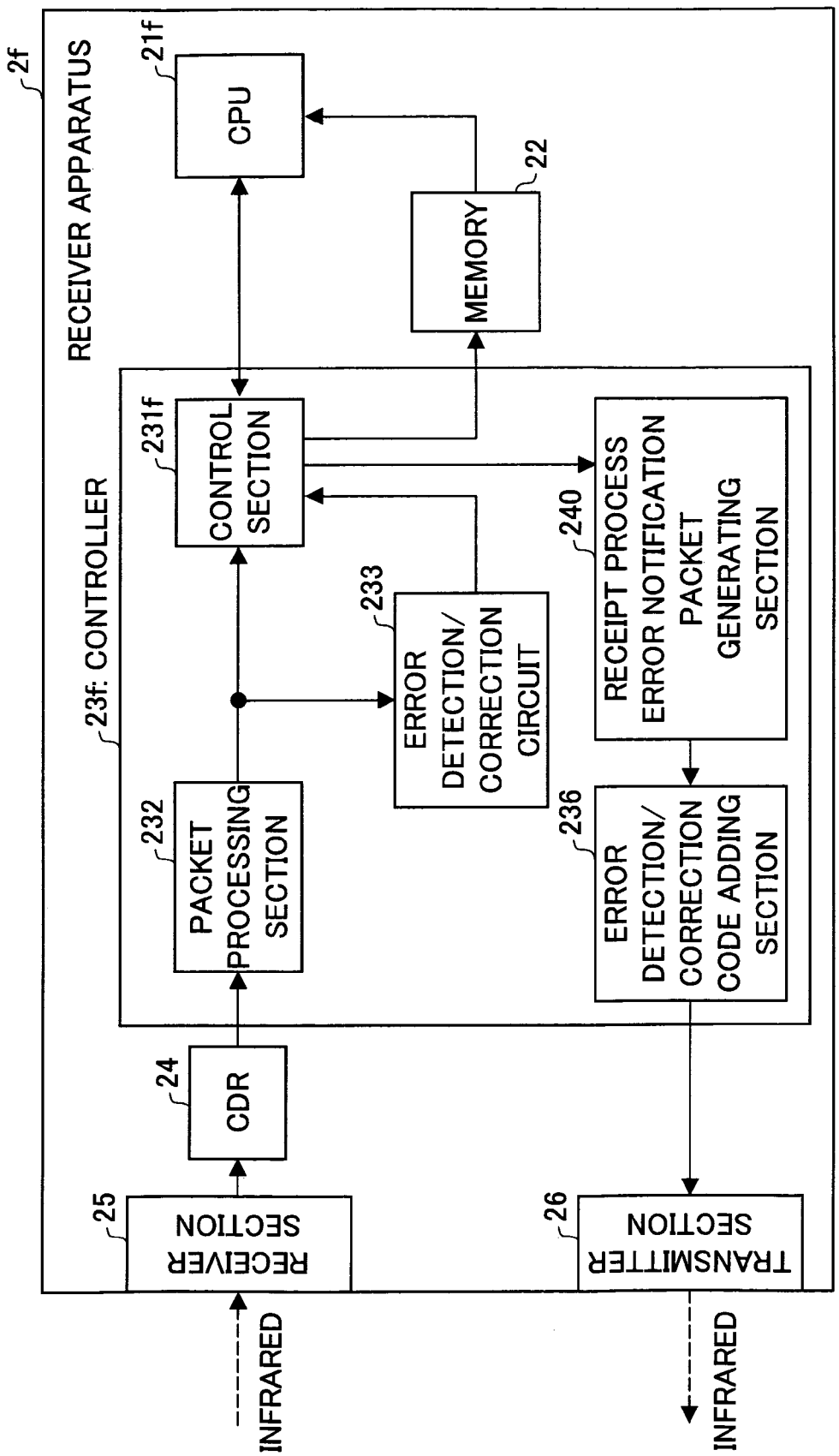
FIG. 20 is a block diagram illustrating a configuration of a receiver apparatus of embodiment 7.

FIG. 20 is a block diagram illustrating a configuration of a receiver apparatus (receiver) 2f of the present embodiment. As shown in FIG. 20, the receiver apparatus 2f differs from the receiver apparatus 2 where the CPU 21 is replaced by a CPU 21f, and the controller 23 by a controller 23f. Another difference is that the apparatus 2f contains a transmitter section 26.

If the control section 231 cannot finish writing the divisional data set into the memory 22 in time because of an interrupt process as in the example above, the CPU 21f sends the controller 23f a receipt process error notification packet transmit request for another transmission of the transfer data. The CPU 21f sends the receipt process error notification packet transmit request after completing the receipt of a data packet.

The controller 23f differs from the controller 23 where the control section 231 is replaced by a control section 231f.

Another difference is where the controller 23f contains a receipt process error notification packet generating section (receipt process error notification information generating section) 240 and an error detection/correction code adding section 236.

The control section 231f has the following functions as well as those of the control section 231: Upon a receipt of a receipt process error notification packet transmit request from the CPU 21f, the control section 231f sends the receipt process error notification packet generating section 240 a packet generate request for generation of a receipt process error notification packet. Upon detecting a transmission of a receipt process error notification packet from the transmitter section 26, the control section 231f sends the CPU 21f a transmission complete notification for the receipt process error notification packet.

The receipt process error notification packet generating section 240 receives the packet generate request from the control section 231f and generates a receipt process error notification packet indicating that the transfer data was not written in time. The receipt process error notification packet generating section 240 sends the generated receipt process error notification packet to the error detection/correction code adding section 236.

The error detection/correction code adding section 236 and the transmitter section 26 have been already described in embodiment 3.

Figure 19:
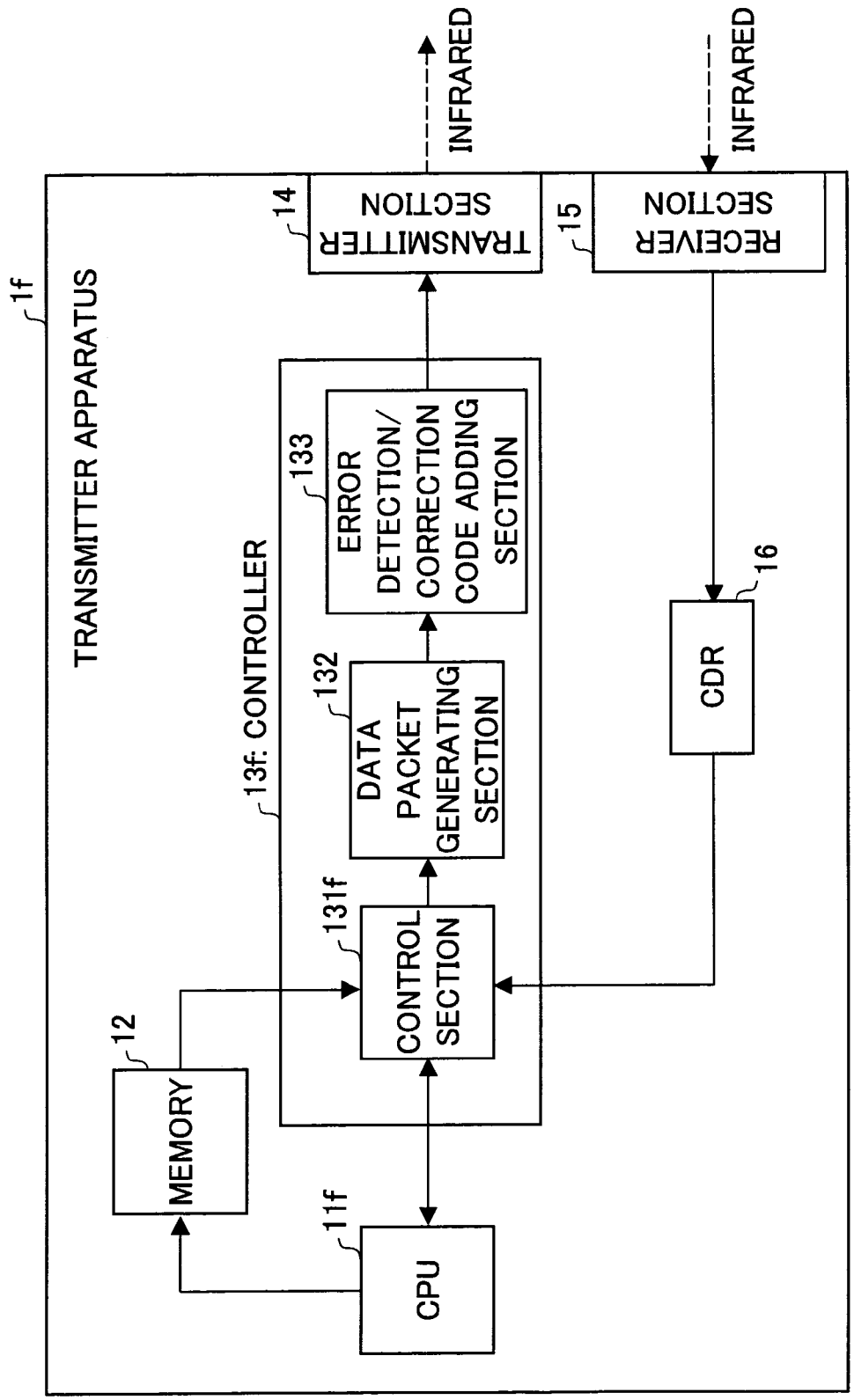
FIG. 19 is a block diagram illustrating a configuration of a transmitter apparatus of embodiment 7.

Next, a transmitter apparatus (transmitter) 1f of the present embodiment will be described in reference to the block diagram in FIG. 19. As shown in FIG. 19, the transmitter apparatus 1f differs from the transmitter apparatus 1 where the CPU 11 is replaced by a CPU 11f, and the controller 13 by a controller 13f. Another difference is that the apparatus 1f contains a receiver device 15 and a CDR 16. The receiver device 15 and the CDR 16 have been already described in embodiment 3.

The controller 13f differs from the controller 13 where the control section 131 is replaced by a control section 131f.

The control section 131f has the following functions as well as those of the control section 131: Upon receipt of the receipt process error notification packet from the CDR 16, the control section 131f sends the CPU 11f a receipt process error notification indicating an occurrence of a write process error in the receiver apparatus 2f. The control section 131f implements another transmission process on the data packet in accordance with an instruction from the CPU 11f.

The CPU 11f has the following functions as well as those of the CPU 11: Upon a receipt of the receipt process error notification from the control section 131f, the CPU 11f instructs the control section 131f to implement another transmission of the data packet with a reduced packet length.

Figure 21:
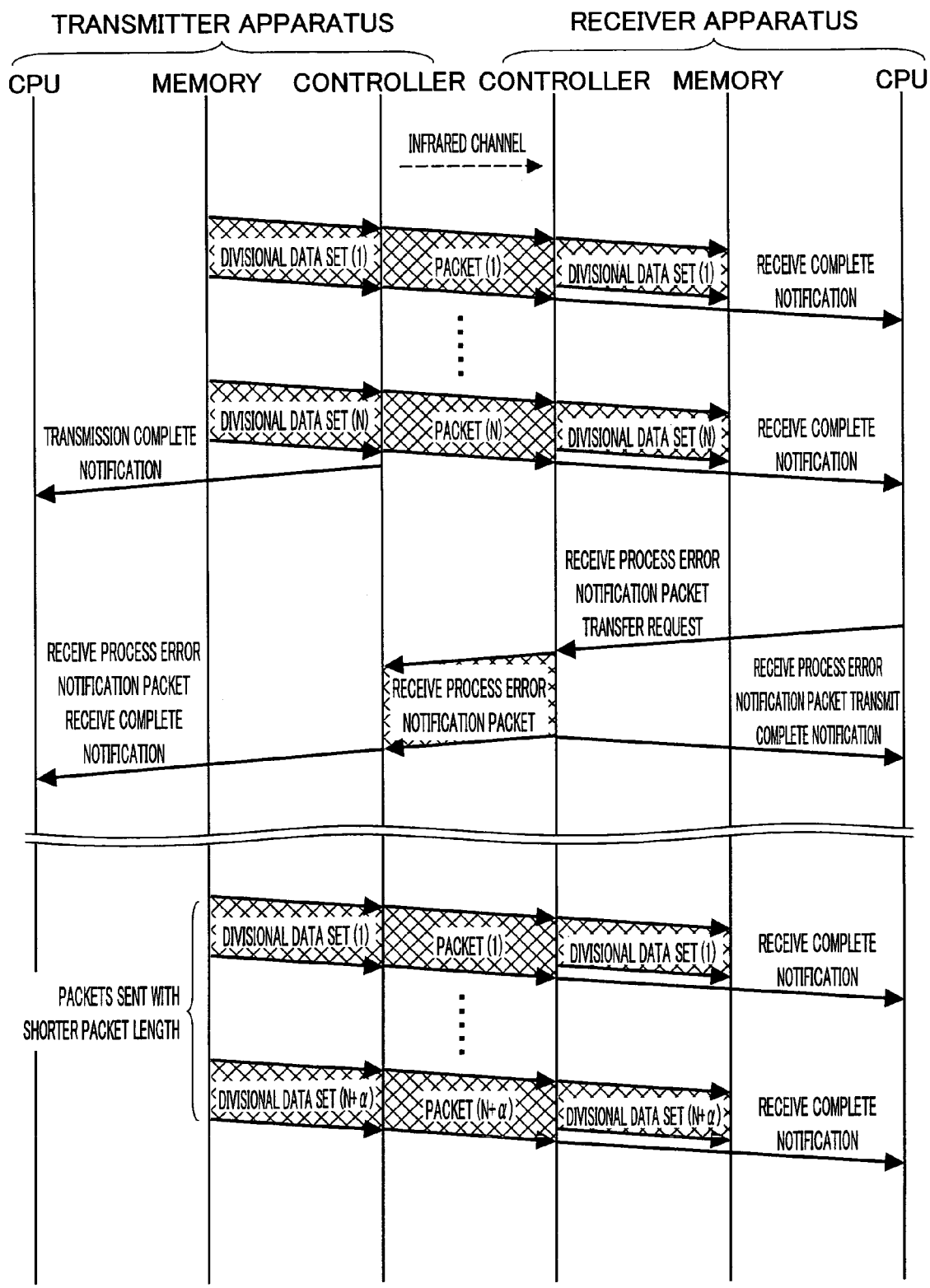
FIG. 21 is a drawing illustrating procedures in a data transfer process of embodiment 7.

Next, data transmission/reception procedures between the transmitter apparatus 1f and the receiver apparatus 2f of the present embodiment will be described in reference to FIG. 21.

First, in the transmitter apparatus 1f, the control section 131f causes the data packet generating section 132 to divide transfer data into multiple divisional data sets (here, N divisional data sets) with an initial packet length setting so as to generate data packets (1) to (N) according to the divisional data sets. The transmitter section 14 then transmits the data packets (1) to (N).

In the receiver apparatus 2f, the receiver section 25 receives the data packets (1) to (N) in this order. The control section 231f records the divisional data sets (1) to (N) into the memory 22 and sends the receive complete notification to the CPU 21f.

Here, the CPU 21f checks the states of the divisional data sets (1) to (N) recorded in the memory 22 to determine whether any of the divisional data sets has been erased by another divisional data set written over that set. Specifically, the CPU 21f checks whether all the divisional data sets are present. If any of the divisional data sets is missing, the CPU 21f determines that the write process for that divisional data set in the control section 231f has not been finished in time. After the write process for all the divisional data sets by the controller 23f ends, the CPU 21f sends the receipt process error notification packet transmit request to the controller 23f.

The control section 231f in the controller 23f sends the receipt process error notification packet generating section 240 a packet generate request for generation of a receipt process error notification packet in accordance with the request. The receipt process error notification packet generating section 240 then generates the receipt process error notification packet indicating an occurrence of a write process error for a divisional data set and transmits the generated receipt process error notification packet via the error detection/correction code adding section 236 and the transmitter section 26. In so doing, the control section 231f sends the CPU 21f a transmission complete notification for the receipt process error notification packet.

In the transmitter apparatus 1f, upon receiving the receipt process error notification packet from the receiver apparatus 2f, a receipt process error notification packet recovered by the CDR 16 is sent to the control section 131f. The control section 131f sends the CPU 11f a receipt process error notification indicating an occurrence of a write process error in the receiver apparatus 2f.

The CPU 11f then instructs the control section 131f to transmit the data packet again, but with a reduced packet length. Upon receiving the instruction, the control section 131f sends the transfer data retrieved from the memory 12 to the data packet generating section 132 to have the section 132 generate a data packet.

In so doing, the control section 131f has the section 132 divide the transfer data into multiple divisional data sets (here, N+a divisional data sets) with a packet length shorter than the initial setting (for example, 80% of the initial setting) so as to generate data packets (1) to (N+α) according to the divisional data sets. The transmitter section 14 then transmits the data packets (1) to (N+α).

The receiver apparatus 2f then receives the data packets (1) to (N+α) which have 80% the previous packet length. Given a shorter packet length than the previous one, the control section 231f takes less time to write the divisional data sets into the memory 22. Thus, a write process error where the divisional data set (n+1) is written over the preceding divisional data set (n) is less likely.

The foregoing description assumes that the CPU 11f, upon receipt of a receipt process error notification from the control section 131f, instructs the control section 131f to transmit the data packet again, but with a reduced packet length.

The CPU 11f may so instruct that the data packets are transmitted at an increased interval to prevent an error from occurring in a post-process on the data received by the receiver apparatus 2f.

Figure 22:
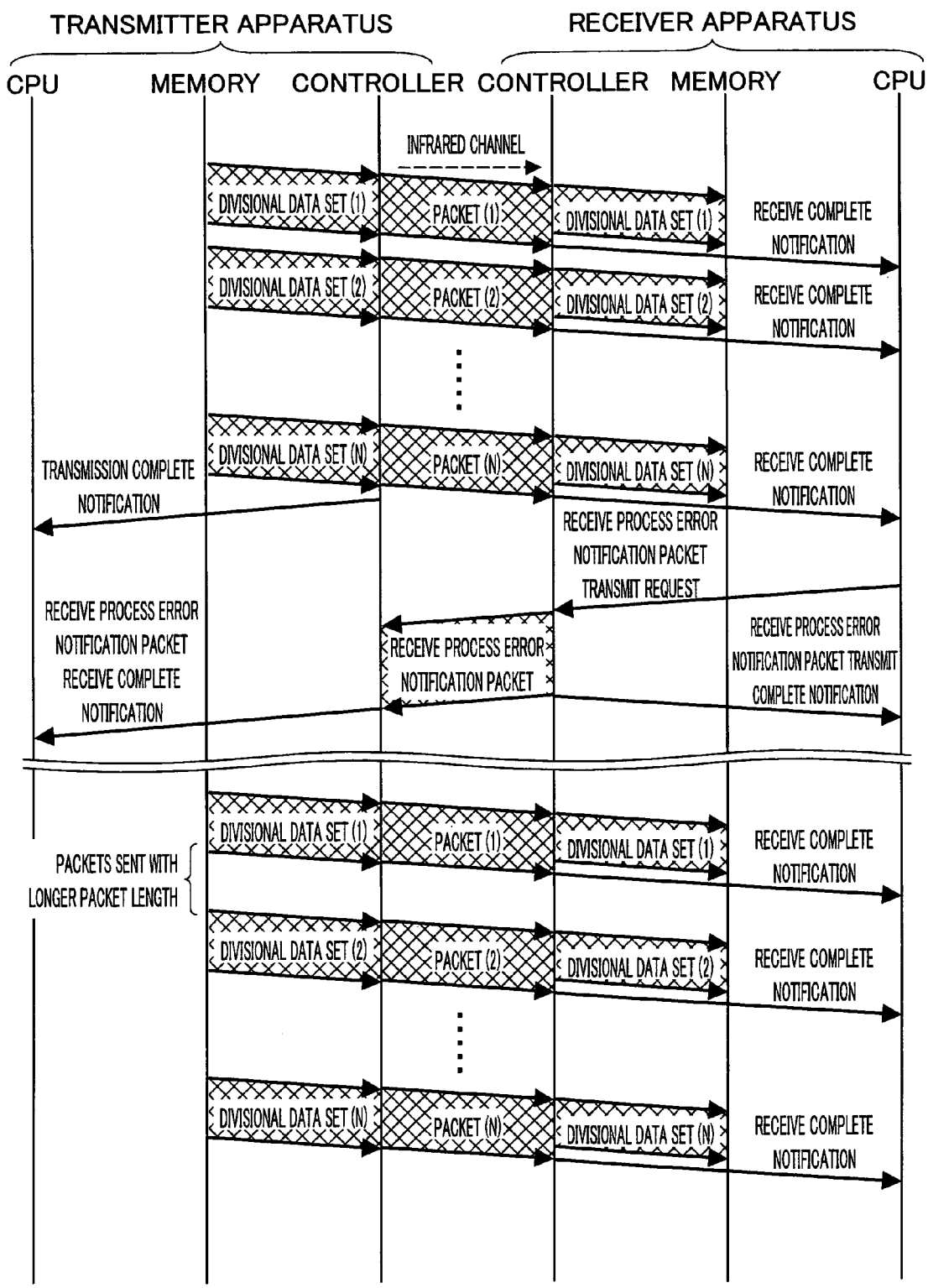
FIG. 22 is a drawing illustrating another example of procedures in a data transfer process of embodiment 7.

FIG. 22 is a drawing illustrating procedures in a data transfer process when the CPU 11f instructs to increase interval between data packets.

The CPU 11f instructs the control section 131f to transmit the data packet again, but at an increased interval (for example, at 1.2 times the previous interval). Upon receiving the instruction, the control section 131f, in sending the transfer data recorded in the memory 12 to the data packet generating section 132, controls the data packet generating section 132 so that the data packet generating section 132 outputs data packets at 1.2 times the initial interval setting. Thus, the transmitter section 14 comes to transmit the data packets (1) to (N) at 1.2 times the previous interval. As a result, the receiver apparatus 2f receives the data packets at an increased interval. In other words, the control section 231f has an extended time to receive the divisional data set (n+1) after receiving the preceding divisional data set (n). Thus, a write process error where the divisional data set (n+1) is written over the preceding divisional data set (n) is less likely.

In addition, the foregoing description assumes that the CPU 21f sends the receipt process error notification packet transmit request to the controller 23f after the controller 23f finishes the write process for all the divisional data sets. Therefore, the transmitter apparatus 1f receives the receipt process error notification packet after transmitting all the data packets. Therefore, the transmitter apparatus 1f does not need to simultaneously perform the transmission process for the data packets and the receipt process for a receipt process error notification packet. The circuit structure of the controller 23f in the transmitter apparatus 1f can be simplified.

However, the CPU 21f may send the receipt process error notification packet transmit request to the controller 23f before the controller 23f finishes the write process for all the divisional data sets. When this is the case, the controller 23f performs a receipt process for the data packets and a transmission process for a receipt process error notification packet. Meanwhile, the controller 13f in the transmitter apparatus 1f also performs a transmission process for the data packets and a receipt process for a receipt process error notification packet. Therefore, the controllers 13f, 23f need to handle an increased workload. The transmitter apparatus 1f however can more quickly know an occurrence of a write process error in the receiver apparatus 2f and quickly start a second data packet transmission process.

Embodiment 8

In the foregoing embodiments, in the receiver apparatus 2, when the error detection/correction circuit 233 detects an error in a divisional data set, the control section 231 discards the divisional data set and sends the CPU 21 a notification indicating the detection. When this is the case, the receiver apparatus 2 does not perform a normal post-process on received data. This often prompts the user to enter a data transfer instruction to the transmitter apparatus 1 again. However, the receiver apparatus 2 cannot determine whether the transfer data received next is the same as the transfer data last received. The apparatus 2 performs another receipt process on those divisional data sets which were completely received without errors in the previous process. As a result, there occurs a lot of waste with the receiver apparatus 2.

The present embodiment is adapted to solve these problems.

In reference to FIGS. 23 to 27, a transfer system of the present embodiment will be described. For convenience, members of the present embodiment that have the same function as members of the above embodiments, and that are mentioned in those embodiments are indicated by the same reference numerals and description thereof is omitted.

Figure 23:
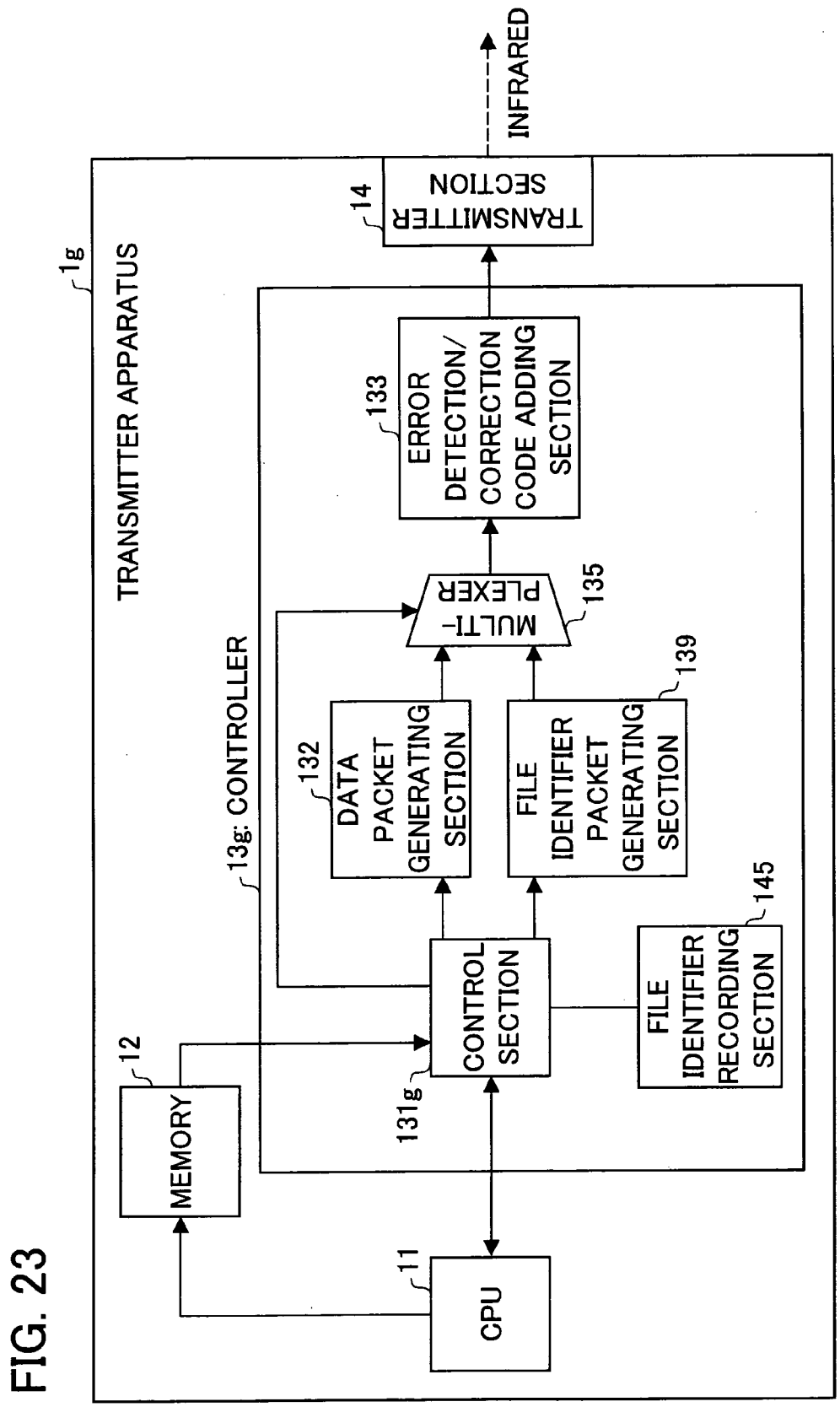
FIG. 23 is a block diagram illustrating a configuration of a transmitter apparatus of embodiment 8.

FIG. 23 is a block diagram illustrating a configuration of a transmitter apparatus (transmitter) 1g of the present embodiment. As shown in FIG. 23, the transmitter apparatus 1g differs from the transmitter apparatus 1 where the controller 13 is replaced by a controller 13g.

The controller 13g contains a control section 131g, a data packet generating section 132, an error detection/correction code adding section 133, a multiplexer 135, a file identifier packet generating section (data identifier information generating section) 139, and a file identifier recording section 145. The input terminal of the multiplexer 135 of the present embodiment is connected to the data packet generating section 132 and the file identifier packet generating section 139, and the output terminal is connected to the error detection/correction code adding section 133.

The file identifier recording section 145 records relationship between transfer data for which the CPU 11 has sent a transfer request and a file identifier (data identifier) identifying the transfer data.

The control section 131g has the file identifier packet generating section 139 to generate a file identifier packet in accordance with a data transfer request from the CPU 11. Subsequently, the section 131g has the data packet generating section 132 generate a data packet.

Upon receiving the transfer request, the control section 131g first compares the transfer data recorded in the memory 12 with the transfer data recorded in the file identifier recording section 145.

If the two sets of transfer data are identical, the control section 131g retrieves a file identifier corresponding to the transfer data from the file identifier recording section 145, outputs the retrieved file identifier to the file identifier packet generating section 139, and has a file identifier packet generated.

On the other hand, if the two sets of transfer data are different, the control section 131g generates a unique file identifier identifying the transfer data recorded in the memory 12 and records the transfer data and the generated file identifier in an associated manner into the file identifier recording section 145. The control section 131g outputs the generated file identifier to the file identifier packet generating section 139 to have a file identifier packet generated.

The control section 131g, on outputting the file identifier to the file identifier packet generating section 139, controls the multiplexer 135 so that the multiplexer 135 outputs a signal from the file identifier packet generating section 139.

In addition, upon detecting a transmission of the file identifier packet generated by the file identifier packet generating section 139 from the transmitter section 14, the control section 131g retrieves transfer data from the memory 12 and sends the retrieved data to the data packet generating section 132. In so doing, the control section 131g controls the multiplexer 135 so that the multiplexer 135 outputs the packet generated by the data packet generating section 132.

The file identifier packet generating section 139, upon receiving a file identifier from the control section 131g, generates a file identifier packet containing the received file identifier as information. The file identifier packet generating section 139 sends the generated file identifier packet to the error detection/correction code adding section 133 via the multiplexer 135. The error detection/correction code adding section 133 adds an error detection code (or correction code) to the file identifier packet. The file identifier packet and with the added code is transmitted from the transmitter section 14.

Figure 24:
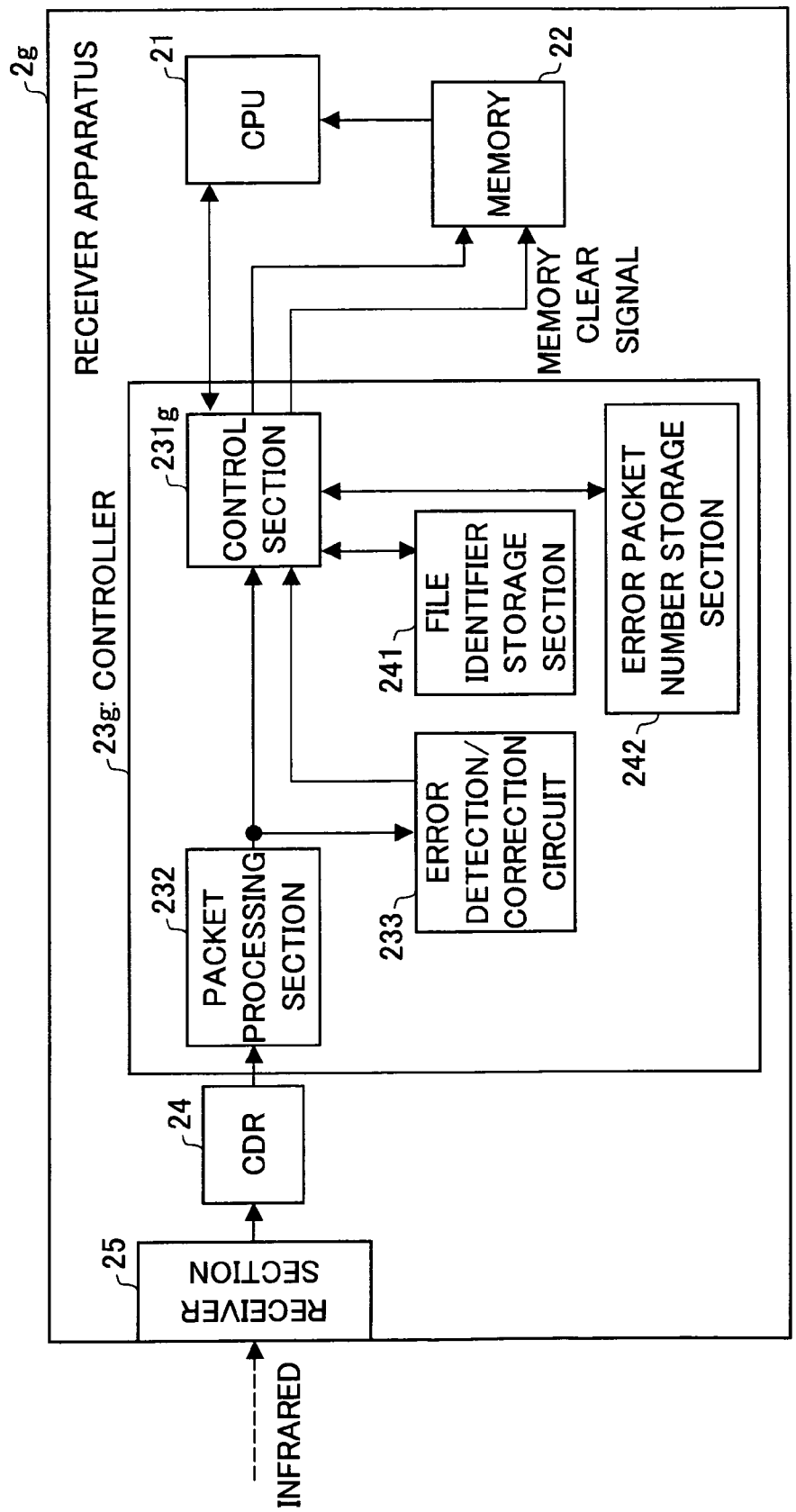
FIG. 24 is a block diagram illustrating a configuration of a receiver apparatus of embodiment 8.

Next, a receiver apparatus (receiver) 2g of the present embodiment will be described in reference to the a block diagram in FIG. 24. As shown in FIG. 24, the receiver apparatus 2g differs from the receiver apparatus 2 where the controller 23 is replaced by a controller 23g.

The controller 23g contains a control section 231g, a packet processing section 232, an error detection/correction circuit 233, a file identifier storage section (data identifier storage section) 241, and an error packet number storage section (error divisional data set identity information storage section) 242.

The file identifier storage section 241 stores the file identifier transmitted from the transmitter apparatus 1g. The stored file identifier is updated by the control section 231g.

The error packet number storage section 242 stores the number of the data packet (error packet number) transmitted from the transmitter apparatus 1g and containing a divisional data set in which an error has been detected by the error detection/correction circuit 233. The stored error packet number is updated by the control section 231g.

The control section 231g controls the recording into the memory 22 of the divisional data set sent from the packet processing section 232. The control section 231g receives the file identifier and the divisional data set in this order from the packet processing section 232. Upon receiving the file identifier, the control section 232 compares the file identifier stored in the file identifier storage section 241 with the received file identifier. If the file identifier stored in the file identifier storage section 241 is different from the received file identifier, the control section 232 updates the content of the file identifier storage section 241 to the received file identifier and clears the error packet number storage section 242 and the memory 22. On the other hand, if the file identifier stored in the file identifier storage section 241 is identical to the received file identifier, the control section 231g retrieves the error packet number stored in the error packet number storage section 242.

Next, the control by the control section 231g upon receipt of a divisional data set will be described. If no number has been retrieved from the error packet number storage section 242 (in other words, after receiving a different file identifier from the file identifier stored in the file identifier storage section 241), the control section 231g stores into the memory 22 regarding all the divisional data sets. However, regarding the divisional data set containing an error detected by the error detection/correction circuit 233, the control section 231g discards the divisional data set and stores the smallest one of the numbers of the divisional data sets (i.e. the packet number of the divisional data set containing a first detected error) into the error packet number storage section 242 as an error packet number.

On the other hand, if a number has been retrieved from the error packet number storage section 242 (in other words, after receiving an identical file identifier to the file identifier stored in the file identifier storage section 241), the control section 231g records the divisional data set corresponding to the retrieved error packet number and the succeeding divisional data sets into the memory 22. Regarding the divisional data set containing an error detected by the error detection/correction circuit 233, the control section 231g discards the divisional data set in the memory 22 and stores the smallest one of the numbers of the divisional data sets (i.e. the packet number of the divisional data set containing a first detected error) into the error packet number storage section 242 as an error packet number.

Next, procedures in a data transfer process between the transmitter apparatus 1g and the receiver apparatus 2g of the present embodiment will be described in reference to FIGS. 26 and 27.

Figure 26:
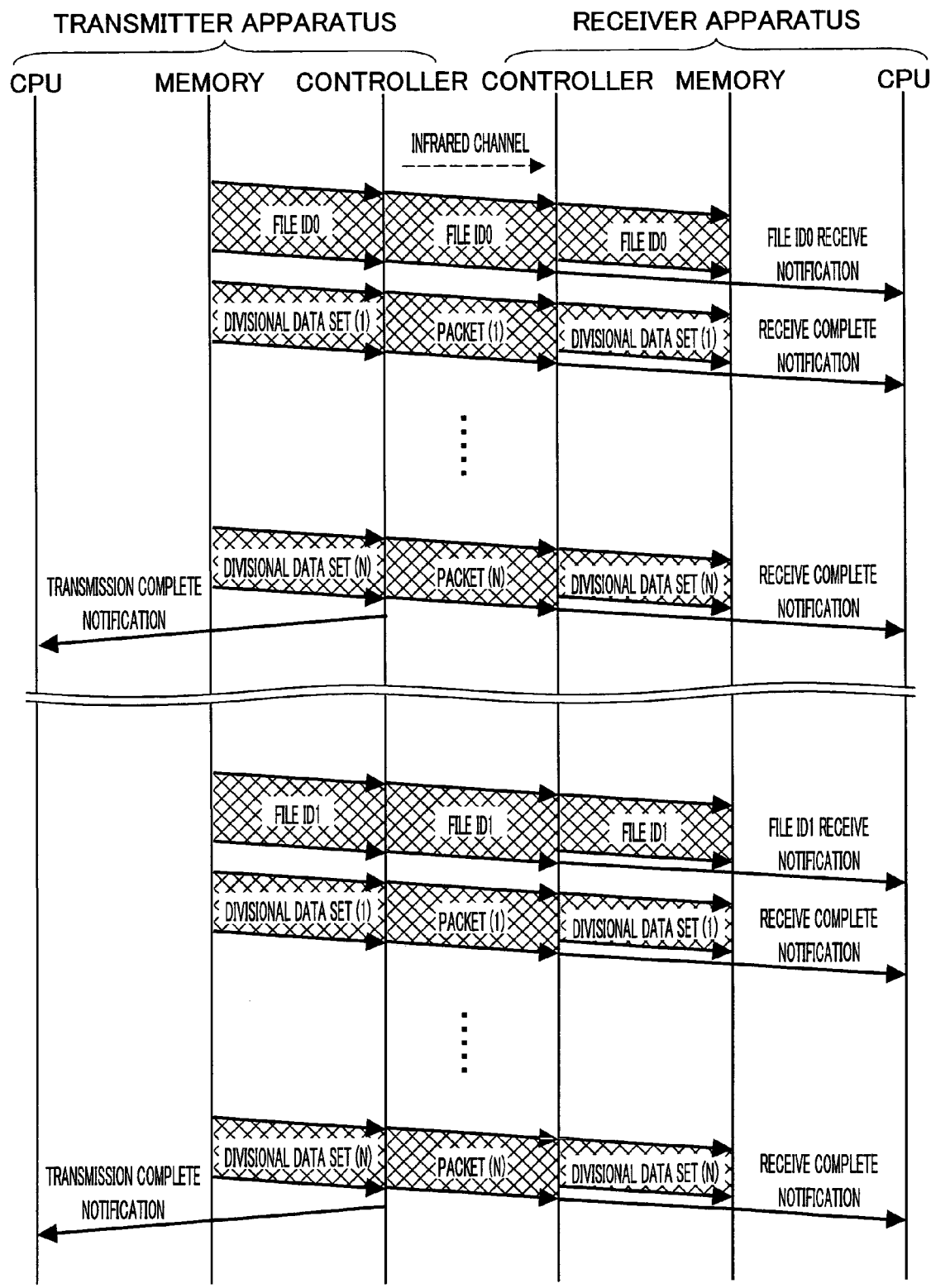
FIG. 26 is a drawing illustrating procedures in a data transfer process when different transfer data is successively transmitted.

FIG. 26 shows different transfer data having been successively transmitted.

Assume that transfer data A with a file identifier "file ID0" has been transmitted/received between the transmitter apparatus 1g and the receiver apparatus 2g as shown in FIG. 26. In so doing, in the transmitter apparatus 1g, the file identifier recording section 145 stores the "file ID0" and the transmitted/received transfer data A in an associated manner. In addition, in the receiver apparatus 2g, the file identifier storage section 241 stores the "file ID0." In addition, the memory 22 stores those divisional data sets which make up the transfer data A.

Thereafter, in the transmitter apparatus 1g, the CPU 11 sends the controller 13g a transfer request for transfer data B which is different from the transfer data A transmitted in the previous transmission. The CPU 11 stores the requested transfer data B into the memory 12.

Upon receiving the transfer request from the CPU 11, the control section 131g compares the transfer data B stored in the memory 12 with the transfer data A stored in the file identifier recording section 145 and knows that the data B differs from the data A. The control section 131g then generates an identifier (here, "file ID1") identifying the transfer data B for which a new transfer request was made. The section 131g updates the content of the file identifier recording section 145 based on the information associating the generated "file ID1" with the transfer data B.

Thereafter, the control section 131g outputs the file identifier "file ID 1" stored in the file identifier recording section 145 to the file identifier packet generating section 139. The file identifier packet generating section 139 receives the file identifier "file ID1" and generates a packet (file identifier packet) containing the "file ID1" as information to output the generated file identifier packet to the next stage, i.e. the multiplexer 135. The error detection/correction code adding section 133 then adds an error detection code (or correction code) to the file identifier packet. The transmitter section 14 transmits the packet with the added code to the receiver apparatus 2g.

Upon detecting a transmission of the file identifier packet from the transmitter section 14, the control section 131g retrieves the transfer data B from the memory 12 and outputs the retrieved transfer data B to the data packet generating section 132. The data packet generating section 132 divides the received transfer data B into a predetermined amount of data and generates multiple data packets (1) to (N) (for example, N data packets (1) to (N)) containing the respective divisional data sets as information. The generated data packets (1) to (N) are sent to the error detection/correction code adding section 133 via the multiplexer 135. The error detection/correction code adding section 133 adds an error detection code (or correction code) to each data packet (1) to (N). The transmitter section 14 then sequentially transmits the data packets (1) to (N) with the added error detection code (or correction code) at a predetermined interval.

Meanwhile, the receiver apparatus 2g sequentially receives the file identifier packet containing the file identifier "file ID1" and the data packets (1) to (N) which make up the transfer data B.

Upon receiving the file identifier packet containing the "file ID1," the packet processing section 232 outputs the file identifier "file ID1" to the control section 231g. Upon being informed by the error detection/correction circuit 233 that the file identifier "file ID1" is error free, the control section 231g updates the content of the file identifier storage section 241 to the file identifier "file ID1" and clears the error packet number storage section 242 and the memory 22. The file identifier storage section 241 stores the "file ID1" instead of the "file ID0." In so doing, the control section 231g sends the CPU 21 a notification indicating a receipt of the file identifier (file identifier receipt notification).

Then, the packet processing section 232 sequentially receives the data packets (1) to (N) which follow the file identifier packet, and extracts the divisional data sets (1) to (N) and the error detection codes from the data packets (1) to (N). The packet processing section 232 outputs the extracted divisional data sets (1) to (N) and error detection codes to the control section 231g and the error detection/correction circuit 233.

The control section 231g stores into the memory 22 regarding all the divisional data sets (1) to (N). However, regarding the divisional data set containing an error detected by the error detection/correction circuit 233, the control section 231g discards the divisional data set in the memory 22 and stores the smallest one of the numbers of the divisional data sets containing a detected error in the error packet number storage section 242 as an error packet number. The control section 231g ends the process.

Next, procedures of the transmitter apparatus 1g and the receiver apparatus 2g when two identical sets of transfer data are successively transmitted will be described in reference to FIG. 27.

Figure 27:
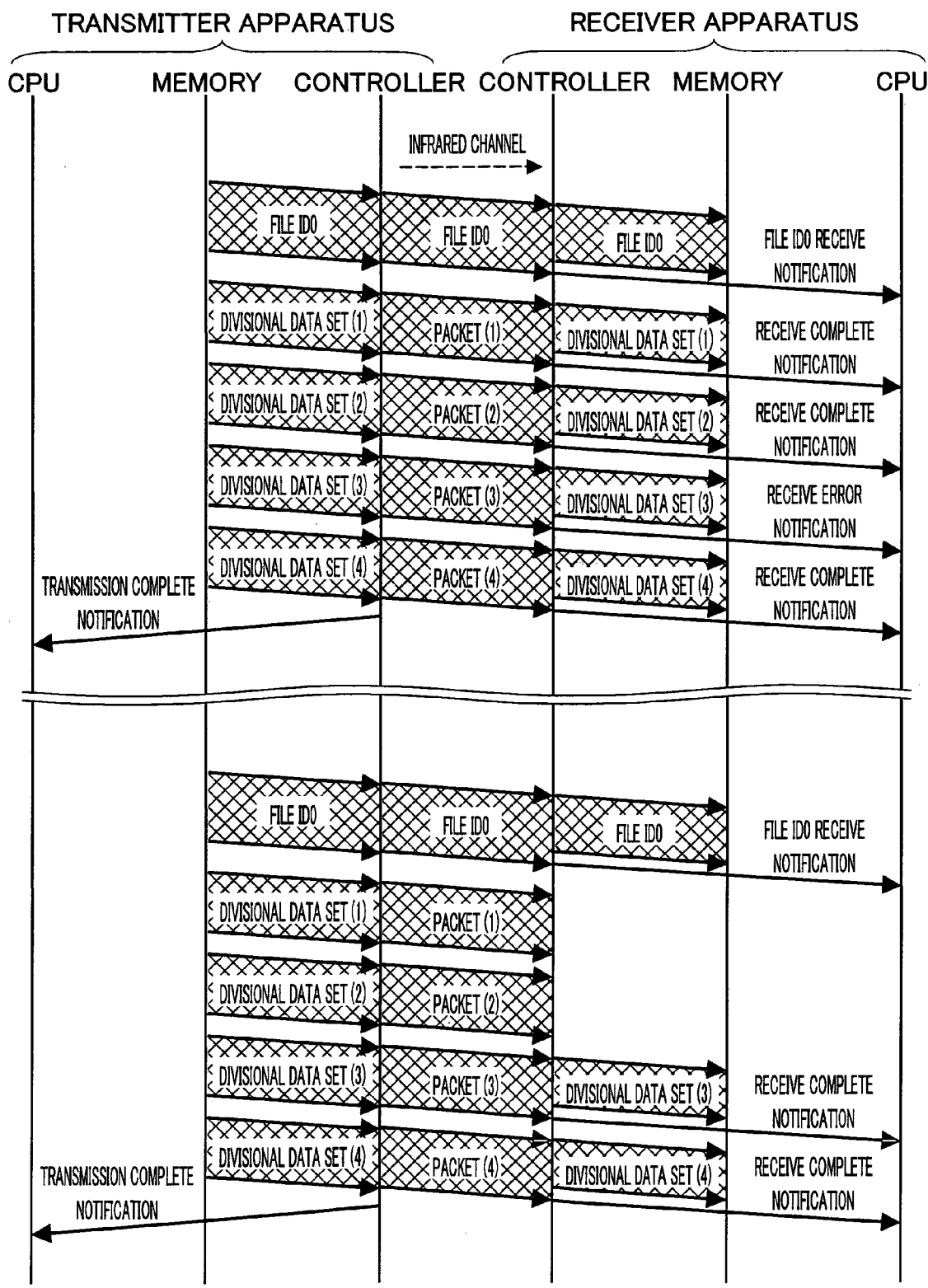
FIG. 27 is a drawing illustrating procedures in a data transfer process when identical sets of transfer data are successively transmitted.

As shown in FIG. 27, assume that the transfer data A (composed of divisional data sets (1) to (4)) with the file identifier "file ID0" is transmitted/received between the transmitter apparatus 1g and the receiver apparatus 2g and also that the error detection/correction circuit 233 in the receiver apparatus 2g has detected an error in the divisional data set (3). In this case, in the transmitter apparatus 1g, the file identifier recording section 145 stores the file ID0 and the transfer data A in an associated manner. In addition, in the receiver apparatus 2g, the file identifier storage section 241 stores the file ID0, and the error packet number storage section 242 stores (3) as an error packet number. The memory 22 stores the transfer data A except for the divisional data set (3).

Thereafter, in the transmitter apparatus 1g, the CPU 11 in response to an instruction from the user sends the controller 13g a transfer request for another transfer of the same data as the transfer data A transmitted in the previous transmission. In so doing, the CPU 11 stores the requested transfer data A into the memory 12.

Upon receiving the transfer request from the CPU 11, the control section 131g compares the transfer data A stored in the memory 12 with the transfer data A stored in the file identifier recording section 145 and knows that the data A is identical to the data B. The control section 131g then outputs the file identifier "file ID0" stored in the file identifier recording section 145 to the file identifier packet generating section 139. Upon receiving the file identifier "file ID0," the file identifier packet generating section 139 generates a packet (file identifier packet) containing the "file ID0" as information and outputs the generated file identifier packet to the next stage, i.e. the multiplexer 135. The error detection/correction code adding section 133 adds an error detection code (or correction code) to the file identifier packet. The transmitter section 14 transmits the packet with the added code to the receiver apparatus 2g.

Upon detecting a transmission of the file identifier packet from the transmitter section 14, the control section 131g retrieves the transfer data A from the memory 12 and outputs the retrieved transfer data A to the data packet generating section 132. The data packet generating section 132 divides the received transfer data A into a predetermined amount of data and generates multiple (for example, four) data packets (1) to (4) containing the divisional data sets as information. The generate data packets (1) to (4) are sequentially transmitted at a predetermined interval as they were in the previous transmission.

Meanwhile, the receiver apparatus 2g again sequentially receives the file identifier packet containing the file identifier "file ID0" and the data packets (1) to (N) which make up the transfer data A.

Upon receiving the file identifier packet containing the "file ID0," the packet processing section 232 outputs the file identifier "file ID0" to the control section 231g. Upon being informed by the error detection/correction circuit 233 that the file identifier "file ID0" is error free, the control section 231g compares the received file identifier with the file identifier stored in the file identifier storage section 241 and knows that the file identifiers are identical to each other. The control section 231g then retrieves an error packet number (here, (3)) from the error packet number storage section 242. In so doing, the control section 231g sends the CPU 21 a notification (file identifier receipt notification) indicating a receipt of the file identifier.

The packet processing section 232 then sequentially receives the data packets (1) to (4) after the file identifier packet and extracts the divisional data sets (1) to (4) and the error detection codes from the data packets (1) to (4). The packet processing section 232 outputs the extracted divisional data sets (1) to (4) and error detection codes to the control section 231g and the error detection/correction circuit 233.

The control section 231g retrieves the error packet number (3) from the error packet number storage section 242. Therefore, the section 231g stores in the memory 22 the divisional data set (3) and the succeeding divisional data sets (here, divisional data sets (3), (4)). The control section 231g ends the process.

FIG. 25 is a drawing illustrating a relationship between the data packet received by the receiver apparatus 2g and the divisional data set stored in the memory 22.

When identical sets of transfer data are successively transmitted as shown in FIG. 25(a), since the file identifiers are identical, the receiver apparatus 2g can recognize that the sets of transfer data are identical. Therefore, the divisional data set in which an error was detected in a first transmission and the succeeding divisional data sets (here, (4) and larger) are stored in the memory 22 in the second transmission. As a result, there is no need to replace the divisional data sets stored in the memory 22 in the first transmission (here, (1) to (3)) with new ones. An error, if any, detected in the divisional data set (2) in the second transmission presents no problems.

In contrast, when different sets of transfer data are successively transmitted as shown in FIG. 25(b), since the file identifiers are different, the receiver apparatus 2g can recognize that the sets of transfer data are different. Therefore, the divisional data sets which make up new, other transfer data can be stored in the memory 22 by erasing the divisional data sets previously stored in the memory 22.

The foregoing description assumes that the error packet number storage section 242 stores the packet number of the divisional data set in which a first error was detected. Thus, the error packet number storage section 242 only needs to store one packet number and requires only a small capacity. Further, the information contained in the error packet number notification packet is no larger than a single number. The packet length is short, and it takes less time to transmit/receive the packet.

However, the control section 231g may have the error packet number storage section 242 store the packet numbers of all the divisional data sets in which an error was detected. When this is the case, the error packet number notification packet contains all the error-detected packet numbers as information. Therefore, the transmitter apparatus 1g only needs to transmit the data packets corresponding to the error packet numbers. It takes less time to transmit/receive the packets for the second time.

Embodiment 9

The present embodiment differs from embodiment 8 where the present embodiment is suited to reduce the time it takes to transmit/receive the packets for the second time when identical sets of transfer data are successively transmitted.

Figure 28:
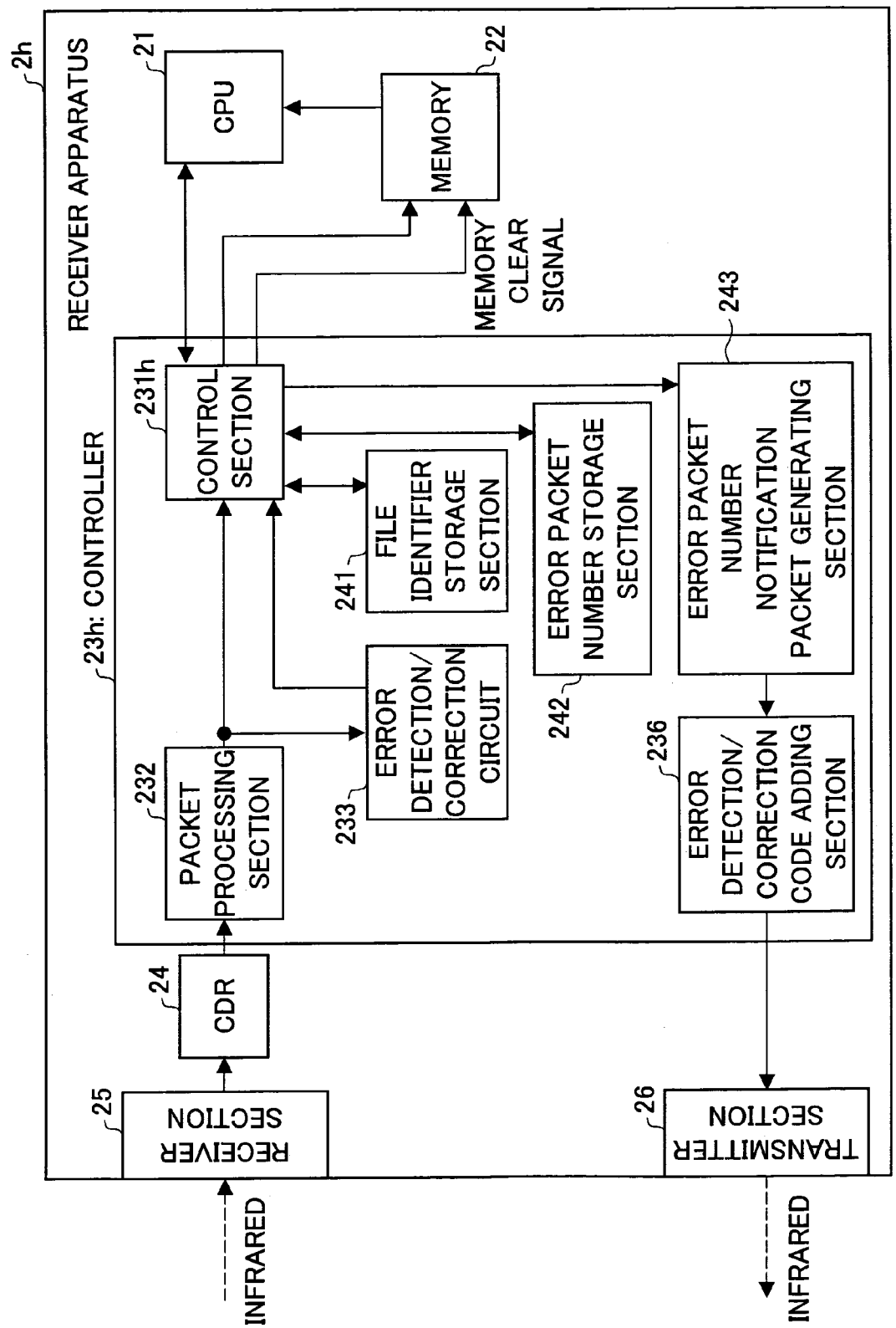
FIG. 28 is a block diagram illustrating a configuration of a transmitter apparatus of embodiment 9.

In reference to FIG. 28 to FIG. 30, a transfer system of the present embodiment will be described. For convenience, members of the present embodiment that have the same function as members of the above embodiments, and that are mentioned in those embodiments are indicated by the same reference numerals and description thereof is omitted.

In reference to the block diagram in FIG. 28, a receiver apparatus (receiver) 2h of the present embodiment will be described. As shown in FIG. 28, the receiver apparatus 2h differs from the receiver apparatus 2g where the controller 23g is replaced by a controller 23h. Another difference is that the apparatus 2h contains a transmitter section 26. The controller 23h contains a control section 231h, an error packet number notification packet generating section 243, and an error detection/correction code adding section 236.

The control section 231h has the following functions as well as those of the control section 231g: In storing an error packet number into the error packet number storage section 242, the section 231h outputs the stored error packet number to the error packet number notification packet generating section 243.

Upon receiving an error packet number from the control section 231h, the error packet number notification packet generating section 243 generates the packet containing the error packet number as information, that is, an error packet number notification packet indicating a number corresponding to the packet in which an error occurred. The error packet number notification packet generating section 243 outputs the generated error packet number notification packet to the error detection/correction code adding section 236.

The transmitter section 26 and the error detection/correction code adding section 236 have been already described in embodiment 3.

Figure 29:
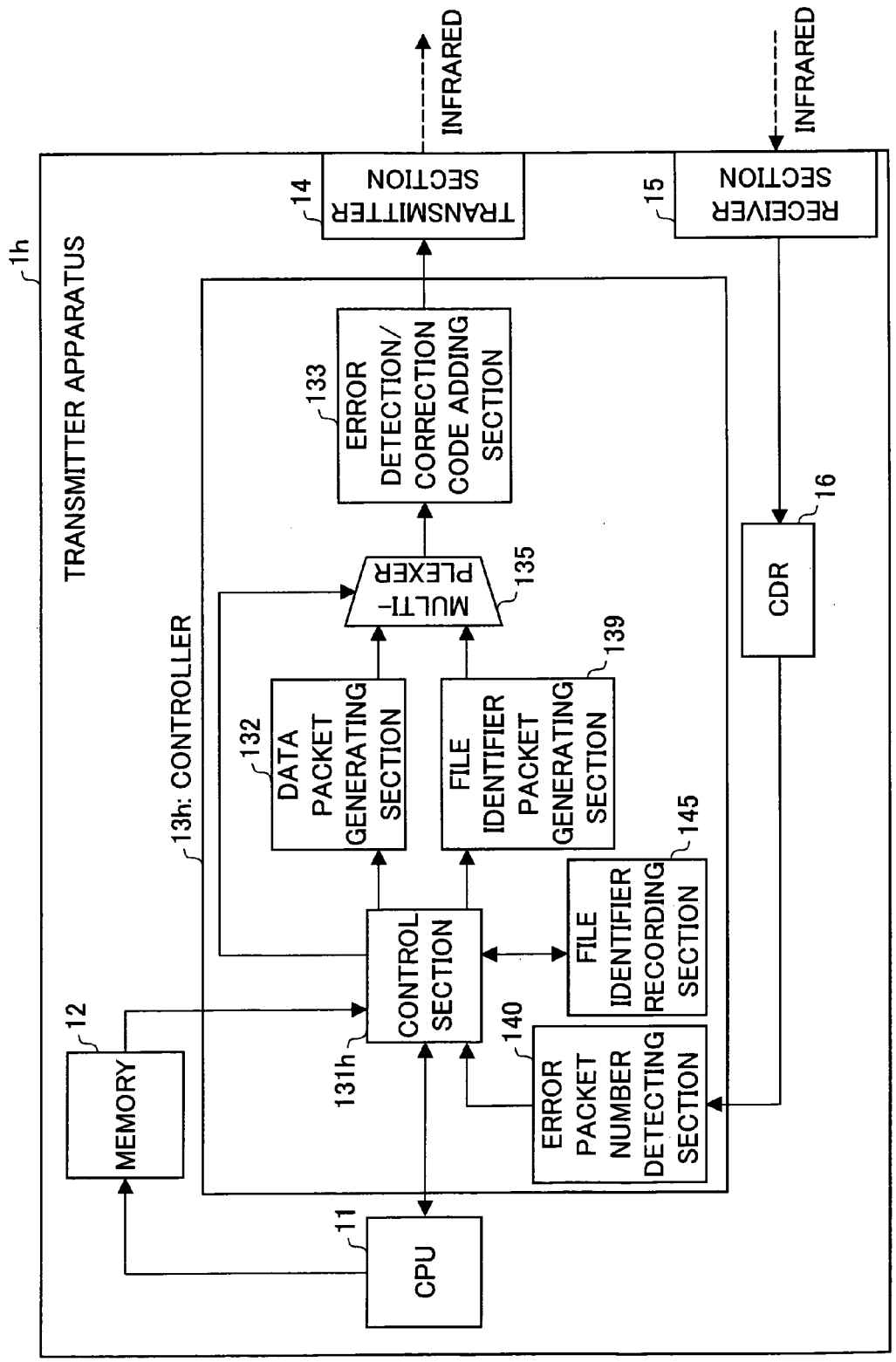
FIG. 29 is a block diagram illustrating a configuration of a receiver apparatus of embodiment 9.

FIG. 29 is a block diagram illustrating a configuration of a transmitter apparatus 1h of the present embodiment. As shown in FIG. 29, the transmitter apparatus 1h differs from the transmitter apparatus 1g where the controller 13g is replaced by a controller 13h. Another difference is that the apparatus 1h contains a receiver section 15 and a CDR 16.

The controller 13h contains a control section 131h, a data packet generating section 132, an error detection/correction code adding section 133, a multiplexer 135, a file identifier packet generating section 139, a file identifier recording section 145, and an error packet number detecting section 140.

The error packet number detecting section 140 detects the error packet number according to the error packet number notification packet sent from the CDR 16 and outputs the detected error packet number to the control section 131h.

The control section 131h has the following functions as well as those of the control section 131g: When receiving from the CPU 11 a transfer request for the same transfer data as the transfer data stored in the file identifier recording section 145 and also receiving an error packet number from the error packet number detecting section 140, the control section 131h, in sending the transfer data retrieved from the memory 12 to the data packet generating section 132, controls the data packet generating section 132 so that the section 132 outputs only those data packets which contain the divisional data set of the error packet number and succeeding divisional data sets to a next stage.

Next, data transmission/reception procedures between the transmitter apparatus 1h and the receiver apparatus 2h of the present embodiment will be described in reference to FIG. 30.

Figure 30:
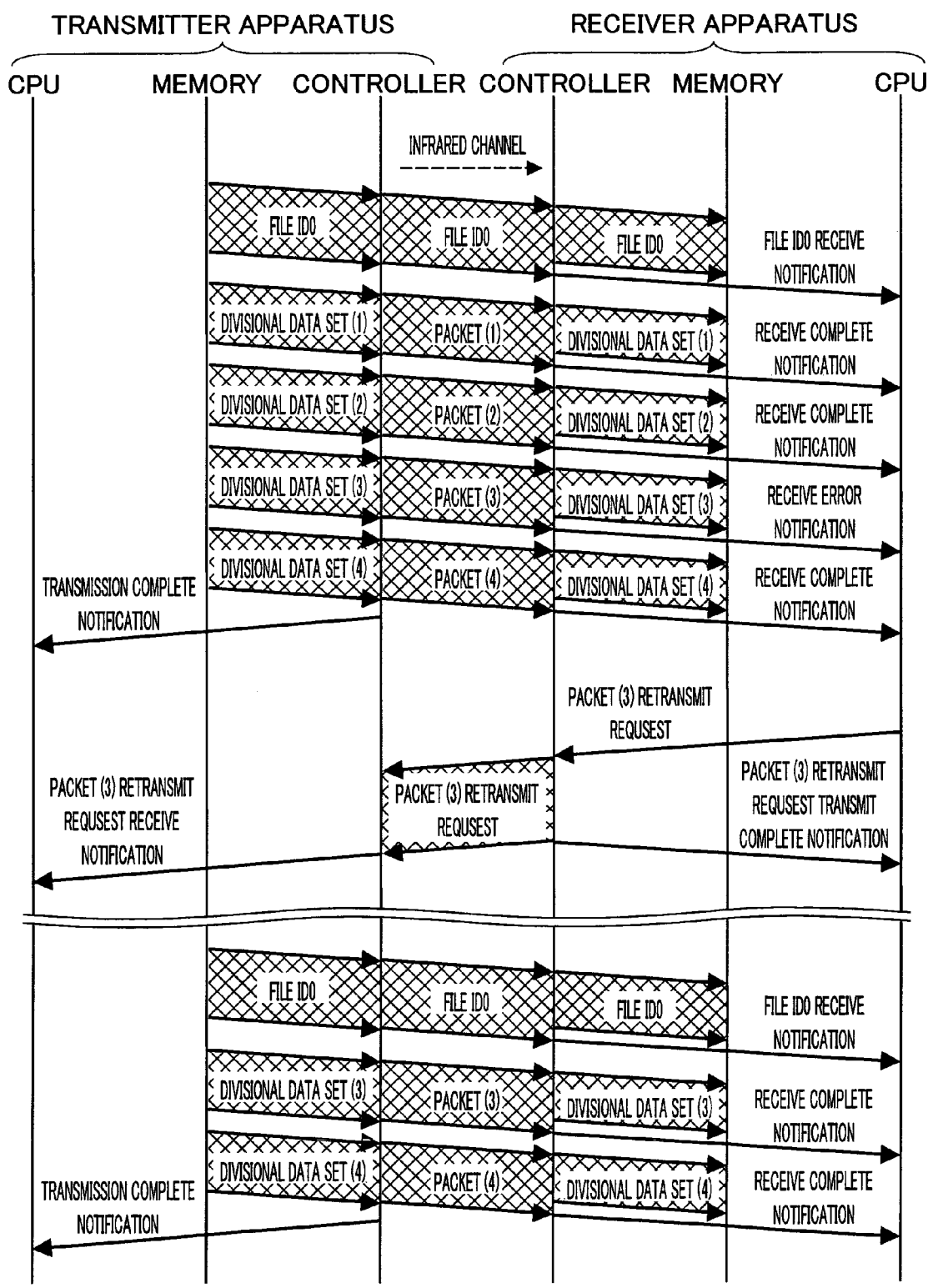
FIG. 30 is a drawing illustrating procedures in a data transfer process of embodiment 9.

As shown in FIG. 30, assume that transfer data A of a file identifier "file ID0" was transmitted/received twice between the transmitter apparatus 1h and the receiver apparatus 2h.

When the first transmission/receipt is completed, in the transmitter apparatus 1h, the "file ID0" and the transfer data A are already stored in the file identifier recording section 145 in an associated manner. In the receiver apparatus 2h, the "file ID0" is already stored in the file identifier storage section 241. In addition, the transfer data A is already stored in the memory 22.

Assume also that in the first transmission/receipt, the error detection/correction circuit 233 in the receiver apparatus 2h detected an error in the divisional data set (3). When this is the case, the control section 231h updates the error packet number (3) in the error packet number storage section 242 and outputs the error packet number (3) to the error packet number notification packet generating section 243. The error packet number notification packet generating section 243 generates an error packet number notification packet containing the received error packet number (3) as information and transmits the generated error packet number notification packet via the error detection/correction code adding section 236 and the transmitter section 26.

In the transmitter apparatus 1h, upon receiving the error packet number notification packet, the error packet number detecting section 140 detects the error packet number (3) and outputs the number to the control section 131h.

Next, upon receiving an instruction from the user, the CPU 11 sends the controller 13h a transfer request for the same transfer data A as that in the first transmission and stores the transfer data A into the memory 12.

Upon receiving the transfer request, the control section 131h compares the content of the memory 12 with the content of the file identifier recording section 145 and knows that the memory 12 and the section 145 both contains the same transfer data A. The control section 131h outputs the file identifier "file ID0" corresponding to the transfer data A to the file identifier packet generating section 139. The file identifier packet generating section 139 generates a file identifier packet containing the "file ID0" and transmits the generated file identifier packet via the error detection/correction code adding section 133 and the transmitter section 14.

Thereafter, the control section 131h outputs the transfer data A retrieved from the memory 12 to the data packet generating section 132. The control section 131h controls the data packet generating section 132 so that the section 132 generates data packets containing the divisional data set of a number detected by the error packet number detecting section 140 (here, (3)) and succeeding divisional data sets. Thus, the data packet generating section 132 generates the data packet (3) and succeeding data packets and transmits the generated data packets (3) and those of succeeding numbers via the error detection/correction code adding section 133 and the transmitter section 14.

The receiver apparatus 2h sequentially receives the file identifier packet containing a file identifier "file ID0" and the data packets (3) and those of succeeding numbers which are part of the transfer data A.

Upon receiving the file identifier packet containing the "file ID0," the packet processing section 232 outputs the file identifier "file ID0" to the control section 231h. Upon being informed by the error detection/correction circuit 233 that the file identifier "file ID0" is error free, the control section 231h compares the received file identifier with the file identifier stored in the file identifier storage section 241 and knows that the file identifies are identical to each other. The control section 231h then retrieves the error packet number (3) from the error packet number storage section 242. In so doing, the control section 231h sends the CPU 21 a notification (file identifier receipt notification) indicating a receipt of the file identifier.

The packet processing section 232 then sequentially receives the file identifier packet followed by the data packets (3) and those of succeeding numbers and extracts the divisional data sets (3) and those of succeeding numbers and error detection codes from the data packets (3) and those of succeeding numbers. The packet processing section 232 outputs the extracted divisional data sets (3) and those of succeeding numbers and error detection codes to the control section 231h and the error detection/correction circuit 233.

The control section 231h retrieves the error packet number (3) from the error packet number storage section 242. Therefore, the section 231h stores into the memory 22 the divisional data set of the number (3) and succeeding divisional data sets (here, the divisional data sets (3), (4)). The control section 231h then ends the process.

As described in the foregoing, the transmitter section 26 in the receiver apparatus 2h of the present embodiment transmits the error packet number (error divisional data set identity information) stored in the error packet number storage section 242 to the transmitter apparatus 1h. Therefore, the transmitter apparatus 1h can recognize a divisional data set in which an error has been detected by the receiver apparatus 2h. The transmitter section 14 can transmit only the error-detected divisional data set and succeeding divisional data sets.

The error packet number storage section 242 may store not only the packet number corresponding to the divisional data set in which an error has been first detected, but the packet numbers corresponding to all the divisional data sets in which an error has been detected. When this is the case, the transmitter section 14 transmits all the divisional data sets in which an error has been detected by the receiver apparatus 2h. Thus, the transmitter section 14 transmits fewer divisional data sets in the second transmission. The transmission time becomes shorter.

Embodiment 10

In embodiment 2, the transmitter apparatus 1a transmits a tone signal and receives a response tone signal to the tone signal, so as to determine the presence of the receiver apparatus 2a. Embodiments 3 to 5 are similar: the transmitter apparatus determines the presence of the receiver apparatus according to a receiver apparatus detection packet, a maximum transfer rate request packet, or a file information packet and response packets to these packets.

However, in embodiments 2 to 5, the transmitter apparatus cannot transmit a data packet unless the receiver apparatus has a function to transmit a tone signal, a receiver apparatus detection response packet, a maximum transfer rate notification packet, or a file information receipt success packet. For example, the transmitter apparatus 1a cannot transmit a data packet to a receiver apparatus 2 which has no function to transmit a tone signal.

The present embodiment address these problems. The embodiment is adapted so that the transmitter apparatus is able to transmit a data packet even when the receiver apparatus has no function to transmit a tone signal, a receiver apparatus detection response packet, a maximum transfer rate notification packet, or a file information receipt success packet.

In reference to FIGS. 31 to 34, a transfer system of the present embodiment will be described. For convenience, members of the present embodiment that have the same function as members of the above embodiments, and that are mentioned in those embodiments are indicated by the same reference numerals and description thereof is omitted.

FIGS. 31 to 34 are block diagrams illustrating respectively configurations of transmitter apparatuses 1$i$, 1$j$, 1$k$, 1$m$ which are examples of the present embodiment.

Figure 31:
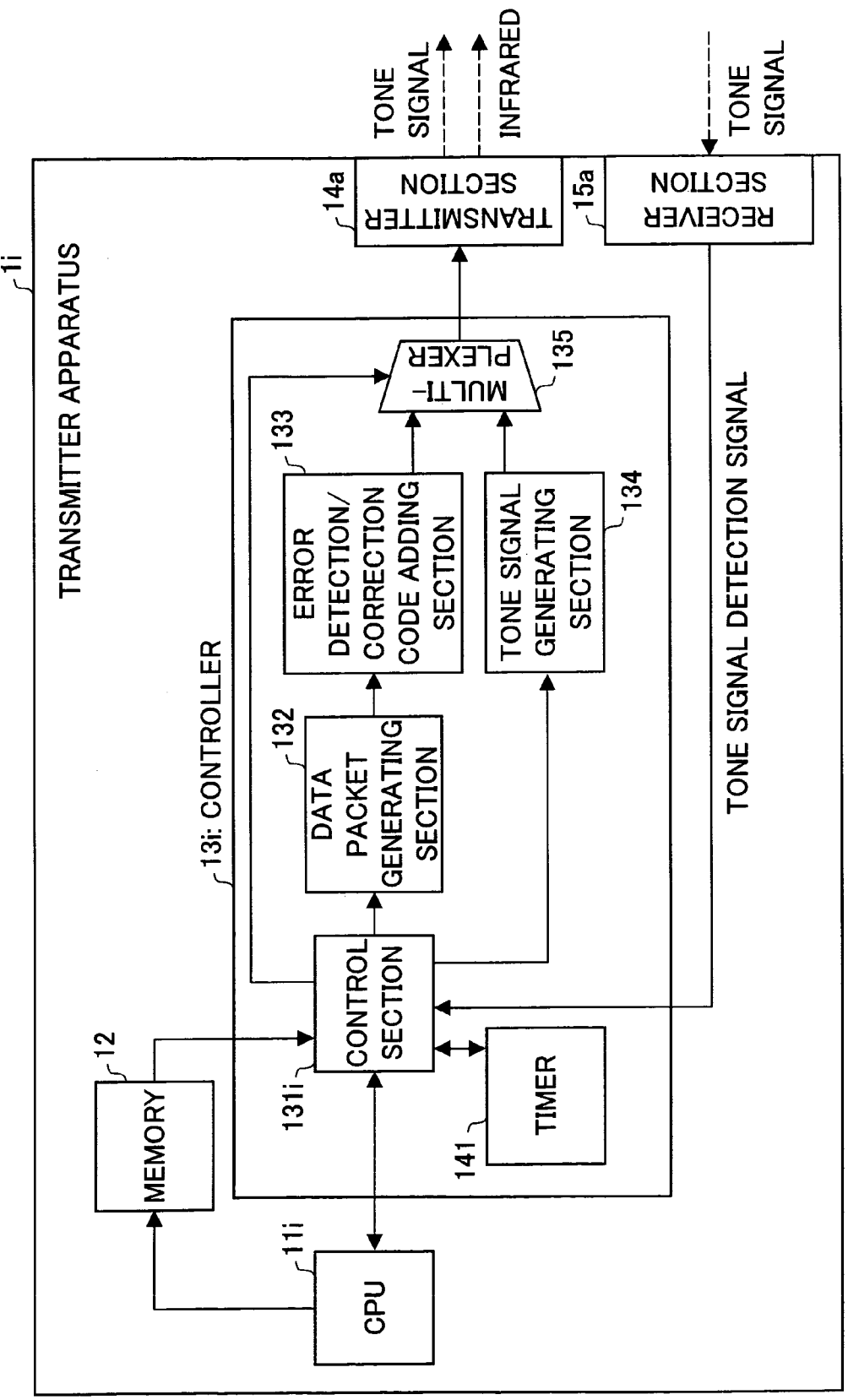
FIG. 31 is a block diagram illustrating a configuration of an example of the transmitter apparatus of embodiment 9.

As shown in FIG. 31, the transmitter apparatus 1$i$ differs from the transmitter apparatus 1$a$ of embodiment 2 where the control section 131$a$ is replaced by a control section 131$i$, and the CPU 11$a$ by a CPU 11$i$. Another difference is that the apparatus 1$i$ contains a timer 141.

Figure 32:
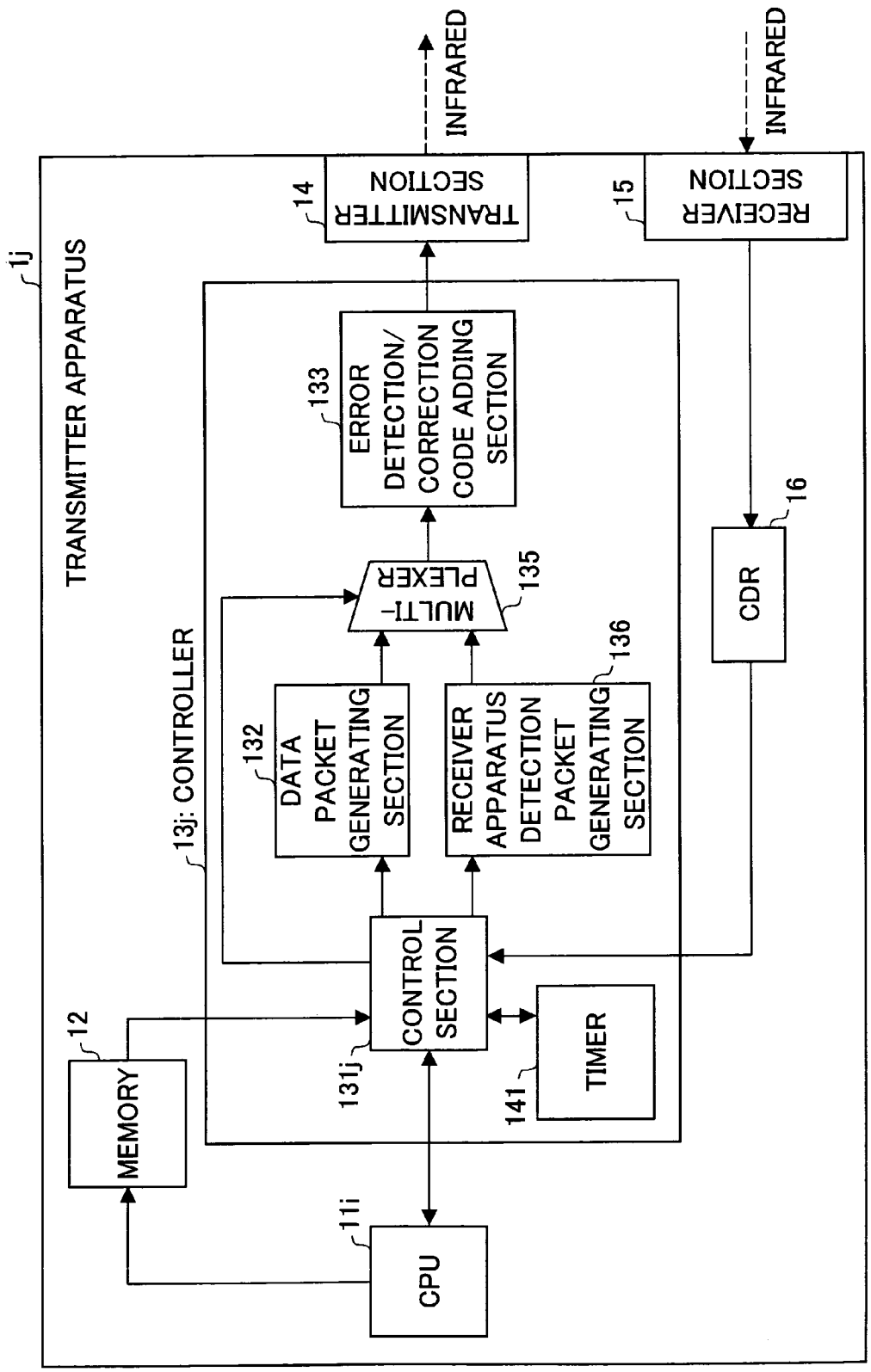
FIG. 32 is a block diagram illustrating a configuration of another example of the transmitter apparatus of embodiment 9.
Figure 33:
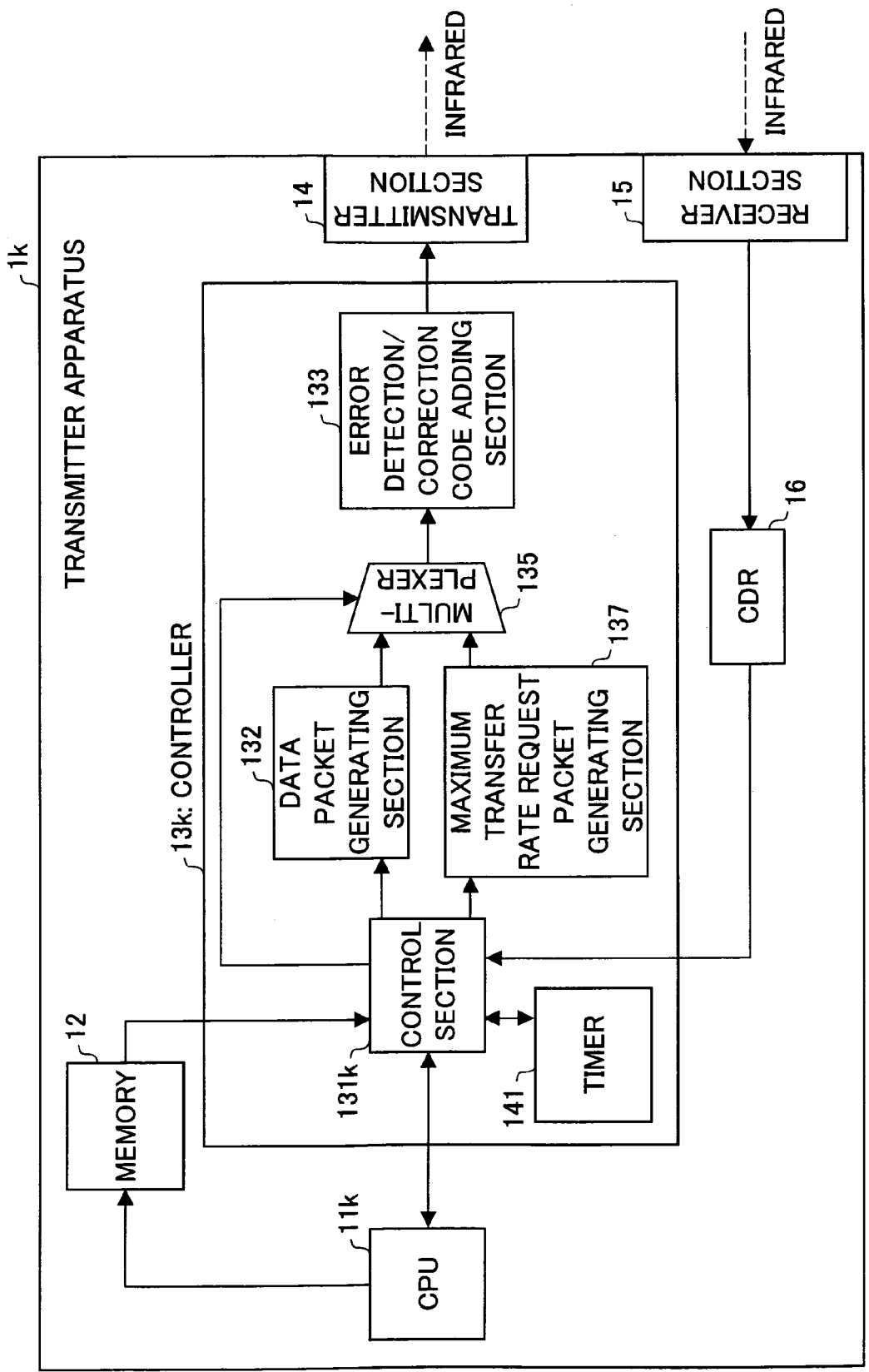
FIG. 33 is a block diagram illustrating a configuration of a further example of the transmitter apparatus of embodiment 9.
Figure 34:
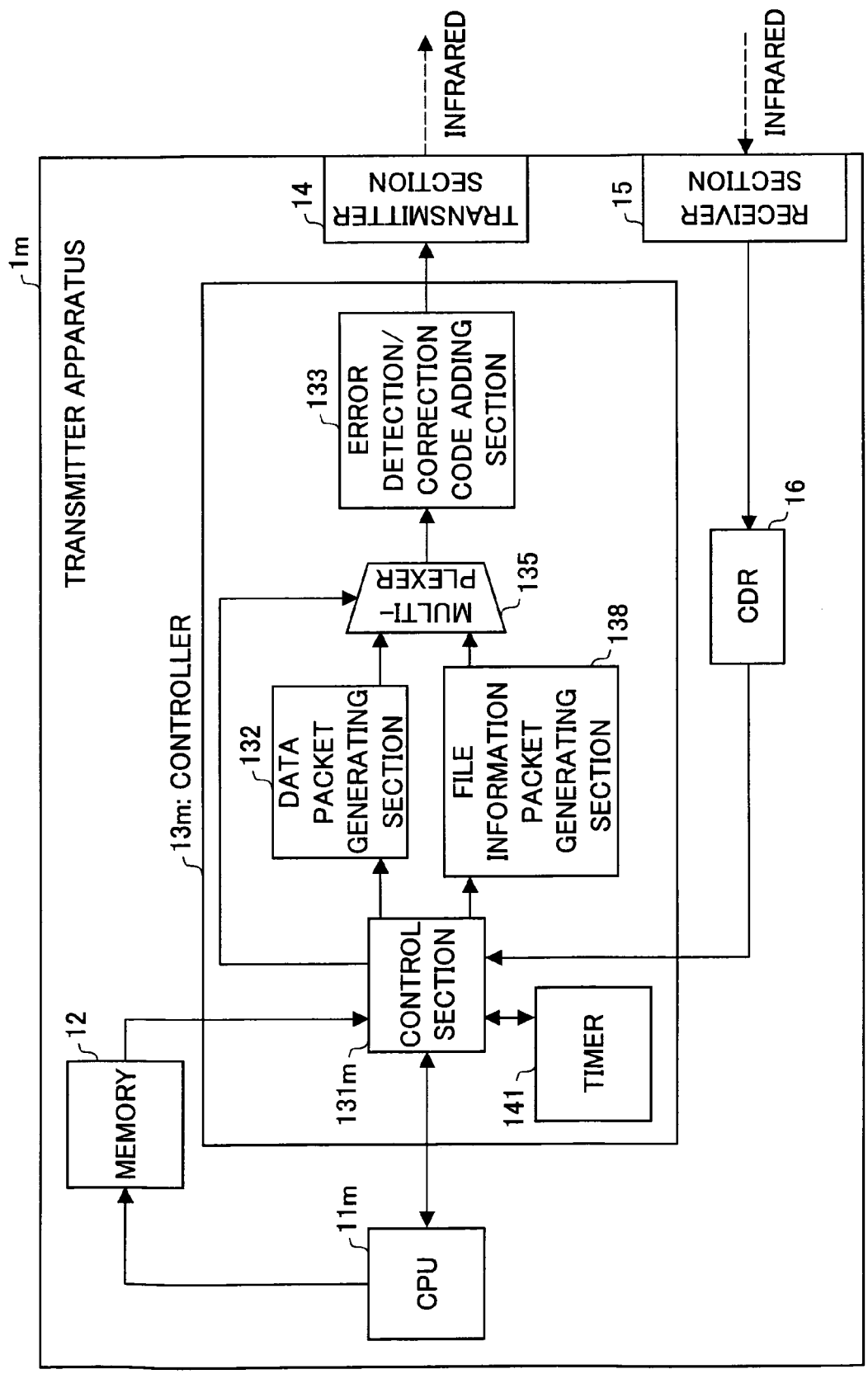
FIG. 34 is a block diagram illustrating a configuration of yet another example of the transmitter apparatus of embodiment 9.

Similarly, as shown in FIGS. 32 to 34, the transmitter apparatuses 1$j$, 1$k$, 1$m$ differ from the respective transmitter apparatuses 1$b$, 1$c$, 1$d$ of embodiments 3 to 5 where the control sections 131$b$, 131$c$, 131$d$ are replaced by control sections 131$j$, 131$k$, 131$m$, and the CPUs 11$b$, 11$c$, 11$d$ by CPUs 11$j$, 11$k$, 11$m$. Another difference is that the apparatuses 1$j$, 1$k$, 1$m$ each contain a timer 141.

The control section 131$i$ has the following functions as well as those of the control section 131$a$: The control section 131$i$, upon detecting a transmission of a tone signal from the transmitter section 14$a$, activates the timer 141 to measure the elapsed time. If no tone signal detection signal is received from the receiver section 15$a$ within a predetermined time (for example, 50 ms) as measured by the timer 141, the control section 131$i$ sends the CPU 11$i$ a predetermined time elapse notification indicating that the signal was not received.

The CPU 11$i$ has the following functions as well as those of the CPU 11$a$: the CPU 11$i$ outputs a data transfer request to the controller 13$i$ also when the CPU 11$i$ has received a predetermined time elapse notification from the control section 131$i$.

The control sections 131$j$, 131$k$, 131$m$ have similar functions to the control section 131$i$. The control section 131$j$ sends the CPU 11$j$ a predetermined time elapse notification if no receiver apparatus detection response packet is received within a predetermined time. The control section 131$k$ sends the CPU 11$k$ a predetermined time elapse notification if no maximum transfer rate notification packet is received within a predetermined time. The control section 131$m$ sends the CPU 11$m$ a predetermined time elapse notification if no file information receipt success packet is received within a predetermined time. In addition, the CPUs 11$j$, 11$k$, 11$m$ also have similar functions to the CPU 11$i$.

As described in the foregoing, in the transmitter apparatus 1$i$ (or transmitter apparatus 1$j$, 1$k$, 1$m$) of the present embodiment, the transmitter section 14$a$ (or transmitter section 14) transmits the multiple divisional data sets also when a predetermined time has elapsed after a transmission of the tone signal (or receiver apparatus detection packet, maximum transfer rate request packet, file information packet).

Thus, the multiple divisional data sets can be transmitted to a receiver apparatus which is not able to transmit/receive a tone signal (or receiver apparatus which is not able to receive a receiver apparatus detection packet, maximum transfer rate request packet, or file information packet or transmit a response to these packets).

As mentioned earlier, upon receiving a file information packet from the transmitter apparatus 11$m$, the receiver apparatus 2$d$ does not transmit a file information receipt success packet if the error detection/correction circuit 233 has detected an error in file information. Even when this is the case, the transmitter apparatus 1$m$ transmits a data packet if the timer 141 indicates that a predetermined time has elapsed.

However, a predetermined post-process on received transfer data whose file information is unknown in the receiver apparatus 2$d$ is likely to be meaningless: for example, when the transfer data is in a format which the receiver apparatus 2$d$ cannot handle. Accordingly, if the file information contains an error, the control section 231$d$ preferably records in the memory 22 none of the divisional data sets making up the subsequently received transfer data from the packet processing section 232. Thus, no wasteful post-process is needed to be done on the received data. Power consumption is lowered.

Embodiment 11

In embodiment 10, the transmitter apparatus is adapted to transmit a data packet if a predetermined time elapses without receiving a response to a transmitted tone signal (or receiver apparatus detection packet, maximum transfer rate request packet, or file information packet).

However, when there is no response to the tone signal (or receiver apparatus detection packet, maximum transfer rate request packet, or file information packet), the receiver apparatus may be compliant with the IrDA standards in data reception.

Accordingly, the transmitter apparatus of the present embodiment is suitably adapted to operate with a receiver apparatus which receives data in compliance with the IrDA standards.

Referring to FIG. 35 to FIG. 40, a transmission system of the present embodiment will be described. For convenience, members of the present embodiment that have the same function as members of the above embodiments, and that are mentioned in those embodiments are indicated by the same reference numerals and description thereof is omitted.

Example A

Figure 35:
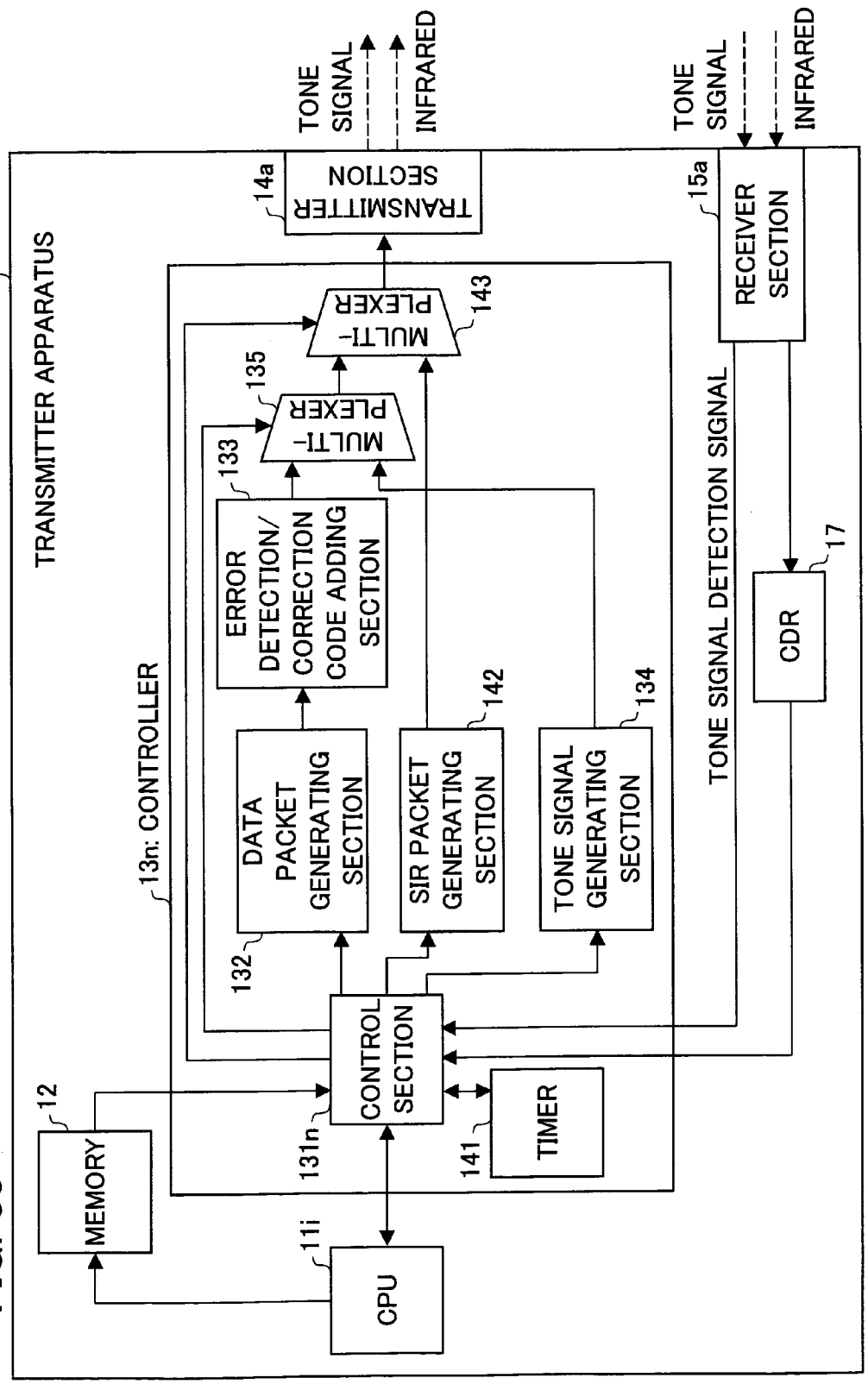
FIG. 35 is a block diagram illustrating a configuration of an example of a transmitter apparatus of embodiment 10.

FIG. 35 is a block diagram illustrating a configuration of a transmitter apparatus 1$n$ which is an example of the present embodiment.

The transmitter apparatus 1$n$ differs from the transmitter apparatus 1$i$ of embodiment 10 where the control section 131$i$ is replaced by a control section 131$n$. Another difference is that the apparatus 1$n$ contains a SIR packet generating section 142, a multiplexer 143, and a CDR 17.

The CDR 17 extracts (recovers) a clock signal and a data signal from a received signal according to the packets received by the receiver section 15$a$. The CDR 17 outputs the recovered clock signal and data signal to the control section 131$n$.

The control section 131$n$ has the following functions as well as those of the control section 131$i$: The control section 131$n$ determines to transmit transfer data by a method in compliance with IrDA SIR in response to a transfer request from the CPU 11$i$ after sending a predetermined time elapse notification to the CPU 11$i$. In so doing, the control section 131$n$ outputs to the multiplexer 143 an output switch signal causing the multiplexer 143 to output a signal from the SIR packet generating section 142.

After the determination, the control section 131$n$ has the SIR packet generating section 142 generate a XID command and a SNRM command and receives a XID response and a UA response from the CDR 17. When a data transfer connection is established, the control section 131$n$ has the SIR packet generating section 142 generate a packet in compliance with SIR according to the transfer data retrieved from the memory 12.

The control section 131n, when it is to have the data packet generating section 132 or tone signal generating section 134 generate a packet or tone signal, performs output switch control on the multiplexer 143 so that a signal from the multiplexer 135 is output.

Figure 36:
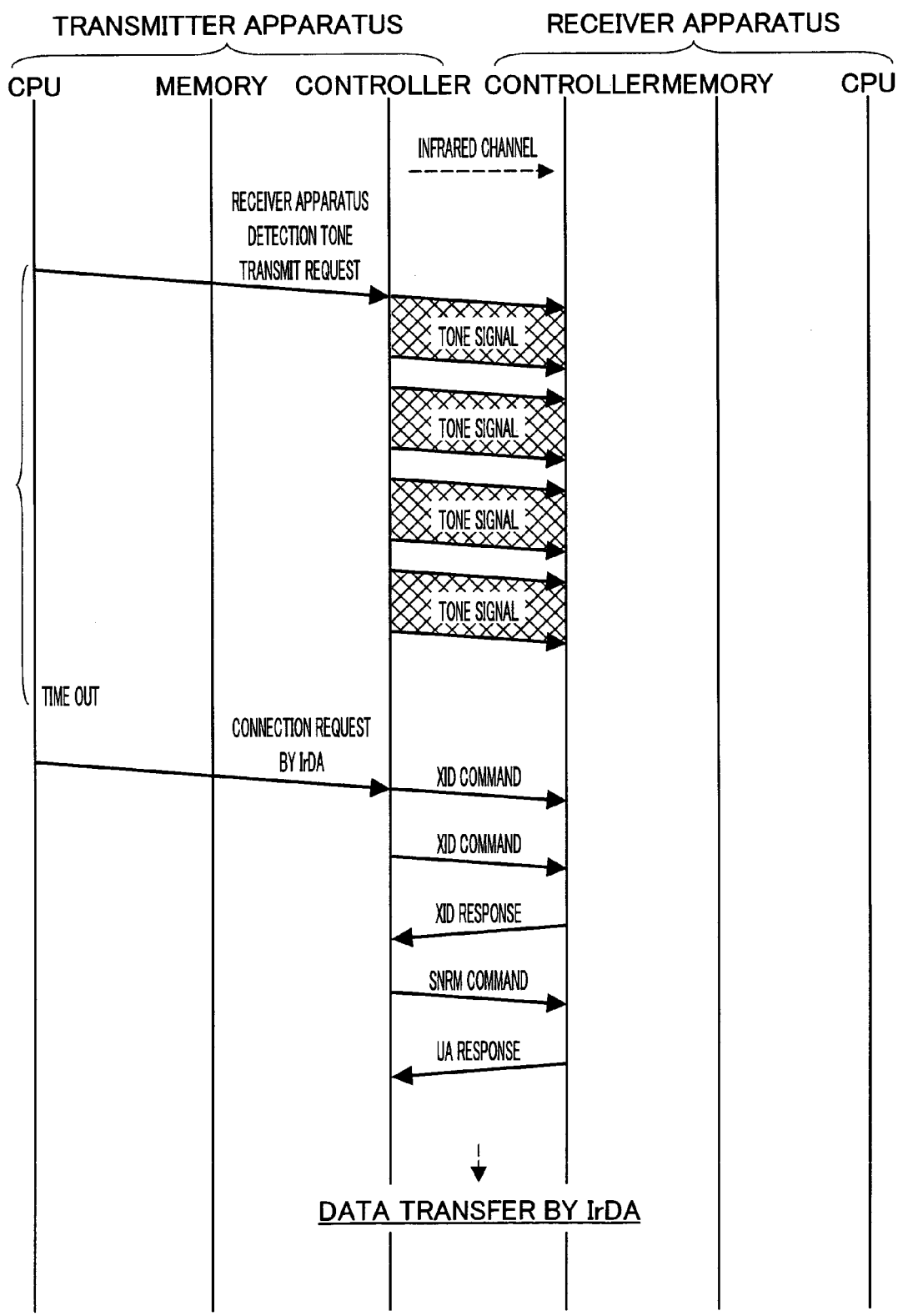
FIG. 36 is a drawing illustrating procedures in a data transfer process from the transmitter apparatus to the receiver apparatus shown in FIG. 35.

Next, referring to FIG. 36, procedures in a data transfer process in the instant example will be described.

In the transmitter apparatus 1n, the control section 131n receives a receiver apparatus detection tone signal transmit request from the CPU 11i and has the tone signal generating section 134 generate a tone signal. The transmitter section 14a then transmits the tone signal generated by the tone signal generating section 134. In so doing, the control section 131n activates the timer 141 to measure the elapsed time.

Here, it is assumed that the receiver apparatus has the only function of receiving data in compliance with conventional IrDA SIR. Therefore, the receiver apparatus cannot transmit a tone signal even if it is located within a communicable range from the transmitter apparatus 1n over an infrared channel.

When this is the case, the control section 131n does not receive a tone signal detection signal, and the timer 141 knows that a predetermined time has elapsed. The control section 131n sends a predetermined time elapse notification to the CPU 11i and receives a data transfer request from the CPU 11i.

Upon receiving the transfer request, the control section 131n decides to transmit data by a method in compliance with IrDA SIR because the transfer request is after the predetermined time elapse notification. The control section 131n then requests the SIR packet generating section 142 to generate a XID command. The transmitter section 14a then transmits the XID command generated by the SIR packet generating section 142. The receiver apparatus responds to the XID command by sending a XID response.

Upon receiving the XID response from the CDR 17, the control section 131n requests the SIR packet generating section 142 to generate a SNRM command. The transmitter section 14a then transmits the SNRM command generated by the SIR packet generating section 142. The receiver apparatus responds to the SNRM command by sending a UA response.

Upon receiving the UA response from the CDR 17, the control section 131n detects an establishment of a data transfer connection, retrieves the transfer data from the memory 12, and has the SIR packet generating section 142 generate a SIR data packet in compliance with SIR. The transmitter section 14a transmits the SIR data packet generated by the SIR packet generating section 142.

Example B

Figure 37:
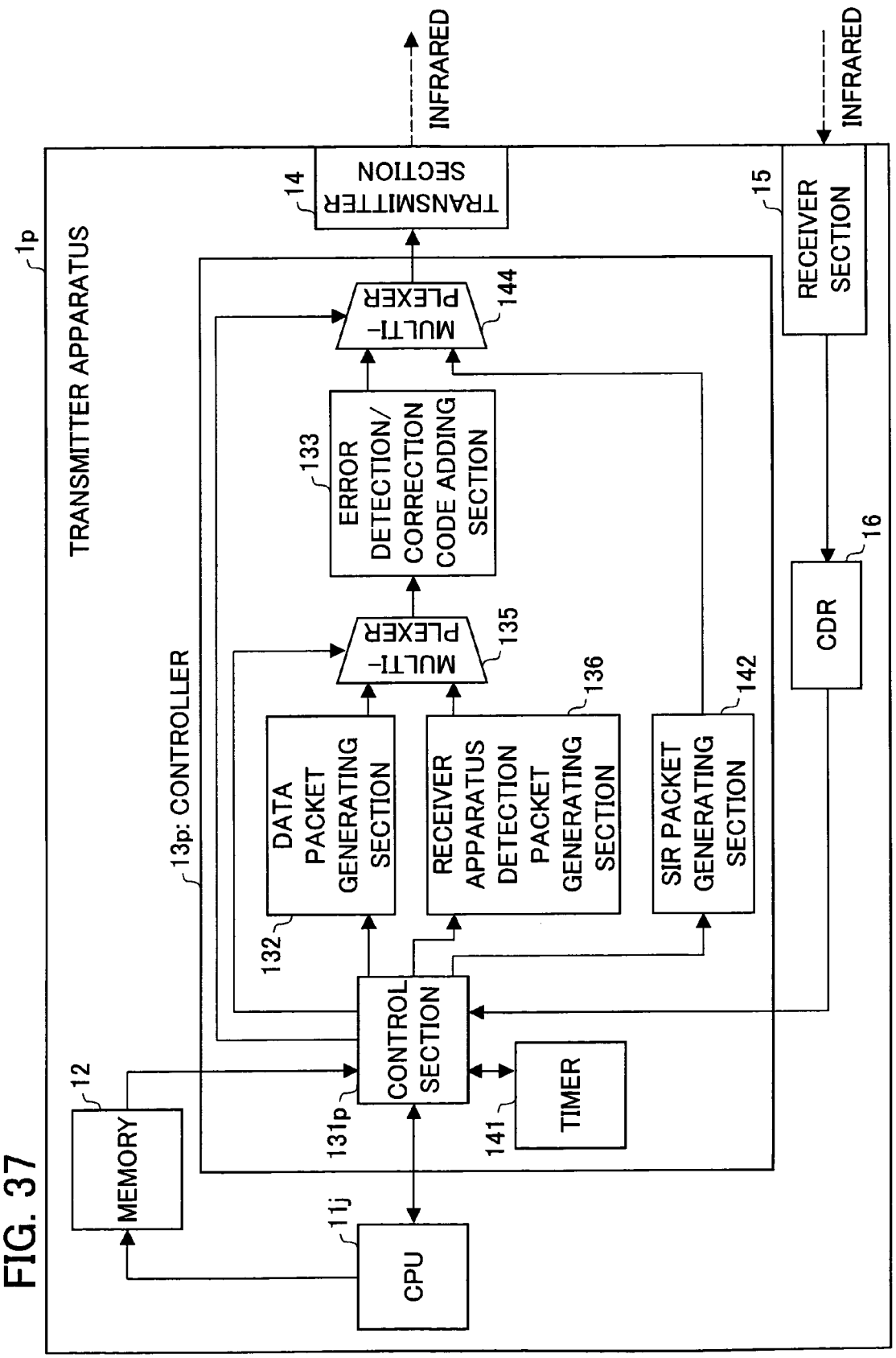
FIG. 37 is a block diagram illustrating a configuration of another example of the transmitter apparatus of embodiment 10.

FIG. 37 is a block diagram illustrating a configuration of a transmitter apparatus 1p which is another example of the present embodiment.

The transmitter apparatus 1p differs from the transmitter apparatus 1j of embodiment 10 where the control section 131j is replaced by a control section 131p. Another difference is that the apparatus 1p contains a SIR packet generating section 142 and a multiplexer 144.

The control section 131p has the following functions similar to those of the control section 131n, as well as those of the control section 131j: The control section 131p decides to transmit transfer data by a method in compliance with IrDA SIR in response to a transfer request from the CPU 11j after sending a predetermined time elapse notification to the CPU 11j. In so doing, the control section 131p performs output switch control on the multiplexer 144 so that a signal from the SIR packet generating section 142 is output.

Figure 40:
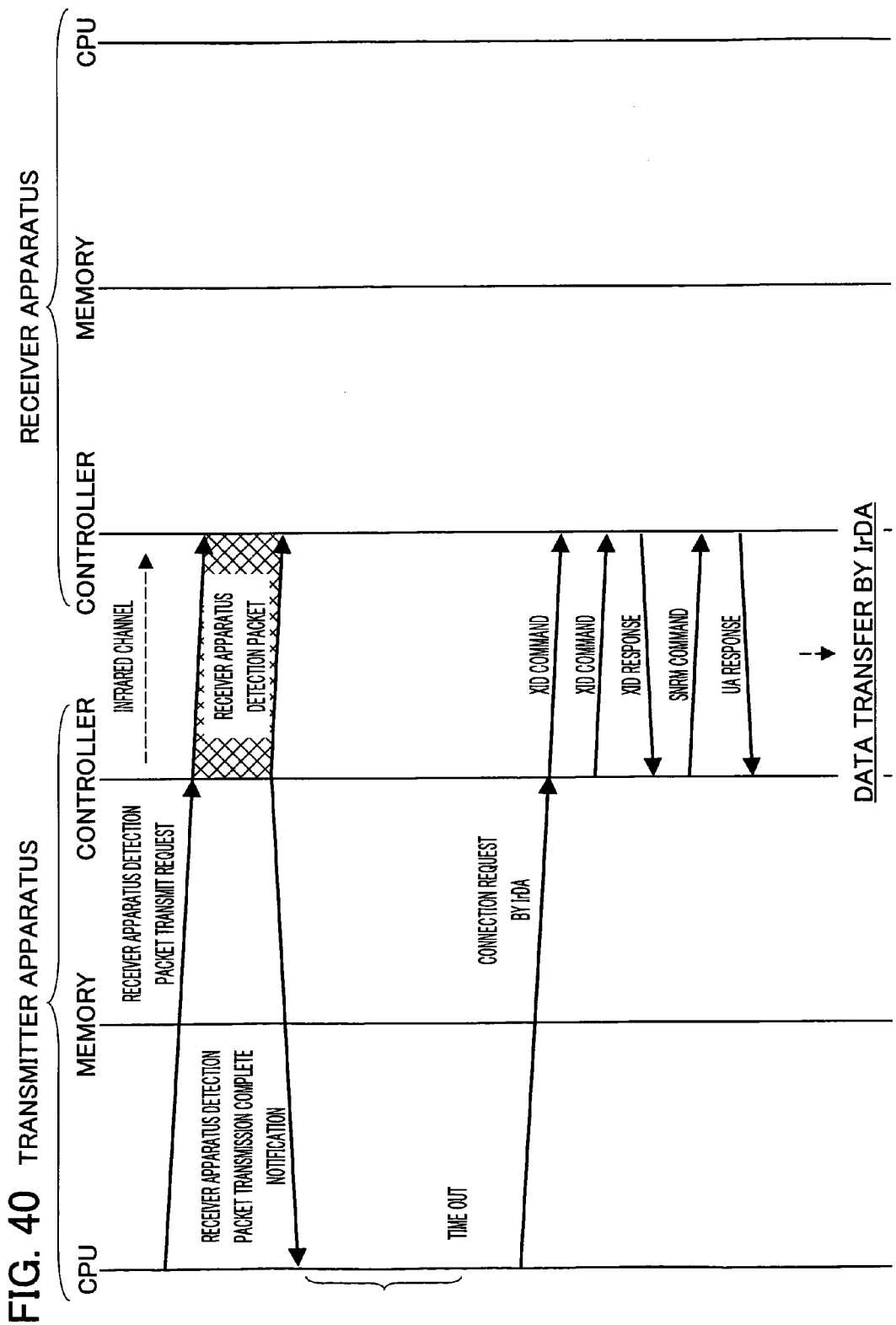
FIG. 40 is a drawing illustrating procedures in a data transfer process from the transmitter apparatus to the receiver apparatus shown in FIG. 37.

Next, referring to FIG. 40, procedures in a data transfer process in the instant example will be described.

In the transmitter apparatus 1p, the control section 131p receives a receiver apparatus detection packet transmit request from the CPU 11j and has the receiver apparatus detection packet generating section 136 generate a receiver apparatus detection packet. The transmitter section 14 then transmits the receiver apparatus detection packet generated by the receiver apparatus detection packet generating section 136. In so doing, the control section 131p activates the timer 141 to measure the elapsed time.

Here, it is assumed that the receiver apparatus has the only function of receiving data in compliance with conventional IrDA SIR.

When this is the case, the control section 131p does not receive the receiver apparatus detection response packet, and the timer 141 knows that a predetermined time has elapsed. The control section 131p then sends the CPU 11j a predetermined time elapse notification and receives a data transfer request from the CPU 11j.

Upon receiving the transfer request, the control section 131p decides to transmit data by a method in compliance with IrDA SIR because the transfer request is after the predetermined time elapse notification. The control section 131p then requests the SIR packet generating section 142 to generate a XID command. The transmitter section 14 then transmits the XID command generated by the SIR packet generating section 142. The receiver apparatus responds to the XID command by sending a XID response.

Upon receiving the XID response from the CDR 16, the control section 131p requests the SIR packet generating section 142 to generate a SNRM command. The transmitter section 14 then transmits the SNRM command generated by the SIR packet generating section 142. The receiver apparatus responds to the SNRM command by sending a UA response.

Upon receiving the UA response from the CDR 16, the control section 131p detects an establishment of a data transfer connection, retrieves the transfer data from the memory 12, and has the SIR packet generating section 142 generate a SIR data packet in compliance with SIR. The transmitter section 14 then transmits the SIR data packet generated by the SIR packet generating section 142.

Example C

Figure 38:
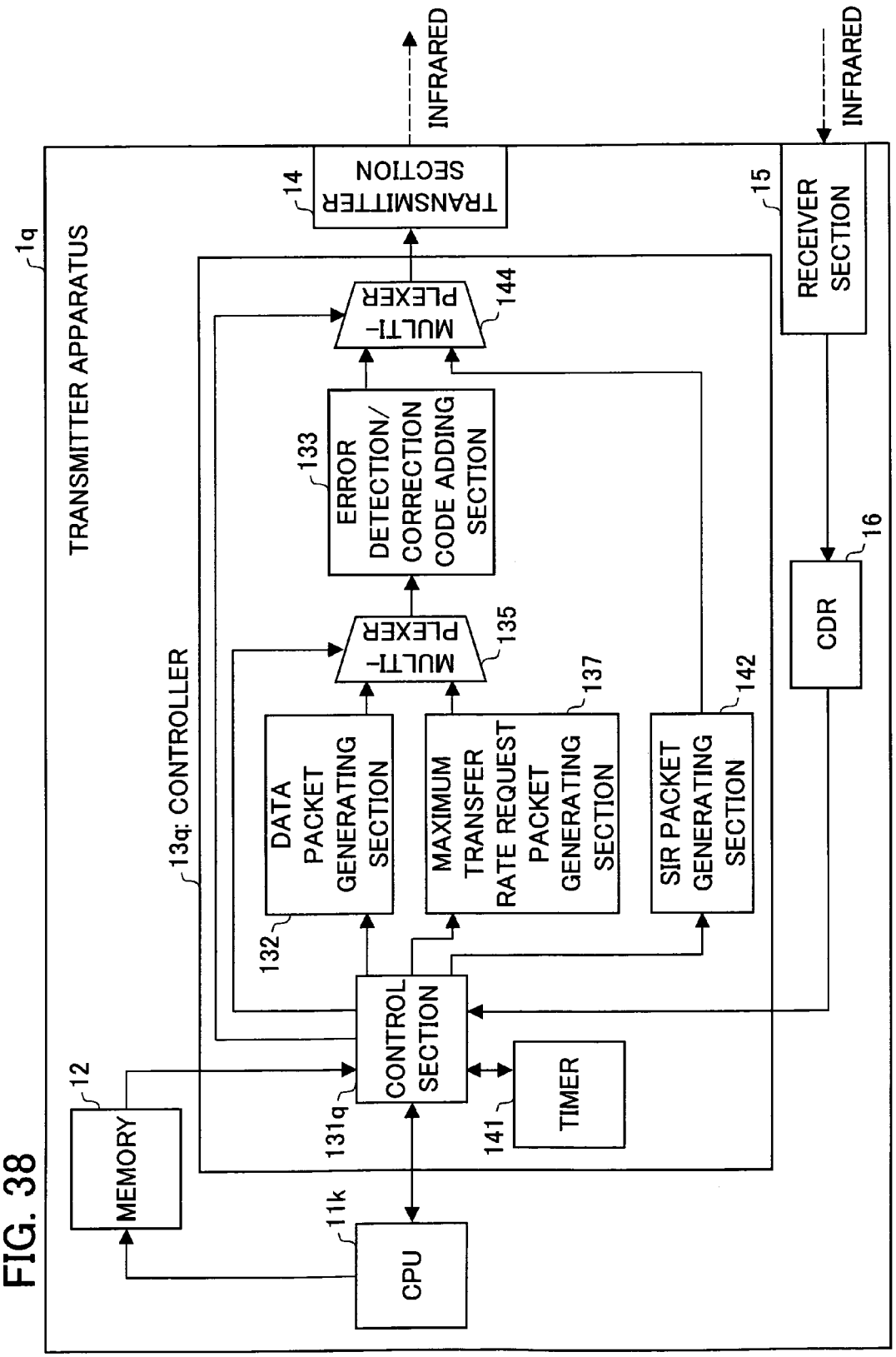
FIG. 38 is a block diagram illustrating a configuration of a further example of the transmitter apparatus of embodiment 10.
Figure 39:
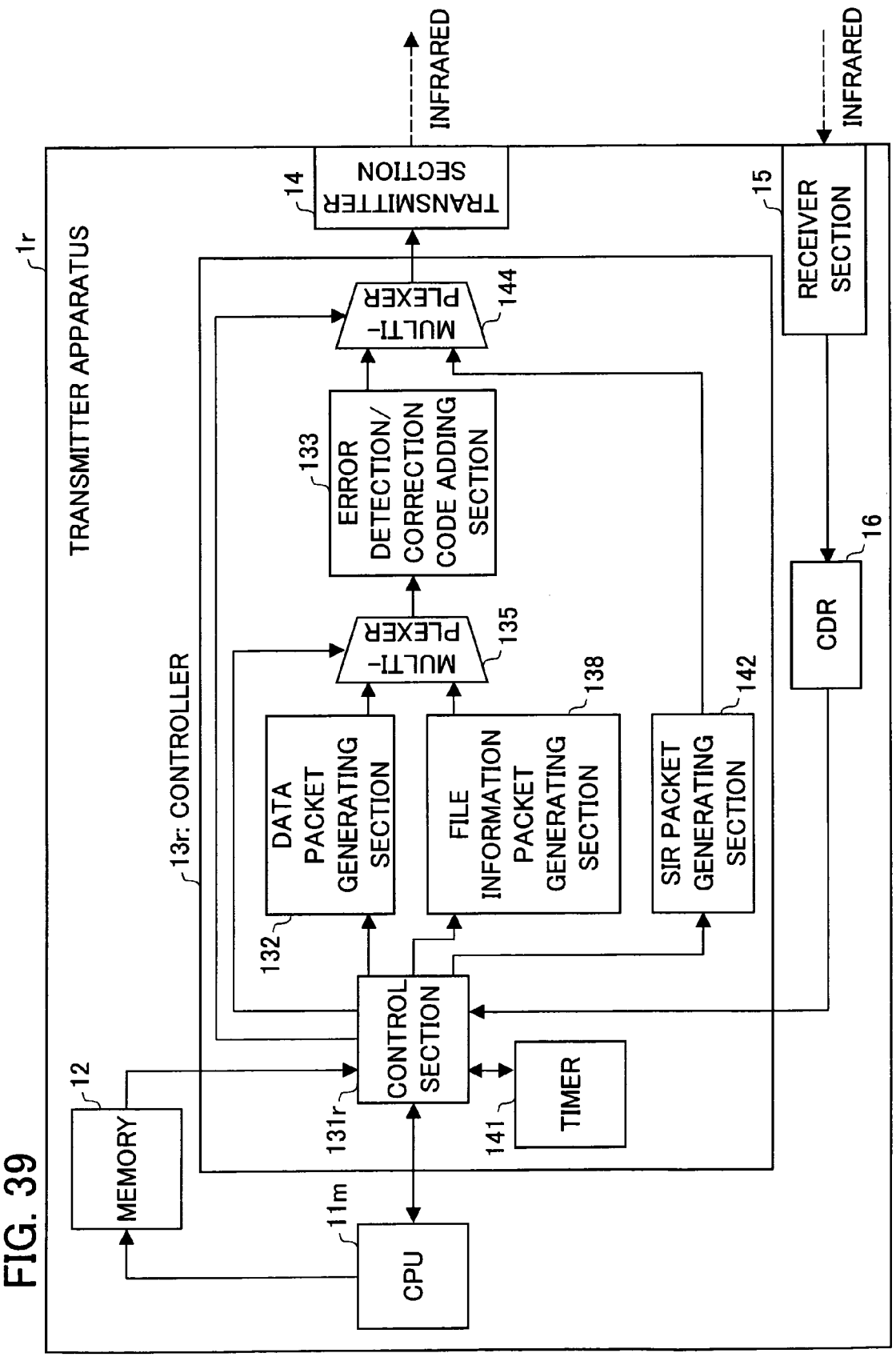
FIG. 39 is a block diagram illustrating a configuration of yet another example of the transmitter apparatus of embodiment 10.

FIG. 38 and FIG. 39 are block diagrams illustrating configurations of transmitter apparatuses 1q, 1r which are other examples of the present embodiment.

The transmitter apparatus 1q differs from the transmitter apparatus 1k of embodiment 10 where the control section 131k is replaced by a control section 131q. Another difference is that the apparatus 1q contains a SIR packet generating section 142 and a multiplexer 144. Similarly, the transmitter apparatus 1r differs from the transmitter apparatus 1m of embodiment 10 where the control section 131m is replaced by a control section 131r. Another difference is that the apparatus 1r contains a SIR packet generating section 142 and a multiplexer 144.

The control section 131q (131r) has the following functions similar to those of the control section 131p, as well as those of the control section 131k (131m). The control section 131q (131r) determines to transmit transfer data by a method in compliance with IrDA SIR in response to a transfer request from the CPU 11*k* (11*m*) after sending a predetermined time elapse notification to the CPU 11*k* (11*m*).

As described in the foregoing, the transmitter section 14*a* (or transmitter section 14) in the transmitter apparatus (transmitter) in (or transmitter apparatus [transmitter] 1*p*, 1*q*, 1*r*) of the present embodiment transmits the multiple divisional data sets at a maximum transfer rate of 115.2 kbps if a predetermined time has elapsed after a transmission of the tone signal (or receiver apparatus detection packet, maximum transfer rate request packet, file information packet).

As mentioned earlier, the IrDA standards stipulate data transfer over an infrared channel. The IrDA SIR standard gives a maximum transfer rate of 115.2 kbps. Therefore, according to the configuration, the multiple divisional data sets can be transmitted to a receiver apparatus implementing a transfer method in compliance with the IrDA SIR standard.

Embodiment 12

In embodiment 1, the transmitter apparatus 1 one-sidedly transmits data packets to the receiver apparatus 2. Therefore, the transmitter apparatus 1 cannot determine whether the receiver apparatus 2 has successfully received data packets. The user of the transmitter apparatus 1 in turn cannot determine whether to transmit the data packets again.

The present embodiment is adapted to solve these problems.

Figure 41:
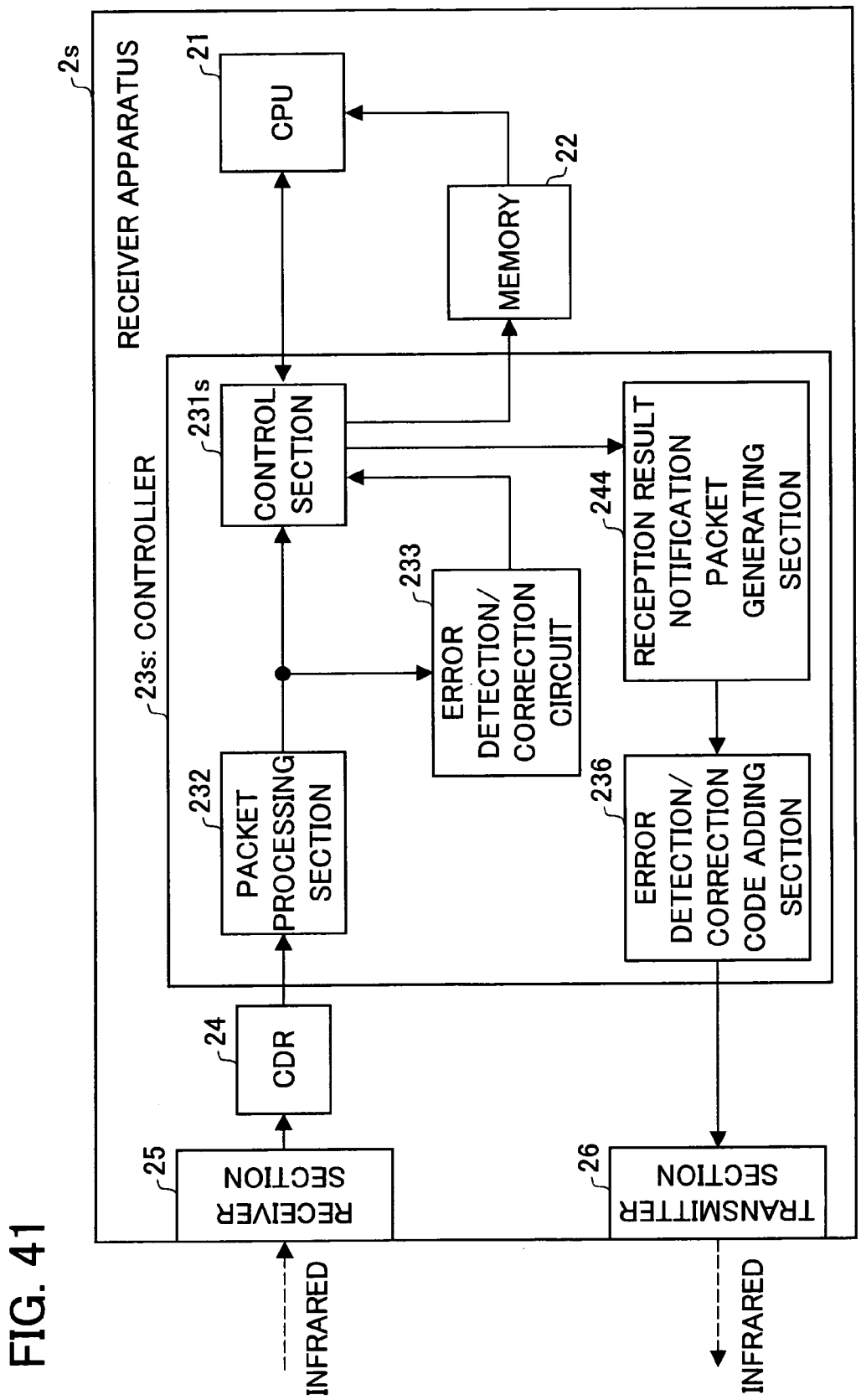
FIG. 41 is a block diagram illustrating a configuration of a receiver apparatus of embodiment 11.
Figure 42:
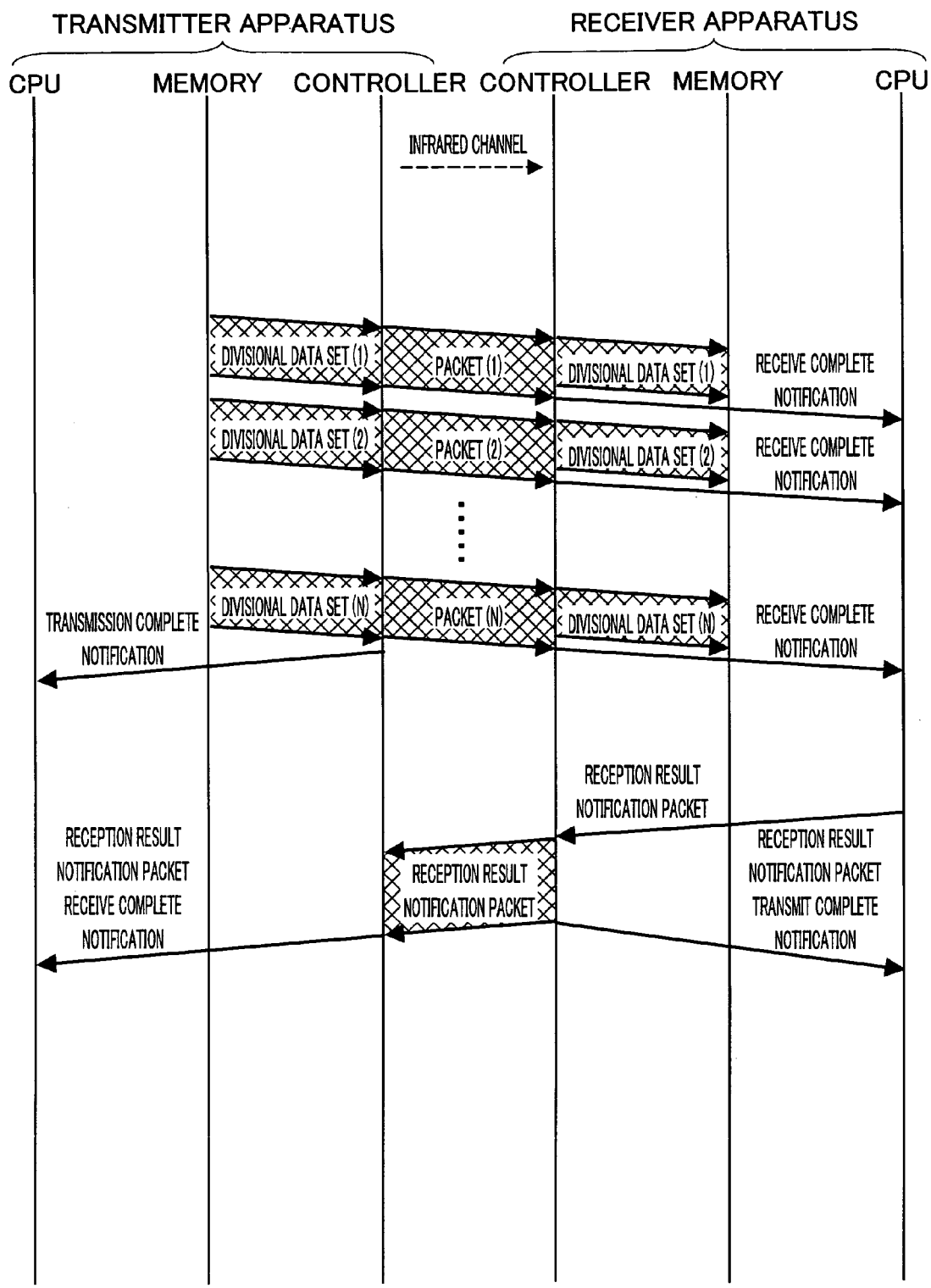
FIG. 42 is a drawing illustrating procedures in a data transfer process of embodiment 11.

Referring to FIG. 41 and FIG. 42, a transmission system of the present embodiment will be described. For convenience, members of the present embodiment that have the same function as members of the above embodiments, and that are mentioned in those embodiments are indicated by the same reference numerals and description thereof is omitted.

FIG. 41 is a block diagram illustrating a configuration of a receiver apparatus 2*s* of the present embodiment. As shown in FIG. 41, the receiver apparatus 2*s* differs from the receiver apparatus 2 where the controller 23 is replaced by a controller 23*s*. Another difference is that the apparatus 2*s* contains a transmitter section 26.

The controller 23*s* differs from the controller 23 where the control section 231 is replaced by a control section 231*s*. Another difference is that the controller 23*s* contains an error detection/correction code adding section 236 and a reception result notification packet generating section 244.

The control section 231*s* has the following functions as well as those of the control section 231: After receiving all the divisional data sets for one piece of transfer data, the section 231*s* has the reception result notification packet generating section 244 generate a reception result notification packet indicating results of the reception.

Specifically, if the control section 231*s* is informed by the error detection/correction circuit 233 that none of the divisional data sets contains an error, the section 231*s* has the reception result notification packet generating section 244 generate a reception result notification packet indicating a successful reception.

On the other hand, if the control section 231*s* is informed by the error detection/correction circuit 233 that at least one of the divisional data sets contains an error, the section 231*s* has the reception result notification packet generating section 244 generate a reception result notification packet indicating a failed reception.

The reception result notification packet generating section 244 receives an instruction from the control section 231*s* and generates a reception result notification packet. The reception result notification-packet generating section 244 outputs the generated reception result notification packet to the next stage, i.e. the error detection/correction code adding section 236.

The error detection/correction code adding section 236 and the transmitter section 26 have been already described in embodiment 3.

The transmitter apparatus of the present embodiment, similarly to embodiment 3, contains a receiver section 15 and a CDR 16.

Transmission/reception procedures for the reception result notification packet are shown in FIG. 42. As shown in FIG. 42, upon receiving all the divisional data sets regarding one piece of transfer data, the receiver apparatus 2*s* transmits a reception result notification packet indicating the reception was successful. The transmitter apparatus then receives the reception result notification packet to know whether the reception was successful according to the content.

In the foregoing embodiments, the data packet generating section 132 divides the data file for one piece of transfer data into multiple divisional data sets (1) to (N) to generate the data packets (1) to (N) containing the respective divisional data sets. Each data packet generated by the data packet generating section 132 has a preamble field as shown in FIG. 46. The preamble field, which is a trailer for clock synchronization, is placed at the head of the packet. The preamble field is, for example, an alternating pattern of a "1" and a "0."

Figure 43A:
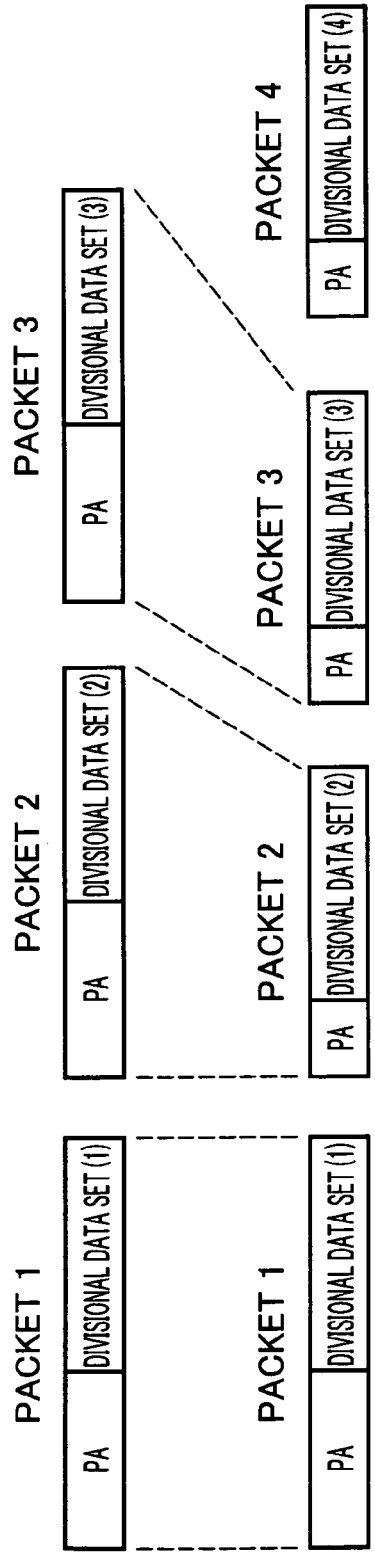
FIGS. 43(*a*), 43(*b*) are drawings illustrating structures of data packets in accordance with the present invention.
Figure 43B:
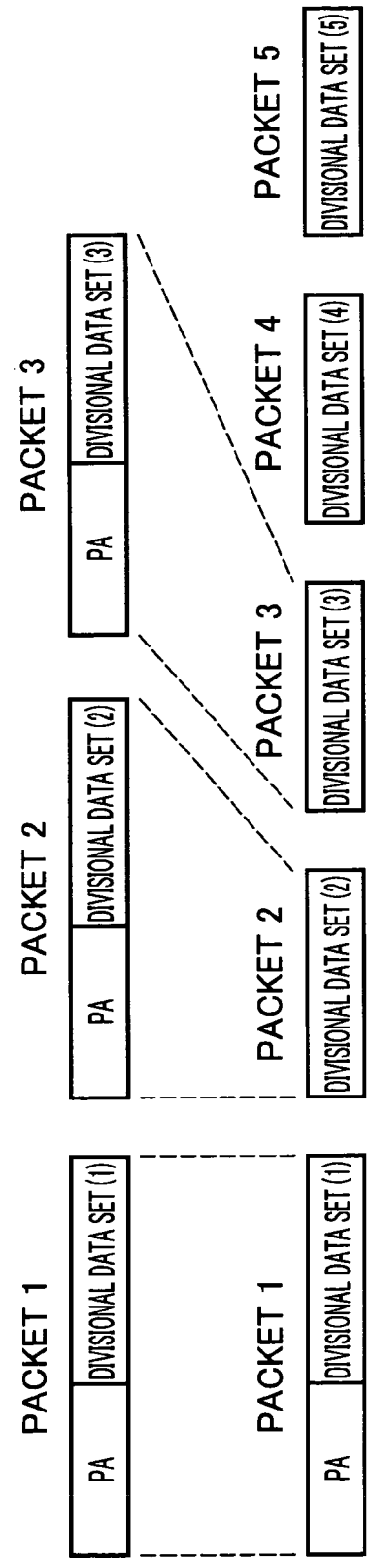
Figure 44:
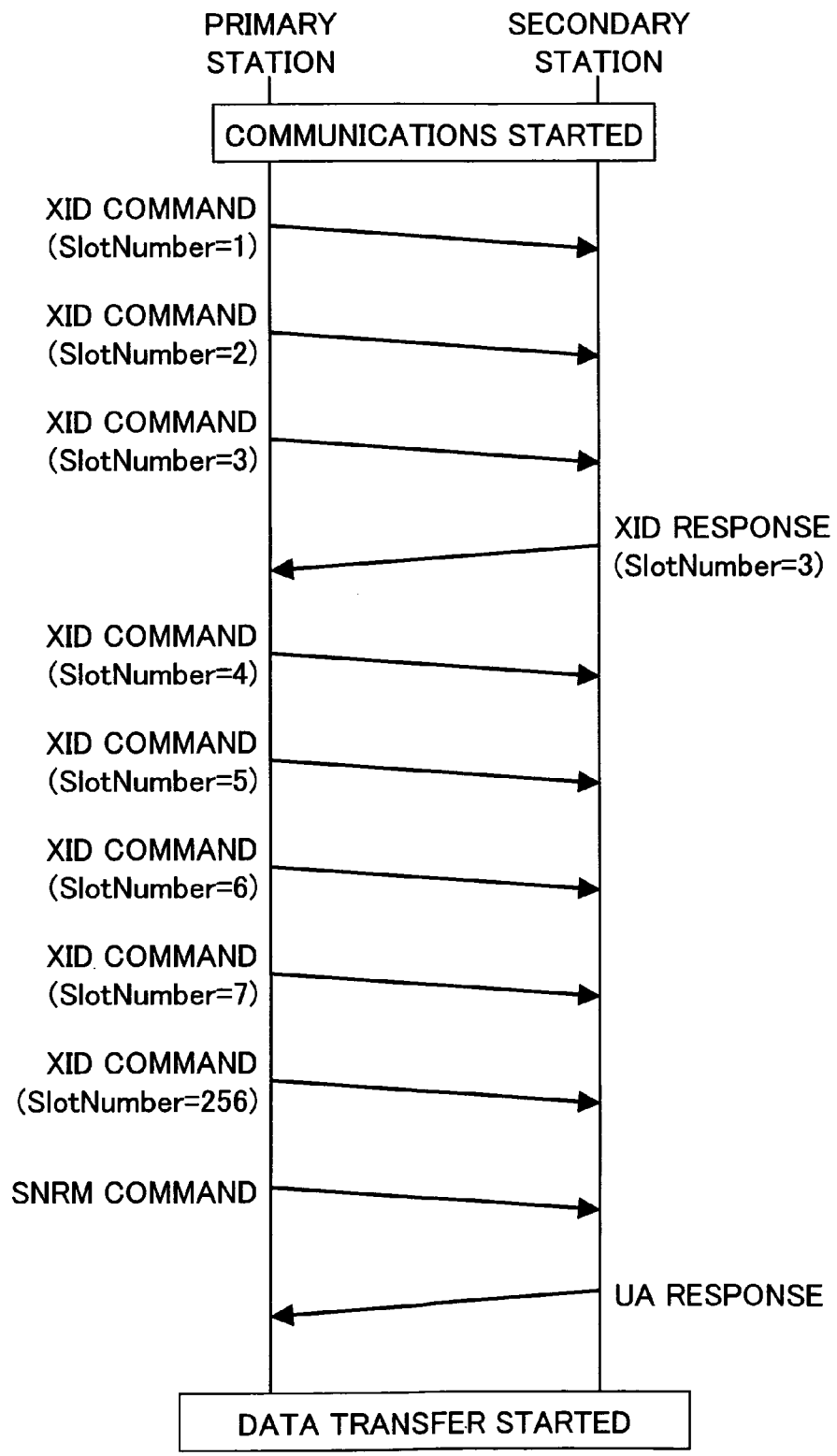
FIG. 44 is a drawing illustrating transmission procedures according to the IrDA standards up to establishment of a data transfer connection.

However, as described above, when the data packets (1) to (N) are successively transmitted at relatively short intervals, the clock of the receiver apparatus will not go out of synchronization. Therefore, as shown in FIG. 43, even if the preamble fields of the packet number (2) and succeeding numbers has a 0 length (see FIG. 43(*b*)) or a length shorter than the preamble field of the packet number (1) (see FIG. 43(*a*)), the receiver apparatus can still successfully receive the packets. Thus, it takes less time to transmit the packets having packet number (2) and succeeding numbers.

In the foregoing embodiments, the transmitter apparatus 1 and the receiver apparatus 2 contain the CPU 11 or the CPU 21. The CPU may be replaced by a microcomputer or anything with computing functions.

In the foregoing embodiments, the controller 13 transfers data in response to an instruction from the CPU 11. However, the controller 13 may transfer data by DMA (direct memory access) without the CPU 11 being involved. When this is the case, data can be transferred from the memory 12 without receiving an instruction from the CPU 11. Thus, the workload of the CPU 11 is lowered.

The transmitter apparatus of the foregoing embodiments is, for example, a mobile terminal device, such as a mobile phone and a PDA (Personal Digital Assistants); a digital camera; a digital video camera; or a personal computer. As will be detailed later, the transmitter apparatus may be applicable to data-transmitting mobile storage devices which contain a recording medium, such as a computer-readable hard disk drive or flash memory, containing a transmission program of the foregoing embodiments or which is connectable to a recording medium, such as a computer-readable hard disk drive or flash memory, containing the transmission program. Further, the receiver apparatus may be, for example, an electronic device: e.g. a mobile terminal device, such as a mobile phone or a PDA (personal digital assistant); a video output device, such as a digital camera, a digital video camera, a television, and a monitor; a storage device which doubles as audio visual equipment, such as a DVD recorder, a hard disk recorder, and a video cassette recorder; and a projector, such as a printer and a personal computer, and a projector. In addition, at least one of the foregoing transmitter apparatuses and at least one of the foregoing receiver apparatuses may used to construct an image transmission/receipt system.

Finally, each block in the transmitter apparatuses 1, 1a to 1r and the receiver apparatuses 2, 2a to 2s may be constructed by hardware logic. Alternatively, the block may be realized by software implemented on a computing device like a CPU as follows.

The transmitter apparatuses 1, 1a to 1r and receiver apparatuses 2, 2a to 2s are provided with a CPU (central processing unit) executing instructions of a control program realizing the functions of those apparatus and storage devices (storage media), such as a ROM (read only memory) storing the program, RAM (random access memory) into which the program is loaded, and memory storing the program and various data. The present invention can achieve its objective also by providing a recording medium containing, in a computer-readable manner, the code (execution program, intermediate code program, or source program) of a transmission program or reception program, for the transmitter apparatuses 1, 1a to 1r and the receiver apparatuses 2, 2a to 2s, which is software realizing the aforementioned functions to the transmitter apparatuses 1, 1a to 1r or the receiver apparatuses 2, 2a to 2s and its computer (or CPU, MPU) reading and executing the program code contained in the recording medium.

The recording medium may be, for example, a tape, such as a magnetism tape or a cassette tape; a magnetic disc, such as a floppy (registered trademark) disc or a hard disk, or an optical disc, such as CD-ROM/MO/MD/DVD/CD-R; a card, such as an IC card (memory card) or an optical card; or a semiconductor memory, such as mask ROM/EPROM/EEPROM/flash ROM.

Further, the transmitter apparatuses 1, 1a to 1r or the receiver apparatuses 2, 2a to 2s may be adapted to be connectable to a communications network so that the code can be downloaded from the communications network. The communications network is by no means limited in any particular manner and may be, for example, the Internet, an Intranet, an Extranet, a LAN, an ISDN, a VAN, a CATV communications network, a virtual private network, a telephone network, a mobile communications network, and a satellite communications network. In addition, the transfer medium which is part of the communications network is by no means limited in any particular manner and may be, for example, either: wired (e.g. the IEEE 1394, the USB, an electric power line transport, a cable TV line, a telephone line, and a ADSL line), infrared (IrDA and a remote controller), or wireless (the Bluetooth, a 802.11 wireless, HDR, a mobile phone network, a satellite channel, and terrestrial digital network). The present invention may be realized by a carrier wave or a series of data signals representing an embodiment of the code by electronic transmission.

Embodiment 13

The following will describe another embodiment of the present invention in reference to FIG. 49 through FIG. 53. The arrangement of the present embodiment is the same as those of embodiments 1 to 12 unless otherwise stated. For convenience, members of the present embodiment that have the same function as members of the above embodiments, and that are mentioned in those embodiments are indicated by the same reference numerals and description thereof is omitted.

Figure 49:
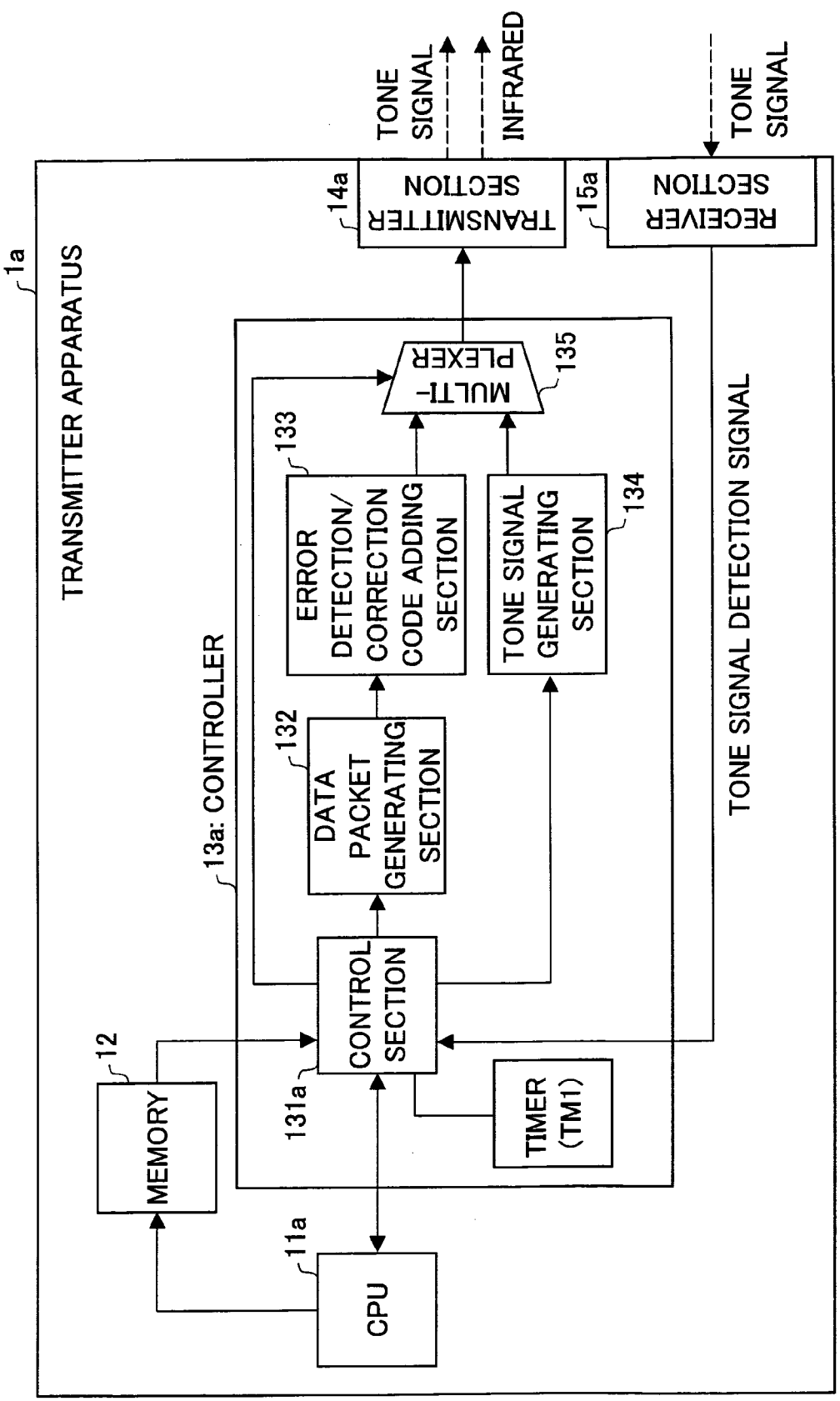
FIG. 49, showing another embodiment of the present invention, is a block diagram illustrating a configuration of a transmitter apparatus.

A transmitter apparatus 1a as the transmitter of the present embodiment differs from the controller 13a in the transmitter apparatus 1a of embodiment 2 where the apparatus 1a contains a timer TM1 as a first timer as shown in FIG. 49.

In the present embodiment, the controller 13a in the transmitter apparatus 1a contains the timer TM1 in the control section 131a to measure the elapsed time as shown in FIG. 49. The control section 131a has a function as a received signal presence/absence determine section which determines the presence/absence of a received signal from the receiver apparatus 2a as the receiver. The section 131a has another function as a timer activate/reset section which activates the timer TM1 or resets the timer. The control section 131a determines that there is a received signal if there, for example, is a tone signal detection signal from the receiver section 15a.

Figure 50A:
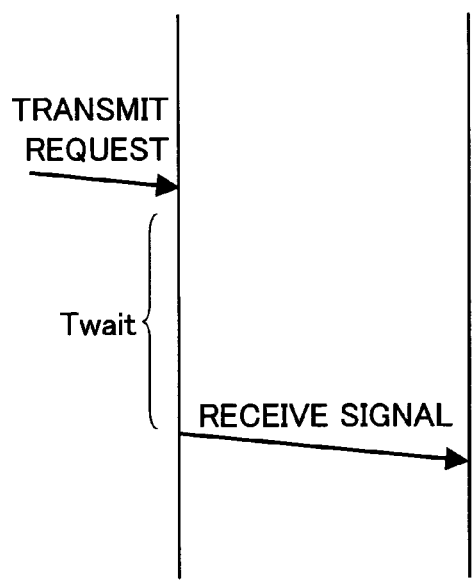
FIG. 50(*a*) is a timing chart illustrating transmission procedures according to an existing IrDA protocol.

In existing IrDA methods, after there occurs a transmit request, the received signal is monitored, and it is checked that there is no signal for a predetermined time Twait=500 ms, for example, as shown in FIG. 50(a). Therefore, at least 500 ms is needed before the start of a transmission.

Figure 50B:
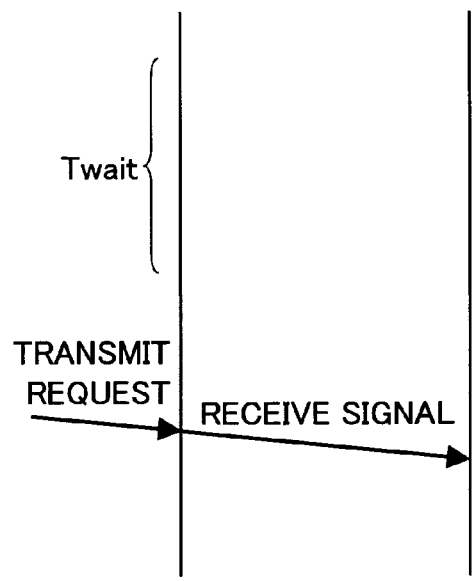

Accordingly, in the present embodiment, as shown in FIG. 50(b), it is checked in advance that there is no received signal for the predetermined time Twait so that a transmission can be immediately started once there occurs a transmit request.

Figure 51:
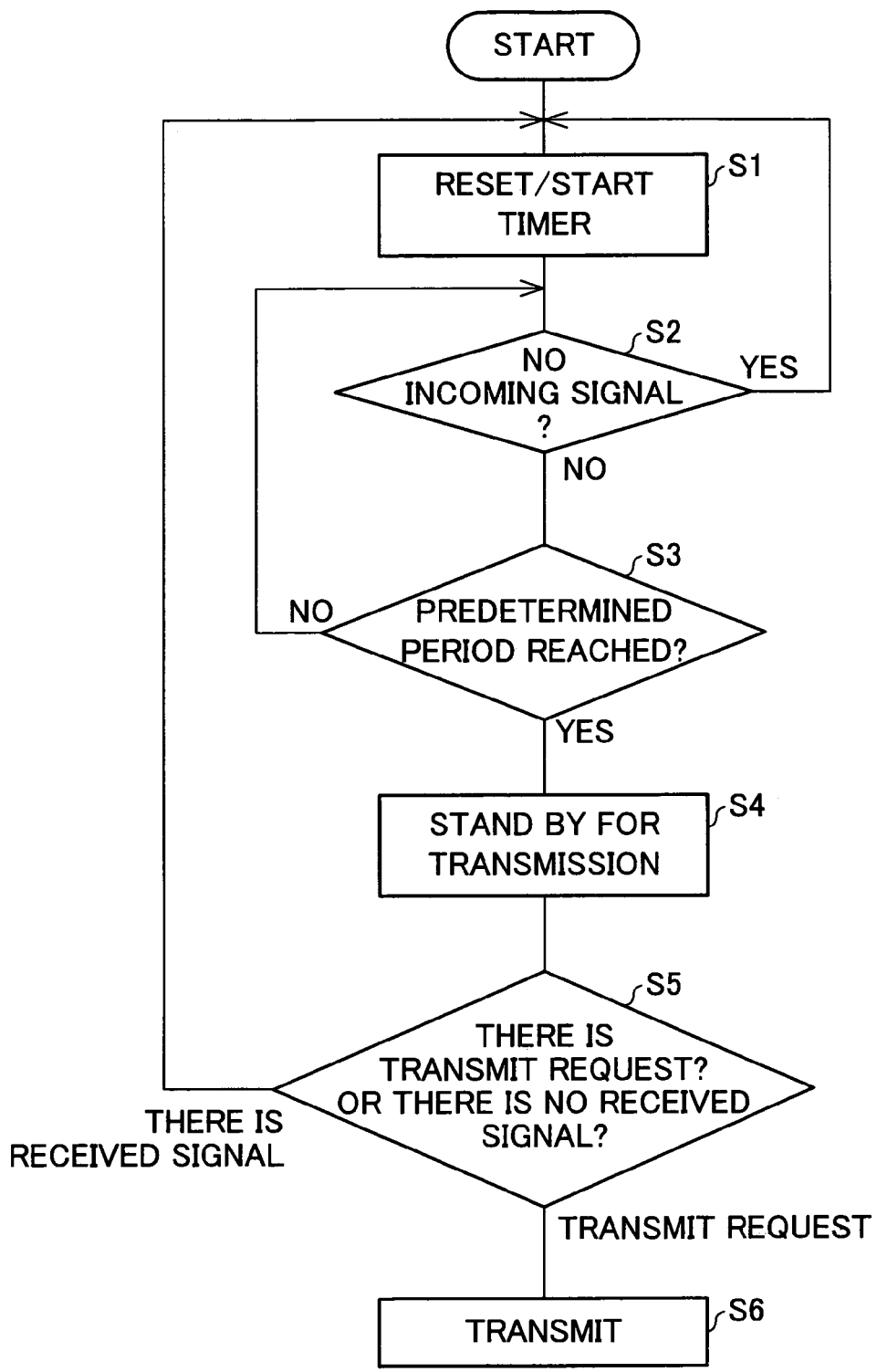
FIG. 51 is a flow chart illustrating transmission procedures implemented by the transmitter apparatus.

The operation of the controller 13a in the transmitter apparatus 1a having the above configuration will be described in reference to the flow chart in FIG. 51.

First, the control section 131a determines the presence/absence of a received signal from the receiver apparatus 2a at a certain point in time. If the section 131a determines that there is no received signal, the section 131a starts the timer TM1 (S1).

Subsequently, after a predetermined time, the control section 131a again determines the presence/absence of a received signal (S2). If the section 131a determines that there is a received signal, the section 131a returns to S1 where it starts the timer TM1.

If the control section 131a determines in S2 that there is no received signal, the section 131a further determines whether the timer TM1 has reached a predetermined value (S3). If the section 131a determines that the timer TM1 has not reached the predetermined value, the section 131a returns to S2 where the section 131a repeats the steps until the timer TM1 reaches the predetermined value.

If the timer TM1 has reached the predetermined value in S3, the section 131a stands by for a transmission in this state (S4) and either determines whether there will be a transmit request or determines whether there is no received signal (S5).

if there is a transmit request, the transmitter section 14 immediately transmits a tone signal (S6), because it is already checked that there is no received signal for the conventional predetermined time Twait. In contrast, if there is a received signal in S5, the operation returns again to S1.

By implementing a state machine which executes this operation, the presence/absence of a received signal is determined before a transmit request. If there occurs a transmit request in a state where there has been no received signal for a predetermined time or more, a transmission can be started immediately in a predetermined format.

In this manner, in the transmitter apparatus 1a of the present embodiment, when there occurs a transmit request inside a circuit section or outside a circuit section, the transmitter section 14a immediately transmits a tone signal if a predetermined time has elapsed since the activation or resetting of the timer TM1. In contrast, if the predetermined time has not elapsed since the activation or resetting of the timer TM1, the tone signal is transmitted after the predetermined time elapses.

Therefore, a transmission can be started more quickly than the existing communications method where a received signal is monitored after a transmit request is started inside or outside a circuit. It takes less time to establish a connection.

Figure 52:
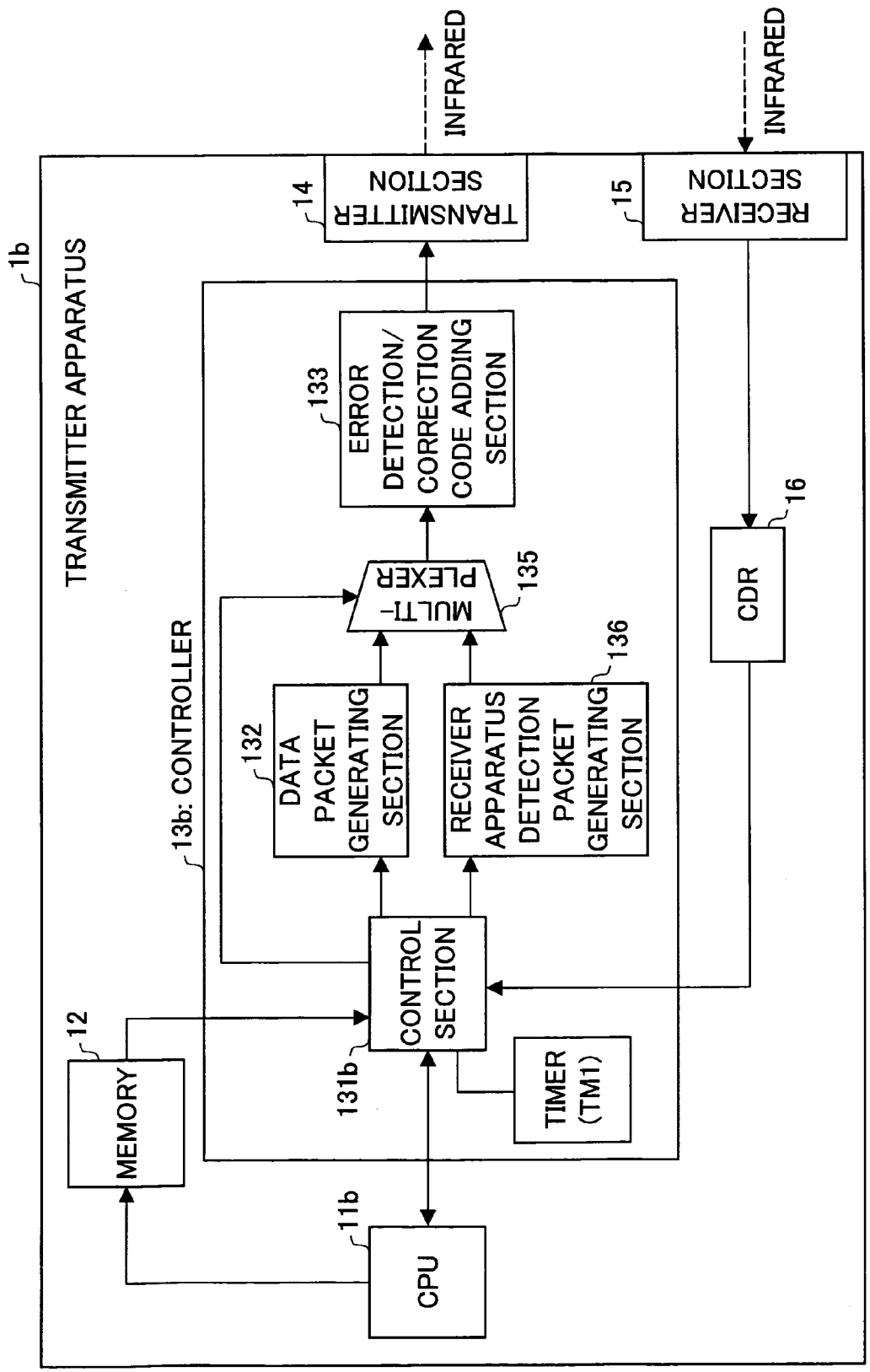
FIG. 52 is a block diagram illustrating another configuration of the transmitter apparatus.
Figure 53:
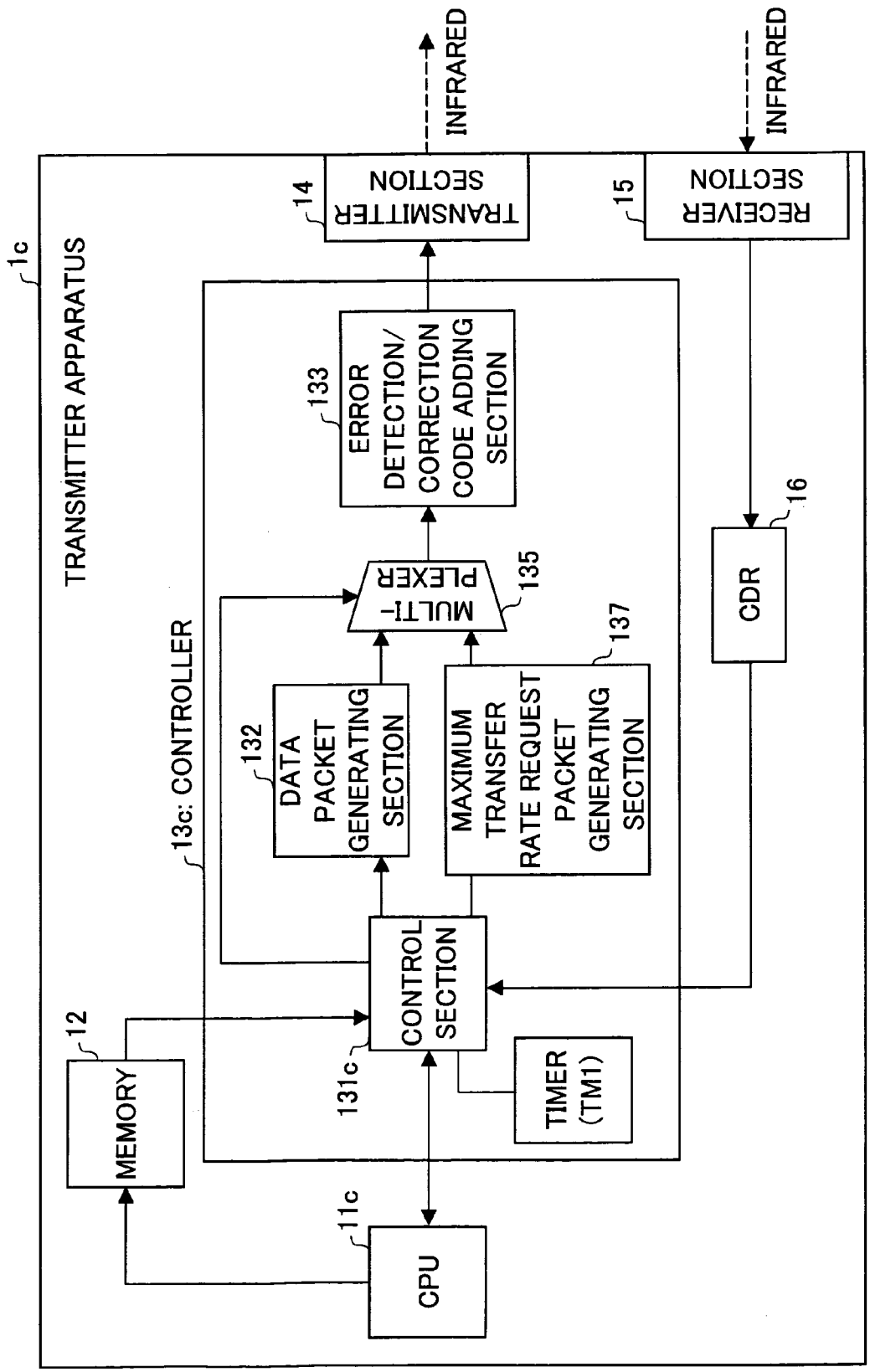
FIG. 53 is a block diagram illustrating a further configuration of the transmitter apparatus.

In the present embodiment, the timer TM1 is provide to the control section 131a in the controller 13a in the transmitter apparatus 1a. Alternatively, for example, as shown in FIG. 52 and FIG. 53, the transmitter apparatuses 1b, 1c may also contain a timer TM1 as a first timer to measure the elapsed time; a control section 131b, 131c as a received signal presence/absence determine section determining the presence/absence of a received signal from the receiver apparatus 2b, 2c as the receiver; and a control section 131b, 131c as a timer activate/reset section activating the timer TM1 on the basis of the control section 131b, 131c determining that there is no received signal and resetting the timer TM1 on the basis of the control section 131b, 131c determining that there is a received signal.

In these transmitter apparatuses 1b, 1c, when there occurs a transmit request, the transmitter section 14 as a first transmitter section immediately transmits the information generated by the receiver apparatus detection packet generating section 136 or the maximum transfer rate request packet generating section 137 as information generating sections if the predetermined time has elapsed since the activation or resetting of the timer TM1, whereas if the predetermined time has not elapsed since the activation or resetting of the timer TM1 the transmitter section 14 transmits the information generated by the receiver apparatus detection packet generating section 136 or the maximum transfer rate request packet generating section 137 after the predetermined time elapses.

Therefore, a transmission can be started more quickly than the existing communications method where a received signal is monitored after a transmit request is started inside or outside a circuit. It takes less time to establish a connection.

Embodiment 14

The following will describe a further embodiment of the present invention in reference to FIG. 54 through FIG. 59. The arrangement of the present embodiment is the same as those of embodiments 1 to 13 unless otherwise stated. For convenience, members of the present embodiment that have the same function as members of the above embodiments, and that are mentioned in those embodiments are indicated by the same reference numerals and description thereof is omitted.

The present embodiment will describe switching to IrDA data transmission when a device has failed to establish a connection.

The following will describe transmission from a mobile phone to a video storage device, a storage device, a printer, a mobile phone, and a projector in this order.

[Image Transfer from Mobile Phone and Image Display on Video Output Device]

Figure 54:
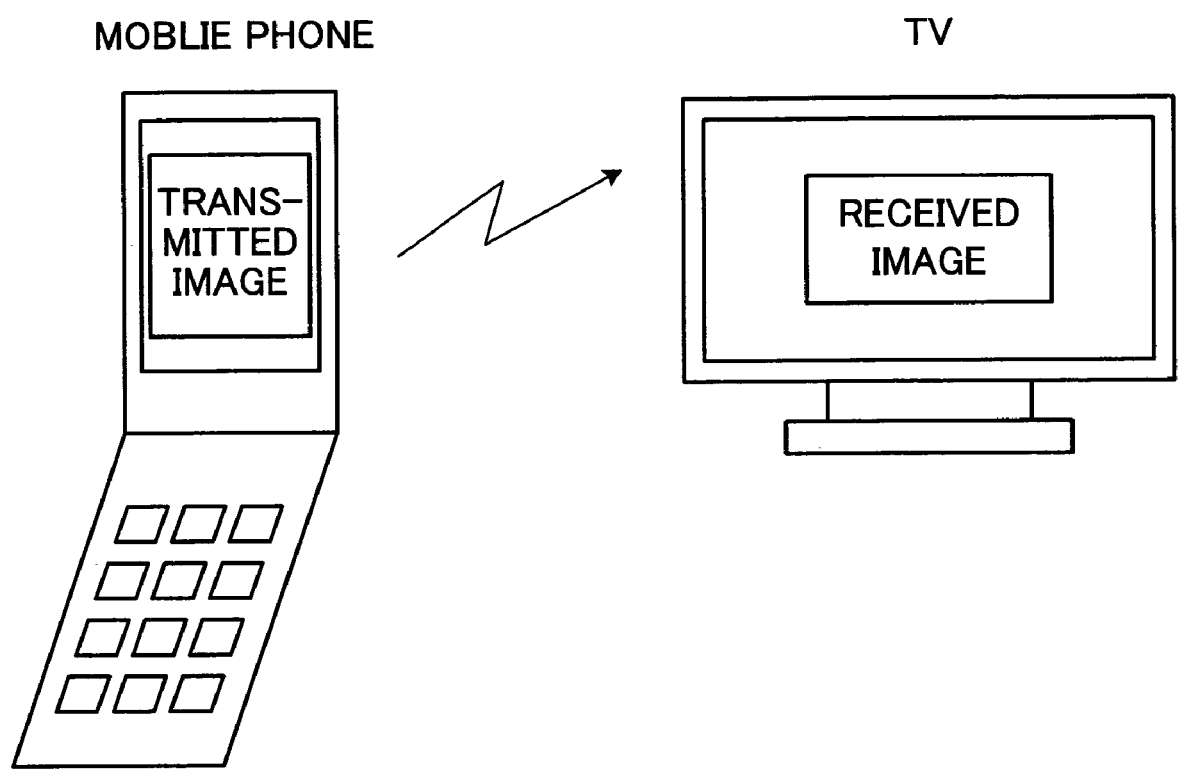
FIG. 54, showing a further embodiment of the present invention, is a drawing illustrating image transfer between a mobile phone and a video storage device.

For example, as shown in FIG. 54, a mobile terminal device such as a mobile phone transfers the following data to a video output device, such as a TV or a monitor, by infrared or other wireless communications:

(1) image data stored in a digital camera or a digital video camera;

(2) image data such as still pictures and movies taken on a built-in camera of a mobile phone, PDA (personal digital assistant), or other mobile terminal device;

(3) image data such as still pictures and movies stored in the mobile terminal device;

(4) text data such as electronic name cards, email addresses, and URLs stored in the mobile terminal device;

(5) image data such as still pictures and movies and text data such as electronic name cards, email addresses, and URLs in recording media such as SD cards, compact flash (registered trademark), and other memory cards, or hard disks connected to the mobile terminal device; and (6) image and text data stored in a mobile recording medium with a built-in hard disk, flash memory, or other recording medium.

Upon receiving the data, a video output device, such as a TV or a monitor, compresses/decompresses and otherwise processes the received data where necessary, to produce a display. Therefore, by using the transmitter apparatuses 1a, 1b, 1c and the receiver apparatuses 2a, 2b, 2c of present embodiments 1 to 13, the data transmission end device like the mobile terminal device and the reception end device like the video output device can transmit/receive data at high speeds after establishing a connection by means of the tone signal or the packets containing information containing a transferable rate. Since data is checked for errors at the receiving end, a highly reliable system can be built.

When the transmission end device is equipped with a protocol of embodiments 1 to 13 and an IrDA protocol, the reception end device is in some cases not equipped with that protocol of embodiments 1 to 13, but only with the IrDA protocol.

Figure 55:
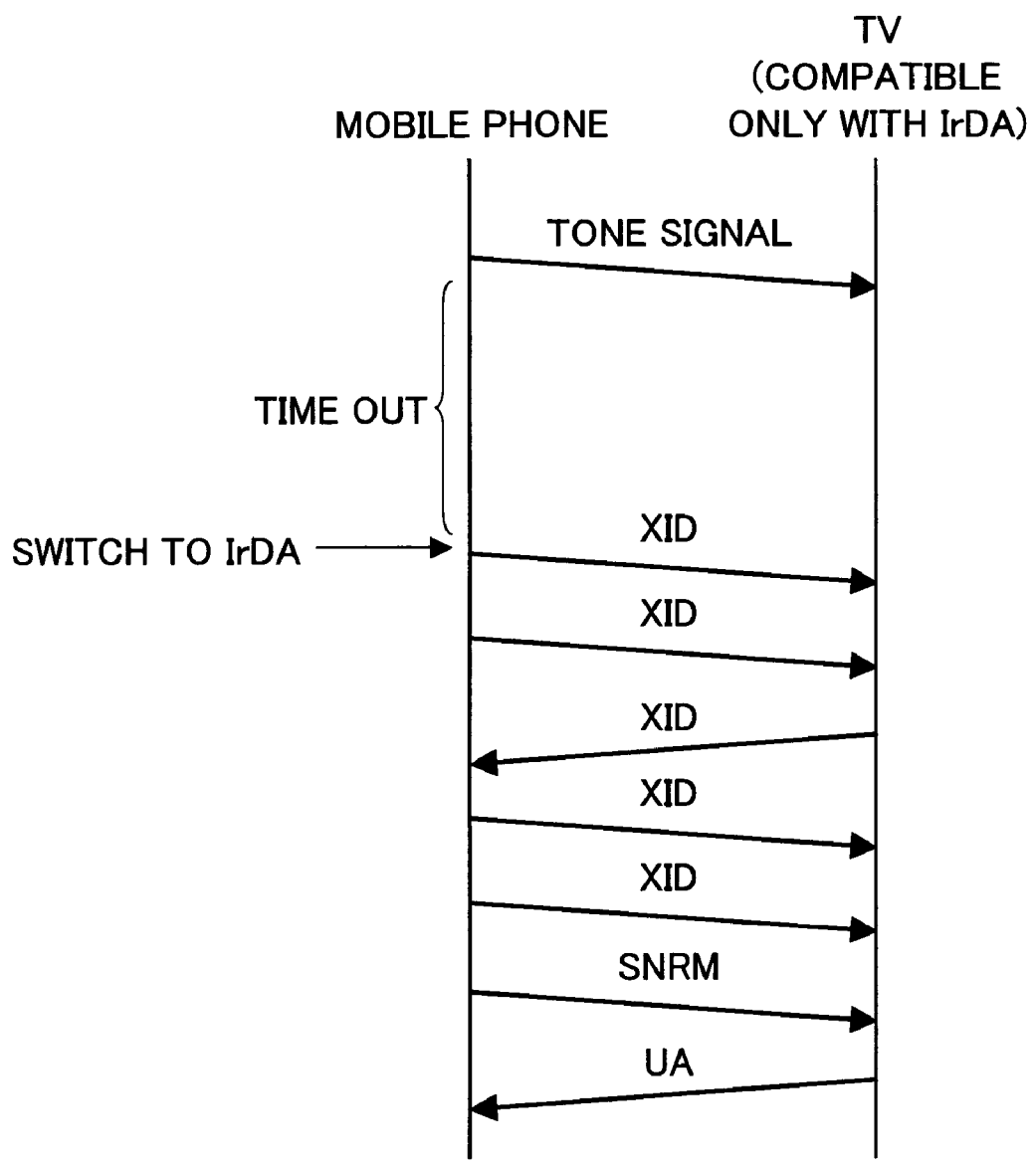
FIG. 55 is a timing chart illustrating data transmission procedures when connection has failed.

In the present embodiment, when this is the case, as shown in FIG. 55, when the transmission end device fails to connect by the protocol of embodiments 1 to 13, the device switches to the IrDA protocol for another attempt at a data transfer so that the device can transfer data by the IrDA protocol.

[Image Transfer from Mobile Phone and Image Recording in Video Storage Device]

Figure 56:
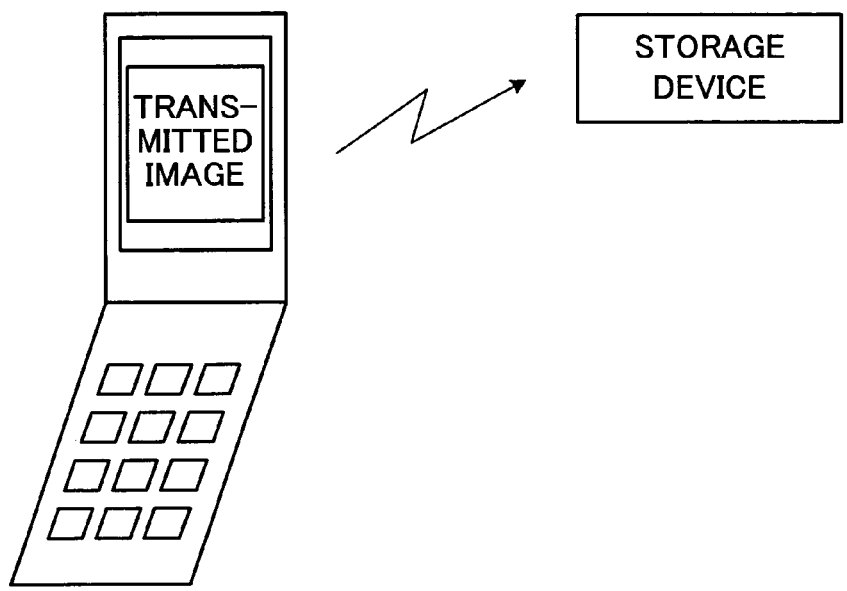
FIG. 56 is a drawing illustrating image transfer between a mobile phone and a storage device.

For example, as shown in FIG. 56, a mobile terminal device such as a mobile phone transfers the following data to a storage device, such as a DVD recorder, a hard disk recorder, or a video recorder, by infrared or other wireless communications:

(1) image data stored in a digital camera or a digital video camera;

(2) image data such as still pictures and movies taken on a built-in camera of a mobile phone, PDA, or other mobile terminal device;

(3) image data such as still pictures and movies stored in the mobile terminal device;

(4) text data such as electronic name cards, email addresses, and URLs stored in the mobile terminal device;

(5) image data such as still pictures and movies and text data such as electronic name cards, email addresses, and URLs in recording media such as SD cards, compact flash (registered trademark), and other memory cards, or hard disks connected to the mobile terminal device; and (6) image data and text data stored in a mobile recording medium with a built-in hard disk, flash memory, or other recording medium.

Upon receiving the data, the storage device compresses/decompresses and otherwise processes the received data where necessary, to record on an internal DVD, hard disk, video tape, or other recording medium. Therefore, by using the transmitter apparatuses 1a, 1b, 1c and the receiver apparatuses 2a, 2b, 2c of present embodiments 1 to 13, the data transmission end device like the mobile terminal device and the reception end device like the storage device can transmit/receive data at high speeds after establishing a connection by means of the tone signal or the packets containing information containing a transferable rate. Since data is checked for errors at the receiving end, a high reliable system can be built.

When the transmission end device is equipped with a protocol of embodiments 1 to 13 and an IrDA protocol, the reception end device is in some cases not equipped with that protocol of embodiments 1 to 13, but only with the IrDA protocol.

In the present embodiment, when this is the case, as shown in FIG. 55, when the transmission end device fails to connect by the protocol of embodiments 1 to 13, the device switches to the IrDA protocol for another attempt at a data transfer so that the device can transfer data by the IrDA protocol.

[Image Transfer from Mobile Phone and Image Print on Printer]

Figure 57:
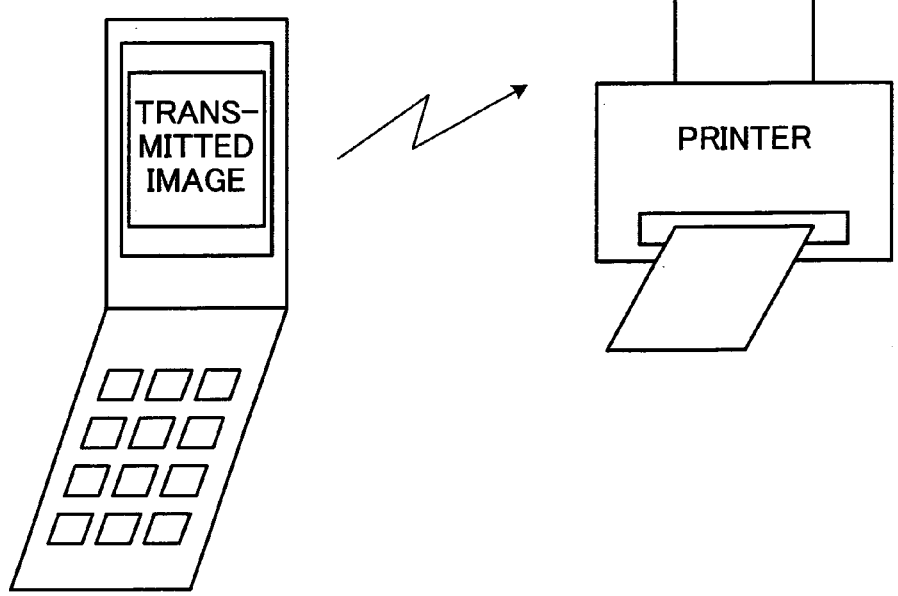
FIG. 57 is a drawing illustrating image transfer between a mobile phone and a printer.

For example, as shown in FIG. 57, a mobile terminal device such as a mobile phone transfers the following data to an output device such as a printer by infrared or other wireless communications:

(1) image data stored in a digital camera or a digital video camera;
(2) image data such as still pictures and movies taken on a built-in camera of a mobile phone, PDA, or other mobile terminal device;
(3) image data such as still pictures and movies stored in the mobile terminal device;
(4) text data such as electronic name cards, email addresses, and URLs stored in the mobile terminal device;
(5) image data such as still pictures and movies and text data such as electronic name cards, email addresses, and URLs in recording media such as SD cards, compact flash (registered trademark), and other memory cards, or hard disks connected to the mobile terminal device; and
(6) image data and text data stored in a mobile recording medium with a built-in hard disk, flash memory, or other recording medium.

Upon receiving the data, the printer or other output device compresses/decompresses and otherwise processes the received data where necessary, to print. Therefore, by using the transmitter apparatuses $1a$, $1b$, $1c$ and the receiver apparatuses $2a$, $2b$, $2c$ of present embodiments 1 to 13, the data transmission end device like the mobile terminal device and the reception end device like the printer or other printer device can transmit/receive data at high speeds after establishing a connection by means of the tone signal or the packets containing information containing a transferable rate. Since data is checked for errors at the receiving end, a high reliable system can be built.

When the transmission end device is equipped with a protocol of embodiments 1 to 13 and an IrDA protocol, the reception end device is in some cases not equipped with that protocol of embodiments 1 to 13, but only with the IrDA protocol.

In the present embodiment, when this is the case, as shown in FIG. 55, when the transmission end device fails to connect by the protocol of embodiments 1 to 13, the device switches to the IrDA protocol for another attempt at a data transfer so that the device can transfer data by the IrDA protocol.

[Image Transfer from Mobile Phone and Image Recording on Mobile Phone, etc.]

Figure 58:
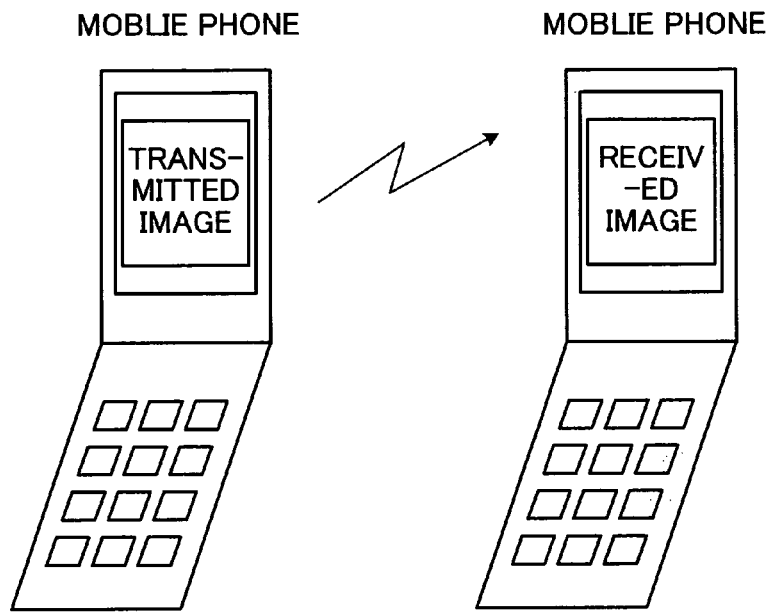
FIG. 58 is a drawing illustrating image transfer between a mobile phone and another mobile phone.

For example, as shown in FIG. 58, a mobile terminal device such as a mobile phone transfers the following data to a mobile terminal device such as another mobile phone and PDA and an information processing terminal device such as a personal computer by infrared or other wireless communications:

(1) image data stored in a digital camera or a digital video camera;
(2) image data such as still pictures and movies taken on a built-in camera of a mobile phone, PDA, or other mobile terminal device;
(3) image data such as still pictures and movies stored in the mobile terminal device;
(4) text data such as electronic name cards, email addresses, and URLs stored in the mobile terminal device; and
(5) image data such as still pictures and movies and text data such as electronic name cards, email addresses, and URLs in recording media such as SD cards, compact flash (registered trademark), and other memory cards, or hard disks connected to the mobile terminal device.

Upon receiving the data, the mobile terminal device or other information processing terminal device which is the receiving end compresses/decompresses and otherwise processes the received data where necessary, to store. Therefore, by using the transmitter apparatuses $1a$, $1b$, $1c$ and the receiver apparatuses $2a$, $2b$, $2c$ of present embodiments 1 to 13, the data transmission end device like the mobile terminal device and the reception end device like the mobile terminal device and the information processing terminal device can transmit/receive data at high speeds after establishing a connection by means of the tone signal or the packets containing information containing a transferable rate. Since data is checked for errors at the receiving end, a high reliable system can be built.

When the transmission end device is equipped with a protocol of embodiments 1 to 13 and an IrDA protocol, the reception end device is in some cases not equipped with that protocol of embodiments 1 to 13, but only with the IrDA protocol.

In the present embodiment, when this is the case, as shown in FIG. 55, when the transmission end device fails to connect by the protocol of embodiments 1 to 13, the device switches to the IrDA protocol for another attempt at a data transfer so that the device can transfer data by the IrDA protocol.

[Image Transfer from Mobile Phone and Personal Computer and Image Display on Projector]

Figure 59:
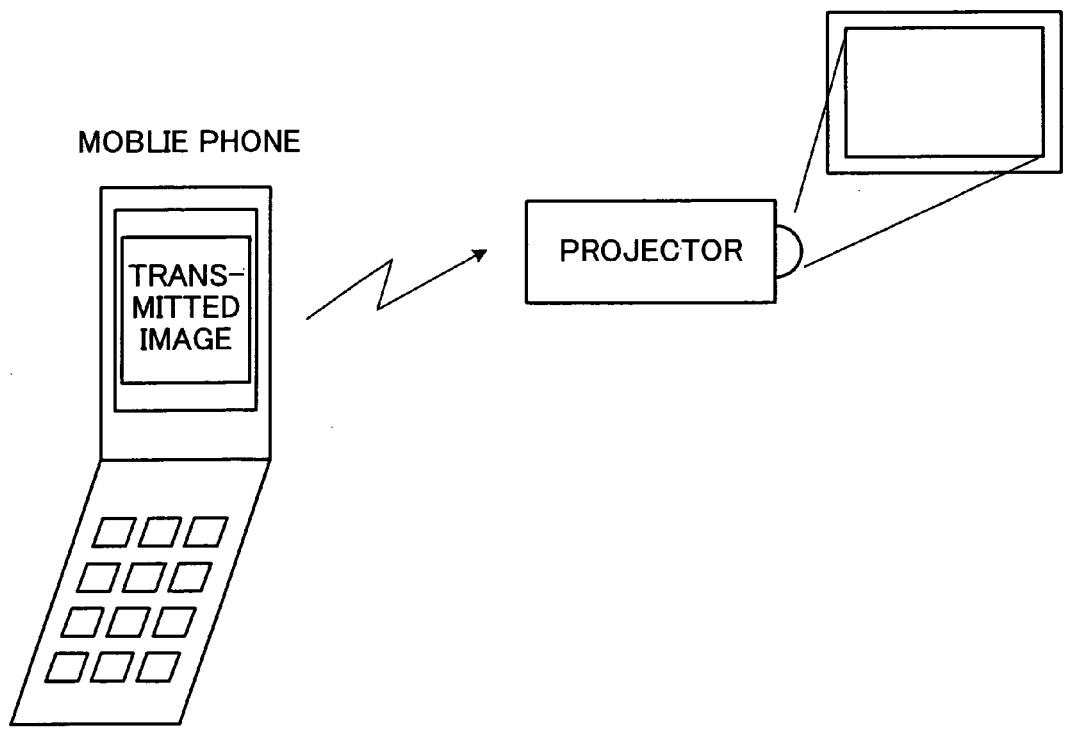
FIG. 59 is a drawing illustrating image transfer between a mobile phone and a projector.
Figure 60:
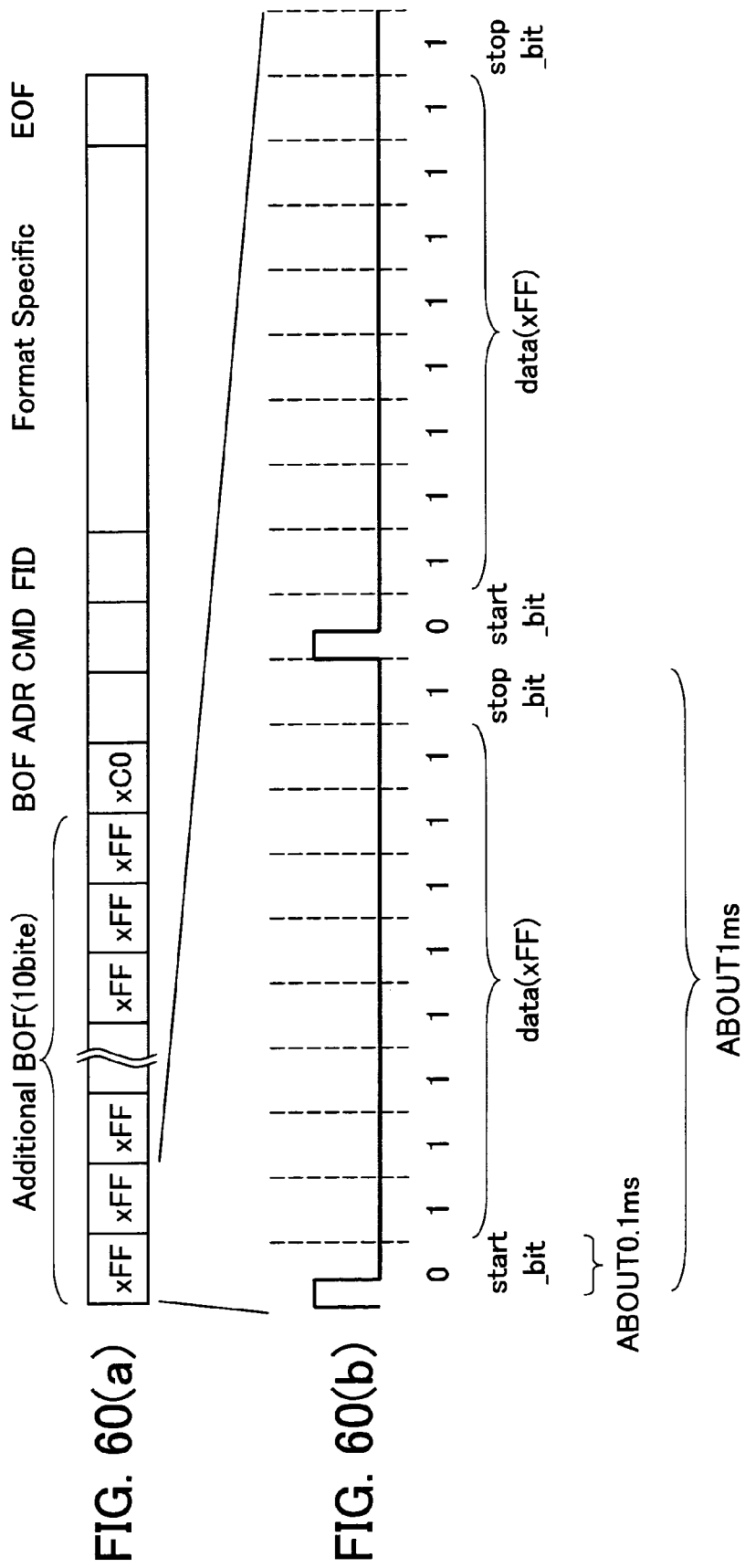
FIG. 60(*a*) is a partial illustration of the structure of an IrDA XID packet format at 9600 bps.

For example, as shown in FIG. 59, a personal computer and a mobile terminal device such as a mobile phone transfer the following data to a projector device such as a projector by infrared or other wireless communications:

(1) image data stored in a digital camera or digital video camera;
(2) image data such as still pictures and movies taken on a built-in camera of a mobile phone, PDA, or other mobile terminal device;
(3) image data such as still pictures and movies stored in the mobile terminal device;
(4) text data such as electronic name cards, email addresses, and URLs stored in the mobile terminal device;
(5) image data such as still pictures and movies and text data such as electronic name cards, email addresses, and URLs in recording media such as SD cards, compact flash (registered trademark), and other memory cards, or hard disks connected to the mobile terminal device; and
(6) image data and text data stored in a personal computer.

Upon receiving the data, the projector device which is the receiving end compresses/decompresses and otherwise processes the received data where necessary, to output. Therefore, by using the transmitter apparatuses $1a$, $1b$, $1c$ and the receiver apparatuses $2a$, $2b$, $2c$ of present embodiments 1 to 13, the data transmission end device such as a mobile terminal device and a personal computer and the reception end device which is the projector device such as a projector can transmit/receive data at high speeds after establishing a connection by means of the tone signal or the packets containing information containing a transferable rate. Since data is checked for errors at the receiving end, a high reliable system can be built.

When the transmission end device is equipped with a protocol of embodiments 1 to 13 and an IrDA protocol, the reception end device is in some cases not equipped with that protocol of embodiments 1 to 13, but only with the IrDA protocol.

In the present embodiment, when this is the case, as shown in FIG. 55, when the transmission end device fails to connect by the protocol of embodiments 1 to 13, the device switches to the IrDA protocol for another attempt at a data transfer so that the device can transfer data by the IrDA protocol.

The foregoing description assumes that the receiver apparatus is a video storage device, a storage device, a printer, a mobile phone, a projector, etc. Alternatively, the transmitter device may be a video storage device, a storage device, a printer, a mobile phone, a projector, etc.

As described above, the mobile terminal device, such as the mobile phone and the personal digital assistant (PDA), the personal computer, the digital camera, the digital video camera, and the mobile storage device of the present embodiment have one of the transmitters of the foregoing embodiments or one of the transmission programs of the foregoing embodiments contained in a computer-readable recording medium so as to transmit transfer data. These devices are further provided with the IrDA protocol through either hardware or software so that when the device involved in the communications cannot be recognized by the transmission of either a tone signal or a packet containing information generated by the information generating section, the data is transferred according to the IrDA protocol.

In addition, the mobile storage device of the present embodiment has one of the transmitters of the foregoing embodiments or the transmission program of the foregoing embodiment contained in a recording medium such as a computer-readable hard disk drive and flash memory. Alternatively, the mobile storage device of the present embodiment is connectable to a recording medium, such as a computer-readable hard disk drive or flash memory, containing the transmission program of the foregoing embodiment. The mobile storage device transmits data and is provided with the IrDA protocol through either hardware or software so that when the device involved in the communications cannot be recognized by the transmission of either a tone signal or a packet containing information generated by the information generating section, the data is transferred according to the IrDA protocol.

Therefore, if the device fails to establish a connection, the device switches to the IrDA protocol for an attempt at a data transmission/reception. Thus, if the receiving end is compatible with the IrDA protocol, data can be transmitted/received.

Embodiment 15

The following will describe a further embodiment of the present invention in reference to FIG. 60 through FIG. 63. The arrangement of the present embodiment is the same as those of embodiments 1 to 14 unless otherwise stated. For convenience, members of the present embodiment that have the same function as members of the above embodiments, and that are mentioned in those embodiments are indicated by the same reference numerals and description thereof is omitted.

Similarly to embodiment 14, the present embodiment will again describe switching to IrDA data transmission when a device has failed to establish a connection. In addition, the present embodiment will describe how to discriminate between an XID packet and the other packets at IrDA 9600 bps.

An IrDA 9600-bps XID packet includes, as shown in FIG. 60(a), a 10-byte additional BOF (beginning of frame) field, a 1-byte BOF field, a 1-byte address field, a 1-byte XID command field, a 1-byte format identifier field, an n-byte format specific field, and a 1-byte EOF (end of frame) field.

The BOF field indicates the head of a frame. The IrLAP standard, one of the IrDA standards, stipulates that three should be specified a xC0. The address field contains an address. The address field of the XID packet transmitted from a transmitting end contains a xFF. The additional BOF field is added to the head of the frame. The IrLAP standard, one of the IrDA standards, stipulates that the additional BOF field is 10 bytes long for the 9600-bps XID packet. The EOF field indicates the tail of the frame. The IrLAP standard, one of the IrDA standards, stipulates that the EOF field contains a xC1. The XID command field, the format identifier field, and the format specific field are not directly related to the present invention; description is therefore omitted.

Here, FIG. 60(b) shows 2 bytes of the additional BOF field as modulated by SIR modulation, In SIR modulation, a start bit 0 and a stop bit 1 are added to 1-byte transmission data when the data is converted to serial. In addition, an unmodulated 0 is modulated to a 1, and an unmodulated 1 to a 0. That is, the 1-byte transmit data of the xFF is modulated to a bit series of "1000000000."

The receiving end detects a start bit upon the rising or falling edge of the received signal and automatically produces 8-bit (or 9-bit, including a stop bit) temporal slots. It would be appreciated that if a rising or falling edge is detected in a slot, the bit corresponding to that slot number is a 0 and also that if no edge is detected, the bit is a 1.

At 9600 bps, it takes about 0.1 ms to transmit one bit. So, the 1-byte additional BOF needs about 1 ms for transmission. As mentioned above, the 10-byte additional BOF is transmitted successively. If the receiving end receives all 10 bytes of the additional BOF normally, it detects 10, each lasting 1 ms.

Based on these principles, the receiving end can determine that it is receiving part of a XID packet while it is receiving the additional BOF of the 9600-bps XID packet; the IrDA protocol is not involved. Therefore, a switching can be made from a protocol other than the IrDA protocol to the IrDA protocol for uninterrupted operation.

Figure 61:
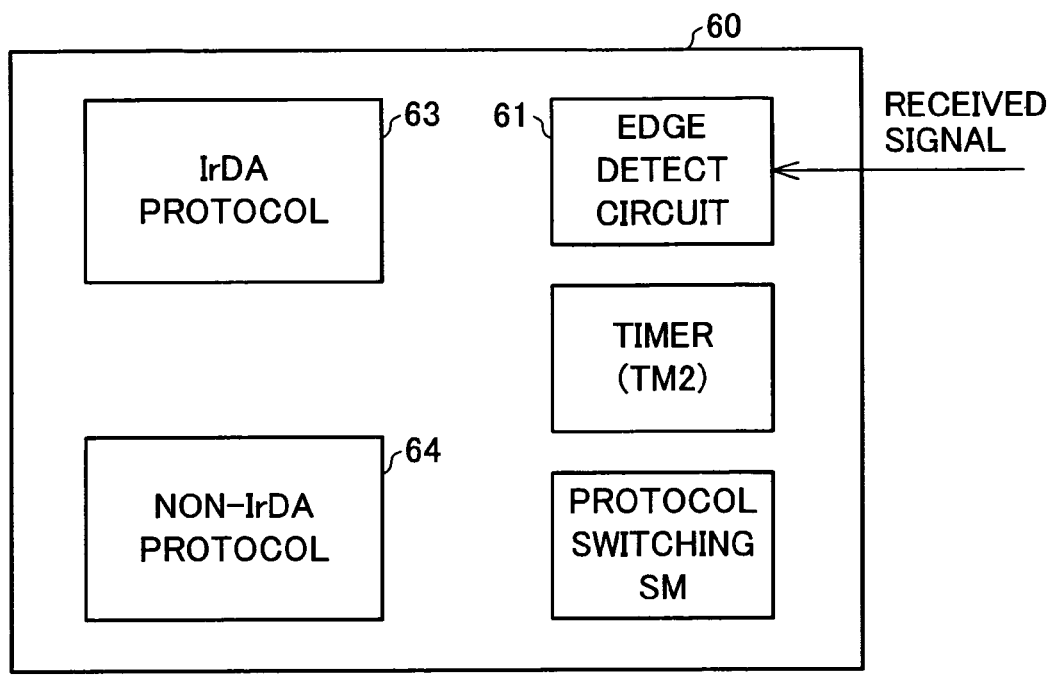
FIG. 61 is a block diagram illustrating a configuration of an IrDA selector section.

To enable switching to the IrDA protocol based on the principles, the receiver apparatuses 2, 2a to 2s of the present embodiment contains an IrDA selector section 60 in the controllers 23, 23a to 23s as shown in FIG. 61.

The IrDA selector section 60 contains an edge detect circuit 61, a timer TM2, a protocol switch state machine SM, and the control section 231, 231a to 231s. The edge detect circuit 61 is an edge detector section detecting a rising or falling edge of a received signal. The timer TM2 is a second timer which measures the elapsed time. The protocol switch state machine SM is a protocol switching section which switches between communications protocols. The control section 231, 231a to 231s is a receipt discrimination section determining whether a signal which corresponds to part or all of the 9600-bps XID packet has been received.

In the IrDA selector section 60 of such a configuration, a received signal is coupled to the edge detect circuit 61. The edge detect circuit 61 sends a notification to the protocol switch state machine SM where either a rising or falling edge is detected. The protocol switch state machine SM calculates intervals between edges from the readings on the timer TM2 at the edge detect timings. Then, the protocol switch state machine SM sets a maximum and a minimum value for edge intervals to, for example, about 1.2 ms and 0.8 ms (these are mere examples; other values are equally possible). If the detected edge intervals fall between the maximum and minimum values, the machine SM determines that the incoming signal is part or all of the 9600-bps XID packet and switches to the IrDA protocol 63.

Thus, the method dynamically triggers the IrDA protocol 63 or enables switching from a protocol other than the IrDA protocol 63 to the IrDA protocol 63 upon detection of part of the 9600-bps XID packet.

The foregoing describes a method of discriminating between a XID packet and the other packets at IrDA 9600 bps. An alternative method is possible.

Figure 62:
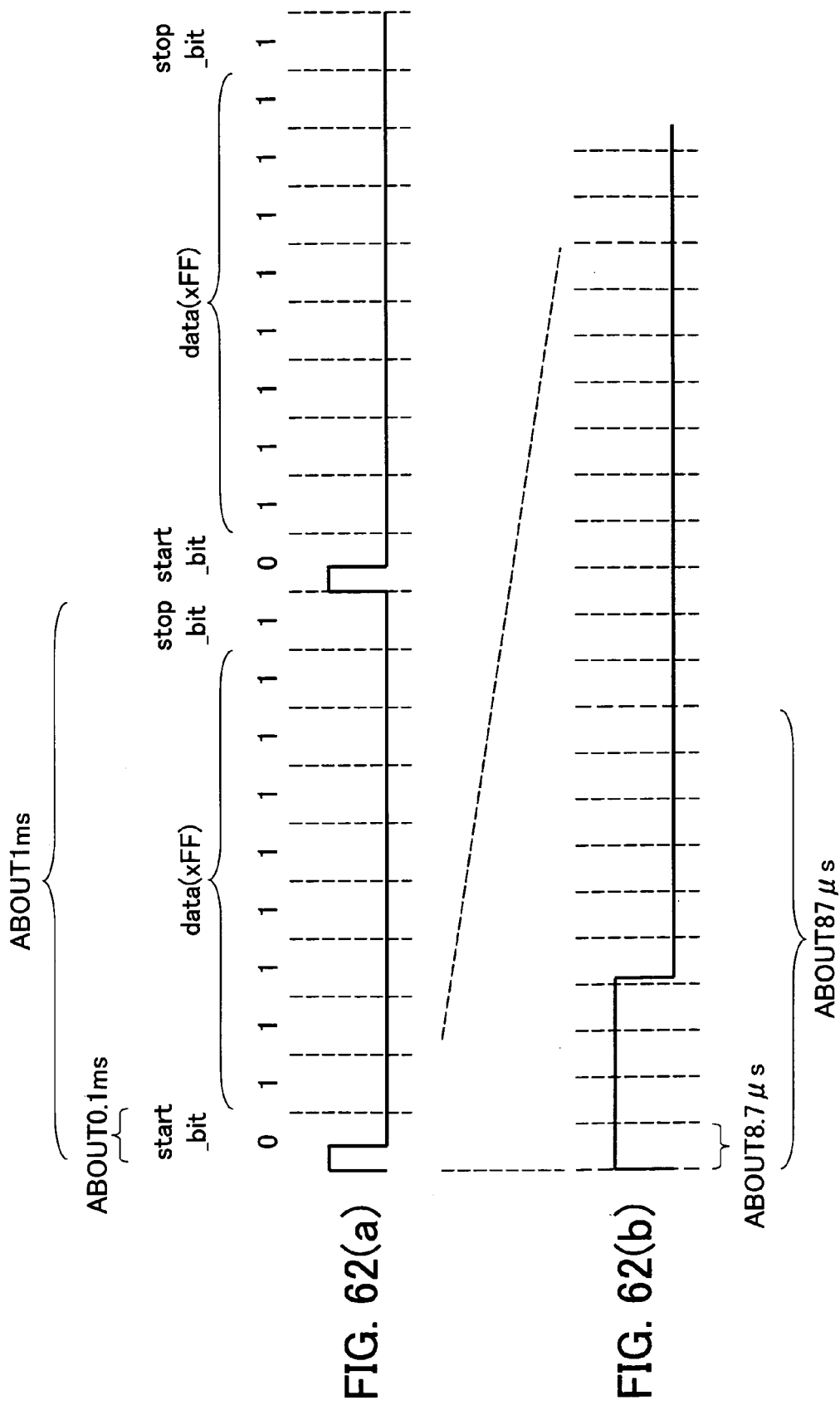
FIG. 62(*a*) is a timing chart illustrating IrDA 9600 bps.

Referring to FIGS. 62(*a*), 62(*b*), assume, for example, that the first 2 bits of the additional BOF field of a 9600-bps XID packet is fed to an SIR demodulator circuit which is operating in a mode of demodulating a SIR 115-kbps signal and a bit series of the first 2 bits of the additional BOF field of a 9600-bps XID packet.

When this is the case, in the SIR 115 kbps reception mode, when a rising or falling edge is detected, a bit is assigned to each slot with the about 8.7 μs time slot being the minimum unit. For example, if a 9600-bps additional BOF is fed, the subsequent slots are determined at the first rising edge (or falling edge). Nevertheless, as shown in FIG. 62(*b*), no edge comes along during the 87 μs which is a period equivalent to 1 byte; therefore, the received data is demodulated to "11111111."

A next edge arrives about 1 ms later. In that case, the received data is again demodulated to "11111111." That is, in the additional BOF of a 9600-bps XID packet, when the SIR demodulator circuit is demodulating in 115-kbps mode, demodulated data "11111111" is written to a FIFO memory in about 1 ms. In the above description, data is written to the FIFO memory on a byte-by-byte basis, hence at a cycle of about 1 ms. However, for example, if two bytes are written in one cycle, data is written to the FIFO memory at a doubled cycle of about 2 ms.

Therefore, based on the principles, the receiving end can determine that it is receiving part of a XID packet while it is receiving the additional BOF of the 9600-bps XID packet; the IrDA protocol is not involved. Therefore, a switching can be made from a protocol other than the IrDA protocol to the IrDA protocol for uninterrupted operation.

Figure 63:
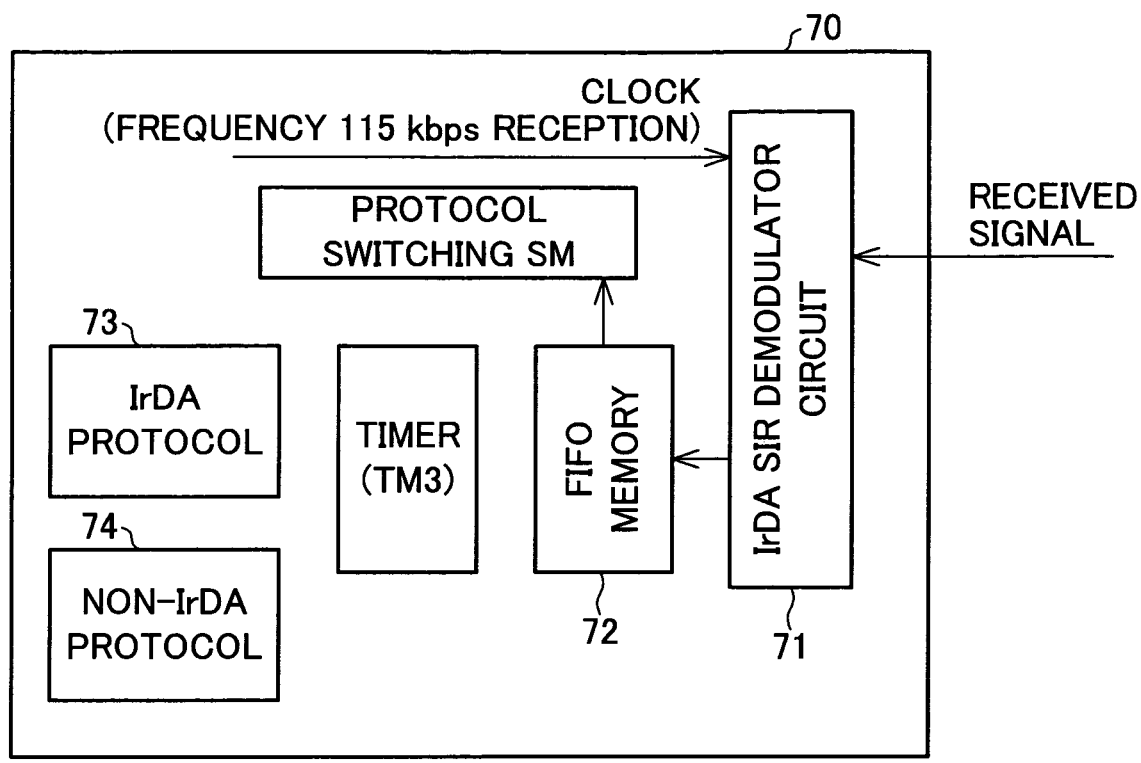
FIG. 63 is a block diagram illustrating a configuration of another IrDA selector section.

To enable switching to the IrDA protocol based on the principles, the receiver apparatuses 2, 2*a* to 2*s* of the present embodiment may contain an IrDA selector section 70 in the controllers 23, 23*a* to 23*s* as shown in FIG. 63.

The IrDA selector section 70 contains, as shown in the figure, an IrDA SIR demodulator circuit 71, a protocol switch state machine SM, the control section 231, 231*a* to 231*s*, a FIFO memory 72, a timer TM3, and the control section 231, 231*a* to 231*s*. The protocol switch state machine SM is a protocol switching section which switches between communications protocols. The control section 231, 231*a* to 231*s* is a receipt discrimination section determining whether a signal which corresponds to part or all of the 9600-bps XID packet has been received. The FIFO memory 72 is a first-in/first-out device. The timer TM3 is a third timer which measures the elapsed time. The control section 231, 231*a* to 231*s* is a signal reception frequency switching section which switches between signal reception frequencies.

In the IrDA selector section 70, the 9600-bps XID packet is fed to the SIR demodulator circuit 71. The SIR demodulator circuit 71 is assumed to operate at 115 kbps. When a 9600-bps XID packet is fed the SIR demodulator circuit 71 operating in 115 kbps reception mode, as mentioned above, the demodulated data of xFF is written to the FIFO memory 72 at an about 1 ms cycle if the bit width of the FIFO memory 72 is 8 bits.

The protocol switch state machine SM is monitoring a write enable signal for the FIFO memory 72, an empty signal for the FIFO memory 72, or an interrupt signal indicating that the FIFO memory 72 is ready for writing. To this end, the writing cycle for the FIFO memory 72 are measured from the elapsed time as measured by the timer TM3 based on the write timings of demodulated data into the FIFO memory 72 by the monitoring of one of the signals. When the bit width of the FIFO memory 72 is, for example, 8 bits, if the writing cycle falls between the predetermined maximum of 1.2 ms and minimum of 0.8 ms (These values is a rough guidance to determine the 1-ms cycle. Other values are equally possible), the machine SM determines that it is receiving a 9600-bps XID packet and switches to the IrDA protocol 73 for continuous operation.

The writing cycle for the FIFO memory 72 varies depending on the bit width of the FIFO memory 72. Therefore, the maximum and minimum values may be varied depending on the bit width of the FIFO memory 72. In addition, when the SIR demodulator circuit 71 is operating in a reception mode at a rate other than 115 kbps, a receipt of a 9600-bps XID packet can be similarly detected by setting to appropriate values the maximum and minimum values for the elapsed time given by the timer TM3 which measures the writing cycle for the FIFO memory 72.

Using the above method, it becomes possible to operate the IrDA protocol 73 from a state where the device is not operating by the IrDA protocol 73 by detecting part of a 9600-bps XID packet. It becomes possible to dynamically switch to the IrDA protocol 73 from a state where a non-IrDA protocol 74 is operating and a state where no protocol is operating.

In addition, the protocol switch state machine SM and the timer TM3 can be realized through software. Therefore, if an existing IrDA controller (hardware) with the SIR demodulator circuit 71 and FIFO memory 72 being built in is provided, the IrDA protocol 73 and the non-IrDA protocol 74 can coexist owing to the software.

As described above, the mobile terminal device, such as the mobile phone and the personal digital assistant (PDA), the personal computer, the digital camera, the digital video camera, and the mobile storage device of the present embodiment have one of the receivers of the foregoing embodiments or one of the reception programs of the foregoing embodiments contained in a computer-readable recording medium so as to receive data. These devices are further provided with the IrDA protocol 63 through either hardware or software so that when at least the received signal is being monitored, and at least a signal has been received which corresponds to part or all of a 9600-bps XID packet, the devices can switch to the IrDA protocol to transmit/receive data according to the IrDA protocol.

In addition, the mobile terminal device, such as the mobile phone and the personal digital assistant (PDA), the personal computer, the digital camera, the digital video camera, and the mobile storage device of the present embodiment contain the timer TM2 which measures the elapsed time, the edge detect circuit 61 detecting a rising or falling edge of the received signal, the protocol switch state machine SM which switches between communications protocols, and a control section 231, 231*a* to 231*s* determining whether a signal which corresponds to part or all of the 9600-bps XID packet has been received. Then, the timer TM2 measures an interval from a rising edge to a next rising edge of a received signal or an interval from a falling edge to a next falling edge of a received signal, as detected by the edge detect circuit 61. Further, if the control section 231, 231a to 231s determines that the interval falls in the predetermined range between the maximum and minimum values, the control section 231, 231a to 231s determines that the received signal is part of a 9600-bps XID packet. The protocol switch state machine SM switches to the IrDA protocol 63 based on the determination that the received signal is part of a XID packet.

In addition, the mobile terminal device, such as the mobile phone and the personal digital assistant (PDA), the personal computer, the digital camera, the digital video camera, and the mobile storage device of the present embodiment contain the IrDA SIR demodulator circuit 71, the protocol switch state machine SM switching between communications protocols, and a control section 231, 231a to 231s which determines whether a signal corresponding to part or all of a 9600-bps XID packet has been received. In addition, in a state where the SIR demodulator circuit 71 is operating, when demodulated based on a clock other than a clock needed to demodulate a 9600-bps signal, the control section 231, 231a to 231s determines that the received signal is part of a 9600-bps XID packet if the demodulated data of the demodulated nx8 bits (n is an integer from 1 to 10 inclusive) is a bit pattern where all bits are 1s in binary representation. Then, the protocol switch state machine SM switches to the IrDA protocol based on the determination that the received signal is part of a XID packet.

In addition, the mobile terminal device, such as the mobile phone and the personal digital assistant (PDA), the personal computer, the digital camera, the digital video camera, and the mobile storage device of the present embodiment contain the timer TM3 which measures the elapsed time, the FIFO memory 72 which is a first-in/first-out device, and a control section 231, 231a to 231s switching between signal reception frequencies. In addition, the timer TM3 measures the time it takes for the demodulated data to be written into the FIFO memory 72, the time it takes for the data in the FIFO memory 72 to be available for retrieval, or the interrupt interval indicating that the FIFO memory 72 is not empty. If the measured time falls between the predetermined maximum and minimum values, the control section 231, 231a to 231s determines that part of a 9600-bps XID packet has been has been received. Then, the control section 231, 231a to 231s switches the clock to the 9600-bps signal reception frequency based on the determination that the received signal is part of a XID packet.

Therefore, a specific means can be provided which, if an attempt to establish a connect has failed, switches to the IrDA protocol and attempts to transmit/receive data. If the receiving end is compatible with the IrDA protocol, the means can transmit/receive the data.

The present invention is by no means limited by the foregoing embodiments. The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

A transmitter in accordance with the present invention, to solve the problems, is a transmitter transmitting transfer data having a predetermined amount to a receiver and includes:

a dividing section dividing the transfer data into multiple divisional data sets;

an error detection information adding section adding error detection information to each of the divisional data sets produced by the dividing by the dividing section, the error detection information being information to be used to detect an error in the divisional data sets; and a first transmitter section transmitting the multiple divisional data sets all together to which the error detection information is added by the error detection information adding section.

A transmission method in accordance with the present invention, to solve the problems, is a method of transmitting transfer data having a predetermined amount to a transmitter, and involves the steps of:

dividing the transfer data into multiple divisional data sets;

adding error detection information to each of the divisional data sets, the error detection information being information to be used to detect an error in the divisional data sets; and transmitting the multiple divisional data sets all together to which the error detection information is added.

According to the configuration and method, each divisional data set has error detection information added thereto. The receiver can therefore determine whether any of the divisional data sets contains an error, and perform a predetermined process according to the divisional data sets.

In addition, the transfer data is divided into multiple divisional data sets. The multiple divisional data sets are transmitted. Therefore, even if the size of the transfer data is large, the transfer data can be transmitted by dividing the transfer data into an increased number of divisional data sets. The configuration and method hence improves reliability over the aforementioned remote controller in the transfer of large amounts of data.

In addition, the multiple divisional data sets are transmitted all together. Therefore, there is no need to perform a check with the receiver on a receipt of each divisional data set (or each predetermined divisional data set). Transfer efficiency is improved.

Further, the transmitter in accordance with the present invention, in addition to the abovementioned configuration, has a tone signal generating section generating a tone signal. The first transmitter section transmits a tone signal generated by the tone signal generating section. Thereafter, after receiving a tone signal from the receiver. the first transmitter section transmits the multiple divisional data sets.

According to the configuration, merely transmitting/receiving a tone signal with the receiver can determine the presence of the receiver and the normal operation status of the receiver. The tone signal is a digital signal represented by two values: "1" and "0" The tone signal may be any given pattern of 1s and 0s. The pattern has no meaning at all. Therefore, the circuit size of the tone signal generating section can be reduced. In addition, after receiving a tone signal from the receiver, the first transmitter section transmits the divisional data sets. Thus, the transmitter can prepare a transmission of the divisional data sets or perform other processes while waiting for a tone signal to come in from the receiver. As a result, the divisional data sets can be transmitted as soon as the tone signal is received from the receiver.

Further, the transmitter in accordance with the present invention, in addition to the abovementioned configuration, is such that the first transmitter section transmits the multiple divisional data sets also when a predetermined time has elapsed since the transmission of the tone signal generated by the tone signal generating section.

According to the configuration, the multiple divisional data sets can be transmitted also to a receiver which cannot transmit/receive a tone signal.

Further, the transmitter in accordance with the present invention, in addition to the abovementioned configuration, is such that the first transmitter section transmits the tone signal only once.

According to the configuration, the first transmitter section transmits the tone signal only once. Thus, the transmission time for the tone signal is reduced. Power consumption for the transmission is lowered.

Further, the transmitter in accordance with the present invention, in addition to the abovementioned configuration, is such that the first transmitter section transmits the multiple divisional data sets using infrared and transmits the multiple divisional data sets at a maximum transfer rate of 115.2 kbps when a predetermined time has elapsed since the transmission of the tone signal generated by the tone signal generating section.

As mentioned earlier, a data transfer using infrared is IrDA standards. The IrDA SIR standard specifies a transfer method at a maximum transfer rate of 115.2 kbps. Therefore, according to the configuration, the multiple divisional data sets can be transmitted also to a receiver which implements a transfer method in compliance with the IrDA SIR standard.

Further, the transmitter in accordance with the present invention, in addition to the abovementioned configuration, further includes: an information generating section generating predetermined information; and a first receiver section receiving response information from the receiver to information generated by the information generating section, wherein the first transmitter section transmits the information generated by the information generating section, and thereafter, after the first receiver section receives the response information from the receiver, transmits the multiple divisional data sets.

According to the configuration, merely transmitting/receiving the predetermined information generated by the information generating section and the response information to that information with the receiver can determine the presence of the receiver and the normal operation status of the receiver. In addition, the first transmitter section transmits the divisional data sets after receiving the response information from the receiver. Therefore, a transmission of the divisional data sets can be prepared or other processes can be performed, while waiting for response information to come in from the receiver. As a result, the divisional data sets can be transmitted as soon as the response information is received from the receiver.

Further, the transmitter in accordance with the present invention, in addition to the abovementioned configuration, is such that the first transmitter section transmits the multiple divisional data sets also when a predetermined time has elapsed since the transmission of the information generated by the information generating section.

According to the configuration, the multiple divisional data sets can be transmitted also to a receiver which cannot receive the information generated by the information generating section.

Further, the transmitter in accordance with the present invention, in addition to the abovementioned configuration, is such that the first transmitter section transmits the information generated by the information generating section and the multiple divisional data sets using infrared, and a transfer rate for the information generated by the information generating section is substantially equal to a transfer rate for the multiple divisional data sets.

In conventional IrDA, which is transfer method standards using infrared, as mentioned earlier, the XID packet and SNRM packet are transmitted at a lower rate (9600 bps) than the transfer rate for transfer data. It therefore takes time before transmitting the transfer data. However, According to the configuration, the first transmitter section transmits the information generated by the information generating section at the transfer rate for the divisional data sets. The transmission process for transfer data can be more quickly started than conventional techniques. In addition, the first transmitter section transmits the divisional data sets and the information generated by the information generating section at a substantially equal transfer rate. The circuit size can be relatively reduced.

Further, the transmitter in accordance with the present invention, in addition to the abovementioned configuration, is such that the first transmitter section transmits the information generated by the information generating section and the multiple divisional data sets using infrared and transmits the information generated by the information generating section at a maximum transfer rate of 4 Mbps.

As mentioned earlier, the IrDA FIR standard specifies a transfer method at a maximum transfer rate of 4 Mbps. Therefore, according to the configuration, the first transmitter section transmits the information generated by the information generating section at a maximum transfer rate of 4 Mbps using infrared. Therefore, the first transmitter section can transmit the information generated by the information generating section by a transfer method in compliance with FIR. Therefore, for example, when an FIR controller is already provided as in the mobile phone, the FIR controller can be used.

In addition, as mentioned earlier, the XID packet and the SNRM packet are transmitted at 9600 bps which is slower than the data transfer rate in conventional IrDA. It therefore takes a long time before the transfer data is transmitted. However, according to the configuration, the information generated by the information generating section is transmitted at a maximum transfer rate of 4 Mbps. A transmission process for the transfer data can therefore be started more quickly than conventional techniques.

Further, the transmitter in accordance with the present invention, in addition to the abovementioned configuration, is such that the first transmitter section transmits the multiple divisional data sets at a maximum transfer rate of 115.2 kbps using infrared when a predetermined time has elapsed since the transmission of the information generated by the information generating section.

As mentioned earlier, the IrDA SIR standard specifies a transfer method at a maximum transfer rate of 115.2 kbps. Therefore, according to the configuration, the transfer data can be transmitted also to a receiver which implements a transfer method in compliance with the IrDA SIR standard.

Further, the transmitter in accordance with the present invention, in addition to the abovementioned configuration, is such that the first transmitter section transmits the information generated by the information generating section only once.

According to the configuration, the transmission time for the information generated by the information generating section is reduced. Power consumption for the transmission is lowered. In addition, the circuit size of the information generating section can be reduced.

Further, the transmitter in accordance with the present invention, in addition to the abovementioned configuration, is such that the predetermined information generated by the information generating section is receiver detection information to detect presence of the receiver, and the response information received by the first receiver section is receiver detection response information to the receiver detection information.

According to the configuration, the presence of a receiver can be readily determined.

Further, the transmitter in accordance with the present invention, in addition to the abovementioned configuration, is such that the predetermined information generated by the information generating section is maximum transfer rate request information requesting a notification of a maximum transfer rate at which the receiver can receive, and the response information received by the first receiver section is maximum transfer rate notification information indicating the maximum transfer rate at which the receiver can receive.

According to the configuration, it can be determined whether the receiver is present, and the maximum transfer rate at which the receiver can receive it can be known.

Further, the transmitter in accordance with the present invention, in addition to the abovementioned configuration, is such that the first transmitter section transmits the multiple divisional data sets at a transfer rate according to the maximum transfer rate notification information.

According to the configuration, the divisional data sets are transmitted at a range at which the receiver can receive. This ensures that the receiver therefore can receive the divisional data sets.

Further, the transmitter in accordance with the present invention, in addition to the abovementioned configuration, further includes data identity information generating section generating data identity information which is to be used to identify the transfer data, wherein the first transmitter section transmits also the data identity information generated by the data identity information generating section.

Here, the data identity information refers to, for example, the data format, date of creation, author, and other information on the transfer data. According to the configuration, the receiver can identify the transfer data composed of the received divisional data sets.

For example, if the data identity information is a data format, the receiver can readily select an execution program for the received divisional data sets according to the received data format. In addition, if the data identity information is the data author, the receiver classify the transfer data composed of the received divisional data sets according to the received data author.

Further, the transmitter in accordance with the present invention, in addition to the abovementioned configuration, further includes a first receiver section receiving data identity information receipt notification information indicating a normal receipt of the data identity information from the receiver wherein after the first receiver section receives the data identity information receipt notification information, the first transmitter section transmits the multiple divisional data sets.

According to the configuration, the presence/absence of the receiver can be determined by transmitting/receiving the data identity information and the data identity information receipt notification information. In addition, after receiving the data identity information receipt notification information from the receiver, the first transmitter section transmits the divisional data sets. Therefore, the transmitter can prepare a transmission of the divisional data sets or perform other processes while waiting for data identity information receipt notification information to come in from the receiver. As a result, the divisional data sets can be transmitted as soon as the data identity information receipt notification information is received from the receiver.

Further, the transmitter in accordance with the present invention, in addition to the abovementioned configuration, is such that the first transmitter section transmits the multiple divisional data sets also when a predetermined time has elapsed since the transmission of the data identity information generated by the data identity information generating section.

According to the configuration, the divisional data sets can be transmitted also to a receiver which cannot transmit/receive the data identity information and the data identity information receipt notification information.

Further, the transmitter in accordance with the present invention, in addition to the abovementioned configuration, is such that the first transmitter section transmits the multiple divisional data sets using infrared, and when a predetermined time has elapsed since the transmission of the data identity information generated by the data identity information generating section, transmits the multiple divisional data sets at a maximum transfer rate of 115.2 kbps.

As mentioned earlier, the IrDA SIR standard specifies a transfer method at a maximum transfer rate of 115.2 kbps. Therefore, according to the configuration, the transfer data can be transmitted also to a receiver which implements a transfer method in compliance with the IrDA SIR standard.

Further, the transmitter in accordance with the present invention, in addition to the abovementioned configuration, further includes a first receiver section receiving receipt process error notification information from the receiver, the receipt process error notification information indicating that a receipt process for the multiple divisional data sets has not been finished in time, wherein when the first receiver section has received the receipt process error notification information, the dividing section renders divisional data sets derived from transfer data which will be divided next smaller in size than those derived from previously divided transfer data.

Here, the state of the receipt process for the multiple divisional data sets not finishing in time refers to a state where, for example, the write process for the next divisional data sets is started for some reason before the write process for the preceding divisional data sets into the memory is finished, and the preceding divisional data sets are written off by the next divisional data sets.

According to the configuration, when the first receiver section has received the receipt process error notification information, the dividing section reduces the size of the divisional data sets which will be produced by dividing next transfer data, relative to the previously divided transfer data. Therefore, the receiver receives smaller divisional data sets than in the previous time where the receipt process has not been finished in time, and is more likely to finish the receipt process in time. Thus, the receiver improves reliability in the receipt of the divisional data sets.

Further, the transmitter in accordance with the present invention, in addition to the abovementioned configuration, further includes a first receiver section receiving receipt process error notification information from the receiver, the receipt process error notification information indicating that a receipt process for the multiple divisional data sets has not been finished in time, wherein when the first receiver section has received the receipt process error notification information, the first transmitter section increases transmission intervals between divisional data sets as to transfer data which will be transmitted next, compared to the transfer data transmitted in the previous transmission.

According to the configuration, when the first receiver section has received the receipt process error notification information, the first transmitter section increases transmission intervals between divisional data sets as to transfer data which will be transmitted next, compared to the transfer data transmitted in the previous transmission. Therefore, the receiver receives multiple divisional data sets at longer intervals than in the previous time where the receipt process has not been finished in time, and is more likely to finish the receipt process in time. Thus, the receiver improves reliability in the receipt of the divisional data sets.

Further, the transmitter in accordance with the present invention, in addition to the abovementioned configuration, further includes a data identifier information generating section generating data identifier information containing a data identifier which is to be used to identify the transfer data, wherein the first transmitter section transmits data identifier information generated by the data identifier information generating section together with the multiple divisional data sets.

According to the configuration, the receiver can obtain a data identifier which is to be used to identify the transfer data. Therefore, the receiver can determine whether the transfer data composed of the received divisional data sets is identical to the previous time.

Further, the transmitter in accordance with the present invention, in addition to the abovementioned configuration, is such that a first receiver section receiving error divisional data set identity information from the receiver, a divisional data set in which an error has been detected being identified by the error divisional data set identity information, wherein when the first receiver section has received the error divisional data set identity information, the first transmitter section transmits again a divisional data set corresponding to the error divisional data set identity information received by the first receiver section as to the transfer data transmitted in the previous transmission and succeeding divisional data sets.

According to the configuration, the receiver receives again the divisional data set in which an error has been detected.

Further, the transmitter in accordance with the present invention, in addition to the abovementioned configuration, is such that the first transmitter section transmits each of the divisional data sets in a different packet containing a preamble section for clock synchronization at a head thereof, and a second and succeeding divisional data sets are each contained in a packet with a preamble section shorter than a preamble section of a packet containing a first divisional data set.

According to the configuration, the sum size of the multiple divisional data sets can be reduced. Therefore, the multiple divisional data sets are transmitted in a shorter time.

Further, the transmitter in accordance with the present invention, in addition to the abovementioned configuration, is such that the first transmitter section transmits the multiple divisional data sets using infrared.

As mentioned earlier, conventional transfer methods using infrared include the remote controller and IrDA. However, the remote controller method needs to transmit the whole transfer data with a one-time signal without interruption (i.e. without no-signal state). The method is not sufficiently reliable for the transmission of transfer data of large size, such as image data. However, according to the configuration, even if the size of the transfer data is large, the transfer data is divided into multiple divisional data sets, and the divisional data sets are transmitted. Therefore, transfer data of large size, such as image data, can be reliably transmitted.

In addition, in IrDA, receipt check for the divisional data sets needs to be frequently received from the receiver, while the multiple divisional data sets are being transmitted. Therefore, it inevitably takes a long time to transmit all the divisional data sets. However, according to the configuration, the multiple divisional data sets making up the transfer data are transmitted all together. It hence takes less time to transmit all the divisional data sets.

A receiver in accordance with the present invention, to solve the problems, is a receiver receiving transfer data having a predetermined amount from a transmitter, and includes:

a second receiver section receiving multiple divisional data sets and error detection information together from the transmitter, the transfer data being divided into the multiple divisional data sets, an error in each of the divisional data sets being detected based on the error detection information; and an error detection section detecting whether any of the divisional data sets contains an error according to the error detection information received by the second receiver section, wherein when the error detection section has detected no error in the multiple divisional data sets, the receiver performs a predetermined process according to the divisional data sets.

A reception method in accordance with the present invention, to solve the problems, is a method of receiving transfer data having a predetermined amount from a transmitter, and involves the steps of:

receiving multiple divisional data sets and error detection information together from the transmitter, the transfer data being divided into the multiple divisional data sets, an error in each of the divisional data sets being detected based on the error detection information; and detecting whether any of the divisional data sets contains an error according to the received error detection information, wherein when no error has been detected in all of the multiple divisional data sets, a process according to the multiple divisional data sets is performed.

According to the configuration and method, the multiple divisional data sets and the error detection information are received together. When the error detection section has detected no error in any of the divisional data sets, the receiver performs a predetermined process according to the divisional data sets. In other words, there is no need to transmit a notification to verify reception for each or two or more of the divisional data sets. It takes less time to receive all the divisional data sets.

In addition, the divisional data sets into which the transfer data is divided are received. Therefore, a large size of transfer data can be handled by increasing the number of divisional data sets. The configuration and method hence improves reliability over the aforementioned remote controller in the transfer of large amounts of data.

Further, the receiver in accordance with the present invention, in addition to the abovementioned configuration, further includes a tone signal generating section generating a tone signal; and a second transmitter section, when the second receiver section has received the tone signal, transmitting the tone signal generated by the tone signal generating section to the transmitter.

According to the configuration, the receiver can have the transmitter recognize the presence of the receiver by transmitting/receiving the tone signal. In addition, since the tone signal generating section generates the tone signal, its circuit size is small.

Further, the receiver in accordance with the present invention, in addition to the abovementioned configuration, is such that the second receiver section includes a receipt clock generating section for generating a receipt clock for the divisional data sets and the error detection information, and the receipt clock generating section starts operating by the second receiver section having received the tone signal.

According to the configuration, the receipt clock generating section can be stopped from operating until the second receiver section receives the tone signal. Power consumption can be lowered.

Further, the receiver in accordance with the present invention, in addition to the abovementioned configuration, is such that the second receiver section receives also different predetermined information from the divisional data sets from the transmitter, and the second receiver section further includes: a response information generating section generating response information for the predetermined information received by the second receiver section; and a second transmitter section, when the second receiver section has normally received the predetermined information, transmitting the response information generated by the response information generating section to the transmitter.

According to the configuration, the receiver can have the transmitter recognize the presence of the receiver by transmitting/receiving the predetermined information and the response information.

Further, the receiver in accordance with the present invention, in addition to the abovementioned configuration, is such that the second receiver section and the second transmitter section communicate using infrared, and the second transmitter section transmits the response information generated by the response information generating section at a maximum transfer rate of 4 Mbps.

As mentioned earlier, the IrDA FIR standard specifies a transfer method at a maximum transfer rate of 4 Mbps. Therefore, according to the configuration, the second transmitter section transmits the response information generated by the response information generating section at a maximum transfer rate of 4 Mbps using infrared. Therefore, the second transmitter section can transmit the response information generated by the response information generating section by a transfer method in compliance with FIR. Therefore, for example, when a FIR controller is already provided as in the mobile phone, the FIR controller can be used.

Further, the receiver in accordance with the present invention, in addition to the abovementioned configuration, is such that the predetermined information received by the second receiver section is receiver detection information based on which the presence of the receiver is to be detected, and the response information generated by the response information generating section is receiver detection response information indicating the presence of the receiver.

According to the configuration, the transmitter can readily determine whether there is a receiver.

Further, the receiver in accordance with the present invention, in addition to the abovementioned configuration, is such that the predetermined information received by the second receiver section is maximum transfer rate request information requesting a notification of a maximum receivable transfer rate, and the response information generated by the response information generating section is maximum transfer rate notification information containing the maximum receivable transfer rate.

According to the configuration, the transmitter can determine whether there is a receiver and know the maximum transfer rate at which the receiver can receive.

Further, the receiver in accordance with the present invention, in addition to the abovementioned configuration, is such that the predetermined information received by the second receiver section is data identity information which is to be used to identify the transfer data, and the response information generated by the response information generating section is data identity information receipt notification information indicating that the data identity information has been received.

According to the configuration, the transfer data made up of the received divisional data sets can be identified. For example, when the data identity information is a data format, an execution program for the received divisional data sets can be readily selected according to the received data format. In addition, when the data identity information is the data author, the received divisional data sets can be classified by the author according to the received data author.

Further, the receiver in accordance with the present invention, in addition to the abovementioned configuration, is such that the predetermined information received by the second receiver section is data identity information which is to be used to identify the transfer data, and the second receiver section receives the data identity information and corresponding multiple divisional data sets in this order, and if the data identity information cannot be normally received, does not receive subsequent divisional data sets.

When a divisional data set with no data identity information is received, it is necessary either to check again with the transmitter the data identity information based on which the transfer data made up of the divisional data sets is to be identified or to inspect by the receiver. When this is the case, a new circuit configuration needs be provided. According to the configuration, if the data identity information cannot be normally received, the second receiver section does not receive subsequent divisional data sets, that is, the divisional data sets corresponding to the data identity information which could not be normally received. Therefore, no new circuit configuration is needed.

Further, the receiver in accordance with the present invention, in addition to the abovementioned configuration, is such that when the error detection section has detected an error in the divisional data sets received by the second receiver section, the second receiver section does not receive succeeding divisional data sets to the divisional data set in which an error has been detected by the error detection section with respect to the transfer data containing the divisional data set in which an error has been detected by the error detection section.

According to the configuration, the second receiver section does not receive succeeding divisional data sets to the divisional data set in which an error has been detected by the error detection section with respect to the transfer data containing the divisional data set in which an error has been detected by the error detection section. If any of the divisional data sets contains an error, the transfer data made up of the divisional data sets loses its original meaning. Therefore, by not receiving the succeeding divisional data sets to the divisional data set in which an error has been detected by the error detection section, no wasteful receipt of divisional data sets is carried out. Power consumption is lowered.

Further, the receiver in accordance with the present invention, in addition to the abovementioned configuration, further includes: a receipt process error notification information generating section, if a receipt process for the divisional data sets and the error detection information in the second receiver section has not been finished in time, and the second receiver section has failed to normally receive at least part of the divisional data sets and the error detection information, generating receipt process error notification information indicating the failure; and a second transmitter section transmitting the receipt process error notification information generated by the receipt process error notification information generating section to the transmitter.

Here, the state where the receipt process for the divisional data sets and the error detection information in the second receiver section has not been finished in time refers to, for example, a state where the write process for the next divisional data sets is started for some reason before the write process for the preceding divisional data sets into the memory is finished, and the preceding divisional data sets are written off by the next divisional data sets.

According to the configuration, when the second receiver section has failed to normally receive at least part of the divisional data sets and the error detection information, the receipt process error notification information generating section generates receipt process error notification information indicating the failure. The second transmitter section then transmits the generated receipt process error notification information to the transmitter. Thus, the transmitter can recognize that the receipt process has not been finished in time. As a result, the user can have the transfer data transmitted again from the transmitter.

Further, the receiver in accordance with the present invention, in addition to the abovementioned configuration, is such that the second transmitter section transmits the receipt process error notification information after the second receiver section has received all the divisional data sets and the error detection information.

According to the configuration, the transmitter can receive the receipt process error notification information after transmitting all the divisional data sets. Therefore, the transmitter does not have to simultaneously perform a transmission process for the divisional data sets and a receipt process for the receipt process error notification information.

Further, the receiver in accordance with the present invention, in addition to the abovementioned configuration, is such that: the second receiver section receives a data identifier along with the divisional data sets from the transmitter, the transfer data composed of the divisional data sets being identified by the data identifier; the receiver further includes: a data identifier storage section recording a data identifier received last time by the second receiver section; and an error divisional data set identity information storage section recording error divisional data set identity information based on which a divisional data set in which an error has been detected by the error detection section is to be identified in the multiple divisional data sets received last time by the second receiver section; and when a data identifier received by the second receiver section is identical to a data identifier recorded in the data identifier storage section, the second receiver section receives a divisional data set corresponding to the error divisional data set identity information recorded in the error divisional data set identity information storage section.

According to the configuration, the divisional data set in which an error was detected last time can be recognized. Only that divisional data set in which an error has been detected can be received.

Further, the receiver in accordance with the present invention, in addition to the abovementioned configuration, is such that the error divisional data set identity information storage section records only the error divisional data set identity information based on which a divisional data set in which an error has been first detected by the error detection section is to be identified; and when a data identifier received by the second receiver section is identical to a data identifier recorded in the data identifier storage section, the second receiver section receives a divisional data set corresponding to the error divisional data set identity information recorded in the error divisional data set identity information storage section and also receives succeeding divisional data sets.

According to the configuration, the error divisional data set identity information storage section records only the error divisional data set identity information based on which the divisional data set in which an error has been first detected by the error detection section is to be identified. Therefore, the requisite storage capacity can be lowered.

In addition, the second receiver section receives the divisional data set corresponding to the error divisional data set identity information recorded in the error divisional data set identity information storage section and succeeding divisional data sets. Therefore, even if an error was detected last time in two or more divisional data sets, a receipt process becomes possible merely by selecting the divisional data sets corresponding to the error divisional data set identity information only once. The receipt process is simplified.

Further, the receiver in accordance with the present invention, in addition to the abovementioned configuration, further includes a second transmitter section transmitting the error divisional data set identity information recorded in the error divisional data set identity information storage section to the transmitter.

According to the configuration, the transmitter can recognize the divisional data sets in which an error has been detected in the receiver. Therefore, the transmitter can transmit only the divisional data sets and other processes.

Further, the receiver in accordance with the present invention, in addition to the abovementioned configuration, further includes: a receipt result information generating section generating receipt result information indicating whether the error detection section has detected an error in the divisional data sets received together by the second receiver section; and a second transmitter section transmitting the receipt result information generated by the receipt result information generating section.

According to the configuration, the transmitter can recognize whether any of the divisional data sets received by the receiver contains an error. Then, by displaying the received receipt result information to the user on the transmitter, the user can determine whether the transfer data should be transmitted from the transmitter again.

Further, the receiver in accordance with the present invention, in addition to the abovementioned configuration, is such that the second receiver section receives the divisional data sets and the error detection information using infrared.

As mentioned earlier, conventional transfer methods using infrared include the remote controller and IrDA. However, the remote controller method needs to receive the whole transfer data with a one-time signal without interruption. The method is not sufficiently reliable for the receipt of transfer data of large size, such as image data. However, according to the configuration, even if the size of the transfer data is large, the transfer data is divided into multiple divisional data sets, and the divisional data sets are received. Therefore, transfer data of large size, such as image data, can be reliably received.

In addition, in IrDA, receipt check for the divisional data sets needs to be frequently transmitted to the transmitter, while the multiple divisional data sets are being received. Therefore, it inevitably takes a long time to receive all the divisional data sets. However, according to the configuration, the multiple divisional data sets making up the transfer data are received all together. It hence takes less time to receive all the divisional data sets.

A data transfer system in accordance with the present invention includes: the transmitter and the receiver, wherein the transfer data is transferred from the transmitter to the receiver.

According to the configuration, the data transfer has high reliability. It takes less time to transfer the data.

A transmission program in accordance with the present invention is a computer program causing a computer to function as components of the transmitter.

According to the configuration, the transmitter can be realized by a computer realizing the components of the transmitter.

A reception program in accordance with the present invention is a computer program causing a computer to function as components of the receiver.

According to the configuration, the receiver can be realized by a computer realizing the components of the receiver.

A recording medium in accordance with the present invention is a computer-readable recording medium containing either the transmission program realizing the aforementioned sections on a computer and manipulating the transmitter or the reception program realizing the aforementioned sections on a computer and manipulating the receiver.

According to the configuration, the transmitter or receiver can be realized on the computer by either the transmission or reception program retrieved from the recording medium.

In addition, the transmitter in accordance with the present invention, in addition to the abovementioned configuration, is such that the first transmitter section transmits the information generated by the information generating section and the multiple divisional data sets using infrared, and transmits the information generated by the information generating section at a maximum transfer rate of 115.2 kbps.

The IrDA FIR standard also specifies a transfer method at a maximum transfer rate of 115.2 kbps. Therefore, according to the configuration, the first transmitter section transmits the information generated by the information generating section at a maximum transfer rate of 115.2 kbps using infrared. Therefore, the first transmitter section can transmit the information generated by the information generating section by a transfer method in compliance with FIR. Therefore, an existing built-in controller in mobile phones, etc. can be used for this purpose. Changing the protocol also a time before an establishment of a connection when compared with the establishment of a connection by existing IrDA method at 9600 bps, which also leads to an improved effective transfer rate.

In addition, the transmitter in accordance with the present invention, in addition to the abovementioned configuration, further includes: a first timer measuring an elapsed time; a received signal presence/absence determine section determining the presence/absence of a received signal from the receiver; and a timer activate/reset section starting the first timer on the basis of a determination that there is no received signal by the received signal presence/absence determine section and resetting the timer on the basis of a determination that there is a received signal by the received signal presence/absence determine section, wherein when, for example, a transmit request occurs in or out of a circuit section, the first transmitter section immediately transmits the tone signal if a predetermined time has elapsed since a start or resetting of the first timer whereas the first transmitter section transmits the tone signal after the predetermined time has elapsed if the predetermined time has not elapsed since the start or resetting of the first timer.

In addition, the transmitter in accordance with the present invention, in addition to the abovementioned configuration, further includes: a first timer measuring an elapsed time; a received signal presence/absence determine section determining the presence/absence of a received signal from the receiver; and a timer activate/reset section starting the first timer on the basis of a determination that there is no received signal by the received signal presence/absence determine section and resetting the first timer on the basis of a determination that there is a received signal by the received signal presence/absence determine section, wherein when a transmit request has occurred, the first transmitter section immediately transmits the information generated by the information generating section if a predetermined time has elapsed since a start or resetting of the first timer whereas the first transmitter section transmits the information generated by the information generating section after the predetermined time has elapsed if the predetermined time has not elapsed since the start or resetting of the first timer.

According to the configuration, the transmission can be quickly started, and it takes less time to establish a connection, when compared with the existing communications where the received signal is monitored after the start of a request for a transmission in or out of a circuit.

In addition, the mobile terminal device in accordance with the present invention, such as the mobile phone and the personal digital assistant (PDA), contains either the transmitter of the aforementioned configuration or the transmission program of the aforementioned configuration in a computer-readable recording medium, so as to transmit the transfer data.

In addition, the mobile terminal device in accordance with the present invention, such as the mobile phone and the personal digital assistant (PDA), contains either the transmitter of the aforementioned configuration or the transmission program of the aforementioned configuration in a computer-readable recording medium, so as to transmit the transfer data, is provided with a built-in IrDA protocol through either hardware or software, and if a device involved in the communications cannot be recognized through a transmission of a packet containing the tone signal or the information generated by the information generating section, performs data transfer by the IrDA protocol.

A personal computer in accordance with the present invention includes either the transmitter of the aforementioned configuration or the transmission program of the aforementioned configuration in a computer-readable recording medium, so as to transmit the transfer data.

Another personal computer in accordance with the present invention includes either the transmitter of the aforementioned configuration or the transmission program of the aforementioned configuration in a computer-readable recording medium, so as to transmit the transfer data, is provided with a built-in IrDA protocol through either hardware or software, and if a device involved in the communications cannot be recognized through a transmission of a packet containing the tone signal or the information generated by the information generating section, performs data transfer by the IrDA protocol.

A digital camera in accordance with the present invention contains either the transmitter of the aforementioned configuration or the transmission program of the aforementioned configuration in a computer-readable recording medium, so as to transmit the transfer data.

Another digital camera in accordance with the present invention includes either the transmitter of the aforementioned configuration or the transmission program of the aforementioned configuration in a computer-readable recording medium, so as to transmit the transfer data, wherein the digital camera is provided with a built-in IrDA protocol through either hardware or software, and if a device involved in the communications cannot be recognized through a transmission of a packet containing the tone signal or the information generated by the information generating section, performs data transfer by the IrDA protocol.

A digital video camera in accordance with the present invention includes either the transmitter of the aforementioned configuration or the transmission program of the aforementioned configuration in a computer-readable recording medium, so as to transmit the transfer data.

Another digital video camera in accordance with the present invention includes either the transmitter of the aforementioned configuration or the transmission program of the aforementioned configuration in a computer-readable recording medium, so as to transmit the transfer data, wherein the digital video camera is provided with a built-in IrDA protocol through either hardware or software, and if a device involved in the communications cannot be recognized through a transmission of a packet containing the tone signal or the information generated by the information generating section, performs data transfer by the IrDA protocol.

A mobile storage device in accordance with the present invention either includes the transmitter of the aforementioned configuration built therein, contains the transmission program of the aforementioned configuration in a recording medium, such as a computer-readable hard disk drive or flash memory, or is connectable to a recording medium, such as a computer-readable hard disk drive or flash memory, containing the transmission program of the aforementioned configuration, so as to transmit data.

Another mobile storage device in accordance with the present invention either includes the transmitter of the aforementioned configuration built therein, contains the transmission program of the aforementioned configuration in a recording medium, such as a computer-readable hard disk drive or flash memory, or is connectable to a recording medium, such as a computer-readable hard disk drive or flash memory, containing the transmission program of the aforementioned configuration, so as to transmit data, wherein the mobile storage device is provided with a built-in IrDA protocol through either hardware or software, and if a device involved in the communications cannot be recognized through a transmission of a packet containing the tone signal or the information generated by the information generating section, performs data transfer by the IrDA protocol.

A mobile terminal device, such as a mobile phone or a personal digital assistant (PDA), the present invention includes either the receiver of the aforementioned configuration or the reception program of the aforementioned configuration in a computer-readable recording medium, so as to receive data.

Another mobile terminal device in accordance with the present invention in addition to the abovementioned configuration, is such that the mobile terminal device is provided with a built-in IrDA protocol through either hardware or software, monitors at least a received signal, and at least upon receipt of a signal corresponding to part or all of a 9600-bps XID packet, switches to the IrDA protocol to transmit/receive the data by the IrDA protocol.

In addition, the mobile terminal device in accordance with the present invention in addition to the abovementioned configuration, further includes: a second timer measuring an elapsed time; an edge detector section detecting a rising edge or a falling edge of a received signal; a protocol switching section switching between communications protocols; and a receipt discrimination section determining whether the signal corresponding to part or all of a 9600-bps XID packet has been received, wherein: the second timer measures an interval from one rising edge to a next rising edge of the received signal or an interval from one falling edge to a next falling edge of the received signal as detected by the edge detector section; the receipt discrimination section, when the interval is determined to fall in a range between a predetermined maximum and a predetermined minimum, determines that the received signal is part of a 9600-bps XID packet; and the protocol switching section switches to the IrDA protocol based on the determination that the received signal is part of a XID packet.

In addition, the mobile terminal device in accordance with the present invention, in addition to the abovementioned configuration, further includes: an IrDA SIR demodulator circuit; a protocol switching section switching between communications protocols; and a receipt discrimination section determining whether the signal corresponding to part or all of a 9600-bps XID packet has been received, wherein when the SIR demodulator circuit is in operation, when demodulated with a clock other than a clock needed to demodulate the 9600-bps signal, if the received signal is such a bit pattern that all bits of demodulated data of the demodulated n×8 bits (n is an integer from 1 to 10 inclusive) are 1s in binary representation, the receipt discrimination section determines that the received signal is part of a 9600-bps XID packet; and the protocol switching section switches to the IrDA protocol based on the determination that the received signal is part of a XID packet.

In addition, the mobile terminal device in accordance with the present invention, in addition to the abovementioned configuration, further includes: a third timer measuring an elapsed time; a FIFO memory which is a first-in/first-out device; and a signal reception frequency switching section switching between signal reception frequencies, wherein the receipt discrimination section measures the time it takes for the demodulated data to be written into the FIFO memory, the time it takes for the data in the FIFO memory to be available for retrieval, or the interrupt interval indicating that the FIFO memory is not empty on the third timer, and when the measured time falls between the predetermined maximum and minimum, determines that the part of a 9600-bps XID packet has been received; and the signal reception frequency switching section switches the clock to the 9600-bps signal reception frequency based on the determination that the received signal is part of a XID packet.

A personal computer in accordance with the present invention includes either the receiver of the aforementioned configuration or the reception program of the aforementioned configuration in a computer-readable recording medium, so as to receive the transfer data.

In addition, the personal computer in accordance with the present invention, in addition to the abovementioned configuration, is provided with a built-in IrDA protocol through either hardware or software, monitors at least a received signal, and when at least the signal corresponding to part or all of a 9600-bps XID packet has been received, switches to the IrDA protocol to transmit/receive the data by the IrDA protocol.

In addition, the personal computer in accordance with the present invention, in addition to the abovementioned configuration, further includes a second timer measuring an elapsed time; an edge detector section detecting a rising edge or a falling edge of a received signal; a protocol switching section switching between communications protocols; and a receipt discrimination section determining whether the signal corresponding to part or all of a 9600-bps XID packet has been received, wherein: the second timer measures an interval from one rising edge to a next rising edge of the received signal or an interval from one falling edge to a next falling edge of the received signal as detected by the edge detector section; the receipt discrimination section, when the interval is determined to fall in a range between a predetermined maximum and a predetermined minimum, determines that the received signal is part of a 9600-bps XID packet; and the protocol switching section switches to the IrDA protocol based on the determination that the received signal is part of a XID packet.

In addition, the personal computer in accordance with the present invention, in addition to the abovementioned configuration, further includes: an IrDA SIR demodulator circuit; a protocol switching section switching between communications protocols; and a receipt discrimination section determining whether the signal corresponding to part or all of a 9600-bps XID packet has been received, wherein when the SIR demodulator circuit is in operation, when demodulated with a clock other than a clock needed to demodulate the 9600-bps signal, if the received signal is such a bit pattern that all bits of demodulated data of the demodulated n×8 bits (n is an integer from 1 to 10 inclusive) are 1s in binary representation, the receipt discrimination section determines that the received signal is part of a 9600-bps XID packet; and the protocol switching section switches to the IrDA protocol based on the determination that the received signal is part of a XID packet.

In addition, the personal computer in accordance with the present invention, in addition to the abovementioned configuration, further includes: a third timer measuring an elapsed time; a FIFO memory which is a first-in/first-out device; and a signal reception frequency switching section switching between signal reception frequencies, wherein the receipt discrimination section measures the time it takes for the demodulated data to be written into the FIFO memory, the time it takes for the data in the FIFO memory to be available for retrieval, or the interrupt interval indicating that the FIFO memory is not empty on the third timer, and when the measured time falls between the predetermined maximum and minimum, determines that the part of a 9600-bps XID packet has been received; and the signal reception frequency switching section switches the clock to the 9600-bps signal reception frequency based on the determination that the received signal is part of a XID packet.

In addition, a digital camera in accordance with the present invention includes either the receiver of the aforementioned configuration or the reception program of the aforementioned configuration in a computer-readable recording medium, so as to receive data.

In addition, the digital camera in accordance with the present invention, in addition to the abovementioned configuration, is provided with a built-in IrDA protocol through either hardware or software, monitors at least a received signal, and when at least the signal corresponding to part or all of a 9600-bps XID packet has been received, switches to the IrDA protocol to transmit/receive the data by the IrDA protocol.

In addition, the digital camera in accordance with the present invention, in addition to the abovementioned configuration, further includes: a second timer measuring an elapsed time; an edge detector section detecting a rising edge or a falling edge of a received signal; a protocol switching section switching between communications protocols; and a receipt discrimination section determining whether the signal corresponding to part or all of a 9600-bps XID packet has been received, wherein: the second timer measures an interval from one rising edge to a next rising edge of the received signal or an interval from one falling edge to a next falling edge of the received signal as detected by the edge detector section; the receipt discrimination section, when the interval is determined to fall in a range between a predetermined maximum and a predetermined minimum, determines that the received signal is part of a 9600-bps XID packet; and the protocol switching section switches to the IrDA protocol based on the determination that the received signal is part of a XID packet.

In addition, the digital camera in accordance with the present invention, in addition to the abovementioned configuration, further includes: an IrDA SIR demodulator circuit; a protocol switching section switching between communications protocols; and a receipt discrimination section determining whether the signal corresponding to part or all of a 9600-bps XID packet has been received, wherein when the SIR demodulator circuit is in operation, when demodulated with a clock other than a clock needed to demodulate the 9600-bps signal, if the received signal is such a bit pattern that all bits of demodulated data of the demodulated n×8 bits (n is an integer from 1 to 10 inclusive) are is in binary representation, the receipt discrimination section determines that the received signal is part of a 9600-bps XID packet; and the protocol switching section switches to the IrDA protocol based on the determination that the received signal is part of a XID packet.

In addition, the digital camera in accordance with the present invention, in addition to the abovementioned configuration, further includes: a third timer measuring an elapsed time; a FIFO memory which is a first-in/first-out device; and a signal reception frequency switching section switching between signal reception frequencies, wherein the receipt discrimination section measures the time it takes for the demodulated data to be written into the FIFO memory, the time it takes for the data in the FIFO memory to be available for retrieval, or the interrupt interval indicating that the FIFO memory is not empty on the third timer, and when the measured time falls between the predetermined maximum and minimum, determines that the part of a 9600-bps XID packet has been received; and the signal reception frequency switching section switches the clock to the 9600-bps signal reception frequency based on the determination that the received signal is part of a XID packet.

A digital video camera in accordance with the present invention includes either the receiver of the aforementioned configuration or the reception program of the aforementioned configuration in a computer-readable recording medium, so as to receive data.

In addition, the digital video camera in accordance with the present invention, in addition to the abovementioned configuration, is provided with a built-in IrDA protocol through either hardware or software, monitors at least a received signal, and when at least the signal corresponding to part or all of a 9600-bps XID packet has been received, switches to the IrDA protocol to transmit/receive the data by the IrDA protocol.

In addition, the digital video camera in accordance with the present invention, in addition to the abovementioned configuration, further includes: a second timer measuring an elapsed time; an edge detector section detecting a rising edge or a falling edge of a received signal; a protocol switching section switching between communications protocols; and a receipt discrimination section determining whether the signal corresponding to part or all of a 9600-bps XID packet has been received, wherein: the second timer measures an interval from one rising edge to a next rising edge of the received signal or an interval from one falling edge to a next falling edge of the received signal as detected by the edge detector section; the receipt discrimination section, when the interval is determined to fall in a range between a predetermined maximum and a predetermined minimum, determines that the received signal is part of a 9600-bps XID packet; and the protocol switching section switches to the IrDA protocol based on the determination that the received signal is part of a XID packet.

In addition, the digital video camera in accordance with the present invention, in addition to the abovementioned configuration, further includes: an IrDA SIR demodulator circuit; a protocol switching section switching between communications protocols; and a receipt discrimination section determining whether the signal corresponding to part or all of a 9600-bps XID packet has been received, wherein when the SIR demodulator circuit is in operation, when demodulated with a clock other than a clock needed to demodulate the 9600-bps signal, if the received signal is such a bit pattern that all bits of demodulated data of the demodulated n×8 bits (n is an integer from 1 to 10 inclusive) are 1s in binary representation, the receipt discrimination section determines that the received signal is part of a 9600-bps XID packet; and the protocol switching section switches to the IrDA protocol based on the determination that the received signal is part of a XID packet.

In addition, the digital video camera in accordance with the present invention, in addition to the abovementioned configuration, further includes: a third timer measuring an elapsed time; a FIFO memory which is a first-in/first-out device; and a signal reception frequency switching section switching between signal reception frequencies, wherein the receipt discrimination section measures the time it takes for the demodulated data to be written into the FIFO memory, the time it takes for the data in the FIFO memory to be available for retrieval, or the interrupt interval indicating that the FIFO memory is not empty on the third timer, and when the measured time falls between the predetermined maximum and minimum, determines that the part of a 9600-bps XID packet has been received; and the signal reception frequency switching section switches the clock to the 9600-bps signal reception frequency based on the determination that the received signal is part of a XID packet.

A video output device, such as a television and a monitor, in accordance with the present invention includes either the receiver of the aforementioned configuration or the reception program of the aforementioned configuration in a computer-readable recording medium, so as to receive data, compress, decompress, and process the received data, and produce a display output.

In addition, the video output device in accordance with the present invention, in addition to the abovementioned configuration, is provided with a built-in IrDA protocol through either hardware or software, monitors at least a received signal, and when at least the signal corresponding to part or all of a 9600-bps XID packet has been received, switches to the IrDA protocol to transmit/receive the data by the IrDA protocol.

In addition, the video output device in accordance with the present invention, in addition to the abovementioned configuration, further includes: a second timer measuring an elapsed time; an edge detector section detecting a rising edge or a falling edge of a received signal; a protocol switching section switching between communications protocols; and a receipt discrimination section determining whether the signal corresponding to part or all of a 9600-bps XID packet has been received, wherein: the second timer measures an interval from one rising edge to a next rising edge of the received signal or an interval from one falling edge to a next falling edge of the received signal as detected by the edge detector section; the receipt discrimination section, when the interval is determined to fall in a range between a predetermined maximum and a predetermined minimum, determines that the received signal is part of a 9600-bps XID packet; and the protocol switching section switches to the IrDA protocol based on the determination that the received signal is part of a XID packet.

In addition, the video output device in accordance with the present invention, in addition to the abovementioned configuration, further includes: an IrDA SIR demodulator circuit; a protocol switching section switching between communications protocols; and a receipt discrimination section determining whether the signal corresponding to part or all of a 9600-bps XID packet has been received, wherein when the SIR demodulator circuit is in operation, when demodulated with a clock other than a clock needed to demodulate the 9600-bps signal, if the received signal is such a bit pattern that all bits of demodulated data of the demodulated n×8 bits (n is an integer from 1 to 10 inclusive) are 1s in binary representation, the receipt discrimination section determines that the received signal is part of a 9600-bps XID packet; and the protocol switching section switches to the IrDA protocol based on the determination that the received signal is part of a XID packet.

In addition, the video output device in accordance with the present invention, in addition to the abovementioned configuration, further includes: a third timer measuring an elapsed time; a FIFO memory which is a first-in/first-out device; and a signal reception frequency switching section switching between signal reception frequencies, wherein the receipt discrimination section measures the time it takes for the demodulated data to be written into the FIFO memory, the time it takes for the data in the FIFO memory to be available for retrieval, or the interrupt interval indicating that the FIFO memory is not empty on the third timer, and when the measured time falls between the predetermined maximum and minimum, determines that the part of a 9600-bps XID packet has been received; and the signal reception frequency switching section switches the clock to the 9600-bps signal reception frequency based on the determination that the received signal is part of a XID packet.

A printer in accordance with the present invention includes either the receiver of the aforementioned configuration or the reception program of the aforementioned configuration in a computer-readable recording medium, so as to receive data, compress, decompress, and process the received data, and print.

In addition, the printer in accordance with the present invention, in addition to the abovementioned configuration, is provided with a built-in IrDA protocol through either hardware or software, monitors at least a received signal, and when at least the signal corresponding to part or all of a 9600-bps XID packet has been received, switches to the IrDA protocol to transmit/receive the data by the IrDA protocol.

In addition, the printer in accordance with the present invention, in addition to the abovementioned configuration, further includes: a second timer measuring an elapsed time; an edge detector section detecting a rising edge or a falling edge of a received signal; a protocol switching section switching between communications protocols; and a receipt discrimination section determining whether the signal corresponding to part or all of a 9600-bps XID packet has been received, wherein: the second timer measures an interval from one rising edge to a next rising edge of the received signal or an interval from one falling edge to a next falling edge of the received signal as detected by the edge detector section; the receipt discrimination section, when the interval is determined to fall in a range between a predetermined maximum and a predetermined minimum, determines that the received signal is part of a 9600-bps XID packet; and the protocol switching section switches to the IrDA protocol based on the determination that the received signal is part of a XID packet.

In addition, the printer in accordance with the present invention, in addition to the abovementioned configuration, further includes: an IrDA SIR demodulator circuit; a protocol switching section switching between communications protocols; and a receipt discrimination section determining whether the signal corresponding to part or all of a 9600-bps XID packet has been received, wherein when the SIR demodulator circuit is in operation, when demodulated with a clock other than a clock needed to demodulate the 9600-bps signal, if the received signal is such a bit pattern that all bits of demodulated data of the demodulated n×8 bits (n is an integer from 1 to 10 inclusive) are 1s in binary representation, the receipt discrimination section determines that the received signal is part of a 9600-bps XID packet; and the protocol switching section switches to the IrDA protocol based on the determination that the received signal is part of a XID packet.

In addition, the printer in accordance with the present invention, in addition to the abovementioned configuration, further includes: a third timer measuring an elapsed time; a FIFO memory which is a first-in/first-out device; and a signal reception frequency switching section switching between signal reception frequencies, wherein the receipt discrimination section measures the time it takes for the demodulated data to be written into the FIFO memory, the time it takes for the data in the FIFO memory to be available for retrieval, or the interrupt interval indicating that the FIFO memory is not empty on the third timer, and when the measured time falls between the predetermined maximum and minimum, determines that the part of a 9600-bps XID packet has been received; and the signal reception frequency switching section switches the clock to the 9600-bps signal reception frequency based on the determination that the received signal is part of a XID packet.

A storage device in accordance with the present invention, such as a DVD recorder, a hard disk recorder, a video recorder, includes: either the receiver of the aforementioned configuration or the reception program of the aforementioned configuration in a computer-readable recording medium, so as to receive data, compress, decompress, process, and record the received data.

In addition, the storage device in accordance with the present invention, in addition to the abovementioned configuration, is provided with a built-in IrDA protocol through either hardware or software, monitors at least a received signal, and when at least the signal corresponding to part or all of a 9600-bps XID packet has been received, switches to the IrDA protocol to transmit/receive the data by the IrDA protocol.

In addition, the storage device in accordance with the present invention, in addition to the abovementioned configuration, further includes: a second timer measuring an elapsed time; an edge detector section detecting a rising edge or a falling edge of a received signal; a protocol switching section switching between communications protocols; and a receipt discrimination section determining whether the signal corresponding to part or all of a 9600-bps XID packet has been received, wherein: the second timer measures an interval from one rising edge to a next rising edge of the received signal or an interval from one falling edge to a next falling edge of the received signal as detected by the edge detector section; the receipt discrimination section, when the interval is determined to fall in a range between a predetermined maximum and a predetermined minimum, determines that the received signal is part of a 9600-bps XID packet; and the protocol switching section switches to the IrDA protocol based on the determination that the received signal is part of a XID packet.

In addition, the storage device in accordance with the present invention, in addition to the abovementioned configuration, further includes: an IrDA SIR demodulator circuit; a protocol switching section switching between communications protocols; and a receipt discrimination section determining whether the signal corresponding to part or all of a 9600-bps XID packet has been received, wherein when the SIR demodulator circuit is in operation, when demodulated with a clock other than a clock needed to demodulate the 9600-bps signal, if the received signal is such a bit pattern that all bits of demodulated data of the demodulated n×8 bits (n is an integer from 1 to 10 inclusive) are 1s in binary representation, the receipt discrimination section determines that the received signal is part of a 9600-bps XID packet; and the protocol switching section switches to the IrDA protocol based on the determination that the received signal is part of a XID packet.

In addition, the storage device in accordance with the present invention, in addition to the abovementioned configuration, further includes: a third timer measuring an elapsed time; a FIFO memory which is a first-in/first-out device; and a signal reception frequency switching section switching between signal reception frequencies, wherein the receipt discrimination section measures the time it takes for the demodulated data to be written into the FIFO memory, the time it takes for the data in the FIFO memory to be available for retrieval, or the interrupt interval indicating that the FIFO memory is not empty on the third timer, and when the measured time falls between the predetermined maximum and minimum, determines that the part of a 9600-bps XID packet has been received; and the signal reception frequency switching section switches the clock to the 9600-bps signal reception frequency based on the determination that the received signal is part of a XID packet.

A projector device in accordance with the present invention, such as a projector, includes: either the receiver of the aforementioned configuration or the reception program of the aforementioned configuration in a computer-readable recording medium, so as to receive data, compress, decompress, process, and record the received data.

In addition, the projector device in accordance with the present invention, in addition to the abovementioned configuration, is provided with a built-in IrDA protocol through either hardware or software, monitors at least a received signal, and when at least the signal corresponding to part or all of a 9600-bps XID packet has been received, switches to the IrDA protocol to transmit/receive the data by the IrDA protocol.

In addition, the projector device in accordance with the present invention, in addition to the abovementioned configuration, further includes: a second timer measuring an elapsed time; an edge detector section detecting a rising edge or a falling edge of a received signal; a protocol switching section switching between communications protocols; and a receipt discrimination section determining whether the signal corresponding to part or all of a 9600-bps XID packet has been received, wherein: the second timer measures an interval from one rising edge to a next rising edge of the received signal or an interval from one falling edge to a next falling edge of the received signal as detected by the edge detector section; the receipt discrimination section, when the interval is determined to fall in a range between a predetermined maximum and a predetermined minimum, determines that the received signal is part of a 9600-bps XID packet; and the protocol switching section switches to the IrDA protocol based on the determination that the received signal is part of a XID packet.

In addition, the projector device in accordance with the present invention, in addition to the abovementioned configuration, further includes: an IrDA SIR demodulator circuit; a protocol switching section switching between communications protocols; and a receipt discrimination section determining whether the signal corresponding to part or all of a 9600-bps XID packet has been received, wherein when the SIR demodulator circuit is in operation, when demodulated with a clock other than a clock needed to demodulate the 9600-bps signal, if the received signal is such a bit pattern that all bits of demodulated data of the demodulated n×8 bits (n is an integer from 1 to 10 inclusive) are 1s in binary representation, the receipt discrimination section determines that the received signal is part of a 9600-bps XID packet; the protocol switching section switches to the IrDA protocol based on the determination that the received signal is part of a XID packet.

In addition, the projector device in accordance with the present invention, in addition to the abovementioned configuration, further includes: a third timer measuring an elapsed time; a FIFO memory which is a first-in/first-out device; and a signal reception frequency switching section switching between signal reception frequencies, wherein the receipt discrimination section measures the time it takes for the demodulated data to be written into the FIFO memory, the time it takes for the data in the FIFO memory to be available for retrieval, or the interrupt interval indicating that the FIFO memory is not empty on the third timer, and when the measured time falls between the predetermined maximum and minimum, determines that the part of a 9600-bps XID packet has been received; and the signal reception frequency switching section switches the clock to the 9600-bps signal reception frequency based on the determination that the received signal is part of a XID packet.

An image transmission/receipt system in accordance with the present invention includes: the data transmission device of the aforementioned configuration; and the data receipt device of the aforementioned configuration, wherein at least image data is transmitted/received.

According to the configuration, it takes less time to establish a connection to a device involved in the communications. The user feels less frustrated. Data is transferred more reliably.

In addition, when an attempt to establish a connect has failed, the system switches to the IrDA protocol and attempts another data transmission/receipt. Thus, if the receiving end is compatible with the IrDA protocol, data can be transmitted/received.

The transmitter in accordance with the present invention, as described in the foregoing, includes: the dividing section dividing the transfer data into multiple divisional data sets; the error detection information adding section adding error detection information based on which an error in the divisional data sets is detected to each of the divisional data sets produced by the dividing by the dividing section; and the first transmitter section transmitting the multiple divisional data sets to which the error detection information is added by the error detection information adding section all together.

In addition, the receiver in accordance with the present invention, as described in the foregoing, includes: the second receiver section receiving the multiple divisional data sets into which the transfer data is divided and the error detection information based on which an error in the divisional data sets is detected together from the transmitter; and the error detection section detecting whether any of the divisional data sets contains an error according to the error detection information received by the second receiver section, wherein when the error detection section has detected no error in any of the divisional data sets, the receiver performs a predetermined process according to the divisional data sets.

Therefore, data transfer is very reliable. It takes less time to transfer data.

With the transmitter, receiver, data transfer system, transmission method, reception method, transmission program, reception program, and recording medium in accordance with the present invention, data transfer is very reliable, and it takes less time to transfer data. Therefore, the transmitter, transmission method, or transmission program in accordance with the present invention are applicable to electronics, such as, mobile phones, PDAs, and personal computers. In contrast, the receiver, reception method, or reception program in accordance with the present invention are applicable to electronics, such as, televisions, AV equipment, printers, and personal computers. In addition, the data transfer system in accordance with the present invention is applicable to both wireless transmission and wired transmission.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. An electronic device comprising:
 a receiver receiving transfer data having a predetermined amount from a transmitter, the receiver including:
 a second receiver section receiving multiple divisional data sets and error detection information together from the transmitter, the transfer data being divided into the multiple divisional data sets, an error in each of the multiple divisional data sets being detected based on the error detection information; and
 an error detection section detecting whether any of the multiple divisional data sets contains an error according to the error detection information received by the second receiver section,
 wherein when the error detection section has detected no error in the multiple divisional data sets, the receiver performs a predetermined process according to the multiple divisional data sets, and
 wherein the electronic device is provided with a built-in Infrared Data Association (IrDA) protocol through either hardware or software, monitors at least a received signal, and at least upon receipt of a signal corresponding to part or all of a 9600-bps station discovery (XID) packet, switches to the IrDA protocol to transmit/receive data by the IrDA protocol, the electronic device further comprising:
 a second timer measuring an elapsed time;
 an edge detector section detecting a rising edge or a falling edge of a received signal;

a protocol switching section switching between communications protocols; and a receipt discrimination section determining whether the signal corresponding to part or all of the 9600-bps XID packet has been received, wherein:

the second timer measures an interval from one rising edge to a next rising edge of the received signal or an interval from one falling edge to a next falling edge of the received signal as detected by the edge detector section;

the receipt discrimination section, when the interval is determined to fall in a range between a predetermined maximum and a predetermined minimum, determines that the received signal is part of the 9600-bps XID packet; and the protocol switching section switches to the IrDA protocol based on the determination that the received signal is part of a XID packet.

2. An electronic device comprising:

a receiver receiving transfer data having a predetermined amount from a transmitter, the receiver including:

a second receiver section receiving multiple divisional data sets and error detection information together from the transmitter, the transfer data being divided into the multiple divisional data sets, an error in each of the multiple divisional data sets being detected based on the error detection information; and an error detection section detecting whether any of the multiple divisional data sets contains an error according to the error detection information received by the second receiver section, wherein when the error detection section has detected no error in the multiple divisional data sets, the receiver performs a predetermined process according to the multiple divisional data sets, and wherein the electronic device is provided with a built-in Infrared Data Association (IrDA) protocol through either hardware or software, monitors at least a received signal, and at least upon receipt of a signal corresponding to part or all of a 9600-bps station discovery (XID) packet, switches to the IrDA protocol to transmit/receive data by the IrDA protocol, the electronic device further comprising:

an IrDA Serial Infrared (SIR) demodulator circuit;

a protocol switching section switching between communications protocols; and a receipt discrimination section determining whether the signal corresponding to part or all of the 9600-bps XID packet has been received, wherein:

when IrDA SIR demodulator circuit is in operation, when demodulated with a clock other than a clock needed to demodulate the 9600-bps XID packet, if the received signal is such a bit pattern that all bits of demodulated data of the demodulated n×8 bits (n is an integer from 1 to 10 inclusive) are 1 s in binary representation, the receipt discrimination section determines that the received signal is part of the 9600-bps XID packet; and the protocol switching section switches to the ITDA protocol based on the determination that the received signal is part of a XID packet.

3. The electronic device as set forth in claim 2, further comprising:

a third timer measuring an elapsed time;

a FIFO memory which is a first-in/first-out device; and a signal reception frequency switching section switching between signal reception frequencies, wherein the receipt discrimination section measures a time it takes for the demodulated data to be written into the FIFO memory, a time it takes for the data in the FIFO memory to be available for retrieval, or an interrupt interval indicating that the FIFO memory is not empty on the third timer, and when the measured time falls between the predetermined maximum and minimum, determines that the part of a 9600-bps XID packet has been received; and the signal reception frequency switching section switches the clock to the 9600-bps XID packet signal reception frequency based on the determination that the received signal is part of a XID packet.

* * * * *